US006245499B1

(12) United States Patent
Suzuki et al.

(10) Patent No.: US 6,245,499 B1
(45) **Date of Patent: *Jun. 12, 2001**

(54) PHOTOTHERMOGRAPHIC MATERIAL

(75) Inventors: Keiichi Suzuki; Toshiaki Kubo; Yoshio Inagaki; Tsutomu Arai, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,834

(22) Filed: Aug. 21, 1998

Related U.S. Application Data

(63) Continuation-in-part of application No. 08/841,321, filed on Apr. 30, 1997, now abandoned.

(30) Foreign Application Priority Data

| | | |
|---|---|---|
| Apr. 30, 1996 | (JP) | 8-132837 |
| Apr. 30, 1996 | (JP) | 8-132838 |
| May 17, 1996 | (JP) | 8-148112 |
| May 17, 1996 | (JP) | 8-148117 |

(51) Int. Cl.[7] .............................. G03C 1/498; G03C 1/20; G03C 1/34

(52) U.S. Cl. .......................... 430/619; 430/264; 430/513; 430/577; 430/584; 430/587; 430/591; 430/594; 430/944

(58) Field of Search .................................... 430/619, 264, 430/584, 588, 577, 592, 591, 587, 513, 944, 611

(56) References Cited

U.S. PATENT DOCUMENTS

| | | | | |
|---|---|---|---|---|
| 3,719,495 | | 3/1973 | Lea . | |
| 3,761,279 | | 9/1973 | de Mauriac et al. . | |
| 5,135,842 | * | 8/1992 | Kitchin et al. | 430/510 |
| 5,258,282 | | 11/1993 | Kagami et al. . | |
| 5,314,795 | * | 5/1994 | Helland et al. | 430/517 |
| 5,441,866 | | 8/1995 | Miller et al. . | |
| 5,482,814 | * | 1/1996 | Ooi et al. | 430/203 |
| 5,496,695 | * | 3/1996 | Simson et al. | 430/619 |
| 5,541,054 | * | 7/1996 | Miller et al. | 430/572 |
| 5,578,414 | * | 11/1996 | Yamamoto et al. | 430/577 |
| 5,580,711 | * | 12/1996 | Kagawa et al. | 430/577 |
| 5,604,089 | * | 2/1997 | Ikegawa et al. | 430/584 |
| 5,618,660 | * | 4/1997 | Fujiwara et al. | 430/584 |
| 5,677,121 | | 10/1997 | Tsuzuki . | |
| 5,698,380 | | 12/1997 | Toya . | |
| 5,698,390 | * | 12/1997 | Toya | 430/584 |
| 5,700,630 | * | 12/1997 | Inoue et al. | 430/522 |
| 5,714,307 | * | 2/1998 | Harada et al. | 430/510 |

FOREIGN PATENT DOCUMENTS

| | | | |
|---|---|---|---|
| 0559228A1 | | 8/1993 | (EP) . |
| 0559228 | * | 9/1993 | (EP) . |
| 0616014A2 | | 9/1994 | (EP) . |
| 0762196A1 | | 3/1997 | (EP) . |
| 0803765A1 | | 10/1997 | (EP) . |
| 0803766A1 | | 10/1997 | (EP) . |
| 9711407 | | 3/1997 | (WO) . |

* cited by examiner

*Primary Examiner*—Thorl Chea
(74) *Attorney, Agent, or Firm*—Birch, Stewart, Kolasch & Birch, LLP

(57) ABSTRACT

In a photothermographic material comprising an organic silver salt, a silver halide, and a reducing agent, a hydrazine compound of a special structure and a sensitizing dye of a special structure are contained. The photothermographic material shows high Dmax and ultrahigh contrast.

20 Claims, No Drawings

PHOTOTHERMOGRAPHIC MATERIAL

This application is a continuation-in-part of application Ser. No. 08/841,321 filed on Apr. 30, 1997, the entire contents of which are hereby incorporated by reference, now abandoned.

BACKGROUND OF THE INVENTION

This invention relates to a photothermographic material and more particularly, to a photothermographic material capable of forming a high transparency image faithful to exposure, especially suited for the manufacture of printing plates.

Nowadays, scanners and image setters which can be exposed by means of lasers and light-emitting diodes find widespread use as output devices in the printing art. There is a strong demand for a printing photosensitive material having high sensitivity, Dmax, contrast, and image quality. On the other hand, it is strongly desired from the standpoints of environmental protection and space saving to reduce the amount of waste solution used in the processing of conventional photographic silver halide photosensitive materials.

However, printing photosensitive materials which can form images through a simple process without resorting to solution system processing chemicals have never been supplied to the customers.

Photothermographic materials which are processed by a photothermographic process to form photographic images are disclosed, for example, in U.S. Pat. Nos. 3,152,904 and 3,457,075, D. Morgan and B. Shely, "Thermally Processed Silver Systems" in "Imaging Processes and Materials," Neblette, 8th Ed., Sturge, V. Walworth and A. Shepp Ed., item 2, 1969.

These photothermographic materials have been used as microphotographic and medical photosensitive materials. Only a few have been used as a graphic printing photosensitive material because the image quality is poor for the printing purpose as demonstrated by low maximum density (Dmax) and soft gradation.

Photothermographic materials having high Dmax and contrast are prepared by adding hydrazine derivatives to photosensitive material as disclosed in U.S. Pat. No. 5,496,695 and Japanese Patent Application No. 215822/1996. This photothermographic material has the undesirable tendency of images in exposed areas to thicken and large dots to collapse when exposed by means of a laser image setter. Since currently available advanced laser image setters insure high precision exposure, a photosensitive material capable of reproducing an image faithful to exposure is strongly desired.

When it is desired to produce high resolution images faithful to exposure in these photosensitive materials, one solution is by adding an anti-irradiation dye or providing an anti-halation layer as in conventional wet process photographic silver halide photosensitive materials. In the wet system, the anti-irradiation dye is added to the photosensitive layer while the anti-halation layer is disposed between the support and the photosensitive layer or on the surface of the support remote from the photosensitive layer. In the wet system, the dye is readily bleached or dissolved away during development. In photothermographic material using a dry process, such a dye cannot be fully removed, resulting in an image with residual color.

In the above-referred U.S. Pat. No. 5,496,695, reference is made to thermal decolorization of polymethine dyes having a specific structure (U.S. Pat. No. 5,135,842) and thermal decolorization of similar polymethine dyes by carbanion generators (U.S. Pat. No. 5,314,795). These dyes undesirably lose their anti-irradiation or anti-halation function as the photosensitive material is naturally aged or exposed to high temperature. The above-mentioned polymethine dyes of a specific structure have the problem that after decolorization, decomposition products of the dye are left to provide light absorption, especially in the UV region. There have been available no anti-irradiation or anti-halation dyes which can be used in high Dmax, ultrahigh contrast photothermographic material for use in the manufacture of printing plates.

These photothermographic materials generally contain a reducible silver source (e.g., organic silver salt), a catalytic amount of a photocatalyst (e.g., silver halide), a toner for controlling the tonality of silver, and a developing agent, typically dispersed in a binder matrix. Photothermographic materials are stable at room temperature. When they are heated at an elevated temperature (e.g., 80° C. or higher) after exposure, redox reaction takes place between the reducible silver source (functioning as an oxidizing agent) and the developing agent to form silver. This redox reaction is promoted by the catalysis of a latent image produced by exposure. Silver formed by reaction of the organic silver salt in exposed regions provides black images in contrast to unexposed regions, forming an image.

Such photothermographic materials have been used as microphotographic and medical photosensitive materials. However, only a few have been used as a graphic printing photosensitive material because the image quality is poor for the printing purpose as demonstrated by low maximum density (Dmax) and soft gradation.

A photothermographic material having high Dmax and high contrast can be obtained by adding a hydrazine derivative to a photosensitive material as disclosed in Japanese Patent Application No. 228627/1995. When this photothermographic material having high Dmax and ultrahigh contrast is subject to high precision exposure which is enabled by the advanced laser technology, there arises a problem that image quality is exacerbated at dot edges.

With the recent advance of lasers and light-emitting diodes, scanners and image setters having an oscillation wavelength of 600 to 800 nm find widespread use. There is a strong desire to have a high contrast photosensitive material which has so high sensitivity and Dmax that it may comply with such output devices.

For the purposes of easy handling and rapid accurate feed of sheets of photosensitive material, the existing exposure apparatus and automatic processors which are used with conventional photographic silver halide photosensitive materials are sometimes equipped with a mechanism for detecting the photosensitive material. The detector is generally an optical sensor comprising a light source and a light receiving element. Light used for detection should have a wavelength in the wavelength region to which the silver halide in the photosensitive material is insensitive, typically the infrared region of 850 to 1,400 nm. Conventional photographic silver halide photosensitive materials have sufficient light absorption in the IR region to enable detection.

In contrast, photothermographic materials comprising an organic silver salt, silver halide and reducing agent on a support do not have sufficient light absorption to enable detection because the coverage of silver halide is extremely small (typically a silver coverage of less than 3 g/m$^2$ even when combined with organic acid silver salt) as compared with conventional photographic silver halide photosensitive materials. Then with respect to film detection, the photothermographic materials do not comply with the existing exposure apparatus which are used with conventional photographic silver halide photosensitive materials.

It would occur to those skilled in the art that this problem is solved by adding dyes having light absorption in the IR region to photothermographic materials. In the wet system, such dyes are readily bleached during development or dissolved away in the processing solution and it never happens that an image becomes unclear due to the residual dye. In the photothermographic materials, however, the dyes cannot be dissolved away because of a dry process.

Known methods for diminishing the color of a dye without dissolving the dye away are by thermally decolorizing polymethine dyes having a specific structure as disclosed in U.S. Pat. No. 5,135,842 and by thermally decolorizing similar polymethine dyes using carbanion generators as previously mentioned. These dyes, however, are not IR absorbing dyes and tend to lower their concentration as the photosensitive material ages or is exposed to high temperature. The antihalation dyes described in JP-A 13295/1995 are added to photosensitive material as a solution in a good solvent and do not have sufficient IR absorption for detection.

SUMMARY OF THE INVENTION

A first object of the present invention is to provide a photothermographic material featuring high Dmax, ultrahigh contrast.

A second object of the present invention is to provide a photothermographic material featuring improved resolution and free of residual color after processing.

A third object of the present invention is to provide a photothermographic material producing high Dmax, ultrahigh contrast image of quality.

A fourth object of the present invention is to provide a photothermographic material having sensitivity at 600 to 850 nm, high Dmax, high contrast of toe gradation, and ultrahigh contrast.

A fifth object of the present invention is to provide a photothermographic material featuring high Dmax, ultrahigh contrast, and improved resolution, being free of residual color after processing and detectable with infrared light.

These objects are achieved by the present invention which is defined below.

(1) A photothermographic material comprising at least one photosensitive layer, which comprises an organic silver salt, a silver halide, a reducing agent, a hydrazine derivative of the following general formula (H):

(H)

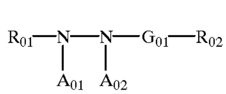

wherein $R_{01}$ is an aliphatic, aromatic or heterocyclic group; $R_{02}$ is a hydrogen atom, alkyl, aryl, heterocyclic, alkoxy, aryloxy, amino or hydrazino group; $G_{01}$ is a group represented by: —CO—, —$SO_2$—, —SO—, —P(=O) (—$R_{03}$)— or —CO—CO—, a thiocarbonyl or iminomethylene group; $A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following general formula (D-I) or (D-II):

(D-1)

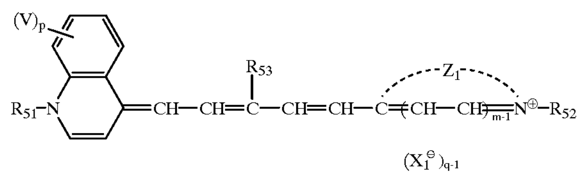

wherein each of $R_{51}$ and $R_{52}$, which may be identical or different, is an alkyl group; $R_{53}$ is a hydrogen atom, lower alkyl, lower alkoxy, phenyl, benzyl or phenethyl group; V is a hydrogen atom, lower alkyl, alkoxy, halogen atom or a substituted alkyl group; $Z_1$ is a group of non-metallic atoms necessary to complete a five- or six-membered nitrogenous heterocycle; $X_1$ is an acid anion; letters m, p and q are independently equal to 1 or 2, with the proviso that q is 1 when the dye forms an intramolecular salt.

(D-II)

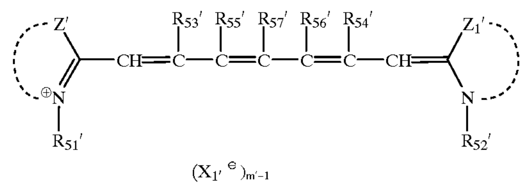

wherein each of $R_{51}'$ and $R_{52}'$, which may be identical or different, is an alkyl group; $R_{53}'$ and $R_{54}'$ each are a hydrogen atom, lower alkyl, lower alkoxy, phenyl, benzyl or phenethyl group; $R_{55}'$ and $R_{56}'$ each are a hydrogen atom or $R_{55}'$ and $R_{56}'$, taken together, form a divalent alkylene group; $R_{57}'$ is a hydrogen atom, lower alkyl, lower alkoxy, phenyl, benzyl or —N($W_1'$) ($W_2'$) group wherein $W_1'$ and $W_2'$ are independently selected from alkyl and aryl groups, or $W_1'$ and $W_2'$, taken together, may form a five- or six-membered nitrogenous heterocycle; or $R_{53}'$ and $R_{57}'$ or $R_{54}'$ and $R_{57}'$, taken together, may form a divalent alkylene group; each of Z' and $Z_1'$ is a group of non-metallic atoms necessary to complete a 5- or 6-membered nitrogenous heterocycle; $X_1'$ is an acid anion; and letter m' is equal to 1 or 2 with the proviso that m' is 1 when the dye forms an intramolecular salt.

(2) The photothermographic material of (1) wherein in formula (H), $R_{02}$ is an alkyl, aryl, heterocyclic, alkoxy, aryloxy, amino or hydrazino group when $G_{01}$ is —CO—, and $R_{02}$ is a hydrogen atom, alkyl, aryl, heterocyclic, alkoxy, aryloxy, amino or hydrazino when $G_{01}$ is —$SO_2$—, —SO—, —P(=O)(—$R_{03}$)—, —CO—CO—, thiocarbonyl or iminomethylene group.

(3) The photothermographic material of (2) wherein in formula (H), $G_{01}$ is —CO—, $R_{02}$ is alkyl, and $A_{01}$ and $A_{02}$ are hydrogen.

(4) A photothermographic material comprising at least one photosensitive layer, which comprises an organic silver salt, a silver halide, a reducing agent, a hydrazine derivative of the following general formula (H):

(H)

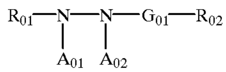

wherein $R_{01}$ is an aliphatic, aromatic or heterocyclic group; $R_{02}$ is a hydrogen atom, alkyl, aryl, heterocyclic, alkoxy, aryloxy, amino or hydrazino group; $G_{01}$ is a group represented by: —CO—, —$SO_2$—, —SO—, —P(═O)(—$R_{03}$)— or —CO—CO—, a thiocarbonyl or iminomethylene group; $A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following general formula (D-III):

(D-III)

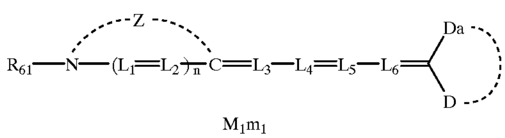

wherein $R_{61}$ is an alkyl group; Z is a group of atoms necessary to complete a five- or six-membered nitrogenous heterocycle; each of D and Da is a group of atoms necessary to form a cyclic or acyclic acidic nucleus; each of $L_1$, $L_2$, $L_3$, $L_4$, $L_5$ and $L_6$ is a methine group; $M_1$ is an electric charge balancing counter ion; $m_1$ is a number necessary to neutralize the electric charge in a molecule; n is 0 or 1.

(5) The photothermographic material of (4) wherein in formula (H), $R_{02}$ is an alkyl, aryl, heterocyclic, alkoxy, aryloxy, amino or hydrazino group when $G_{01}$ is —CO—, and $R_{02}$ is a hydrogen atom, alkyl, aryl, heterocyclic, alkoxy, aryloxy, amino or hydrazino when $G_{01}$ is —$SO_2$—, —SO—, —P(═O) (—$R_{03}$)—, —CO—CO—, thiocarbonyl or iminomethylene group.

(6) The photothermographic material of (5) wherein in formula (H), $G_{01}$ is —CO—, $R_{02}$ is alkyl, and $A_{01}$ and $A_{02}$ are hydrogen.

(7) A photothermographic material comprising at least one photosensitive layer, which comprises an organic silver salt, a silver halide, a reducing agent, a hydrazine derivative of the following general formula (H):

(H)

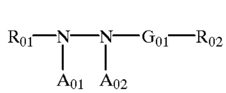

wherein $R_{01}$ is an aliphatic, aromatic or heterocyclic group; $R_{02}$ is a hydrogen atom, alkyl, aryl, heterocyclic, alkoxy, aryloxy, amino or hydrazino group; $G_{01}$ is a group represented by: —CO—, —$SO_2$—, —SO—, —P(═O)(—$R_{03}$)— or —CO—CO—, a thiocarbonyl or iminomethylene group; $A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following general formula (D-IV):

(D-IV)

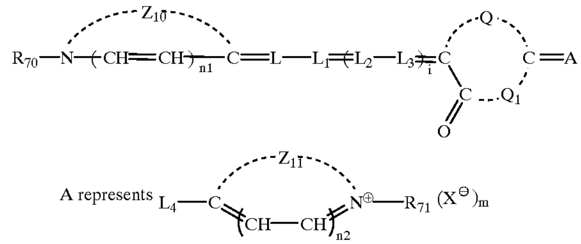

wherein each of $Z_{10}$ and $Z_{11}$ is a group of non-metallic atoms necessary to complete a five- or six-membered nitrogenous heterocyclic nucleus; each of $R_{70}$ and $R_{71}$ is an alkyl, substituted alkyl or aryl group; Q and $Q_1$, taken together, are a group of non-metallic atoms necessary to complete a 4-thiazolidinone, 5-thiazolidinone or 4-imidazolidinone nucleus; each of L, $L_1$, $L_2$, $L_3$, and $L_4$ is a substituted or unsubstituted methine group, or L and $L_2$, or $L_1$ and $L_3$ may form a five- or six-membered ring; $n_1$ and $n_2$ each are 0 or 1; X is an anion; m is 0 or 1, with the proviso that m is 0 when the dye forms an intramolecular salt.

(8) A photothermographic material comprising at least one photosensitive layer, which comprises an organic silver salt, a silver halide, a reducing agent, a hydrazine derivative of the following general formula (H):

(H)

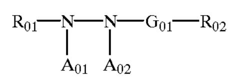

wherein $R_{01}$ is an aliphatic, aromatic or heterocyclic group; $R_{02}$ is a hydrogen atom, alkyl, aryl, heterocyclic, alkoxy, aryloxy, amino or hydrazino group; $G_{01}$ is a group represented by: —CO—, —$SO_2$—, —SO—, —P(═O) (—$R_{03}$)— or —CO—CO—, a thiocarbonyl or iminomethylene group; $A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following general formula (D-V):

(D-V)

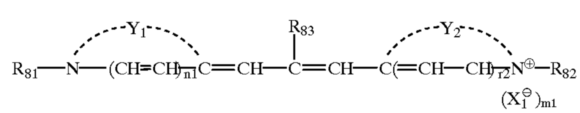

wherein each of $Y_1$ and $Y_2$ is a group of non-metallic atoms necessary to complete a five- or six-membered nitrogenous heterocyclic nucleus which may have a substituent; each of $R_{81}$ and $R_{82}$, which may be identical or different, is a substituted or unsubstituted lower alkyl group; $R_{83}$ is a hydrogen atom, lower alkyl, lower alkoxy, phenyl, benzyl or phenethyl group; $X_1$ is an acid anion; $n_1$ and $n_2$ each are 0 or 1; and $m_1$ is 0 or 1, with the proviso that $m_1$ is 0 when the dye forms an intramolecular salt.

(9) A photothermographic material comprising at least one photosensitive layer, which comprises an organic silver salt, a silver halide, a reducing agent, a hydrazine derivative of the following general formula (H):

(H)

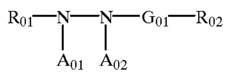

wherein $R_{01}$ is an aliphatic, aromatic or heterocyclic group; $R_{02}$ is a hydrogen atom, alkyl, aryl, heterocyclic, alkoxy, aryloxy, amino or hydrazino group; $G_{01}$ is a group represented by: —CO——$SO_2$—, —SO—, —P(=O) (—$R_{03}$)— or —CO—CO—, a thiocarbonyl or iminomethylene group; $A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following general formula (D-VI):

(D-VI)

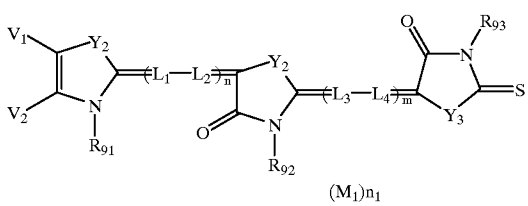

wherein $Y_1$, $Y_2$ and $Y_3$ are independently a group —N—($R_{90}$)—, oxygen, sulfur or selenium atom; each of $R_{90}$, $R_{91}$, $R_{92}$ and $R_{93}$ is an aliphatic, aryl or heterocyclic group; each of $V_1$ and $V_2$ is a hydrogen atom, alkyl, alkoxy or aryl group, or $V_1$ and $V_2$, taken together, may form a fused ring with the azole ring; each of $L_1$, $L_2$, $L_3$, and $L_4$ is a substituted or unsubstituted methine group; n is 1 or 2; m is 0 or 1; $M_1$ is an electric charge balancing counter ion; and $n_1$ is a number necessary to neutralize the electric charge in a molecule.

(10) The photothermographic material of any one of (1), (4), (7), (8) or (9) comprising the organic silver salt, the silver halide, and the reducing agent on a transparent support, wherein at least one of thermally or optically decolorizable dyes is contained in at least one of the following layers: (1) a photosensitive layer on one surface of the support, (2) a layer disposed between the support and the photosensitive layer, (3) a layer coated on the opposite surface of the support to the photosensitive layer, and (4) a layer disposed on the same surface of the support as the photosensitive layer and more remote from the support than the photosensitive layer.

(11) The photothermographic material of (10) wherein said decolorizable dye comprises a dye combined with a thermal and/or optical bleaching agent.

(12) The photothermographic material of (10) wherein said decolorizable dye comprises a basic colorless dye precursor and an acidic material.

(13) The photothermographic material of (10) wherein said decolorizable dye comprises an acidic colorless dye precursor and a basic material.

(14) The photothermographic material of (10) wherein said decolorizable dye comprises at least one decarbonating compound.

(15) The photothermographic material of (10) wherein said decolorizable dye decolorizes upon exposure to light of up to 100,000 lux-min.

(16) The photothermographic material of (10) wherein said decolorizable dye comprises (a) a photosensitive halogenated compound which generates an acid upon photolysis and (b) a dye which undergoes a change of color hue upon acidolysis.

(17) The photothermographic material of (10) which has a transmission density in excess of 0.2 in the photosensitive wavelength range before heat development and a transmission density of up to 0.1 in the wavelength range of 350 to 700 nm in a minimum density portion after decolorization.

(18) The photothermographic material of (1) wherein said hydrazine derivative has the following general formula (Hb) or (Hc);

general formula (Hb):

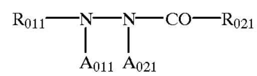

wherein $R_{011}$ is an aromatic group; $R_{021}$ is an alkyl group having at least one electron attractive substituent, an aryl group having at least one electron attractive substituent, or a heterocyclic, amino, alkylamino, arylamino, heterocyclic amino, hydrazino, alkoxy or aryloxy group; both $A_{011}$ and $A_{021}$ are hydrogen atoms or one of $A_{011}$ and $A_{021}$ is a hydrogen atom and the other is a substituted or unsubstituted alkylsulfonyl, arylsulfonyl or acyl group;

general formula (Hc):

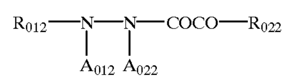

wherein $R_{012}$ is an aromatic group; $R_{022}$ is an amino, alkylamino, arylamino, heterocyclic amino, hydrazino, alkoxy, aryloxy, alkyl or aryl group; and $A_{012}$ and $A_{022}$ are as defined for $A_{011}$ and $A_{021}$.

(19) The photosensitive material of (18) further comprising a supersensitizing amount of an aromatic mercapto compound of the following general formula (I), the silver halide being spectrally sensitized at 600 to 850 nm with a spectral sensitizing dye;

$$Ar—SM \quad (I)$$

wherein M is hydrogen or an alkali metal atom and Ar is a heteroaromatic ring.

(20) The photothermographic material of (19) wherein said spectral sensitizing dye is a cyanine dye having at least one substituent with a thioether bond.

(21) The photothermographic material of any one of (1), (4), (7), (8) or (9) which has a spectral sensitivity maximum at a wavelength of from 600 nm to less than 850 nm, said material further comprising an infrared-absorbing dye having an absorption maximum wavelength of 850 to 1,400 nm.

(22) The photothermographic material of (21) further comprising a hydrazine derivative.

(23) The photothermographic material of (21) wherein said infrared-absorbing dye comprises at least one of dyes of the following general formulae (F1) and (F2):

$$A_1{=}L_a{-}A_2 \quad \text{(F1)}$$

$$B_1{=}L_b{-}B_2 \quad \text{(F2)}$$

wherein $A_1$ and $A_2$ each are an acidic nucleus, $B_1$ is a basic nucleus, $B_2$ is an onium form of basic nucleus, $L_a$ and $L_b$ each are a linking group having 5, 7, 9 or 11 methine groups connected through a conjugated double bond, X is an anion, and letter k is equal to 2 or 1, with the proviso that k is 1 where the dye forms an intramolecular salt.

(24) The photothermographic material of (21) wherein said infrared-absorbing dye comprises at least one lake cyanine dye of the following general formula (F3):

$$D{-}A_m{\cdot}Y_n \quad \text{(F3)}$$

wherein D is a skeleton of the cyanine dye represented by the following general formula (F4), A is an anionic dissociatable group attached to D as a substituent, Y is a cation, letter m is an integer of 2 to 5, and n is an integer of 1 to 5 for balancing the electric charge, (F4)

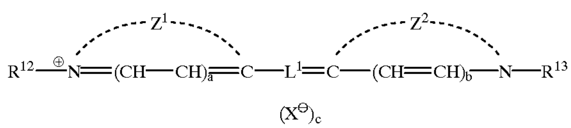

wherein $Z^1$ and $Z^2$ each are a group of non-metallic atoms necessary to form a five- or six-membered nitrogenous heterocycle which may have a ring fused thereto, $R^{12}$ and $R^{13}$ each are an alkyl, alkenyl or aralkyl group, $L^1$ is a linking group having 5, 7 or 9 methine groups connected through a conjugated double bond, and letters a, b and c each are 0 or 1.

(25) The photothermographic material of any one of (21) to (24) wherein the IR absorbing dye is present in the material in such a state that the material may have an absorption spectrum shifted at least 50 nm longer than the absorption maximum wavelength of a solution of the dye.

(26) The photothermographic material of any one of (21) to (24) wherein prior to heat development, said material has a transmission density of more than 0.3 at a wavelength of 850 to 1,400 nm and after heat development, a minimum density area of said material has a transmission density of up to 0.1 at a wavelength of 350 to 700 nm.

DETAILED DESCRIPTION OF THE INVENTION

The photographic photosensitive material of the invention is described in detail. Unless otherwise stated, the following description refers to a photosensitive material containing a hydrazine derivative.

The photothermographic material of the invention is to form a photographic image through a photothermographic process. The photothermographic material generally contains a reducible silver source (typically organic silver salt), a catalytic amount of a silver halide, a hydrazine derivative, a reducing agent, and optionally a toner for controlling the tonality of silver, typically dispersed in an (organic) binder matrix. While the photothermographic material is stable at room temperature, it is developed by heating at an elevated temperature (e.g., 80° C. or higher) after exposure. Upon heating, redox reaction takes place between the organic silver salt (functioning as an oxidizing agent) and the reducing agent to form silver. This redox reaction is promoted by the catalysis of a latent image produced in the silver halide by exposure. Silver formed by reaction of the organic silver salt in exposed regions provides black images in contrast to unexposed regions, forming an image. Since this reaction process proceeds without a need for water supply, it yields no waste liquid and is favorable for the environment.

Hydrazines

In the photothermographic material of the invention, hydrazine derivatives are contained. The hydrazine derivatives used herein are preferably of the following general formula (H).

(H)

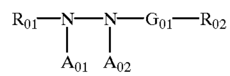

In formula (H), $R_{01}$ is an aliphatic, aromatic or heterocyclic group. $R_{02}$ is a hydrogen atom, alkyl, aryl, heterocyclic, alkoxy, aryloxy, amino or hydrazino group. $G_{01}$ is a group represented by: —CO—, —$S_{02}$—, —SO—, —P(=O) (—$R_{03}$)—or —CO—CO—, a thiocarbonyl or iminomethylene group. $A_{01}$ and $A_{02}$ are both hydrogen atoms, or one of $A_{01}$ and $A_{02}$ is a hydrogen atom and the other is a substituted or unsubstituted alkylsulfonyl group, substituted or unsubstituted arylsulfonyl group or substituted or unsubstituted acyl group. $R_{03}$ is a group selected from the same range as defined for $R_{02}$ and may be identical with or different from $R_{02}$.

In formula (H), the aliphatic groups represented by $R_{01}$ are preferably substituted or unsubstituted normal, branched or cyclic alkyl, alkenyl and alkynyl groups having 1 to 30 carbon atoms.

In formula (H), the aromatic groups represented by $R_{01}$ are preferably monocyclic or dicyclic aryl groups such as benzene and naphthalene rings. The heterocyclic groups represented by $R_{01}$ are preferably monocyclic or dicyclic, aromatic or non-aromatic heterocycles which may be fused to aryl to form a heteroaryl group. Exemplary are pyridine, pyrimidine, imidazole, pyrazole, quinoline, isoquinoline, benzimidazole, thiazole, and benzothiazole rings.

Aryl is the most preferred group of $R_{01}$.

The group represented by $R_{01}$ may have a substituent. Exemplary substituents include an alkyl group (inclusive of active methine groups), nitro group, alkenyl group, alkynyl group, aryl group, heterocyclic-containing group, group containing a quaternized nitrogen atom-bearing heterocycle (e.g., pyridinio), hydroxy group, alkoxy group (inclusive of groups containing recurring ethyleneoxy or propyleneoxy units), aryloxy group, acyloxy group, acyl group, alkoxycarbonyl group, aryloxycarbonyl group, carbamoyl group, urethane group, carboxyl group, imide group, amino group, carbonamide group, sulfonamide group, ureido group, thioureido group, sulfamoylamino group, semicarbazide group, thiosemicarbazide group, hydrazino-containing group, quaternary ammonio-bearing group, mercapto group, alkyl, aryl or heterocyclic thio group, alkyl or arylsulfonyl group, alkyl or arylsulfinyl group, sulfo group, sulfamoyl group, acylsulfamoyl group, alkyl or arylsulfonylureido group, alkyl or arylsulfonylcarbamoyl group, halogen atom, cyano group, phosphonic acid amide group, phosphate structure-bearing group, acyl urea structure-bearing group, selenium or tellurium atom-containing group, and tertiary or quaternary sulfonium structure-bearing group.

Desired among these groups are normal, branched or cyclic alkyl groups preferably having 1 to 20 carbon atoms, nitro group, aralkyl groups preferably having 1 to 20 carbon atoms, alkoxy groups preferably having 1 to 20 carbon atoms, substituted amino groups, especially amino groups having an alkyl substituent of 1 to 20 carbon atoms, acylamino groups preferably having 2 to 30 carbon atoms, sulfonamide groups preferably having 1 to 30 carbon atoms, ureido groups preferably having 1 to 30 carbon atoms, carbamoyl groups preferably having 1 to 30 carbon atoms, and phosphoric acid amide groups preferably having 1 to 30 carbon atoms.

In formula (H), the alkyl groups represented by $R_{02}$ are preferably those having 1 to 10 carbon atoms, and the aryl groups are preferably monocyclic or dicyclic aryl groups, for example, a benzene ring-containing group.

The heterocyclic groups represented by $R_{02}$ are preferably 5 or 6-membered rings containing at least one of nitrogen, oxygen and sulfur atoms, for example, imidazolyl, pyrazolyl, triazolyl, tetrazolyl, pyridyl, pyridinio, quinolinio, and quinolinyl groups, with the pyridyl and pyridinio groups being especially preferred.

The alkoxy groups represented by $R_{02}$ are preferably those having 1 to 8 carbon atoms, the aryloxy groups are preferably monocyclic, the amino groups are preferably unsubstituted amino, alkylamino groups having 1 to 10 carbon atoms, arylamino groups and heterocyclic amino groups.

The groups represented by $R_{02}$ may be substituted ones while preferred substituents are as exemplified for the substituent on $R_{01}$.

Where $G_{01}$ is a —CO— group, the preferred groups represented by $R_{02}$ are a hydrogen atom, alkyl groups (e.g., methyl, trifluoromethyl, difluoromethyl, 2-carboxytetrafluoroethyl, pyridiniomethyl, 3-hydroxypropyl, 3-methanesulfonamidopropyl, and phenylsulfonylmethyl), and aralkyl groups (e.g., o-hydroxybenzyl), aryl groups (e.g., phenyl, 4-nitrophenyl, 3,5-dichlorophenyl, o-methanesulfonamidophenyl, o-carbamoylphenyl, 4-cyanophenyl, and 2-hydroxymethylphenyl), with the hydrogen atom, alkyl and aryl groups being preferred.

Where $G_{01}$ is a —$SO_2$— group, the preferred groups represented by $R_{02}$ are alkyl groups (e.g., methyl), aralkyl groups (e.g., o-hydroxybenzyl), aryl groups (e.g., phenyl), and substituted amino groups (e.g., dimethylamino).

Where $G_{01}$ is a —COCO— group, the preferred groups represented by $R_{02}$ are alkoxy, aryloxy, and amino groups. Substituted amino groups are especially preferred, for example, 2,2,6,6-tetramethylpiperidin-4-ylamino, propylamino, anilino, o-hydroxyanilino, 5-benzotriazolylamino, and N-benzyl-3-pyridinioamino groups.

$R_{02}$ may be such a group as to induce cyclization reaction to cleave a $G_{01}$—$R_{02}$ moiety from the remaining molecule to generate a cyclic structure containing the atoms of the —$G_{01}$—$R_{02}$ moiety. Such examples are described in JP-A 29751/1988, for example.

In formula (H), each of $A_{01}$ and $A_{02}$ is a hydrogen atom, or a substituted or unsubstituted alkyl or arylsulfonyl group having up to 20 carbon atoms (preferably a phenylsulfonyl group or a phenylsulfonyl group substituted such that the sum of Hammette's substituent constants may be −0.5 or more), or substituted or unsubstituted acyl group having up to 20 carbon atoms (preferably a benzoyl group, a benzoyl group substituted such that the sum of Hammette's substituent constants may be −0.5 or more, or a linear, branched or cyclic, substituted or unsubstituted, aliphatic acyl group wherein the substituent is selected from a halogen atom, ether group, sulfonamide group, carbonamide group, hydroxyl group, carboxyl group and sulfonate group).

Most preferably, both $A_{01}$ and $A_{02}$ are hydrogen atoms.

The substituent on $R_{01}$ and $R_{02}$ may be further substituted, with preferred examples of the further substituent being those groups exemplified as the substituent on $R_{01}$. The further substituent, in turn, may be further substituted, the still further substituent, in turn, may be further substituted, and so on. In this way, multiple substitution is acceptable while preferred substituents are those groups exemplified as the substituent on $R_{01}$.

$R_{01}$ and $R_{02}$ in formula (H) may have incorporated therein a ballast group or polymer commonly used in immobile photographic additives such as couplers. The ballast group is a group having at least 8 carbon atoms and relatively inert with respect to photographic properties. It may be selected from, for example, alkyl, aralkyl, alkoxy, phenyl, alkylphenyl, phenoxy, and alkylphenoxy groups. The polymer is exemplified in JP-A 100530/1989, for example.

$R_{01}$ and $R_{02}$ in formula (H) may have incorporated therein a group capable of adsorbing to silver halide. Such adsorptive groups include alkylthio, arylthio, thiourea, thioamide, mercapto heterocyclic and triazole groups as described in U.S. Pat. Nos. 4,385,108 and 4,459,347, JP-A 195233/1984, 200231/1984, 201045/1984, 201046/1984, 201047/1984, 201048/1984, 201049/1984, 170733/1986, 270744/1986, 948/1987, 234244/1988, 234245/1988, and 234246/1988. The silver halide adsorbing groups may take the form of precursors. Such precursors are described in JP-A 285344/1990.

$R_{01}$ and $R_{02}$ in formula (H) may contain a plurality of hydrazino groups as substituents. In this case, the compound of formula (H) is an oligomer of hydrazino groups, examples of which are described in JP-A 86134/1989, 16938/1992 and 197091/1993.

Illustrative, non-limiting, examples of the compound represented by formula (H) are given below.

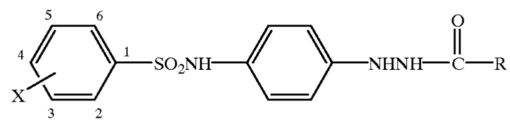
| | | R = | | | |
|---|---|---|---|---|---|
| | X = | —H | —$C_2F_4$—COOH (or —$C_2F_4$—$COO^{\ominus}K^{\oplus}$) | 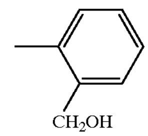 | 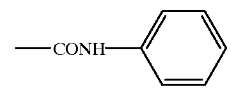 |
| H-1 | 3-NHCO—$C_9H_{19}$(n) | 1a | 1b | 1c | 1d |
| H-2 | 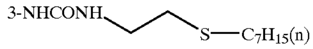 | 2a | 2b | 2c | 2d |
| H-3 | 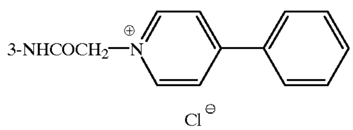 | 3a | 3b | 3c | 3d |
| H-4 | 3-NHCO$CH_2$—$N^{\oplus}$($CH_3$)$_2$—$C_8H_{17}$ $Cl^{\ominus}$ | 4a | 4b | 4c | 4d |
| H-5 | 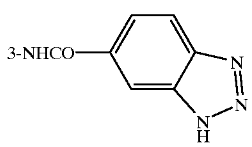 | 5a | 5b | 5c | 5d |
| H-6 | 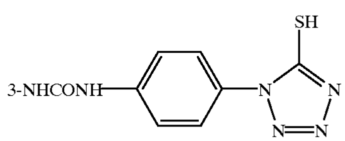 | 6a | 6b | 6c | 6d |
| H-7 | 2,4-($CH_3$)$_2$-3-S$C_2H_4$—(O$C_2H_4$)$_4$—O$C_8H_{17}$ | 7a | 7b | 7c | 7d |
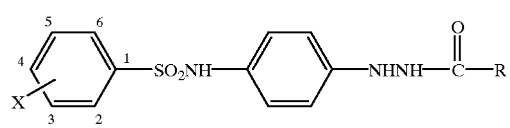
| | | R = | | | |
|---|---|---|---|---|---|
| | X = | —H | —$CF_2H$ | 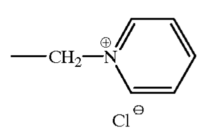 | 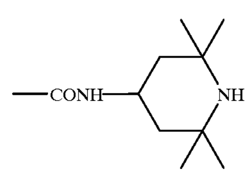 |
| H-8 | 3-CONH$CH_2$CH($C_2H_5$)—$C_4H_9$ | 8a | 8e | 8f | 8g |
| H-9 | 6-O$CH_3$-3-$C_5H_{11}$(t) | 9a | 9e | 9f | 9g |

-continued
| | | | | | |
|---|---|---|---|---|---|
| H-10 | 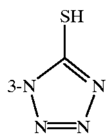 | 10a | 10e | 10f | 10g |
| H-11 | 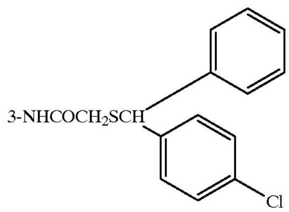 | 11a | 11e | 11f | 11g |
| H-12 | 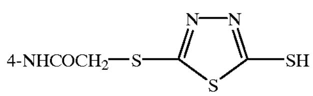 | 12a | 12e | 12f | 12g |
| H-13 | 3-NHCOCH($C_8H_{17}$)$CH_2COOH$ | 13a | 13e | 13f | 13g |
| H-14 | 3,5-(CONHCH$_2$CH($C_2H_5$)—$C_4H_9$)$_2$ | 14a | 14e | 14f | 14g |
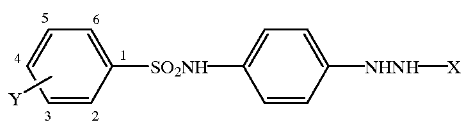
| | | X = | | | |
|---|---|---|---|---|---|
| | Y = | —CHO | —$COCF_3$ | —$SO_2CH_3$ | —P(=O)($OC_2H_5$)$_2$ |
| H-15 | 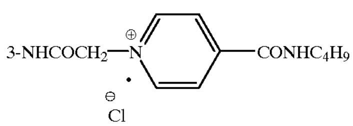 | 15a | 15h | 15i | 15j |
| H-16 | 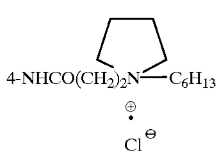 | 16a | 16h | 16i | 16j |
| H-17 | 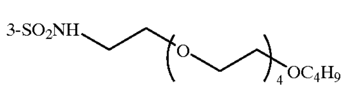 | 17a | 17h | 17i | 17j |
| H-18 | 3,4-(COOCH($CH_3$)COOC$_4$H$_9$)$_2$ | 18a | 18h | 18i | 18j |
| H-19 | 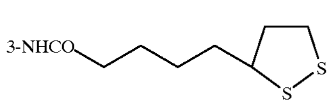 | 19a | 19h | 19i | 19j |
| H-20 | 3-NHSO$_2$NH—$C_6H_{17}$ | 20a | 20h | 20i | 20j |

-continued
| | | | | | |
|---|---|---|---|---|---|
| H-21 | 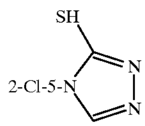 | 21a | 21h | 21i | 21j |
| | | R = | | | |
|---|---|---|---|---|---|
| | | —H | $—CF_2H$ | 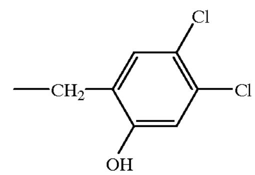 | $—CONHC_3H_7$ |
| H-22 | 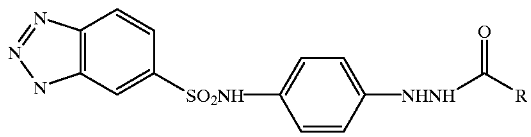 | 22a | 22e | 22k | 22l |
| H-23 | 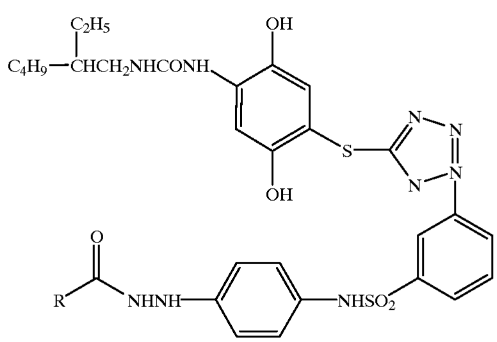 | 23a | 23e | 23k | 23l |
| H-24 | 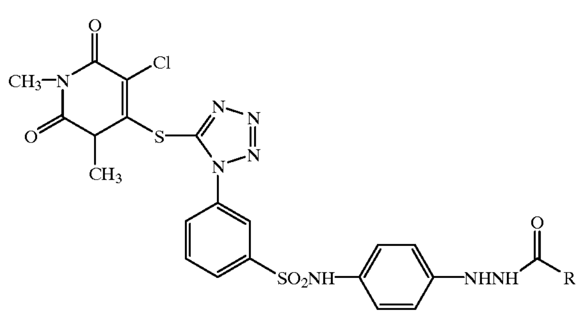 | 24a | 24e | 24k | 24l |
| H-25 | 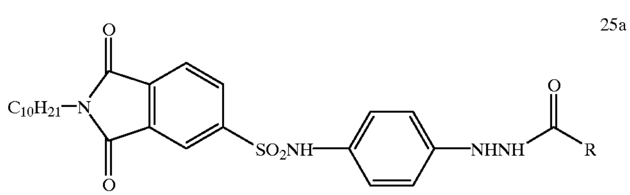 | 25a | 25e | 25k | 25l |

-continued
| | | | | | |
|---|---|---|---|---|---|
| H-26 | 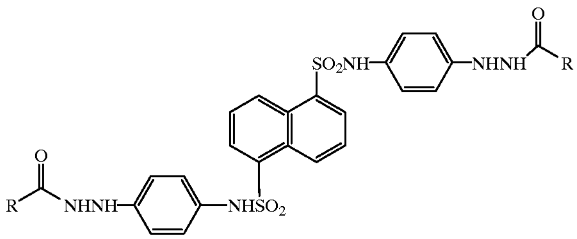 | 26a | 26e | 26k | 26l |
| H-27 | 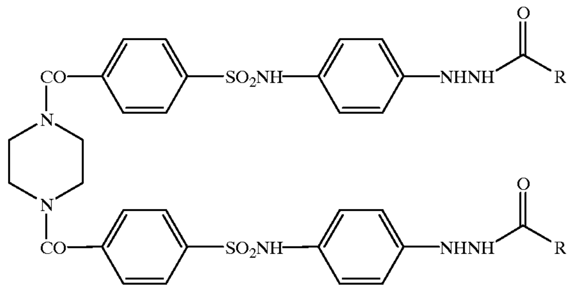 | 27a | 27e | 27k | 27l |
| H-28 | 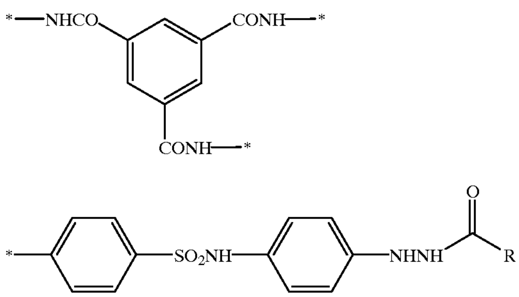 | 28a | 28e | 28k | 28l |
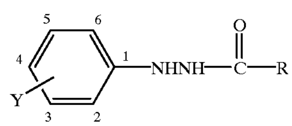
| | Y = | R = —H | —$CH_2OCH_3$ | 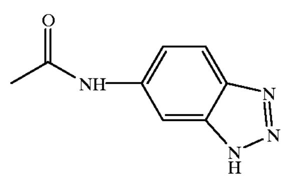 | 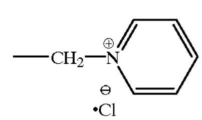 |
|---|---|---|---|---|---|
| H-29 | 4-NHC(=S)NH—$C_8H_{17}$(n) | 29a | 29m | 29n | 29f |
| H-30 | 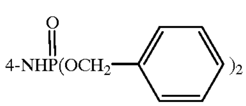 | 30a | 30m | 30n | 30f |
| H-31 | 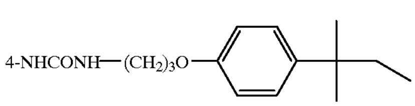 | 31a | 31m | 31n | 31f |

-continued
| | | | | | |
|---|---|---|---|---|---|
| H-32 | 4-OH<br>3-NHCONHCH$_2$CH($C_2H_5$)—$C_4H_9$ | 32a | 32m | 32n | 32f |
| H-33 | 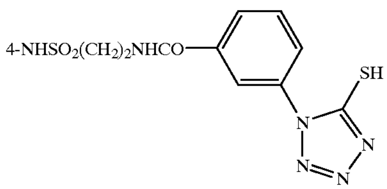 | 33a | 33m | 33n | 33f |
| H-34 | 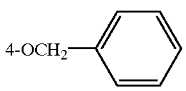 | 34a | 34m | 34n | 34f |
| H-35 | 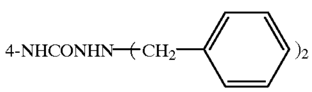 | 35a | 35m | 35n | 35f |
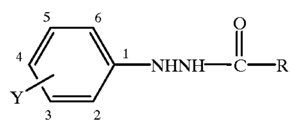
| | | R = | | | |
|---|---|---|---|---|---|
| | Y = | —H | —$C_3F_6$—COOH | —$CONHCH_3$ | 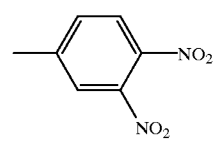 |
| H-36 | 2-$NHSO_2CH_3$—<br>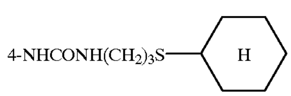 | 36a | 36o | 36p | 36g |
| H-37 | 2-$OCH_3$-4-$NHSO_2C_{12}H_{25}$ | 37a | 37o | 37p | 37g |
| H-38 | 3-$NHCOC_{11}H_{23}$-4-$NHSO_2CF_3$ | 38a | 38o | 38p | 38g |
| H-39 | 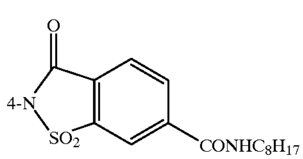 | 39a | 39o | 39p | 39g |
| H-40 | 4-$OCO(CH_2)_2COOC_6H_{13}$ | 40a | 40o | 40p | 40g |
| H-41 | 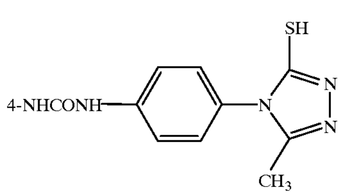 | 41a | 41o | 41p | 41g |

-continued
| | | | | | |
|---|---|---|---|---|---|
| H-42 | 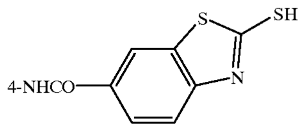 | 42a | 42o | 42p | 42g |
H-43
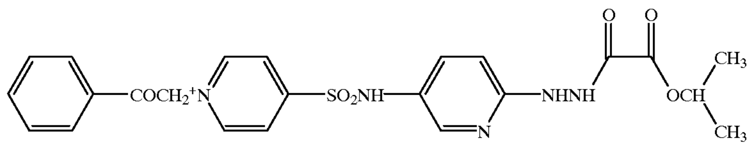
H-44
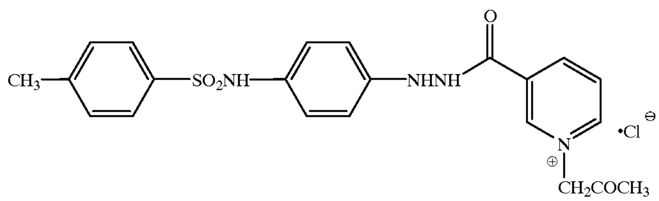
H-45
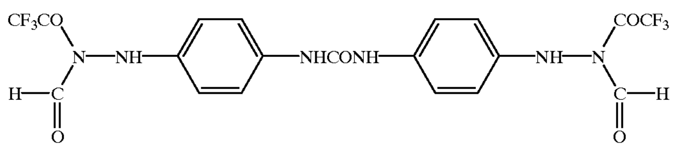
H-46
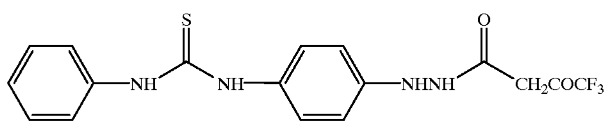
H-47
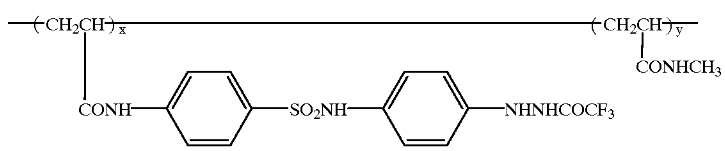
X:Y = 3:97
average molecular weight ~100,000
H-48
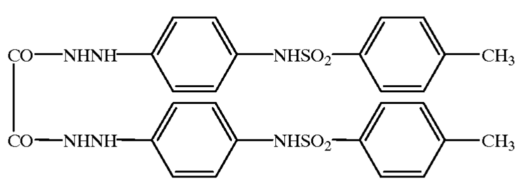
H-49
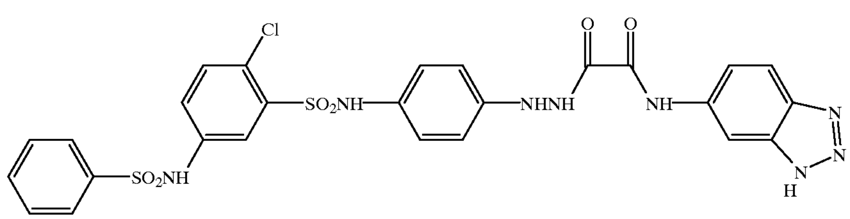
H-50
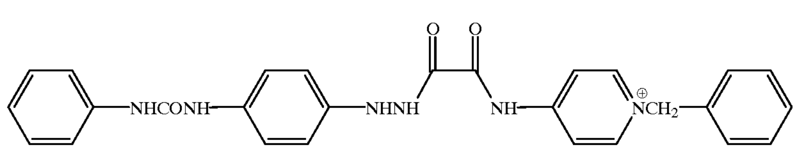

-continued
H-51
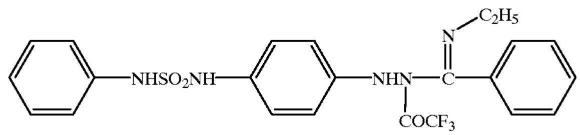
H-52
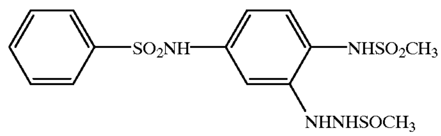
H-53
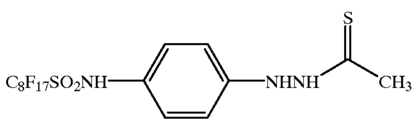
H-54
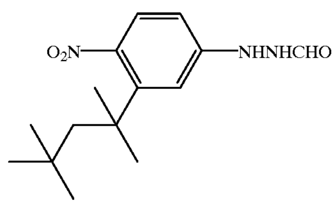
H-55
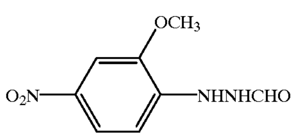
H-56
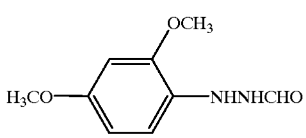
H-57
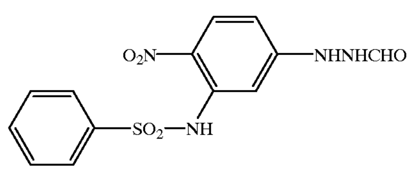
H-58
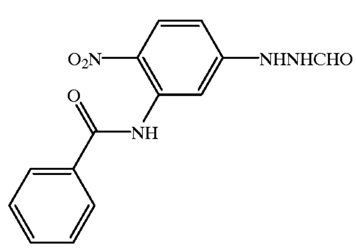
H-59
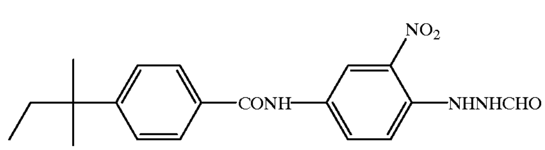

-continued
H-60
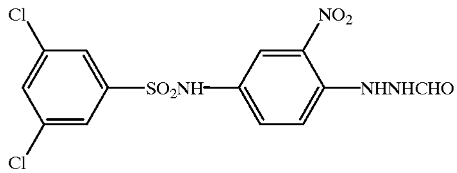
H-61
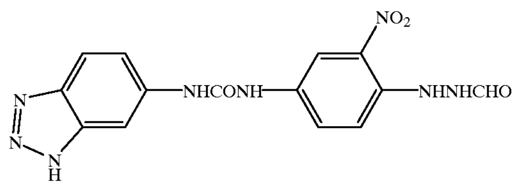
H-62
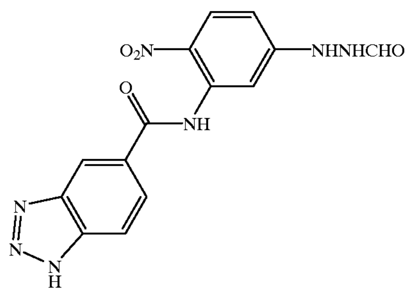
H-63
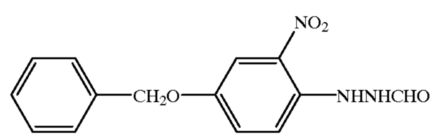
H-64
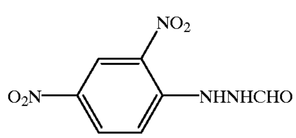
H-65
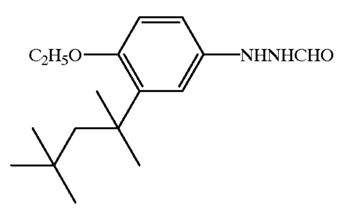
H-66
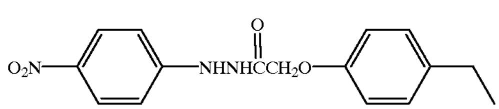
H-67
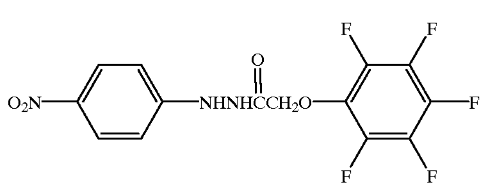

-continued
H-68
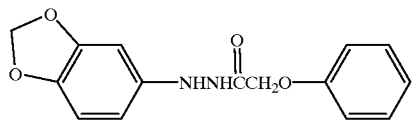
H-69
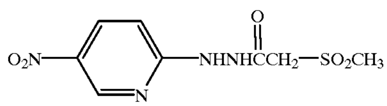
H-70
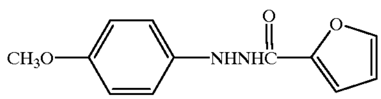
H-71
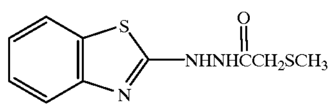
H-72
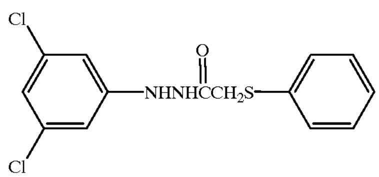
H-73
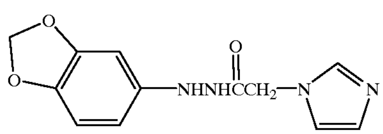
H-74
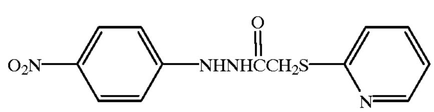
H-75
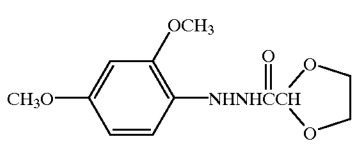
H-76
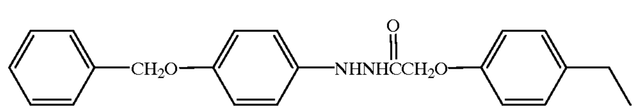

Among the compounds of the general formula (H), compounds of the following general formulae (Ha), (Hb), (Hc), and (Hd) are also preferred.

Compounds of formulae (Hb) and (Hc) are used for a combination of silver halide spectrally sensitized at 600 to 850 nm with a supersensitizing amount of an aromatic mercapto compound of the general formula (I) as will be described later. Compounds of formulae (Ha) to (Hd), often compounds of formula (Ha), especially (Ha-1) are preferably used where an IR absorbing dye of λmax 850 to 1400 nm is used for photosensitive material detection.

general formula (Ha)

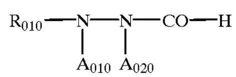

(A)

general formula (Ha)

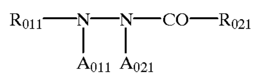

(B)

general formula (Hc)

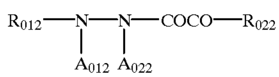

general formula (Hd)

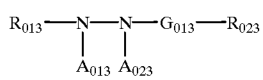

In these formulae, $R_{010}$, $R_{011}$, $R_{012}$, $R_{013}$ each are an aromatic group, for example, aryl or unsaturated heterocyclic groups; and $A_{010}$, $A_{020}$, $A_{011}$, $A_{021}$, $A_{012}$, $A_{022}$, $A_{013}$, and $A_{023}$ are as defined for $A_{01}$ and $A_{02}$ in formula (H).

In formula (Hb), $R_{021}$ is an alkyl group having at least one electron attractive substituent, an aryl group having at least one electron attractive substituent, or a heterocyclic, amino, alkylamino, arylamino, heterocyclic amino, hydrazino, alkoxy or aryloxy group.

In formula (Hc), $R_{022}$ is an amino, alkylamino, arylamino, heterocyclic amino, hydrazino, alkoxy, aryloxy, alkyl or aryl group.

Where compounds of formulae (Hb) and (Hc) are used for a combination of silver halide spectrally sensitized at 600 to 850-nm with a supersensitizing amount of a compound of the general formula (I), both $A_{011}$ and $A_{021}$ are hydrogen atoms or one is hydrogen and the other is a substituted or unsubstituted alkylsulfonyl, substituted or unsubstituted arylsulfonyl or substituted or unsubstituted acyl group.

In formula (Hd), $G_{013}$ is a group: —$SO_2$—, —SO— or —P(═O) (—$R_{030}$)— wherein $R_{030}$ is as defined for $R_{03}$ in formula (H), thiocarbonyl or iminomethylene group; and $R_{023}$ is alkyl, aryl, alkoxy, aryloxy, amino, alkylamino, arylamino, heterocyclic amino or hydrazino group.

Further preferred among the compounds of the general formula (Ha) are those of the following general formula (Ha-1).

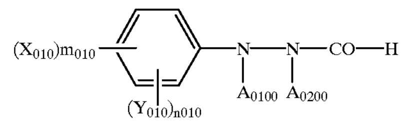

In formula (Ha-1), $X_{010}$ is a sulfonamide, ureido, thioureido, oxycarbonyl, sulfonamide, phosphonamide, alkylamino, halogen atom, cyano, alkoxy having at least 2 carbon atoms in total, aryloxy, alkylthio, arylthio, heterocyclic thio, acylamino having at least 3 carbon atoms in total, carbamoyl, sulfamoyl or alkyl or arylsulfonyl group; $m_{010}$ is an integer of 0 to 5; $Y_{010}$ is a group as defined for $X_{010}$ or a nitro, methoxy, alkyl or acetamide group; $n_{010}$ is an integer of 0 to 4; with the proviso that the sum of $m_{010}$ and $n_{010}$ does not exceed 5, and either one of $A_{0100}$ and $A_{0200}$ is not hydrogen where $m_{010}$ is equal to 0. $A_{0100}$ and $A_{0200}$ are as defined for $A_{01}$ and $A_{02}$ in formula (H). Preferably $m_{010}$ is 1 or 2 and $n_{010}$ is 0 or 1. Most preferably $m_{010}$ is 1 and $n_{010}$ is 0.

In formula (Hb), $R_{021}$ is preferably an alkyl group having at least one electron attractive substituent or an aryl group having at least one electron attractive substituent. The electron attractive group designates a substituent having a positive value of Hammette's substituent constant $\sigma_m$, for example, halogen atoms, nitro, cyano, acyl, oxycarbonyl, sulfonamide, sulfamoyl, carbamoyl, acyloxy, alkyl or arylsulfonyl, alkoxy, aryloxy, alkyl or arylthio, and imide groups. More preferably $R_{021}$ is an alkyl group having at least one electron attractive substituent, which is desirably a fluorine atom, alkoxy or aryloxy group.

In formula (Hc), $R_{022}$ is preferably an amino, alkylamino, arylamino, heterocyclic amino or alkoxy group.

In formula (Hd), $G_{013}$ is preferably —$SO_2$—, —P(═O) (—$R_{030}$)— wherein $R_{030}$ is as defined for $R_{03}$ in formula (H) or thiocarbonyl. $R_{023}$ is preferably alkyl or aryl where $G_{013}$ is —$SO_2$—; alkoxy, aryloxy, alkyl or arylamino where $G_{013}$ is —P(═O) (—$R_{030}$)—; and alkylamino, arylamino or hydrazino group where $G_{013}$ is thiocarbonyl.

Illustrative non-limiting examples of the compound of the general formula (Ha) are given below.

H-77

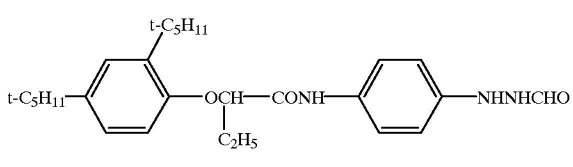

H-78

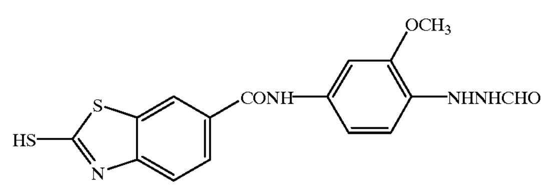

-continued
H-79
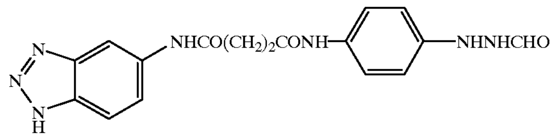
H-80
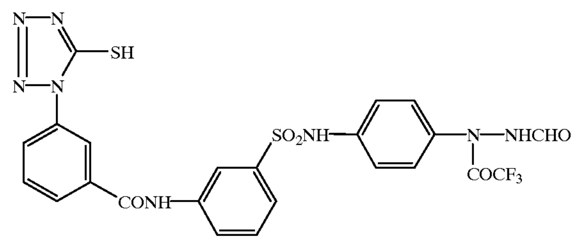
H-81
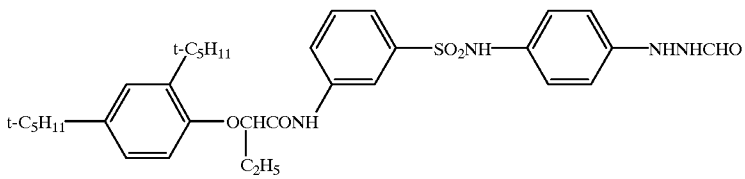
H-82
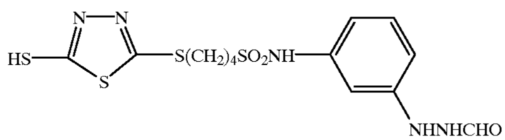
H-83
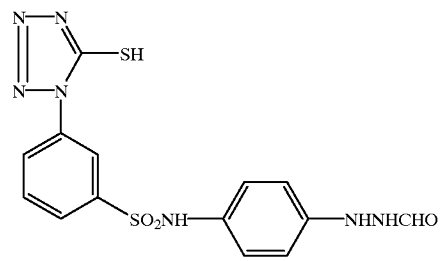
H-84
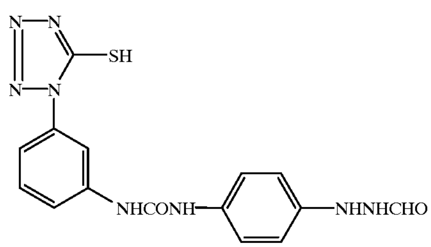
H-85
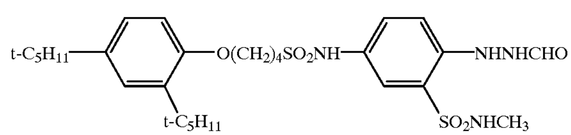
H-86
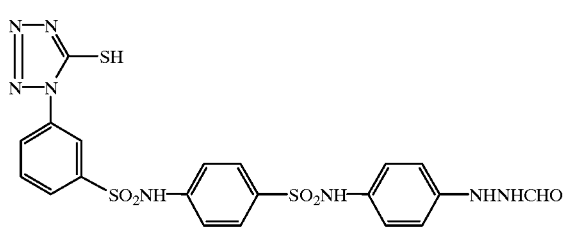
H-87
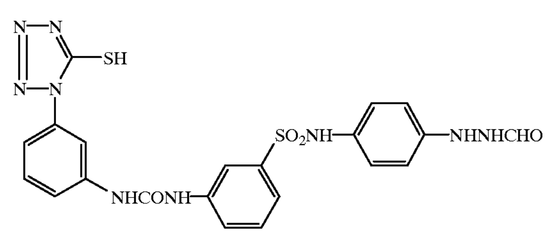
H-88
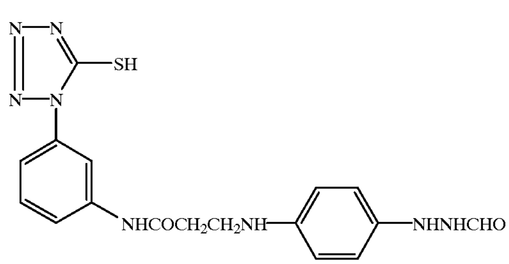
H-89
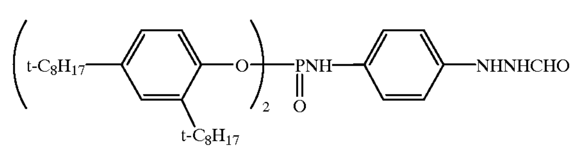

-continued
H-90
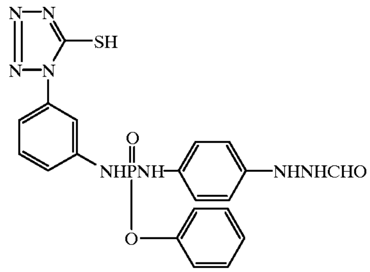
H-91
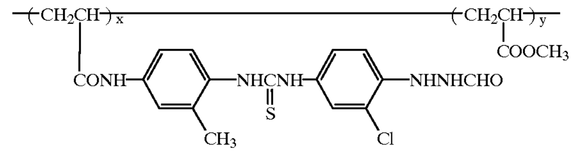
x:Y = 3:97
average molecular weight ~100,000
H-92
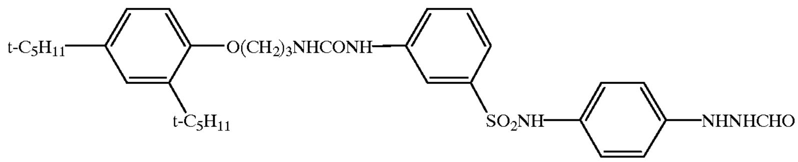
H-93
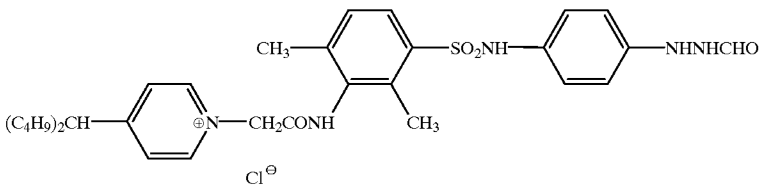
H-94
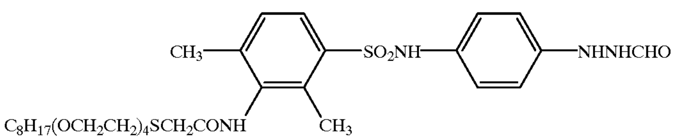
H-95
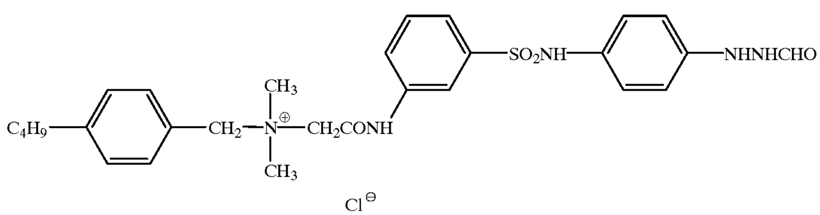
H-96
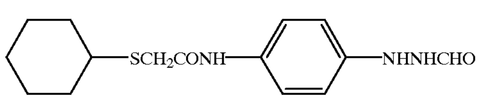
H-97
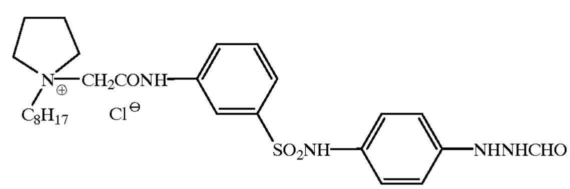
H-98
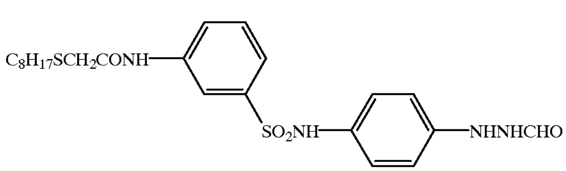
H-99
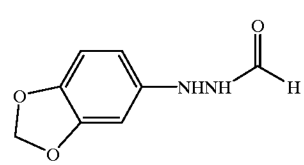

-continued
H-100
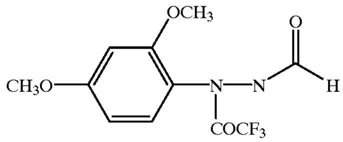
H-101
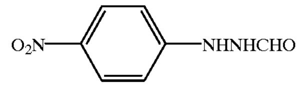
H-102
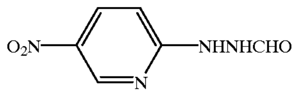
H-103
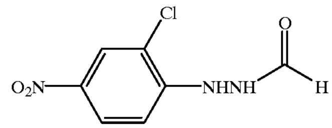
H-104
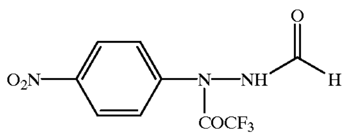
H-105
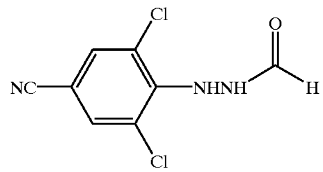
H-106
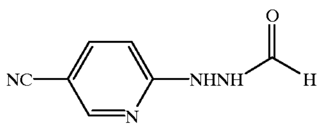
H-107
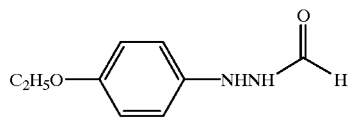
H-108
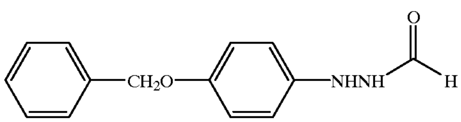
H-109
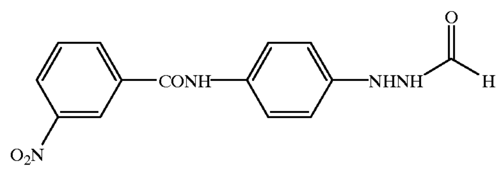
H-110
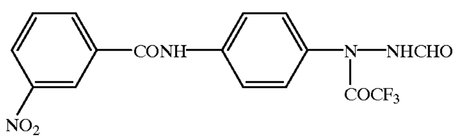
H-111
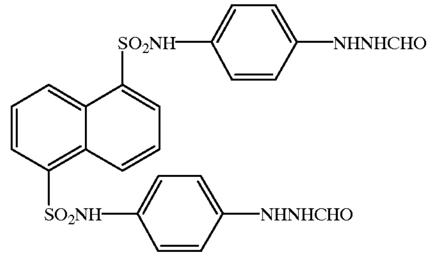
H-112
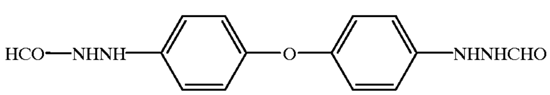
H-113
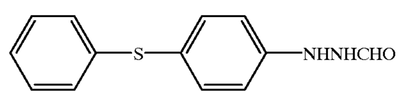
H-114
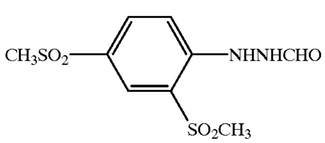
H-115
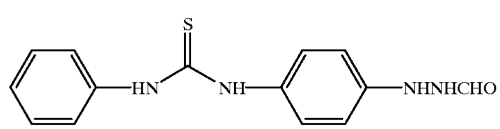
H-116
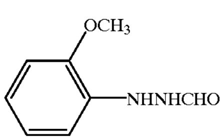

Illustrative non-limiting examples of the compound of the general formula (Hb) are given below.
H-117
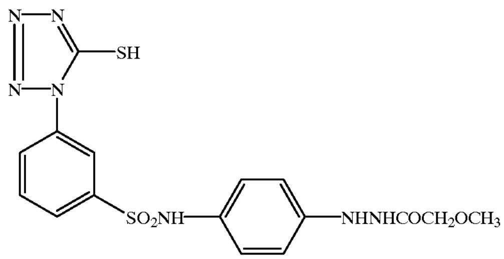
H-118
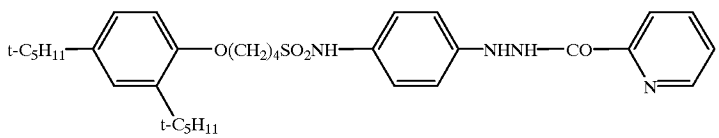
H-119
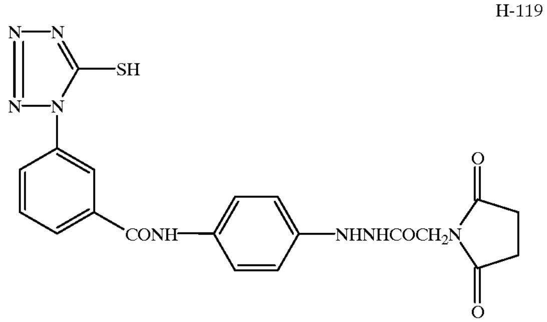
H-120
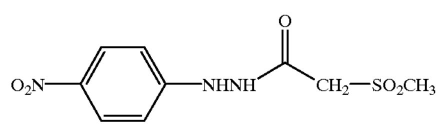
H-121
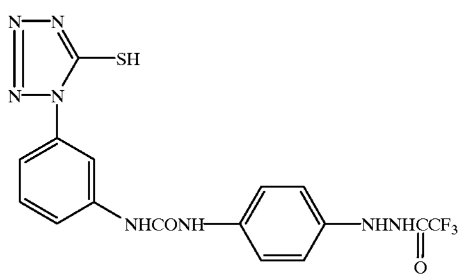
H-122
H-123
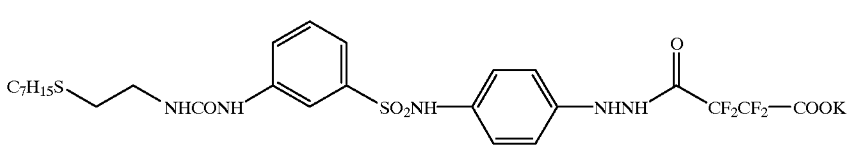
H-124
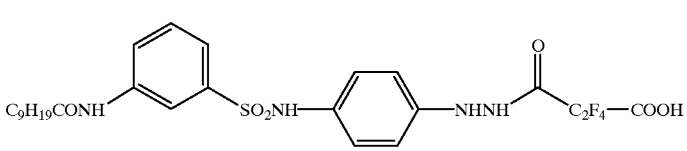

-continued
H-125
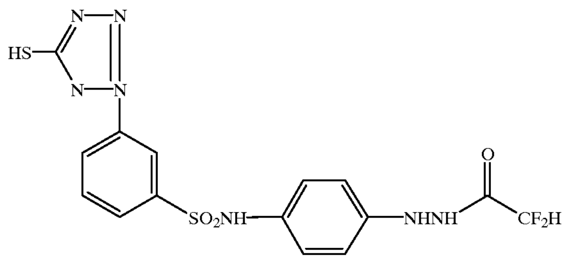
H-126
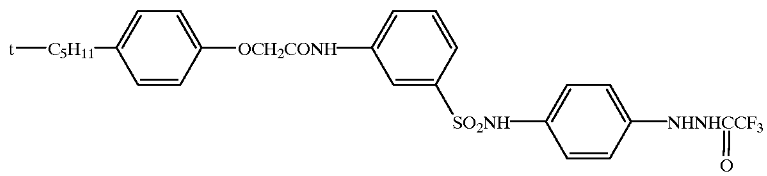
H-128
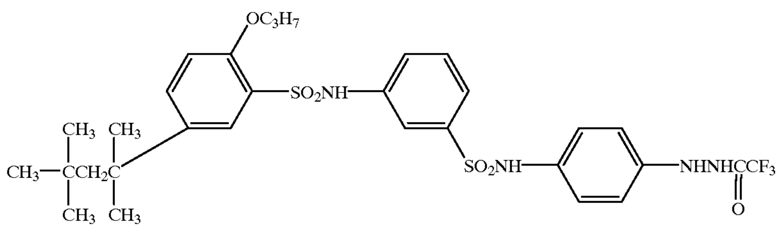
H-129
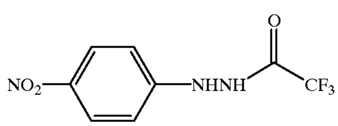
H-130
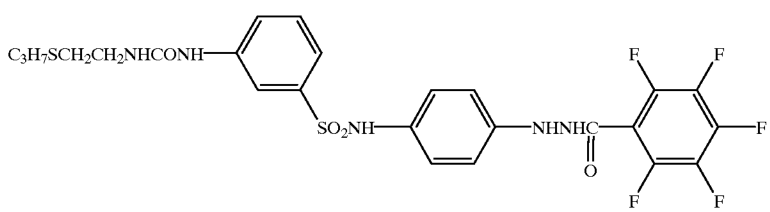
H-131
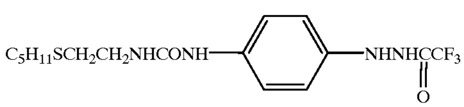
H-132
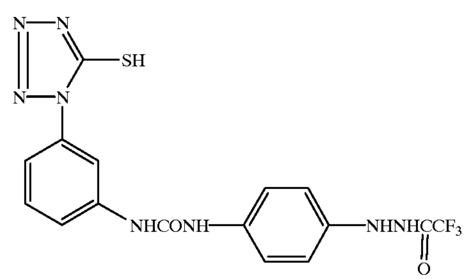
H-133
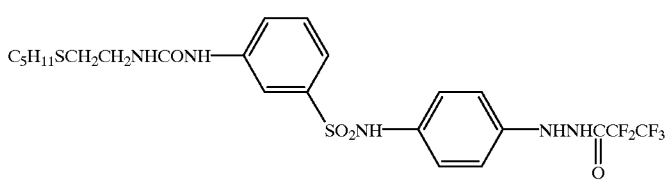

-continued
H-134
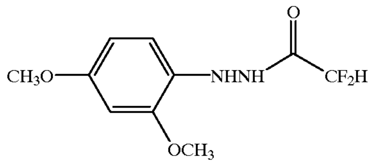
H-135
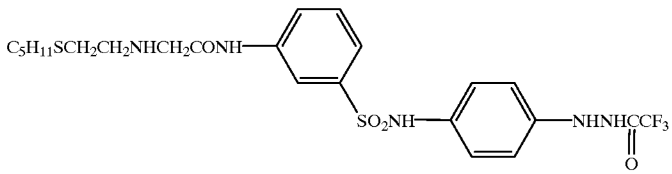
H-136
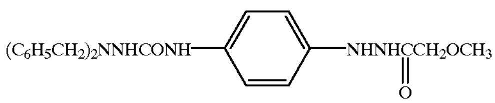
H-137
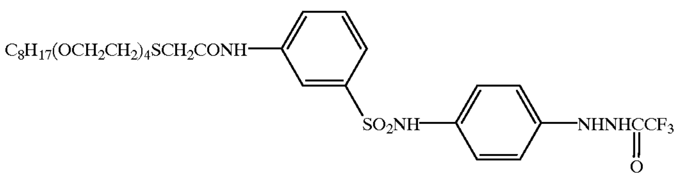
H-138
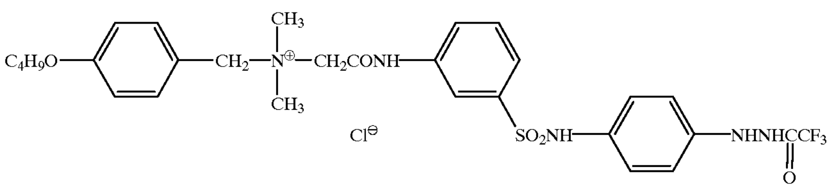
H-139
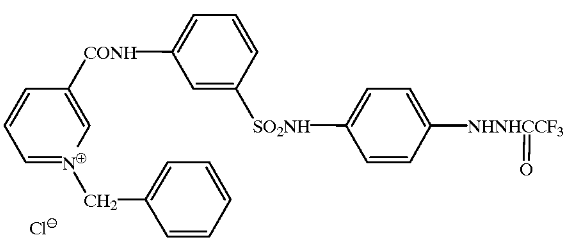
H-140
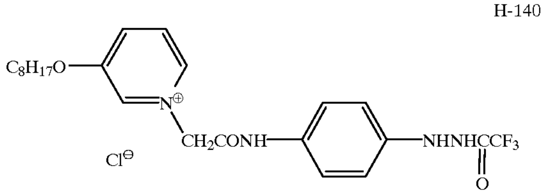
H-141
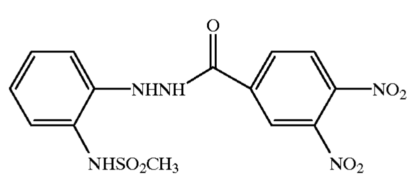
H-142
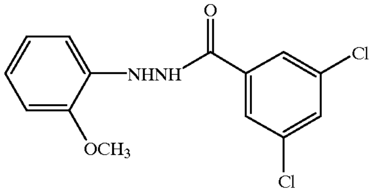
H-143
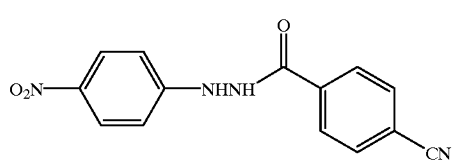

-continued
H-144
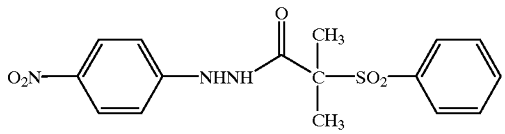
H-145
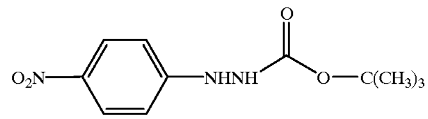
H-146
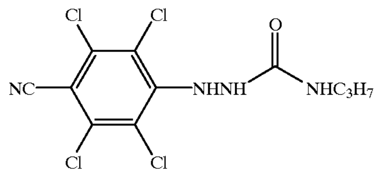
H-147
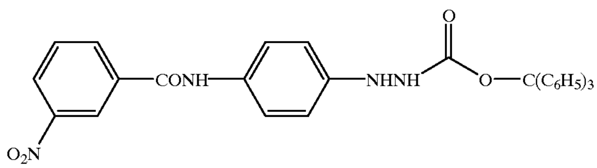
H-148
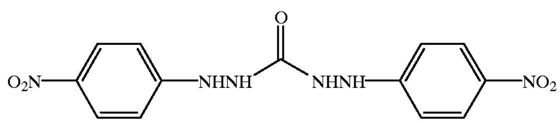
Illustrative non-limiting examples of the compound of the general formula (Hc) are given below.
H-149
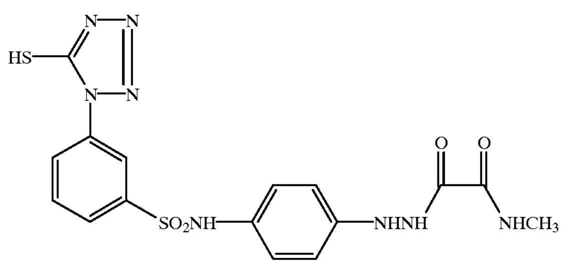
H-150
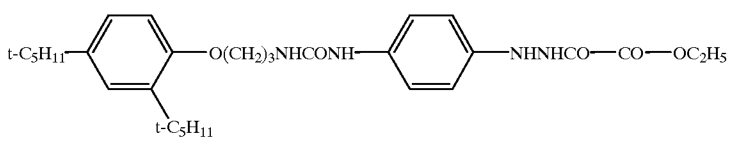
H-151
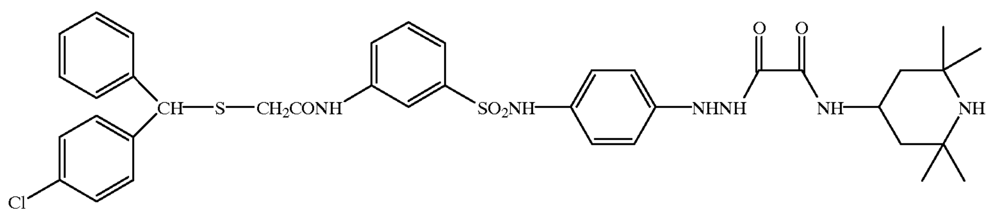
H-152
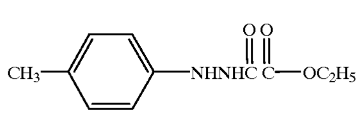
H-153
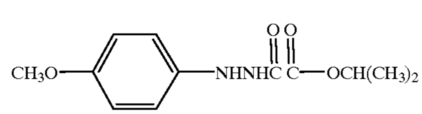

-continued

H-154

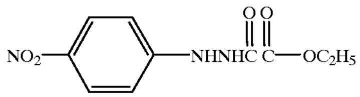

H-155

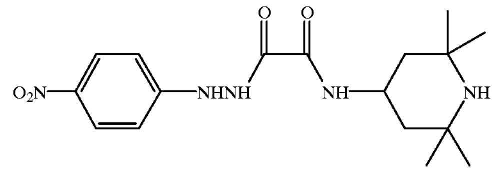

H-156

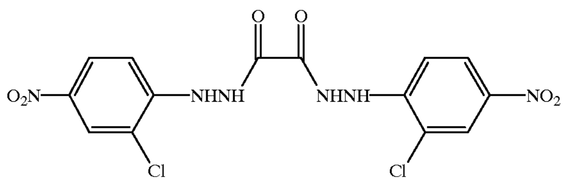

H-157

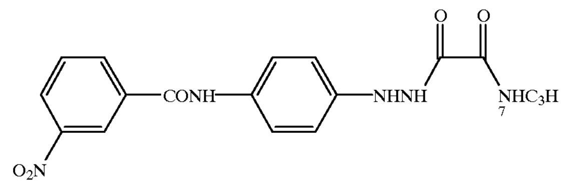

H-158

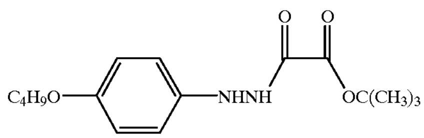

H-159

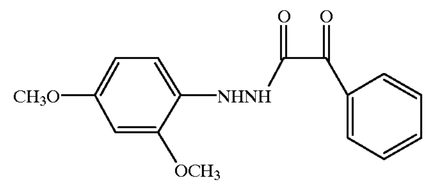

H-160

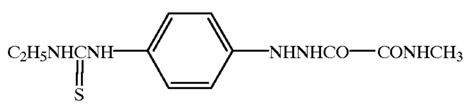

Illustrative non-limiting examples of the compound of the general formula (Hd) are given below.

H-161

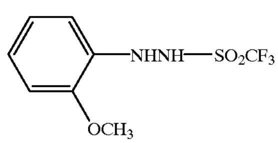

H-162

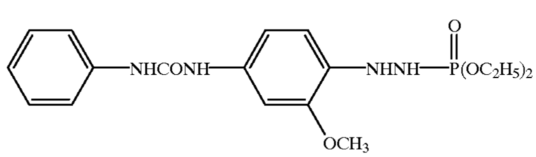

H-163

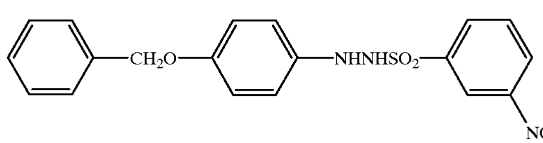

H-164

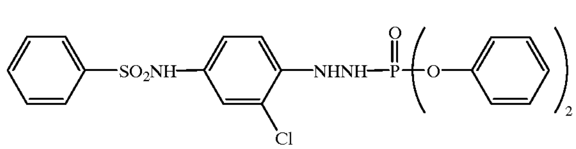

-continued

H-165

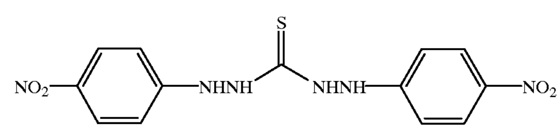

H-166

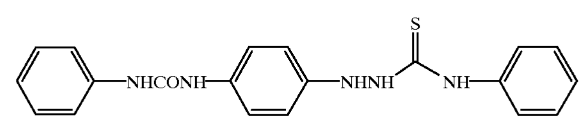

In addition to the above-mentioned examples, the hydrazine derivatives which can be used herein include those examples described in Research Disclosure, Item 23516 (November 1983, page 346), the references cited therein, and the following patents.

| | | | |
|---|---|---|---|
| U.S. Pat. No. | 4,080,207 | 4,269,929 | 4,276,364 |
| | 4,278,748 | 4,385,108 | 4,459,347 |
| | 4,478,928 | 4,560,638 | 4,686,167 |
| | 4,912,016 | 4,988,604 | 4,994,365 |
| | 5,041,355 | 5,104,769 | |
| UKP | 2,011,391B | | |
| EP | 217,310 | 301,799 | 356,898 |
| JP-A | 179734/1985 | 170733/1986 | 270744/1986 |
| | 178246/1987 | 270948/1987 | 29751/1988 |
| | 32538/1988 | 104047/1988 | 121838/1988 |
| | 129337/1988 | 223744/1988 | 234244/1988 |
| | 234245/1988 | 234246/1988 | 294552/1988 |
| | 306438/1988 | 10233/1989 | 90439/1989 |
| | 100530/1989 | 105941/1989 | 105943/1989 |

-continued

| | | |
|---|---|---|
| 276128/1989 | 280747/1989 | 283548/1989 |
| 283549/1989 | 285940/1989 | 2541/1990 |
| 77057/1990 | 139538/1990 | 196234/1990 |
| 196235/1990 | 198440/1990 | 198441/1990 |
| 198442/1990 | 220042/1990 | 221953/1990 |
| 221954/1990 | 285342/1990 | 285343/1990 |
| 289843/1990 | 302750/1990 | 304550/1990 |
| 37642/1991 | 54549/1991 | 125134/1991 |
| 184039/1991 | 240036/1991 | 240037/1991 |
| 259240/1991 | 280038/1991 | 282536/1991 |
| 51143/1992 | 56842/1992 | 84134/1992 |
| 230233/1990 | 96053/1992 | 216544/1992 |
| 45761/1993 | 45762/1993 | 45763/1993 |
| 45764/1993 | 45765/1993 | |

Japanese Patent Application No. 94925/1993

Besides, the following hydrazine derivatives are also useful. Exemplary compounds include the compounds of the chemical formula [1] in JP-B 77138/1994, more specifically the compounds described on pages 3 and 4 of the same; the compounds of the general formula (1) in JP-B 93082/1994, more specifically compound Nos. 1 to 38 described on pages 8 to 18 of the same; the compounds of the general formulae (4), (5) and (6) in JP-A 230497/1994, more specifically compounds 4-1 to 4-10 described on pages 25 and 26, compounds 5-1 to 5-42 described on pages 28 to 36, and compounds 6-1 to 6-7 described on pages 39 and 40 of the same; and the compounds of the general formulae (1) and (2) in JP-A 289520/1994, more specifically compounds 1-1 to 1-17 and 2-1 described on pages 5 to 7 of the same; the compounds of the chemical formulae [2] and [3] in JP-A 313936/1994, more specifically the compounds described on pages 6 to 19 of the same; the compounds of the chemical formula [1] in JP-A 313951/1994, more specifically the compounds described on pages 3 to 5 of the same; the compounds of the general formula (1) in JP-A 5610/1995, more specifically compounds I-1 to I-38 described on pages 5 to 10 of the same; the compounds of the general formula (II) in JP-A 77783/1995, more specifically compounds II-1 to II-102 described on pages 10 to 27 of the same; and the compounds of the general formulae (H) and (Ha) in JP-A 104426/1995, more specifically compounds H-1 to H-44 described on pages 8 to 15 of the same.

It is acceptable to use a mixture of hydrazine derivatives according to the invention. Also a hydrazine derivative according to the invention may be used along with another hydrazine derivative.

The hydrazine derivative is used as a solution in a suitable water-miscible organic solvent such as alcohols (e.g., methanol, ethanol, propanol, and fluorinated alcohols), ketones (e.g., acetone and methyl ethyl ketone), dimethylformamide, dimethylsulfoxide and methyl cellosolve.

A well-known emulsifying dispersion method is used for dissolving the hydrazine derivative with the aid of an oil such as dibutyl phthalate, tricresyl phosphate, glyceryl triacetate and diethyl phthalate or an auxiliary solvent such as ethyl acetate and cyclohexanone whereby an emulsified dispersion is mechanically prepared. Alternatively, a method known as a solid dispersion method is used for dispersing the hydrazine derivative in powder form in water in a ball mill, colloidal mill or ultrasonic mixer.

The hydrazine derivative may be added to a photosensitive layer or any light-insensitive layer on the same side of the support as the photosensitive layer. Preferably the hydrazine derivative is added to the photosensitive layer or a light-insensitive layer disposed adjacent thereto.

Preferably the hydrazine derivative is added in amounts of 1 $\mu$mol to 10 mmol, more preferably 10 $\mu$mol to 5 mmol, most preferably 20 $\mu$mol to 5 mmol per mol of silver.

In the photothermographic material of the invention, a nucleation promoter may be contained. The nucleation promoter used herein includes amine derivatives, onium salts, disulfide derivatives, and hydroxymethyl derivatives. Examples of the nucleation promoter include the compounds described in JP-A 77783/1995, for example, compounds A-1 to A-73 described on pages 49 to 58 thereof; the compounds of chemical formulae [21], [22] and [23] described in JP-A 84331/1995, for example, the compounds described on pages 6 to 8 thereof; the compounds of general formulae [Na] and [Nb] described in JP-A 104426/1995, for example, compounds Na-1 to Na-22 and Nb-1 to Nb-12 described on pages 16 to 20 thereof; the compounds of general formulae (1), (2), (3), (4), (5), (6), and (7) described in Japanese Patent Application No. 37817/1995, for example, compounds 1-1 to 1-19, 2-1 to 2-22, 3-1 to 3-36, 4-1 to 4-5, 5-1 to 5-41, 6-1 to 6-58, and 7-1 to 7-38 described therein.

The nucleation promoter is used as a solution in a suitable organic solvent such as alcohols (e.g., methanol, ethanol, propanol, and fluorinated alcohols), ketones (e.g., acetone and methyl ethyl ketone), dimethylformamide, dimethylsulfoxide and methyl cellosolve.

A well-known emulsifying dispersion method is used for dissolving the nucleation promoter with the aid of an oil such as dibutyl phthalate, tricresyl phosphate, glyceryl triacetate and diethyl phthalate or an auxiliary solvent such as ethyl acetate and cyclohexanone whereby an emulsified dispersion is mechanically prepared. Alternatively, a method known as a solid dispersion method is used for dispersing the nucleation promoter in powder form in water in a ball mill, colloidal mill or ultrasonic mixer.

The nucleation promoter may be added to a photosensitive layer or any light-insensitive layer on the same side of the support as the photosensitive layer. Preferably the nucleation promoter is added to the photosensitive layer or a light-insensitive layer disposed adjacent thereto.

Preferably the nucleation promoter is added in amounts of $1\times10^{-6}$ to $2\times10^{-2}$ mol, more preferably $1\times10^{-5}$ to $2\times10^{-2}$ mol, most preferably $2\times10^{-5}$ to $1\times10^{-2}$ mol per mol of silver.

The organic silver salt used herein is relatively stable to light, but forms a silver image when heated at 80° C. or higher in the presence of an exposed photocatalyst (as typified by a latent image of photosensitive silver halide) and a reducing agent. The organic silver salt may be of any desired organic compound containing a source capable of reducing silver ion. Preferred are silver salts of organic acids, typically long chain aliphatic carboxylic acids having 10 to 30 carbon atoms, especially 15 to 28 carbon atoms. Also preferred are complexes of organic or inorganic silver salts with ligands having a stability constant in the range of 4.0 to 10.0. A silver-providing substance is preferably used in an amount of about 5 to 30% by weight of an image forming layer. Preferred organic silver salts include silver salts of organic compounds having a carboxyl group. Examples include silver salts of aliphatic carboxylic acids and silver salts of aromatic carboxylic acids though not limited thereto. Preferred examples of the silver salt of aliphatic carboxylic acid include silver behenate, silver stearate, silver oleate, silver laurate, silver caproate, silver myristate, silver palmitate, silver maleate, silver fumarate, silver tartrate, silver linolate, silver butyrate, silver camphorate and mixtures thereof. The organic silver salt is preferably used in such amounts to give a coverage of up to 3 g/m$^2$, especially up to 2 g/m$^2$ of silver.

Silver salts of compounds having a mercapto or thion group and derivatives thereof are also useful. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(ethylglycolamido)-benzothiazole, silver salts of thioglycolic acids such as silver salts of S-alkylthioglycolic acids wherein the alkyl group has 12 to 22 carbon atoms, silver salts of dithiocarboxylic acids such as a silver salt of dithioacetic acid, silver salts of thioamides, a silver salt of 5-carboxyl-1-methyl-2-phenyl-4-thiopyridine, silver salts of mercapto-triazines, a silver salt of 2-mercaptobenzoxazole as well as silver salts of 1,2,4-mercaptothiazole derivatives such as a silver salt of 3-amino-5-benzylthio-1,2,4-thiazole as described in U.S. Pat. No. 4,123,274 and silver salts of thion compounds such as a silver salt of 3-(3-carboxyethyl)-4-methyl-4-thiazoline-2-thione as described in U.S. Pat. No. 3,301,678. Compounds containing an imino group may also be used. Preferred examples of these compounds include silver salts of benzotriazole and derivatives thereof, for example, silver salts of benzotriazoles such as silver methylbenzotriazole, silver salts of halogenated benzotriazoles such as silver 5-chlorobenzotriazole as well as silver salts of 1,2,4-triazole and 1-H-tetrazole and silver salts of imidazole and imidazole derivatives as described in U.S. Pat. No. 4,220,709. Also useful are various silver acetylide compounds as described, for example, in U.S. Pat. Nos. 4,761,361 and 4,775,613.

The organic silver salt which can be used herein may take any desired shape although needle crystals having a minor axis and a major axis are preferred. The inverse proportional relationship between the size of silver salt crystal grains and their covering power that is well known for photosensitive silver halide materials also applies to the photothermographic material of the present invention. That is, as organic silver salt grains constituting image forming regions of photothermographic material increase in size, the covering power becomes smaller and the image density becomes lower. It is thus necessary to reduce the grain size. In the practice of the invention, grains should preferably have a minor axis of 0.01 μm to 0.20 μm, more preferably 0.01 μm to 0.15 μm and a major axis of 0.10 μm to 5.0 μm, more preferably 0.10 μm to 4.0 μm. The grain size distribution is desirably monodisperse. The monodisperse distribution means that a standard deviation of the length of minor and major axes divided by the length, respectively, expressed in percent, is preferably up to 100%, more preferably up to 80%, most preferably up to 50%. It can be determined from the measurement of the shape of organic silver salt grains using an image obtained through a transmission electron microscope. Another method for determining a monodisperse distribution is to determine a standard deviation of a volume weighed mean diameter. The standard deviation divided by the volume weighed mean diameter, expressed in percent, which is a coefficient of variation, is preferably up to 100%, more preferably up to 80%, most preferably up to 50%. It may be determined by irradiating laser light, for example, to organic silver salt grains dispersed in liquid and determining the autocorrelation function of the fluctuation of scattering light relative to a time change, and obtaining the grain size (volume weighed mean diameter) therefrom.

The photosensitive silver halide is described. A method for forming a photosensitive silver halide is well known in the art. Any of the methods disclosed in Research Disclosure No. 17029 (June 1978) and U.S. Pat. No. 3,700,458, for example, may be used. Illustrative methods which can be used herein are a method of preparing an organic silver salt and adding a halogen-containing compound to the organic silver salt to convert a part of silver of the organic silver salt into photosensitive silver halide and a method of adding a silver-providing compound and a halogen-providing compound to a solution of gelatin or another polymer to form photosensitive silver halide grains and mixing the grains with an organic silver salt. The latter method is preferred in the practice of the invention. The photosensitive silver halide should preferably have a smaller grain size for the purpose of minimizing white turbidity after image formation. Specifically, the grain size is preferably up to 0.20 μm, more preferably 0.01 μm to 0.15 μm, most preferably 0.02 μm to 0.12 μm. The term grain size designates the length of an edge of a silver halide grain where silver halide grains are regular grains of cubic or octahedral shape. Where silver halide grains are tabular, the grain size is the diameter of an equivalent circle having the same area as the projected area of a major surface of a tabular grain. Where silver halide grains are not regular, for example, in the case of spherical or rod-shaped grains, the grain size is the diameter of an equivalent sphere having the same volume as a grain.

The shape of silver halide grains may be cubic, octahedral, tabular, spherical, rod-like and potato-like, with cubic and tabular grains being preferred in the practice of the invention. Where tabular silver halide grains are used, they should preferably have an average aspect ratio of from 100:1 to 2:1, more preferably from 50:1 to 3:1. Silver halide grains having rounded corners are also preferably used. No particular limit is imposed on the plane indices (Miller indices) of an outer surface of silver halide grains. Preferably silver halide grains have a high proportion of {100} plane featuring high spectral sensitization efficiency upon adsorption of a spectral sensitizing dye. The proportion of {100} plane is preferably at least 50%, more preferably at least 65%, most preferably at least 80%. Note that the proportion of Miller index {100} plane can be determined by the method described in T. Tani, J. Imaging Sci., 29, 165 (1985), utilizing the adsorption dependency of {111} plane and {100} plane upon adsorption of a sensitizing dye.

The halogen composition of photosensitive silver halide is not critical and may be any of silver chloride, silver chlorobromide, silver bromide, silver iodobromide, silver iodochlorobromide, and silver iodide. Silver bromide or silver iodobromide is preferred in the practice of the invention. Most preferred is silver iodobromide preferably having a silver iodide content of 0.1 to 40 mol %, especially 0.1 to 20 mol %. The halogen composition in grains may have a uniform distribution or a non-uniform distribution wherein the halogen concentration changes in a stepped or continuous manner. Preferred are silver iodobromide grains having a higher silver iodide content in the interior. Silver halide grains of the core/shell structure are also useful. Such core/shell grains preferably have a multilayer structure of 2 to 5 layers, more preferably 2 to 4 layers.

Preferably the photosensitive silver halide grains used herein contain at least one complex of a metal selected from the group consisting of rhodium, iridium, ruthenium, rhenium, osmium, cobalt, and iron. The metal complexes may be used alone or in admixture of two or more complexes of a common metal or different metals. The metal complex is preferably contained in an amount of 1 nmol to 10 mmol, more preferably 10 nmol to 100 μmol per mol of silver. Illustrative metal complex structures are those described in JP-A 225449/1995.

The rhodium compounds used herein are preferably water-soluble rhodium compounds. Examples include rhodium(III) halides and rhodium complex salts having halogens, amines and oxalates as a ligand, for example, hexachlororhodium (III) complex salt, hexabromorhodium (III) complex salt, hexaminerhodium(III) complex salt, and rhodium(III) complex salt. These rhodium compounds are used as a solution in water or a suitable solvent. One method often used for stabilizing a solution of a rhodium compound is by adding an aqueous solution of hydrogen halide (e.g., hydrochloric acid, hydrobromic acid, and hydrofluoric acid) or an alkali halide (e.g., KCl, NaCl, KBr, and NaBr). Instead of using water-soluble rhodium compounds, a rhodium compound can be dissolved during preparation of silver halide by adding separate silver halide grains doped with rhodium thereto. The iridium compounds used herein include hexachloroiridium, hexabromoiridium, and hexamineiridium. The ruthenium compounds used herein include hexachlororuthenium and pentachloronitrosilruthenium. The cobalt and iron compounds are preferably hexacyano metal complexes while illustrative, non-limiting examples include a ferricyanate ion, ferrocyanate ion, and hexacyanocobaltate ion. The distribution of the metal complex in silver halide grains is not critical. That is, the metal complex may be contained in silver halide grains to form a uniform phase or at a high concentration in either the core or the shell.

Photosensitive silver halide grains may be desalted by any of well-known water washing methods such as noodle and flocculation methods although silver halide grains may be either desalted or not according to the invention.

The photosensitive silver halide grains used herein should preferably be chemically sensitized. Preferred chemical sensitization methods are sulfur, selenium, and tellurium sensitization methods which are well known in the art. Also useful are a noble metal sensitization method using compounds of gold, platinum, palladium, and iridium and a reduction sensitization method. In the sulfur, selenium, and tellurium sensitization methods, any of compounds well known for the purpose may be used. For example, the compounds described in JP-A 128768/1995 are useful. Exemplary tellurium sensitizing agents include diacyltellurides, bis(oxycarbonyl)tellurides, bis-(carbamoyl) tellurides, bis(oxycarbonyl)ditellurides, bis(carbamoyl) ditellurides, compounds having a P═Te bond, tellurocarboxylic salts, Te-organyltellurocarboxylic esters, di(poly) tellurides, tellurides, telluroles, telluroacetals, tellurosulfonates, compounds having a P—Te bond, Te-containing heterocycles, tellurocarbonyl compounds, inorganic tellurium compounds, and colloidal tellurium. The preferred compounds used in the noble metal sensitization method include chloroauric acid, potassium chloroaurate, potassium aurithiocyanate, gold sulfide, and gold selenide as well as the compounds described in U.S. Pat. No. 2,448,060 and UKP 618,061. Illustrative examples of the compound used in the reduction sensitization method include ascorbic acid, thiourea dioxide, stannous chloride, aminoiminomethanesulfinic acid, hydrazine derivatives, boran compounds, silane compounds, and polyamine compounds. Reduction sensitization may also be accomplished by ripening the emulsion while maintaining it at pH 7 or higher or at pAg 8.3 or lower. Reduction sensitization may also be accomplished by introducing a single addition portion of silver ion during grain formation.

According to the invention, the photosensitive silver halide is preferably used in an amount of 0.01 to 0.5 mol, more preferably 0.02 to 0.3 mol, most preferably 0.03 to 0.25 mol per mol of the organic silver salt. With respect to a method and conditions of admixing the separately prepared photosensitive silver halide and organic silver salt, there may be used a method of admixing the separately prepared photosensitive silver halide and organic silver salt in a high speed agitator, ball mill, sand mill, colloidal mill, vibratory mill or homogenizer or a method of preparing an organic silver salt by adding the already prepared photosensitive silver halide at any timing during preparation of an organic silver salt. Any desired mixing method may be used insofar as the benefits of the invention are fully achievable.

Though not necessary in the practice of the invention, it is sometimes advantageous to add a mercury(II) salt to the emulsion layer as an antifoggant. The mercury(II) salts useful to this end are mercury acetate and mercury bromide. The photosensitive silver halide is generally used in an amount of 0.75 to 25 mol %, preferably 2 to 20 mol % of the organic silver salt.

The reducing agent for the organic silver salt may be any of substances, preferably organic substances, that reduce silver ion into metallic silver. Conventional photographic developing agents such as Phenidone®, hydroquinone and catechol are useful although hindered phenols are preferred reducing agents. The reducing agent should preferably be contained in an amount of 1 to 10% by weight of an image forming layer. In a multilayer embodiment wherein the reducing agent is added to a layer other than an emulsion layer, the reducing agent should preferably be contained in a slightly greater amount of about 2 to 15% by weight of that layer.

For photothermographic materials using organic silver salts, a wide range of reducing agents are disclosed. Exemplary reducing agents include amidoximes such as phenylamidoxime, 2-thienylamidoxime, and p-phenoxyphenylamidoxime; azines such as 4-hydroxy-3,5-dimethoxybenzaldehydeazine; combinations of aliphatic carboxylic acid arylhydrazides with ascorbic acid such as a combination of 2,2'-bis(hydroxymethyl)propionyl-β-phenylhydrazine with ascorbic acid; combinations of polyhydroxybenzenes with hydroxylamine, reductone and/or hydrazine, such as combinations of hydroquinone with bis(ethoxyethyl)hydroxylamine, piperidinohexosereductone or formyl-4-methylphenylhydrazine; hydroxamic acids such as phenylhydroxamic acid, p-hydroxyphenylhydroxamic acid, and β-anilinehydroxamic acid; combinations of azines with sulfonamidophenols such as a combination of phenothiazine with 2,6-dichloro-4-benzenesulfonamidephenol; α-cyanophenyl acetic acid derivatives such as ethyl-α-cyano-2-methylphenyl acetate and ethyl-α-cyanophenyl acetate; bis-β-naphthols such as 2,2'-dihydroxy-1,1'-binaphthyl, 6,6'-dibromo-2,2'-dihydroxy-1,1'-binaphthyl, and bis(2-hydroxy-1-naphthyl)-methane; combinations of bis-β-naphthols with 1,3-dihydroxybenzene derivatives such as 2,4-dihydroxybenzophenone and 2',4'-dihydroxyacetophenone; 5-pyrazolones such as 3-methyl-1-phenyl-5-pyrazolone; reductones such as dimethylaminohexosereductone, anhydrodihydroaminohexosereductone and anhydrodihydropiperidonehexosereductone; sulfonamidephenol reducing agents such as 2,6-dichloro-4-benzenesulfonamidephenol and p-benzenesulfonamidephenol; 2-phenylindane-1,3-dione, etc.; chromans such as 2,2-dimethyl-7-t-butyl-6-hydroxychroman; 1,4-dihydropyridines such as 2,6-dimethoxy-3,5-dicarboethoxy-1,4-dihydropyridine; bisphenols such as bis(2-hydroxy-3-t-butyl-5-methylphenyl)-methane, 2,2-bis(4-hydroxy-3-methylphenyl)propane, 4,4-ethylidene-bis(2-t-butyl-6-methylphenol), 1,1-bis(2-hydroxy-3,5-dimethylphenyl)-3,5,5-trimethylhexane, and 2,2-bis(3,5-dimethyl-4-hydroxyphenyl)propane; ascorbic acid derivatives such as 1-ascorbyl palmitate and ascorbyl stearate; aldehydes and ketones such as benzil and diacetyl; 3-pyrazolidones and certain indane-1,3-diones.

Especially preferred reducing agents used herein are those compounds of the following formulae (R-I), (R-II), (R-III), and (R-IV).

(R-I)

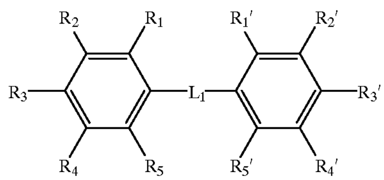

(R-II)

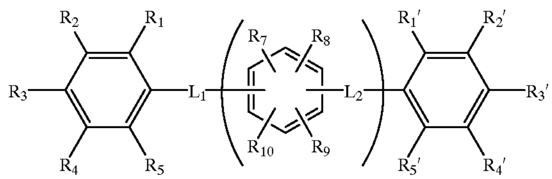

(R-III)

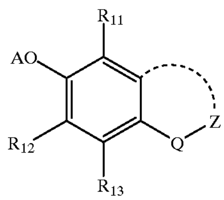

(R-IV)

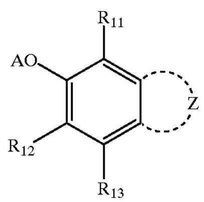

In formula (R-III), Z forms a cyclic structure represented by the following formula (Z-1) or (Z-2).

(Z-1)

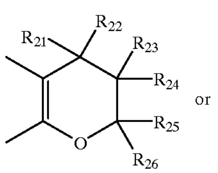

(Z-1)

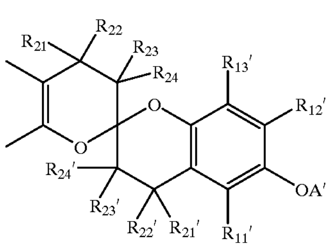

In formula (R-IV), Z forms a cyclic structure represented by the following formula (Z-3) or (Z-4).

(Z-3)

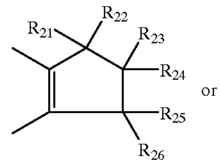

(Z-4)

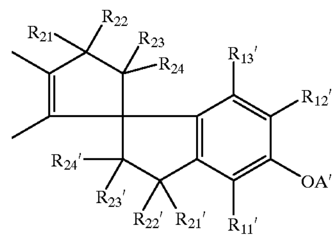

In formulae (R-I) and (R-II), each of $L_1$ and $L_2$ is a group CH—$R_6$ or a sulfur atom, and n is a natural number.

Herein, R is used as a representative of $R_1$ to $R_{10}$, $R_1'$ to $R_5'$, $R_{11}$ to $R_{13}$, $R_{11}'$ to $R_{13}'$, $R_{21}$ to $R_{26}$, and $R_{21}'$ to $R_{24}'$ R is a hydrogen atom, alkyl group having 1 to 30 carbon atoms, aryl group, aralkyl group, halogen atom, amino group or a substituent represented by —O—A, with the proviso that at least one of $R_1$ to $R_5$, at least one of $R_1'$ to $R_5'$, and at least one of $R_7$ to $R_{10}$ each are a group represented by —O—A. Alternatively, R groups, taken together, may form a ring. A and A' each are a hydrogen atom, alkyl group having 1 to 30 carbon atoms, acyl group having 1 to 30 carbon atoms, aryl group, phosphate group or sulfonyl group. R, A and A' may be substituted groups while typical examples of the substituent include an alkyl group (including active methine groups), nitro group, alkenyl group, alkynyl group, aryl group, heterocycle-containing group, group containing a quaternized nitrogen atom-containing heterocycle (e.g., pyridinio group), hydroxyl group, alkoxy group (including a group containing recurring ethyleneoxy or propyleneoxy units), aryloxy group, acyloxy group, acyl group, alkoxycarbonyl group, aryloxycarbonyl group, carbamoyl group, urethane group, carboxyl group, imido group, amino group, carbonamide group, sulfonamide group, ureido group, thioureido group, sulfamoylamino group, semicarbazide group, thiosemicarbazide group, hydrazino-containing group, quaternary ammonio-containing-group, mercapto group, (alkyl, aryl or heterocyclic) thio group, (alkyl or aryl) sulfonyl group, (alkyl or aryl) sulfinyl group, sulfo group, sulfamoyl group, acylsulfamoyl group, (alkyl or aryl) sulfonylureido group, (alkyl or aryl) sulfonylcarbamoyl group, halogen atom, cyano group, phosphoric acid amide group, phosphate structure-containing group, acylurea structure-bearing group, selenium or tellurium atom-containing group, and tertiary or quaternary sulfonium structure-bearing group. The substituent on R, A and A' may be further substituted, with preferred examples of the further substituent being those groups exemplified as the substituent on R. The further substituent, in turn, may be further substituted, the still further substituent, in turn, may be further substituted, and so on. In this way, multiple substitution is acceptable while preferred substituents are those groups exemplified as the substituent on R, A and A'.

Illustrative, non-limiting, examples of the compounds represented by formulae (R-I), (R-II), (R-III) and (R-IV) are given below.

| No. | $R_1, R_{1'}$ | $R_2, R_{2'}$ | $R_3, R_{3'}$ | $R_4, R_{4'}$ | $R_5, R_{5'}$ | $L_1$ | $R_6$ |
|---|---|---|---|---|---|---|---|
| R-I-1 | —OH | —$CH_3$ | —H | —$CH_3$ | —H | CH-R6 | —H |
| R-I-2 | —OH | —$CH_3$ | —H | —$CH_3$ | —H | CH-R6 | —$CH_3$ |
| R-I-3 | —OH | —$CH_3$ | —H | —$CH_3$ | —H | CH-R6 | —$C_3H_7$ |
| R-I-4 | —OH | —$CH_3$ | —H | —$CH_3$ | —H | CH-R6 | —$C_5H_{11}$ |
| R-I-5 | —OH | —$CH_3$ | —H | —$CH_3$ | —H | CH-R6 | -TMB |
| R-I-6 | —OH | —$CH_3$ | —H | —$CH_3$ | —H | CH-R6 | —$C_9H_{19}$ |
| R-I-7 | —OH | —$CH_3$ | —H | —$CH_3$ | —H | S | — |
| R-I-8 | —OH | —$CH_3$ | —H | —$C_2H_5$ | —H | S | — |
| R-I-9 | —OH | —$CH_3$ | —H | —$C_4H_9$(t) | —H | S | — |
| R-I-10 | —OH | —$C_4H_9$(t) | —H | —$CH_3$ | —H | CH-R6 | —H |
| R-I-11 | —OH | —$C_4H_9$(t) | —H | —$CH_3$ | —H | CH-R6 | —$CH_3$ |
| R-I-12 | —OH | —$C_4H_9$(t) | —H | —$CH_3$ | —H | CH-R6 | -TMB |
| R-I-13 | —OH | —$C_4H_9$(t) | —H | —$C_2H_5$ | —H | CH-R6 | —Ph |
| R-I-14 | —OH | —CHex | —H | —$CH_3$ | —H | S | — |
| R-I-15 | —OH | —$C_4H_9$(t) | —H | —$C_2H_5$ | —H | S | — |
| R-I-16 | —OH | —$C_2H_5$ | —H | —$C_4H_9$(t) | —H | CH-R6 | —H |
| R-I-17 | —OH | —$C_2H_5$ | —H | —$C_4H_9$(t) | —H | CH-R6 | —$CH_3$ |
| R-I-18 | —OH | —$C_2H_5$ | —H | —$C_4H_9$(t) | —H | CH-R6 | -TMB |
| R-I-19 | —OH | —$CH_3$ | —H | —$C_4H_9$(t) | —H | CH-R6 | —Ph |
| R-I-20 | —OH | —$CH_3$ | —Cl | —$C_4H_9$(t) | —H | CH-R6 | —H |
| R-I-21 | —OH | —$CH_3$ | —H | —$C_4H_9$(t) | —OCH3 | CH-R6 | —H |
| R-I-22 | —H | —$C_4H_9$(t) | —OH | —CPen | —H | CH-R6 | —H |
| R-I-23 | —H | —$C_4H_9$(t) | —OH | —$C_4H_9$(t) | —H | CH-R6 | -TMB |
| R-I-24 | —H | —$C_4H_9$(t) | —OH | —H | —H | CH-R6 | —H |
| R-I-25 | —H | —$C_4H_9$(t) | —OH | —H | —H | CH-R6 | —$C_3H_7$ |
| R-I-26 | —H | —$CH_3$ | —OH | —$C_4H_9$(t) | —H | CH-R6 | -TMB |
| R-I-27 | —H | —$C_2H_5$ | —OH | —$C_4H_9$(t) | —H | CH-R6 | —H |
| R-I-28 | —H | —$CH_3$ | —OH | —$C_2H_5$ | —H | CH-R6 | -TMB |
| R-I-29 | —H | —$CH_3$ | —OH | —$CH_3$ | —H | S | — |
| R-I-30 | —H | —$CH_3$ | —OH | —$CH_3$ | —Cl | S | — |
| R-I-31 | —H | —$CH_3$ | —OH | —$C_2H_5$ | —H | S | — |
| R-I-32 | —H | —$C_2H_5$ | —OH | —$C_2H_5$ | —H | S | — |
| R-I-33 | —H | —$C_2H_5$ | —OH | —$CH_3$ | —Cl | S | — |
| R-I-34 | —H | —$CH_3$ | —OH | —$C_4H_9$(t) | —H | S | — |
| R-I-35 | —H | —CHex | —OH | —$C_4H_9$(t) | —H | S | — |

TMB: 1,3,3-trimethylbutyl group
CPen: cyclopentyl group
CHex: cyclohexyl group (R-I)

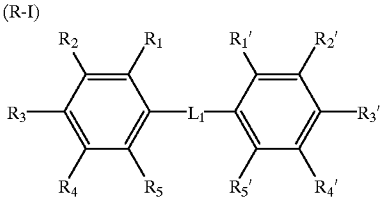

| No. | $R_1$ | $R_2$ | $R_3$ | $R_4$ | $R_5$ | $R_{1'}$ | $R_{2'}$ | $R_{3'}$ | $R_{4'}$ | $R_{5'}$ | $L_1$ | $R_6$ |
|---|---|---|---|---|---|---|---|---|---|---|---|---|
| R-I-36 | —OH | —$CH_3$ | —H | —$CH_3$ | —H | —H | —$CH_3$ | —OH | —$CH_3$ | —H | CH-R6 | —H |
| R-I-37 | —OH | —$C_4H_9$(t) | —H | —$CH_3$ | —H | —H | —$CH_3$ | —OH | —$CH_3$ | —H | CH-R6 | —H |
| R-I-38 | —OH | —$CH_3$ | —H | —$CH_3$ | —H | —H | —CHex | —OH | —$CH_3$ | —H | CH-R6 | —$CH_3$ |
| R-I-39 | —OH | —$C_4H_9$(t) | —H | —$CH_3$ | —H | —H | —$CH_3$ | —OH | —$CH_3$ | —H | CH-R6 | —$CH_3$ |
| R-I-40 | —OH | —$CH_3$ | —H | —$CH_3$ | —H | —H | —$CH_3$ | —OH | —$CH_3$ | —H | CH-R6 | -TMB |
| R-I-41 | —OH | —$C_4H_9$(t) | —H | —$CH_3$ | —H | —H | —$CH_3$ | —OH | —$CH_3$ | —H | CH-R6 | -TMB |
| R-I-42 | —OH | —$CH_3$ | —H | —$CH_3$ | —H | —H | —$CH_3$ | —OH | —$CH_3$ | —H | S | — |
| R-I-43 | —OH | —$C_4H_9$(t) | —H | —$CH_3$ | —H | —H | —$CH_3$ | —OH | —$CH_3$ | —H | S | — |
| R-I-44 | —OH | —$CH_3$ | —H | —$CH_3$ | —H | —H | —CHex | —OH | —$CH_3$ | —H | S | — |

CHex: cyclohexyl group
(R-I)

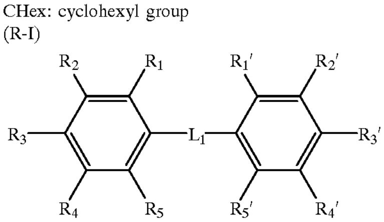

-continued
R-I-45
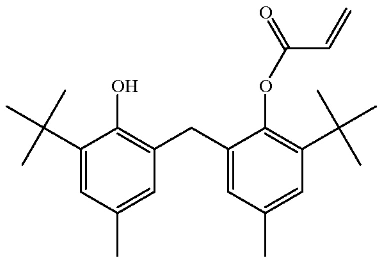
R-I-46
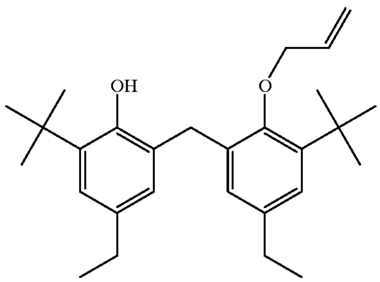
R-I-47
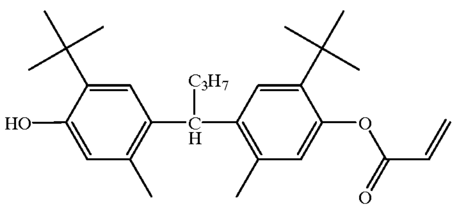
R-I-48
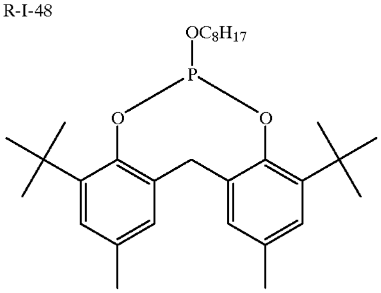
R-I-49
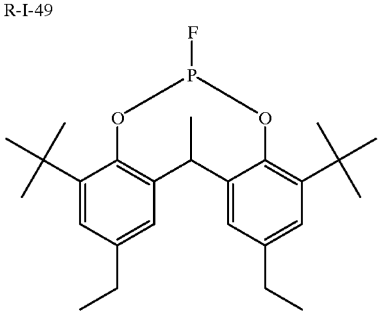

-continued
R-I-50
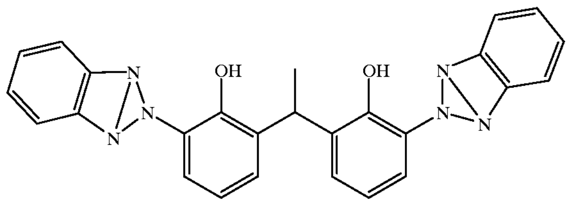
R-I-51
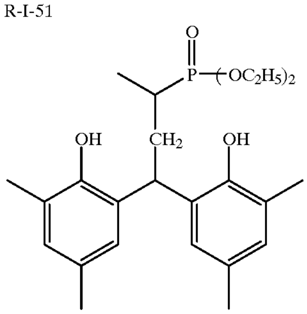
R-I-52
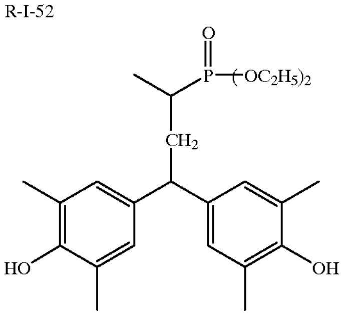
R-I-53
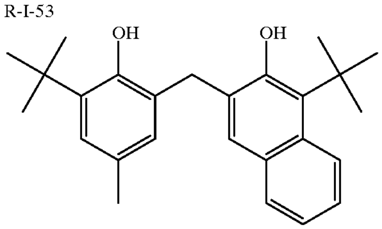
R-I-54
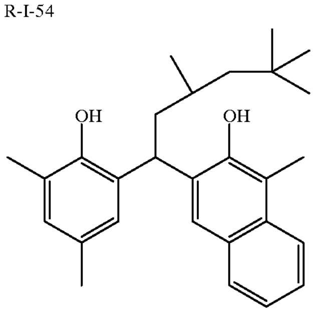

-continued

R-I-55

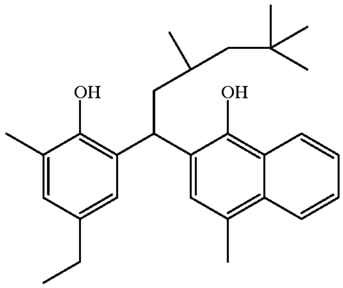

| No. | $R_1$, $R_{1'}$ | $R_2$, $R_{2'}$ | $R_3$, $R_{3'}$ | $R_4$, $R_{4'}$ | $R_5$, $R_{5'}$ | $R_7$ | $R_8$ | $R_9$ | $R_{10}$ | $L_1$ | $R_6$ | $L_2$ | $R_{6'}$ | n |
|---|---|---|---|---|---|---|---|---|---|---|---|---|---|---|
| R-II-1 | —OH | —$C_4H_9$(t) | —H | —$CH_3$ | —H | —OH | —$CH_3$ | —$CH_3$ | —H | CH-R6 | —H | CH-R6' | —$CH_3$ | 1 |
| R-II-2 | —OH | —$CH_3$ | —H | —$CH_3$ | —H | —OH | —$C_2H_5$ | —$CH_3$ | —H | CH-R6 | -TMB | CH-R6' | —$CH_3$ | 1 |
| R-II-3 | —OH | —$C_4H_9$(t) | —H | —$CH_3$ | —H | —OH | —$CH_3$ | —$CH_3$ | —H | CH-R6 | —H | CH-R6' | -TMB | 3 |
| R-II-4 | —OH | —$CH_3$ | —H | —$CH_3$ | —H | —OH | —$C_2H_5$ | —$CH_3$ | —H | CH-R6 | -TMB | CH-R6' | -TMB | 2 |
| R-II-5 | —H | —$C_4H_9$(t) | —OH | —$CH_3$ | —H | —OH | —$CH_3$ | —$CH_3$ | —H | S | — | CH-R6' | —$CH_3$ | 1 |
| R-II-6 | —H | —$CH_3$ | —OH | —$CH_3$ | —H | —OH | —$C_2H_5$ | —$CH_3$ | —H | S | — | S | — | 1 |
| R-II-7 | —H | —$C_4H_9$(t) | —OH | —$CH_3$ | —H | —OH | —$CH_3$ | —$CH_3$ | —H | S | — | S | — | 2 |
| R-II-8 | —H | —$CH_3$ | —OH | —$CH_3$ | —H | —OH | —$C_2H_5$ | —$CH_3$ | —H | S | — | CH-R6 | -TMB | 3 |

(R-II)

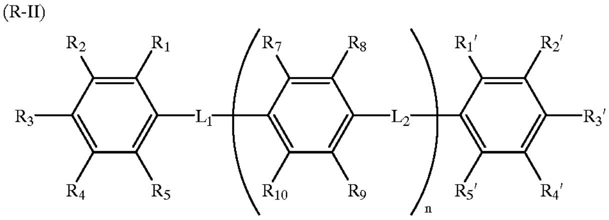

| No. | Z | $R_{11}$ | $R_{12}$ | $R_{13}$ | $R_{21}$ | $R_{22}$ | $R_{23}$ | $R_{24}$ | $R_{25}$ | $R_{26}$ | A |
|---|---|---|---|---|---|---|---|---|---|---|---|
| R-III-1 | Z-1 | —$CH_3$ | —$CH_3$ | —$CH_3$ | —H | —H | —H | —H | —$CH_3$ | —$C_{16}H_{33}$ | —H |
| R-III-2 | Z-1 | —$CH_3$ | —$CH_3$ | —$CH_3$ | —H | —H | —H | —H | —$CH_3$ | —$C_{16}H_{13}$ | —H |
| R-III-3 | Z-1 | —$CH_3$ | —$C_8H_{17}$ | —H | —H | —$CH_3$ | —H | —H | —$CH_3$ | —$CH_3$ | —H |
| R-III-4 | Z-1 | —H | —$C_8H_{17}$ | —H | —H | —$CH_3$ | —H | —H | —$CH_3$ | —$CH_3$ | —H |
| R-III-5 | Z-1 | —H | —H | —$CH_3$ | —H | —H | —H | —H | —$CH_3$ | —$C_{16}H_{33}$ | —H |
| R-III-6 | Z-1 | —H | —$CH_3$ | —H | —$CH_3$ | —$CH_3$ | —H | —H | —$CH_3$ | —$CH_3$ | —H |
| R-III-7 | Z-1 | —H | —$CH_3$ | —H | —$CH_3$ | —$CH_3$ | —H | —H | —$CH_3$ | -DHP | —H |

DHP: 2,4-dihydroxyphenyl group (R-III)

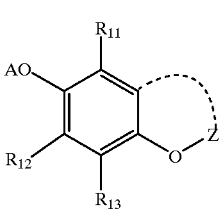

-continued
(Z-1)
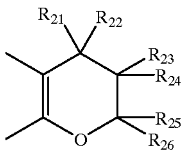
| No. | Z | $R_{11}$, $R_{11'}$ | $R_{12}$, $R_{12'}$ | $R_{13}$, $R_{13'}$ | $R_{21}$, $R_{22}$ | $R_{21'}$, $R_{22'}$ | $R_{23}$, $R_{24}$ | $R_{23'}$, $R_{24'}$ | A |
|---|---|---|---|---|---|---|---|---|---|
| R-III-8 | Z-2 | —H | —$CH_3$ | —H | —$CH_3$ | —$CH_3$ | —H | —H | —H |
| R-III-9 | Z-2 | —$CH_3$ | —$CH_3$ | —$CH_3$ | —H | —H | —$CH_3$ | —$CH_3$ | —H |
| R-III-10 | Z-2 | —$CH_3$ | —$CH_3$ | —$CH_3$ | —H | —H | —H | —H | —H |
| R-III-11 | Z-2 | —$CH_3$ | —OH | —$CH_3$ | —$CH_3$ | —$CH_3$ | —H | —H | —H |
| R-III-12 | Z-2 | —H | —OH | —$CH_3$ | —$CH_3$ | —$CH_3$ | —H | —H | —H |
(R-III)
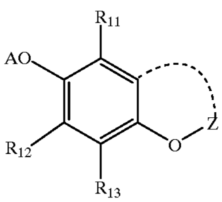
(Z-2)
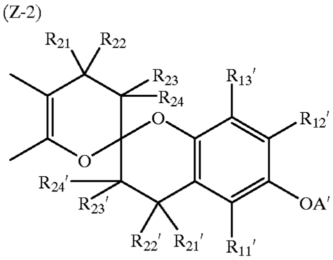
| No. | Z | $R_{11}$ | $R_{12}$ | $R_{13}$ | $R_{21}$, $R_{22}$ | $R_{23}$, $R_{24}$ | $R_{25}$, $R_{26}$ | A |
|---|---|---|---|---|---|---|---|---|
| R-IV-1 | Z-3 | —H | —OH | —$CH_3$ | —$CH_3$ | —H | —H | —H |
| R-IV-2 | Z-3 | —$CH_3$ | —$CH_3$ | —$CH_3$ | —$CH_3$ | —H | —H | —H |
(R-IV)
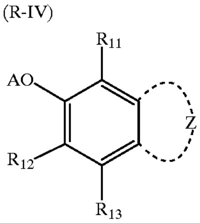
(Z-3)
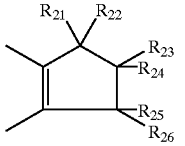

-continued

| No. | Z | $R_{11}$, $R_{11'}$ | $R_{12}$, $R_{12'}$ | $R_{13}$, $R_{13'}$ | $R_{21}$, $R_{21'}$ | $R_{22}$, $R_{22'}$ | $R_{23}$, $R_{24}$ | $R_{23'}$, $R_{24'}$ | A |
|---|---|---|---|---|---|---|---|---|---|
| R-IV-3 | Z-4 | —$CH_3$ | —H | —H | —$CH_3$ | —$CH_3$ | —H | —H | —H |
| R-IV-4 | Z-4 | —$CH_3$ | —$CH_3$ | —H | —$CH_3$ | —$CH_3$ | —H | —H | —H |
| R-IV-5 | Z-4 | —$CH_3$ | —H | —H | —$C_2H_5$ | —$CH_3$ | —H | —H | —H |

(R-IV)

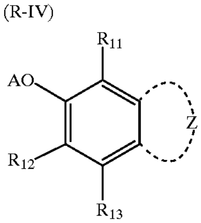

(Z-4)

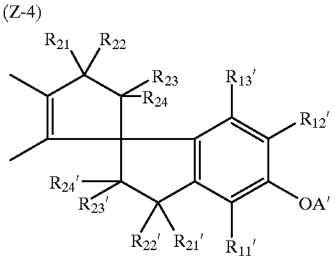

The reducing agent is preferably used in an amount of $1\times10^{-3}$ to 10 mol, more preferably $1\times10^{-2}$ to 1.5 mol per mol of silver.

In the photothermographic material of the invention, mercapto, disulfide and thion compounds may be added for the purposes of retarding or accelerating development to control development, improving spectral sensitization efficiency, and improving storage stability before and after development.

Where mercapto compounds are used herein, any structure is acceptable. Preferred are structures represented by Ar—SM and Ar—S—S—Ar wherein M is a hydrogen atom or alkali metal atom, and Ar is an aromatic ring or fused aromatic ring having at least one nitrogen, sulfur, oxygen, selenium or tellurium atom. Preferred hetero-aromatic rings are benzimidazole, naphthimidazole, benzothiazole, naphtho-thiazole, benzoxazole, naphthoxazole, benzoselenazole, benzotellurazole, imidazole, oxazole, pyrrazole, triazole, thiadiazole, tetrazole, triazine, pyrimidine, pyridazine, pyrazine, pyridine, purine, quinoline and quinazolinone rings. These hetero-aromatic rings may have a substituent selected from the group consisting of halogen (e.g., Br and Cl), hydroxy, amino, carboxy, alkyl groups (having at least 1 carbon atom, preferably 1 to 4 carbon atoms), and alkoxy groups (having at least 1 carbon atom, preferably 1 to 4 carbon atoms). Illustrative, non-limiting examples of the mercapto-substituted hetero-aromatic compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 2,2'-dithiobis(benzothiazole), 3-mercapto-1,2,4-triazole, 4,5-diphenyl-2-imidazolethiol, 2-mercaptoimidazole, 1-ethyl-2-mercaptobenzimidazole, 2-mercaptoquinoline, 8-mercaptopurine, 2-mercapto-4(3H)-quinazolinone, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mercapto-1,3,4-thiadiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole, and 2-mercapto-4-phenyloxazole.

These mercapto compounds are preferably added to the emulsion layer in amounts of 0.001 to 1.0 mol, more preferably 0.01 to 0.3 mol per mol of silver.

A sensitizing dye is also useful in the practice of the invention. There may be used any of sensitizing dyes which can spectrally sensitize silver halide grains in a desired wavelength region when adsorbed to the silver halide grains. The sensitizing dyes used herein include cyanine dyes, merocyanine dyes, complex cyanine dyes, complex merocyanine dyes, holopolar cyanine dyes, styryl dyes, hemicyanine dyes, oxonol dyes, and hemioxonol dyes. Useful sensitizing dyes which can be used herein are described in Research Disclosure, Item 17643 IV-A (December 1978, page 23), ibid., Item 1831 X (August 1979, page 437) and the references cited therein.

It is advantageous to select a sensitizing dye having appropriate spectral sensitivity to the spectral properties of a particular light source of various scanners, image setters and printing plate-forming cameras. Exemplary sensitizing dyes include (A) compounds (I)-1 to (I)-8 described in JP-A 162247/1985, compounds I-1 to I-28 described in JP-A 48653/1990, compounds I-1 to I-13 described in JP-A 330434/1992, compounds of Examples 1 to 14 described in U.S. Pat. No. 2,161,331, and compounds 1 to 7 described in W. German Patent No. 936,071 for argon laser light sources; (B) compounds I-1 to I-38 described in JP-A 18726/1979, compounds I-1 to I-35 described in JP-A 75322/1994, and compounds I-1 to I-34 described in JP-A 287338/1995 for He—Ne laser light sources; (C) dyes 1 to 20 described in JP-B 39818/1980, compounds I-1 to I-37 described in JP-A 284343/1987, and compounds I-1 to I-34 described in JP-A 287338/1995 for LED light sources; (D) compounds I-1 to I-12 described in JP-A 191032/1984, compounds I-1 to I-22 described in JP-A 80841/1985, compounds I-1 to I-29 described in JP-A 335342/1992, and compounds I-1 to I-18 described in JP-A 192242/1984 for semiconductor laser light sources; (E) compounds (1) to (19) of general formula [1] described in JP-A 45015/1980, compounds I-1 to I-97 described in Japanese Patent Application No. 346193/1995, and compounds 4-A to 4-S, 5-A to 5-Q, and 6-A to 6-T described in JP-A 242547/1994 for tungsten and xenon light sources for printing plate-forming cameras.

These sensitizing dyes may be used alone or in admixture of two or more. A combination of sensitizing dyes is often used for the purpose of supersensitization. In addition to the sensitizing dye, the emulsion may contain a dye which itself has no spectral sensitization function or a compound which does not substantially absorb visible light, but is capable of supersensitization.

In the practice of the invention, at least one of sensitizing dyes of the following general formulae (D-I) to (D-VI) is preferably used in combination with a hydrazine derivative of the general formula (H). The general formulae (D-I) to (D-VI) are described.

general formula (D-I)

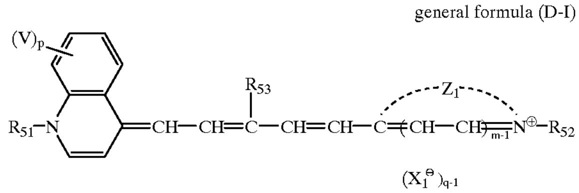

In formula (D-I), each of $R_{51}$ and $R_{52}$, which may be identical or different, is a substituted or unsubstituted alkyl group, preferably having 1 to 8 carbon atoms, for example, methyl, ethyl, propyl, butyl, pentyl, heptyl and octyl. When substituted, the alkyl group preferably has up to 6 carbon atoms, and examples of the substituent include carboxyl, sulfo, cyano, halogen atoms (fluorine, chlorine and bromine atoms), hydroxyl, alkoxycarbonyl (preferably having up to 8 carbon atoms, e.g., methoxycarbonyl, ethoxycarbonyl and benzyloxycarbonyl), alkoxy (preferably having up to 7 carbon atoms, e.g., methoxy, ethoxy, propoxy, butoxy, and benzyloxy), aryloxy (e.g., phenoxy and p-tolyloxy), acyloxy (preferably having up to 3 carbon atoms, e.g., acetyloxy and propionyloxy), acyl (preferably having up to 8 carbon atoms, e.g., acetyl, propionyl, benzoyl and mesyl), carbamoyl (e.g., carbamoyl, N,N-dimethylcarbamoyl, morpholinocarbamoyl, and piperidinocarbamoyl), sulfamoyl (e.g., sulfamoyl, N,N-dimethylsulfamoyl and morpholinosulfamoyl), and aryl (e.g., phenyl, p-hydroxyphenyl, p-carboxyphenyl, p-sulfophenyl and α-naphthyl). The alkyl group may have two or more different substituents.

$R_{53}$ is hydrogen or a lower alkyl (preferably having 1 to 4 carbon atoms, e.g., methyl, ethyl, propyl and butyl), lower alkoxy (preferably having 1 to 4 carbon atoms, e.g., methoxy, ethoxy, propoxy and butoxy), phenyl, benzyl or phenethyl group. Among these, lower alkyl and benzyl groups are advantageous.

V is a hydrogen atom, a lower alkyl (preferably having 1 to 4 carbon atoms, e.g., methyl, ethyl and propyl), alkoxy (preferably having 1 to 4 carbon atoms, e.g., methoxy, ethoxy and butoxy), halogen atoms (e.g., fluorine and chlorine atoms) or substituted alkyl (preferably having 1 to 4 carbon atoms, e.g., trifluoromethyl and carboxymethyl).

$Z_1$ is a group of non-metallic atoms necessary to complete a 5- or 6-membered nitrogenous heterocycle. Exemplary nitrogenous heterocycles are thiazole, selenazole, oxazole, quinoline, 3,3-dialkylindolenine, imidazole, and pyridine nuclei. Examples of the thiazole nucleus include benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, and 5-methoxynaphtho[2,3-d]thiazole nuclei; examples of the selenazole nucleus include benzoselenazole, 5-chlorobenzoselenazole, 5-methoxybenzoselenazole, 5-methylbenzoselenazole, 5-hydroxybenzoselenazole, naphtho[2,1-d]selenazole, and naphtho[1,2-d]selenazole nuclei; examples of the oxazole nucleus include benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluoromethylbenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole, 5-ethoxybenzoxazole, naphtho[2,1-d]oxazole, naphtho[1,2-d]oxazole, and naphtho[2,3-d]oxazole nuclei; examples of the quinoline nucleus include 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, and 8-fluoro-4-quinoline nuclei; examples of the 3,3-dialkylindolenine nucleus include 3,3-dimethylindolenine, 3,3-diethylindolenine, 3,3-dimethyl-5-cyanoindolenine, 3,3-dimethyl-5-methoxyindolenine, 3,3-dimethyl-5-methylindolenine, and 3,3-dimethyl-5-chloroindolenine nuclei; examples of the imidazole nucleus include 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-ethyl-5-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chlorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, and 1-ethylnaphtho[1,2-d]imidazole nuclei; and examples of the pyridine nucleus include pyridine, 5-methyl-2-pyridine, and 3-methyl-4-pyridine nuclei. Preferred among these are thiazole and oxazole nuclei. More preferred are benzothiazole, naphthothiazole, naphthoxazole and benzoxazole nuclei.

Letters m, p and q are independently equal to 1 or 2. When the dye forms an intramolecular salt, q is 1.

$X_1$ is an acid anion, for example, chloride, bromide, iodide, tetrafluoroborate, hexafluorophosphate, methylsulfate, ethylsulfate, benzenesulfonate, 4-methylbenzenesulfonate, 4-chlorobenzenesulfonate, 4-nitrobenzenesulfonate, trifluoromethanesulfonate and perchlorate.

general formula (D-II)

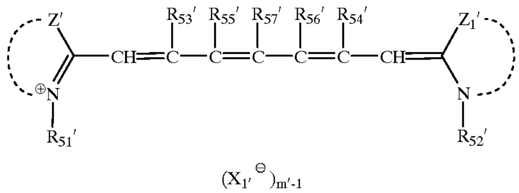

In formula (D-II), each of $R_{51}'$ and $R_{52}'$, which may be identical or different, is a substituted or unsubstituted alkyl group, preferably having 1 to 8 carbon atoms, for example, methyl, ethyl, propyl, butyl, pentyl, heptyl and octyl. When substituted, the alkyl group preferably has up to 6 carbon atoms, and examples of the substituent include carboxyl, sulfo, cyano, halogen atoms (fluorine, chlorine and bromine atoms), hydroxyl, alkoxycarbonyl (preferably having up to 8 carbon atoms, e.g., methoxycarbonyl, ethoxycarbonyl and benzyloxycarbonyl), alkoxy (preferably having up to 7 carbon atoms, e.g., methoxy, ethoxy, propoxy, butoxy, and benzyloxy), aryloxy (e.g., phenoxy and p-tolyloxy), acyloxy (preferably having up to 3 carbon atoms, e.g., acetyloxy and propionyloxy), acyl (preferably having up to 8 carbon atoms, e.g., acetyl, propionyl, benzoyl and mesyl), carbamoyl (e.g., carbamoyl, N,N-dimethylcarbamoyl, morpholinocarbamoyl, and piperidinocarbamoyl), sulfamoyl (e.g., sulfamoyl, N,N-dimethylsulfamoyl and morpholinosulfonyl), and aryl (e.g., phenyl, p-hydroxyphenyl, p-carboxyphenyl, p-sulfophenyl and α-naphthyl). The alkyl group may have two or more different substituents.

$R_{53}'$ and $R_{54}'$ each are a hydrogen atom, lower alkyl (preferably having 1 to 4 carbon atoms, e.g., methyl, ethyl, propyl and butyl), lower alkoxy (preferably having 1 to 4 carbon atoms, e.g., methoxy, ethoxy, propoxy and butoxy), phenyl, benzyl or phenethyl group. Among these, lower alkyl and benzyl groups are advantageous.

$R_{55}'$ and $R_{56}'$ each are a hydrogen atom or $R_{55}'$ and $R_{56}'$, taken together, form a divalent alkylene group (e.g., ethylene and trimethylene). This alkylene group may have one or more substituents, for example, alkyl groups (preferably having 1 to 4 carbon atoms, e.g., methyl, ethyl, propyl, isopropyl and butyl), halogen atoms (e.g., chlorine and bromine atoms), and alkoxy groups (preferably having 1 to 4 carbon atoms, e.g., methoxy, ethoxy, propoxy, isopropoxy and butoxy).

$R_{57}'$ is a hydrogen atom, lower alkyl (preferably having 1 to 4 carbon atoms, e.g., methyl, ethyl and propyl), lower alkoxy (preferably having 1 to 4 carbon atoms, e.g., methoxy, ethoxy, propoxy and butoxy), phenyl, benzyl or —N(W1') (W2') group. Herein, W1' and W2' are independently selected from alkyl groups (inclusive of substituted alkyl groups, preferably alkyl moiety having 1 to 18 carbon atoms, especially 1 to 4 carbon atoms, e.g., methyl, ethyl, propyl, butyl, benzyl and phenylethyl) and aryl groups (inclusive of substituted phenyl groups, e.g., phenyl, naphthyl, tolyl and p-chlorophenyl). Alternatively, W1' and W2', taken together, may form a 5- or 6-membered nitrogenous heterocycle. $R_{53}'$ and $R_{57}'$ or $R_{54}'$ and $R_{57}'$, taken together, may form a divalent alkylene group (as defined for the divalent alkylene group formed by $R_{55}'$ and $R_{56}'$, taken together).

Each of Z' and $Z_1'$ is a group of non-metallic atoms necessary to complete a 5- or 6-membered nitrogenous heterocycle. Exemplary nitrogenous heterocycles are thiazole, selenazole, oxazole, quinoline, 3,3-dialkylindolenine, imidazole, and pyridine nuclei. Examples of the thiazole nucleus include benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,l-d]thiazole, and 5-methoxynaphtho[2,3-d]thiazole nuclei; examples of the selenazole nucleus include benzoselenazole, 5-chlorobenzoselenazole, 5-methoxybenzoselenazole, 5-methylbenzoselenazole, 5-hydroxybenzoselenazole, naphtho[2,1-d]selenazole, and naphtho[1,2-d]selenazole nuclei; examples of the oxazole nucleus include benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluoromethylbenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole, 5-ethoxybenzoxazole, naphtho[2,1-d]oxazole, naphtho[1,2-d]oxazole, and naphtho[2,3-d]oxazole nuclei; examples of the quinoline nucleus include 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, and 8-fluoro-4-quinoline nuclei; examples of the 3,3-dialkylindolenine nucleus include 3,3-dimethylindolenine, 3,3-diethylindolenine, 3,3-dimethyl-5-cyanoindolenine, 3,3-dimethyl-5-methoxyindolenine, 3,3-dimethyl-5-methylindolenine, and 3,3-dimethyl-5-chloroindolenine nuclei; examples of the imidazole nucleus include 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-ethyl-5-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chlorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, and 1-ethylnaphtho[1,2-d]imidazole nuclei; and examples of the pyridine nucleus include pyridine, 5-methyl-2-pyridine, and 3-methyl-4-pyridine nuclei. Preferred among these are thiazole and oxazole nuclei. More preferred are benzothiazole, naphthothiazole, naphthoxazole and benzoxazole nuclei.

$X_1'$ is an acid anion, for example, chloride, bromide, iodide, tetrafluoroborate, hexafluorophosphate, methylsulfate, ethylsulfate, benzenesulfonate, 4-methylbenzenesulfonate, 4-chlorobenzenesulfonate, 4-nitrobenzenesulfonate, trifluoromethanesulfonate and perchlorate.

Letter m' is equal to 0 or 1. When the dye forms an intramolecular salt, m' is 1.

Illustrative non-limiting examples of the sensitizing dye of formulae (D-I) and (D-II) are given below.
D-I-1
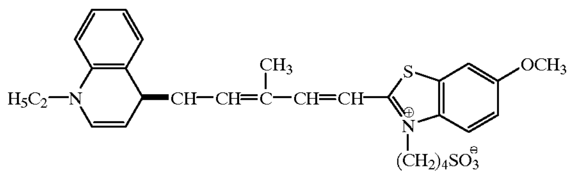
D-I-2
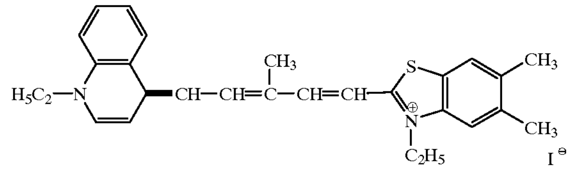
D-I-3
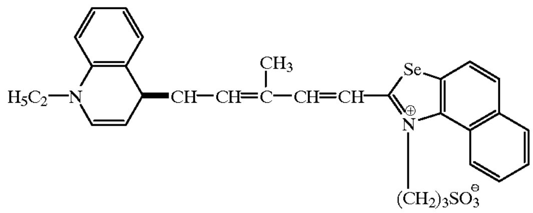
D-I-4
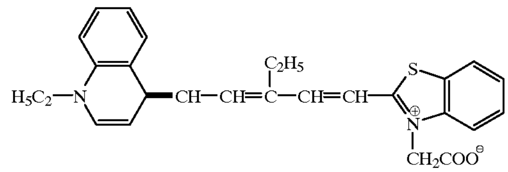
D-I-5
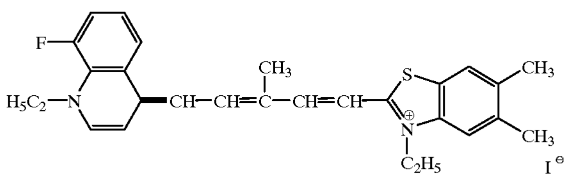
D-I-6
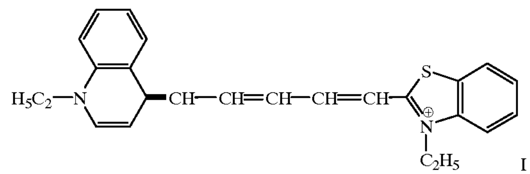
D-I-7
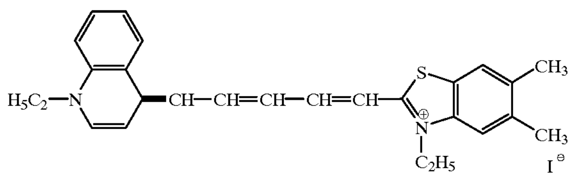
D-I-8
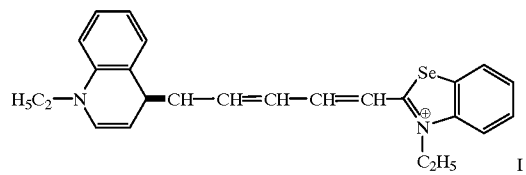
D-I-9
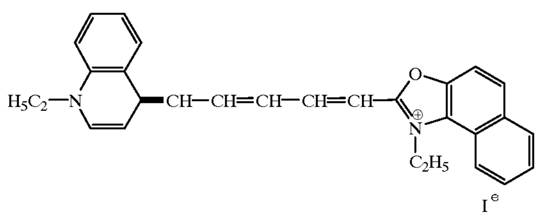
D-I-10
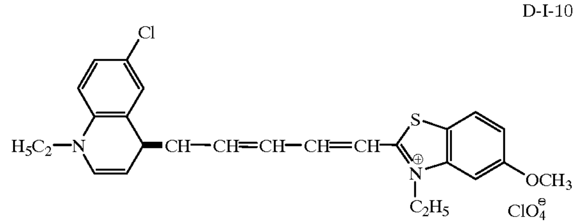
D-I-11
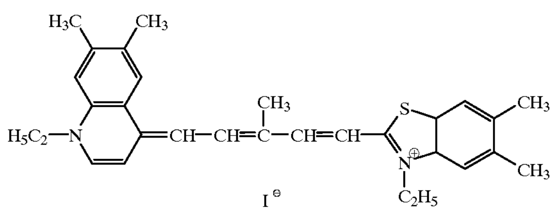

-continued
D-I-15
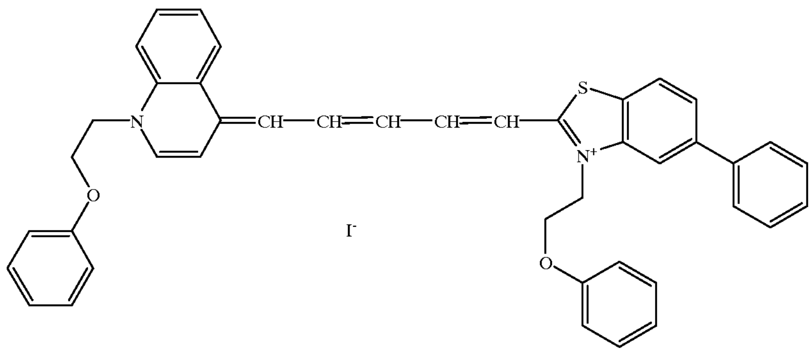
D-I-9
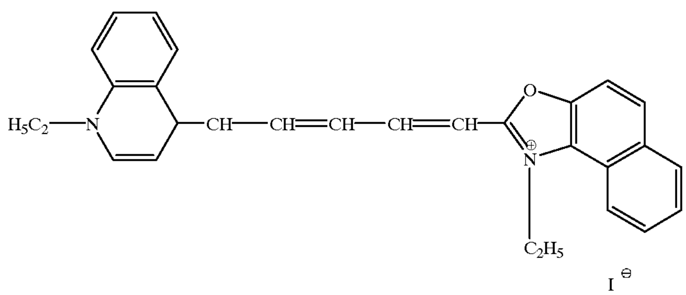
D-I-16
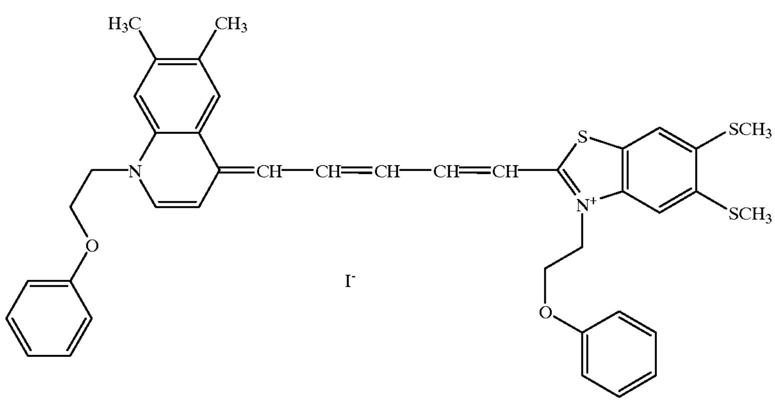

-continued
D-I-17
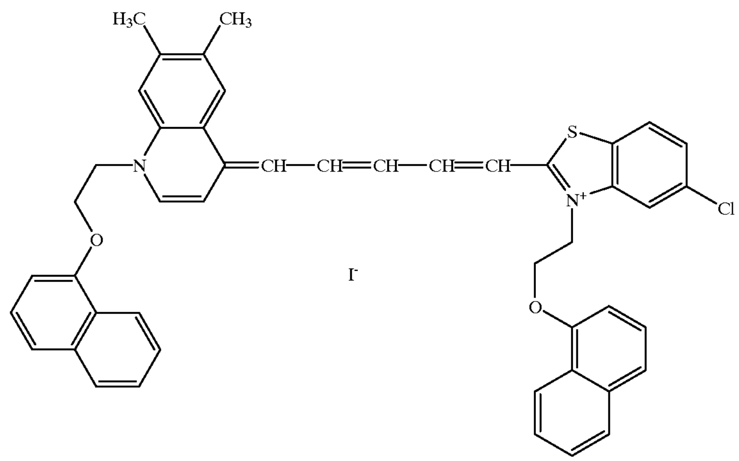
D-II-1
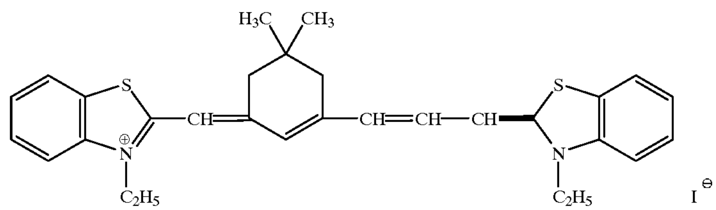
D-II-2
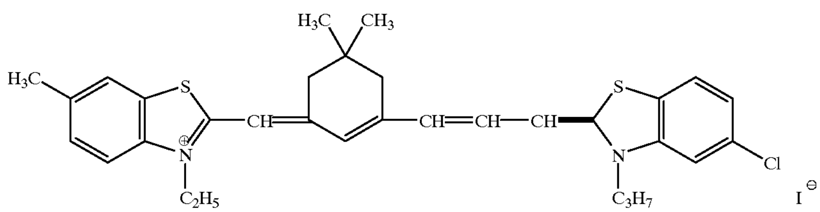
D-II-3
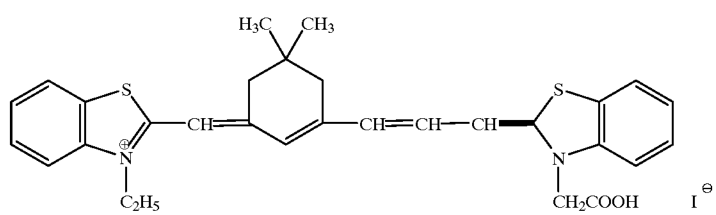
D-II-4
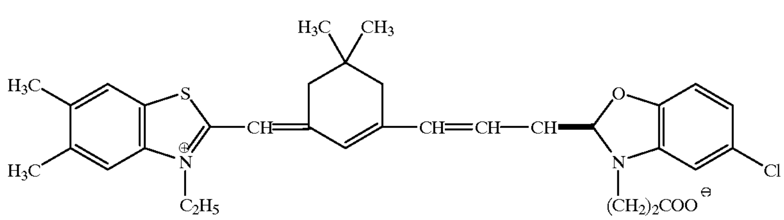
D-II-5
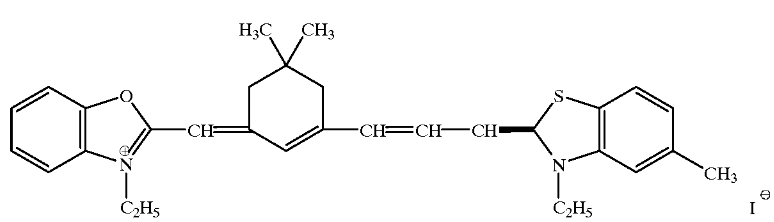

-continued
D-II-6
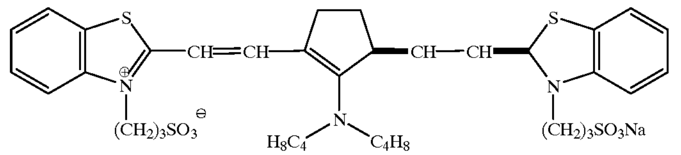
D-II-7
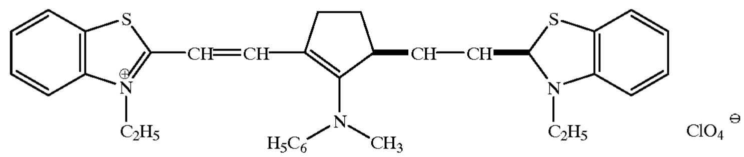
D-II-8
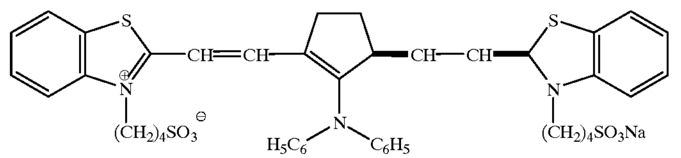
D-II-9
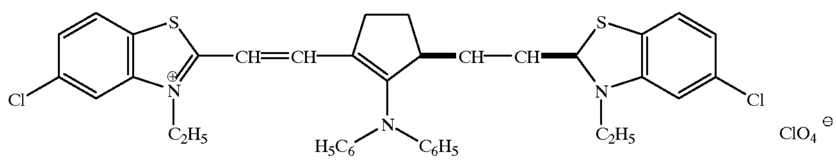
D-II-10
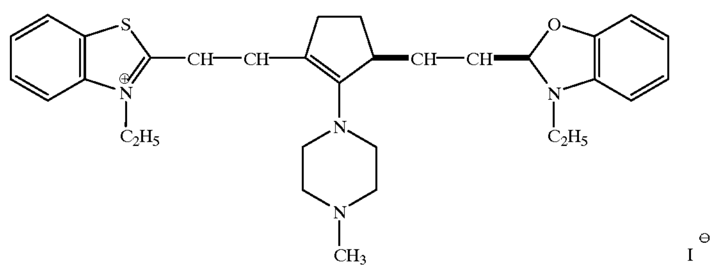
D-II-11
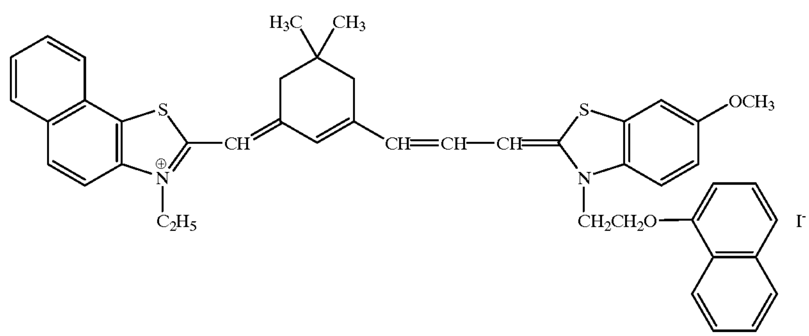
D-II-12
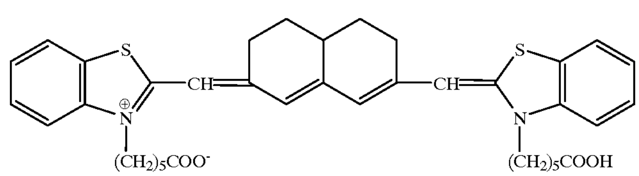

-continued
D-II-13
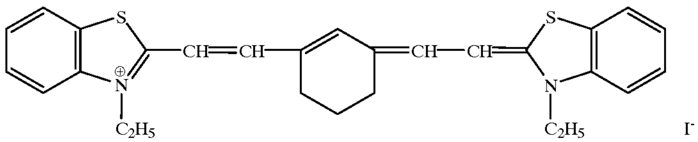
D-II-14
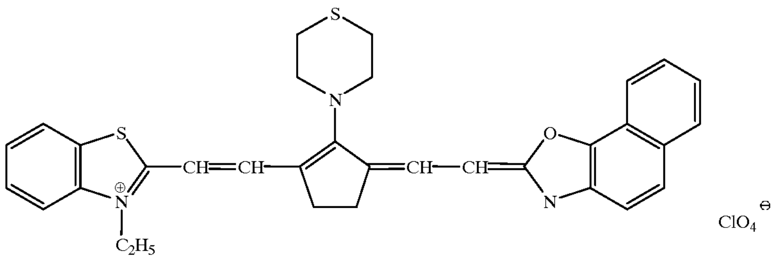
D-II-15
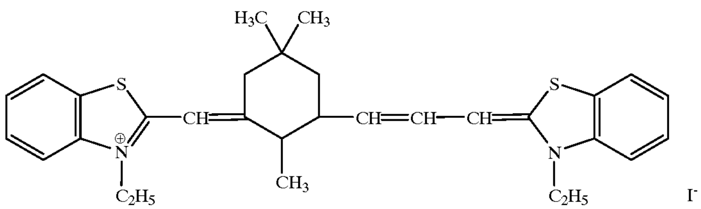
D-II-16
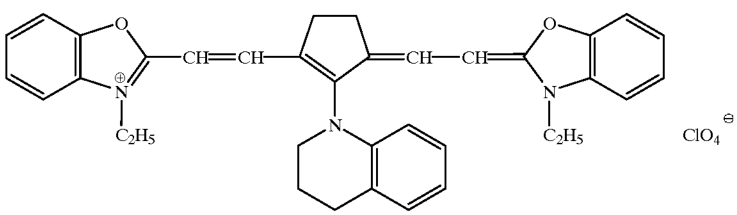
D-II-17
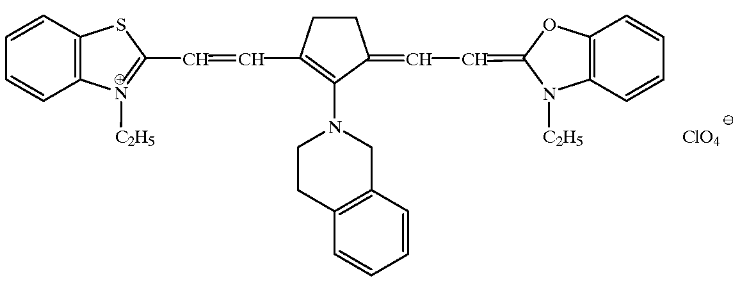
D-II-18
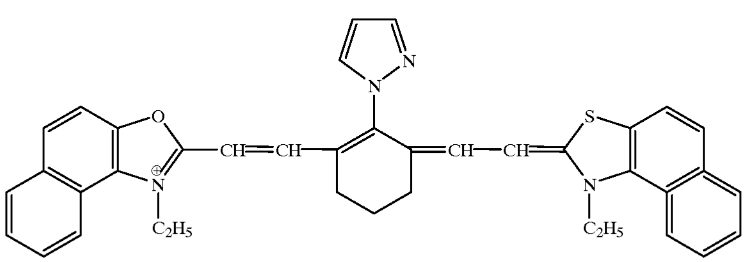

-continued

D-II-19

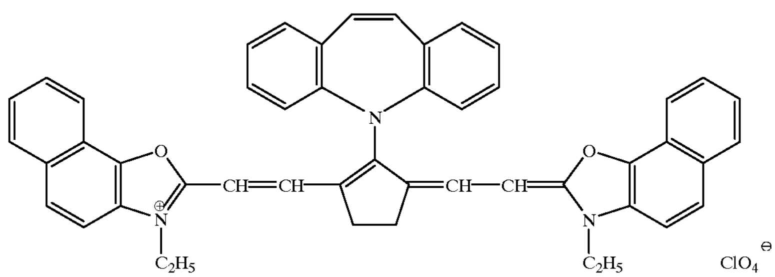

D-II-20

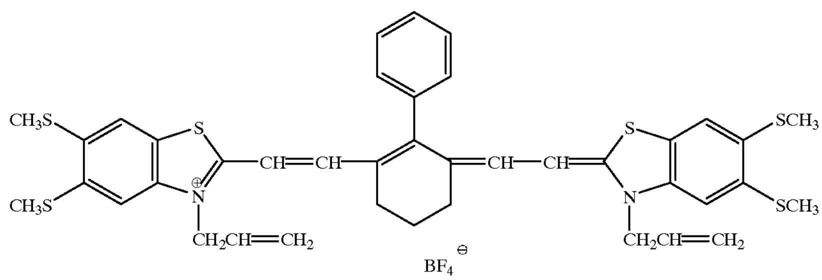

The amount of the sensitizing dye added varies with the shape, size and halogen composition of silver halide grains, the method and extent of chemical sensitization, and the type of antifoggant although the amount is generally $4\times10^{-6}$ to $8\times10^{-3}$ mol per mol of silver halide. Where silver halide grains have a size of 0.2 to 1.3 μm, the amount of the sensitizing dye added is preferably $2\times10^{-7}$ to $3.5\times10^{-6}$ mol, more preferably $6.5\times10^{-7}$ to $2.0\times10^{-6}$ mol per square meter of the surface area of silver halide grains.

general formula (D-III)

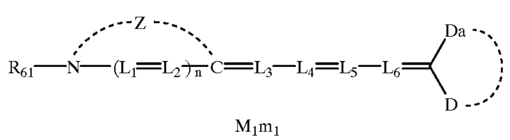

$R_{61}$ is preferably an alkyl having up to 8 carbon atoms, substituted alkyl (exemplary substituents are carboxy, sulfo, cyano and halogen atoms), hydroxy, alkoxycarbonyl, alkanesulfonylaminocarbonyl, alkoxy, alkylthio, arylthio, aryloxy, acyloxy, acylthio, acyl, carbamoyl, sulfamoyl or aryl group. More preferably $R_{61}$ is unsubstituted alkyl, carboxyalkyl, sulfoalkyl or methanesulfonylcarbamoylmethyl.

Z forms a nucleus, for example, thiazole, benzothiazole, naphthothiazole, thiazoline, oxazole, benzoxazole, naphthoxazole, oxazoline, selenazole, benzoselenazole, naphthoselenazole, tellurazole, benzotellurazole, naphthotellurazole, tellurazoline, 3,3-dialkylindolenine, imidazole, benzimidazole, naphthimidazole, pyridine, quinoline, isoquinoline, imidazo[4,5-b]quinoxaline, oxadiazole, thiadiazole, tetrazole, and pyrimidine nuclei. Preferred are benzothiazole, naphthothiazole, benzoxazole, naphthoxazole, 2-quinoline and 4-quinoline nuclei.

Each of D and Da is a group of atoms necessary to form an acidic nucleus. It may take the form of an acidic nucleus of any merocyanine dye. The acidic nucleus is defined in T. H. James, the Theory of the Photographic Process, 4th Ed., Macmillan, 1977, page 198. In a preferred form, the substituents which participate in the resonance of D are, for example, carbonyl, cyano, sulfonyl and sulfenyl groups. D' is a remaining group of atoms necessary to form an acidic nucleus, for example, such as described in U.S. Pat. Nos. 3,567,719, 3,575,869, 3,804,634, 3,837,862, 4,002,480, 4,925,777 and JP-A 167546/1991. Preferred are 2-thiohydantoin, 2-oxazolin-5-one, and rhodanine nuclei.

Each of $L_1$, $L_2$, $L_3$, $L_4$, $L_5$ and $L_6$ is a methine group or substituted methine group (exemplary substituents are substituted or unsubstituted alkyl, substituted or unsubstituted aryl, heterocyclic, halogen atoms, alkoxy, amino, and alkylthio) or may form a ring with another methine group or a ring with an auxochrome.

$M_1m_1$ is included in the formula in order to indicate the presence or absence of a cation or anion when necessary to neutralize the ionic charge of the dye.

Preferred among the compounds of formula (D-III) are those of the following general formula (D-III-a).

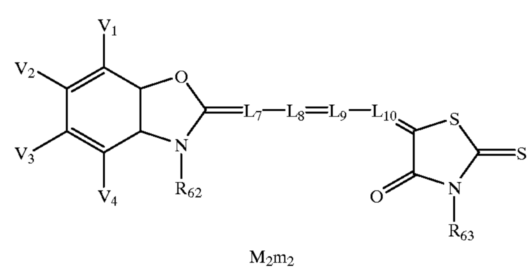

In formula (D-III-a), each of $R_{62}$ and $R_{63}$ is an alkyl group having a group capable of rendering the compound water soluble. Each of $V_1$, $V_2$, $V_3$, and $V_4$ is a hydrogen atom or a monovalent substituent, with the proviso that the substituents ($V_1$, $V_2$, $V_3$, and $V_4$) do not form a ring with each other and the total of molecular weights of the substituents is up to 100. Each of $L_7$, $L_8$, $L_9$, and $L_{10}$ is a methine group. $M_2$ is an electric charge balancing counter ion and $m_2$ is a number (inclusive of 0) necessary to neutralize the electric charge in a molecule.

Typical non-limiting examples of the sensitizing dye of formula (D-IIII) or (D-III-a) are given below.

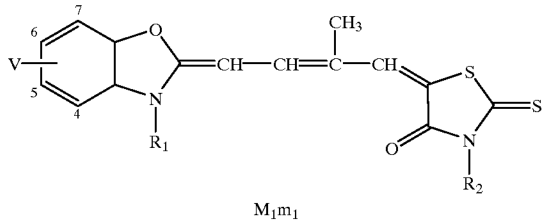

| Compound No. | $R_1$ | $R_2$ | V | $M_1$ | $m_1$ |
|---|---|---|---|---|---|
| D-III-1 | $(CH_2)_2SO_3^{\ominus}$ | $CH_2CO_2^{\ominus}$ | H | $Na^{\oplus}$ | 2 |
| D-III-2 | $(CH_2)_2SO_3^{\ominus}$ | $CH_2CO_2^{\ominus}$ | H | $K^{\oplus}$ | 2 |
| D-III-3 | $(CH_2)_2SO_3^{\ominus}$ | $CH_2CO_2^{\ominus}$ | H | $(C_2H_5)_3N^{\oplus}H$ | 2 |
| D-III-4 | $(CH_2)_4SO_3^{\ominus}$ | $CH_2CO_2^{\ominus}$ | H | $(C_2H_5)_3N^{\oplus}H$ | 2 |
| D-III-5 | $(CH_2)_3SO_3^{\ominus}$ | $CH_2CO_2^{\ominus}$ | H | $(C_2H_5)_3N^{\oplus}H$ | 2 |
| D-III-6 | $(CH_2)_2CH(CH_3)SO_3^{\ominus}$ | $CH_2CO_2^{\ominus}$ | H | $(C_2H_5)_3N^{\oplus}H$ $(C_2H_5)_3N^{\oplus}H$ | 2 |
| D-III-7 | $(CH_2)_4SO_3^{\ominus}$ | $CH_2CO_2^{\ominus}$ | 5-$OCH_3$ | $(C_2H_5)_3N^{\oplus}H$ | 2 |
| D-III-8 | $(CH_2)_4SO_3^{\ominus}$ | $CH_2CO_2^{\ominus}$ | 5-F | $Na^{\oplus}$ | 2 |
| D-III-9 | $(CH_2)_2SO_3^{\ominus}$ | $CH_2CO_2^{\ominus}$ | 5-$CH_3$ | $Na^{\oplus}$ | 2 |
| D-III-10 | $(CH_2)_2SO_3^{\ominus}$ | $CH_2CO_2^{\ominus}$ | 5,6-$(CH_3)_2$ | $Na^{\oplus}$ | 2 |
| D-III-11 | $(CH_2)_4SO_3^{\ominus}$ | $(CH_2)_2SO_3^{\ominus}$ | H | $K^{\oplus}$ | 2 |
| D-III-12 | $CH_2CO_2^{\ominus}$ | $CH_2CO_2^{\ominus}$ | H | $Na^{\oplus}$ | 2 |
| D-III-13 | $CH_2CO_2^{\ominus}$ | $(CH_2)_2SO_3^{\ominus}$ | H | $Na^{\oplus}$ | 2 |
| D-III-14 | $(CH_2)_3CO_3^{\ominus}$ | $(CH_2)_2SO_3^{\ominus}$ | H | $Na^{\oplus}$ | 2 |
| D-III-15 | $(CH_2)_4SO_3^{\ominus}$ | $(CH_2)_2OH^{\ominus}$ | H | $K^{\oplus}$ | 1 |
| D-1II-16 | $(CH_2)_4SO_3^{\ominus}$ | $(CH_2C)_2CO_2^{\ominus}$ | H | $K^{\oplus}$ | 2 |
| D-III-17 | $(CH_2)_4SO_3^{\ominus}$ | $(CH_2)_3CO_2^{\ominus}$ | H | $K^{\oplus}$ | 2 |
| D-III-18 | $(CH_2)_4SO_3^{\ominus}$ | $(CH_2)_5CO_2^{\ominus}$ | H | $K^{\oplus}$ | 2 |
| D-III-19 | $(CH_2)_4SO_3^{\ominus}$ | $(CH_2)_2NHC(=O)CH_3$ | H | $K^{\oplus}$ | 1 |

D-III-20

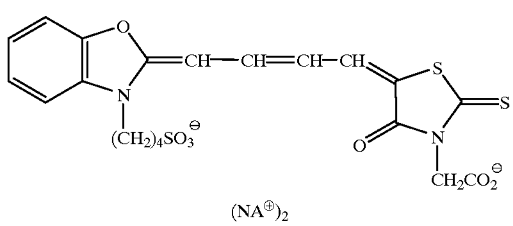

D-III-21

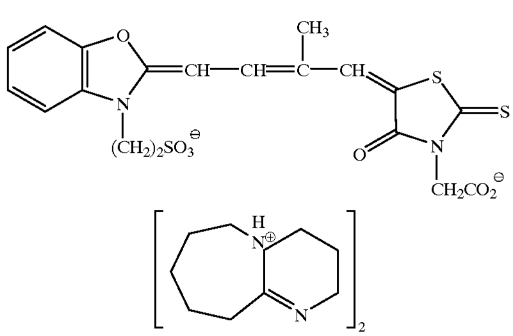

-continued
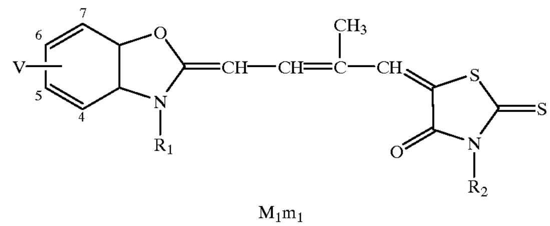
| Compound No. | $R_1$ | $R_2$ | V | $M_1$ | $m_1$ |
|---|---|---|---|---|---|
D-III-22
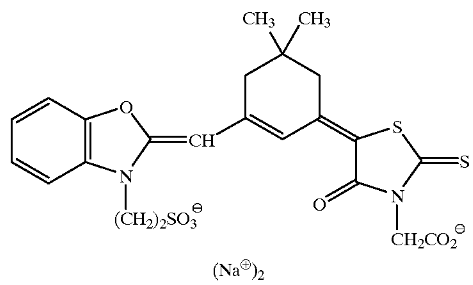
D-III-23
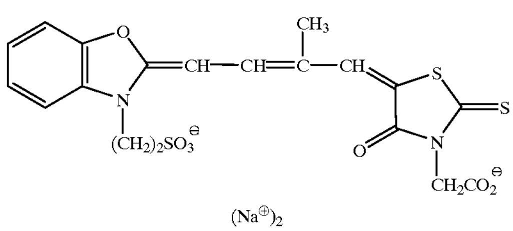
D-III-24
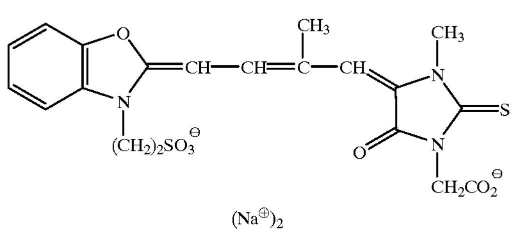
D-III-25
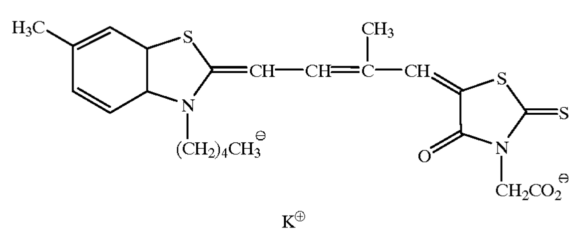
D-III-26
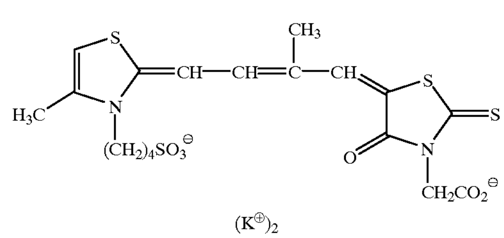

-continued
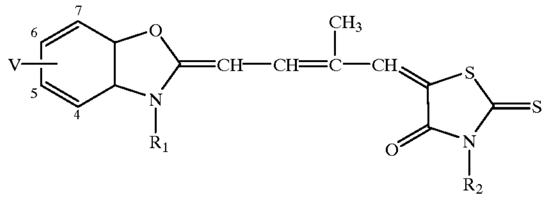
M1m1
| Compound No. | $R_1$ | $R_2$ | V | $M_1$ | $m_1$ |
|---|---|---|---|---|---|
D-III-27
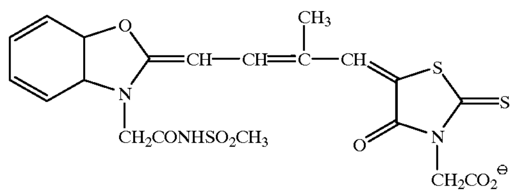
$Na^{\oplus}$
D-III-28
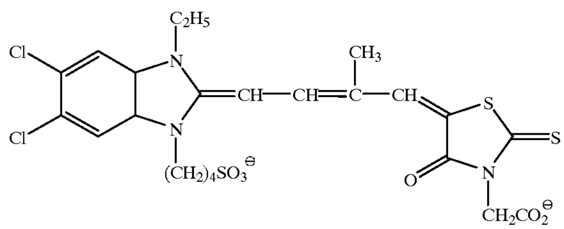
$(Na^{\oplus})_2$
D-II-29
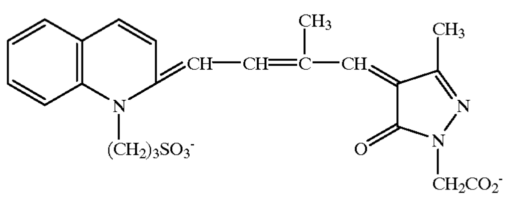
$(K^+)_2$
D-III-30
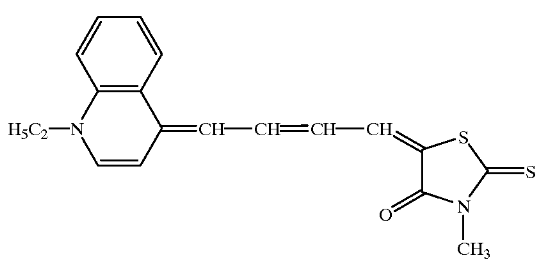
D-III-31
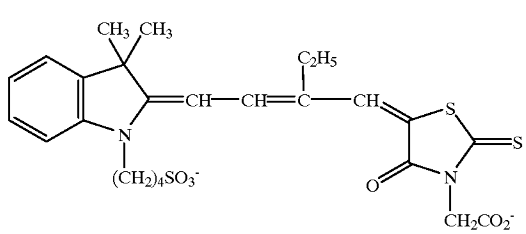
$(K^+)_2$ -continued

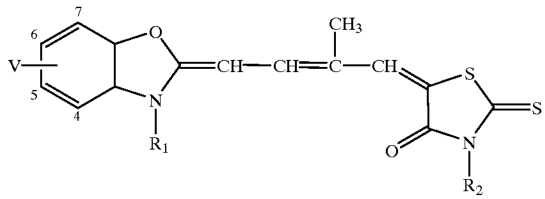

$M_1m_1$

| Compound No. | $R_1$ | $R_2$ | V | $M_1$ | $m_1$ |
|---|---|---|---|---|---|
| D-III-32 | 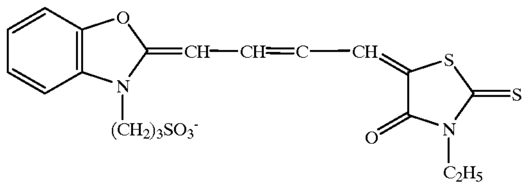 | | | $H\overset{+}{N}(C_2H_5)_3$ | |
| D-III-33 | 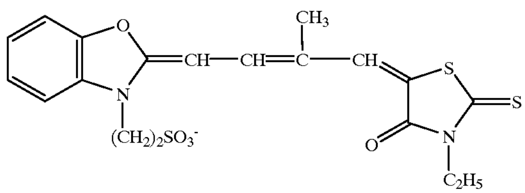 | | | $Na^+$ | |
| D-III-34 | 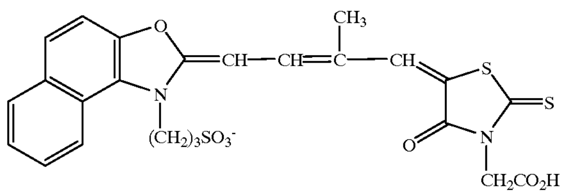 | | | $K^+$ | |
| D-III-35 | 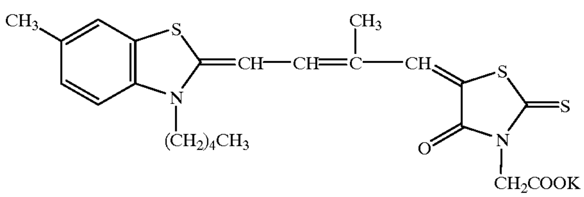 | | | | |

The compound of formula (D-III) is preferably added to the silver halide emulsion layer and especially preferably used as a sensitizing dye for silver halide. The amount of the compound of formula (D-III) added is preferably $1\times10^{-6}$ to $1\times10^{-2}$ mol, more preferably $1\times10^{-5}$ to $1\times10^{-3}$ mol per mol of silver halide.

general formula (D-IV)

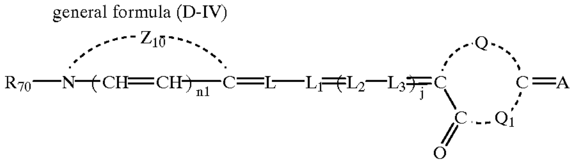

-continued

A respresents

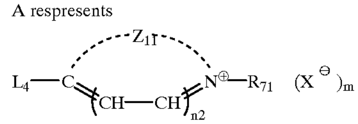

In formula (D-IV), each of $Z_{10}$ and $Z_{11}$ completes a nitrogenous heterocyclic nucleus which is exemplified below.

Included are thiazole nuclei, for example, thiazole, 4-methylthiazole, 4-phenylthiazole, 4,5-dimethylthiazole, and 4,5-diphenylthiazole;

benzothiazole nuclei, for example, benzothiazole, 5-chlorobenzothiazole, 6-chlorobenzothiazole, 5-methylbenzothiazole, 6-methylbenzothiazole, 5-bromobenzothiazole, 6-bromobenzothiazole, 5-iodobenzothiazole, 6-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-hydroxybenzothiazole, 5-carboxybenzothiazole, 5-fluorobenzothiazole, 5-dimethylaminobenzothiazole, 5-acetylaminobenzothiazole, 5-trifluoromethylbenzothiazole, 5,6-dimethylbenzothiazole, 5-hydroxy-6-methylbenzothiazole, 5-ethoxy-6-methylbenzothiazole, and tetrahydrobenzothiazole;

naphthothiazole nuclei, for example, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, and 5-methoxynaphtho[2,3-d]thiazole nuclei;

selenazole nuclei, for example, 4-methylselenazole and 4-phenylselenazole;

benzoselenazole nuclei, for example, benzoselenazole, 5-chlorobenzoselenazole, 5-phenylbenzoselenazole, 5-methoxybenzoselenazole, 5-methylbenzoselenazole, and 5-hydroxybenzoselenazole;

naphthoselenazole nuclei, for example, naphtho[1,2-d]selenazole and naphtho[2,1-d]selenazole nuclei;

oxazole nuclei, for example, oxazole, 4-methyloxazole, 5-methyloxazole, and 4,5-dimethyloxazole;

benzoxazole nuclei, for example, benzoxazole, 5-fluorobenzoxazole, 5-chlorobenzoxazole, 5-bromobenzoxazole, 5-trifluoromethylbenzoxazole, 5-methylbenzoxazole, 5-methyl-6-phenylbenzoxazole, 5,6-dimethylbenzoxazole, 5-methoxybenzoxazole, 5,6-dimethoxybenzoxazole, 5-phenylbenzoxazole, 5-carboxybenzoxazole, 5-methoxycarbonylbenzoxazole, 5-acetylbenzoxazole, and 5-hydroxybenzoxazole;

naphthoxazole nuclei, for example, naphth[2,1-d]oxazole, naphtha[1,2-d]oxazole, and naphth[2,3-d]oxazole; and 2-quinoline, imidazole, benzimidazole, 3,3'-dialkylindolenine, 2-pyridine, and thiazoline nuclei. More preferably, at least one of $Z_{10}$ and $Z_{11}$ is a thiazole, thiazoline, oxazole or benoxazole nucleus.

Each of $R_{70}$ and $R_{71}$ is an alkyl, substituted alkyl or aryl group. The alkyl groups are preferably alkyl groups having up to 5 carbon atoms (e.g., methyl, ethyl, n-propyl and n-butyl). The substituted alkyl groups are preferably substituted alkyl groups whose alkyl moiety has up to 5 carbon atoms, for example, hydroxyalkyl groups such as 2-hydroxyethyl, 3-hydroxypropyl and 4-hydroxybutyl, carboxyalkyl groups such as carboxymethyl, 2-carboxyethyl, 3-carboxypropyl, 4-carboxybutyl, and 2-(2-carboxyethoxy)ethyl, sulfoalkyl groups such as 2-sulfoethyl, 3-sulfopropyl, 3-sulfobutyl, 4-sulfobutyl, 2-hydroxy-3-sulfopropyl, 2-(3-sulfopropoxy)ethyl, 2-acetoxy-3-sulfopropyl, 3-methoxy-2-(3-sulfopropoxy)propyl, 2-[(3-sulfopropoxy)ethoxy]ethyl, and 2-hydroxy-3-(3'-sulfopropoxy)propyl, aralkyl groups, preferably aralkyl groups whose alkyl moiety has 1 to 5 carbon atoms and aryl moiety is phenyl, such as benzyl, phenethyl, phenylpropyl, phenylbutyl, p-tolylpropyl, p-methoxyphenethyl, p-chlorophenethyl, p-carboxybenzyl, p-sulfophenethyl, and p-sulfobenzyl, aryloxyalkyl groups, preferably aryloxyalkyl groups whose alkyl moiety has 1 to 5 carbon atoms and aryl moiety is phenyl, such as phenoxyethyl, phenoxypropyl, phenoxybutyl, p-methylphenoxyethyl, and p-methoxyphenoxypropyl, and vinylmethyl group. A typical aryl group is phenyl.

Each of L, $L_1$, $L_2$, $L_3$, and $L_4$ is a methine group or substituted methine =C(R')— group. R' is selected from alkyl groups (e.g., methyl and ethyl) and substituted alkyl groups, for example, alkoxyalkyl (e.g., 2-ethoxyethyl), carboxyalkyl (e.g., 2-carboxyethyl), alkoxycarbonylalkyl (e.g., 2-methoxycarbonylethyl), aralkyl (e.g., benzyl and phenethyl), and aryl (e.g., phenyl, p-methoxyphenyl, p-chlorophenyl and o-carboxyphenyl). Alternatively, L and $R_{70}$, and $L_1$ and $R_{71}$ may be concatenated through a methine chain to form a nitrogenous heterocycle.

Q and $Q_1$ form a thiazoline or imidazoline nucleus which may have a substituent attached to the nitrogen atom at the 3-position. Exemplary substituents include alkyl groups, preferably having 1 to 8 carbon atoms (e.g., methyl, ethyl and propyl), allyl, aralkyl groups, preferably aralkyl groups whose alkyl moiety has 1 to 5 carbon atoms (e.g., benzyl and p-carboxyphenylmethyl), aryl groups preferably having 6 to 9 carbon atoms in total (e.g., phenyl and p-carboxyphenyl), hydroxyalkyl groups, preferably hydroxyalkyl groups whose alkyl moiety has 1 to 5 carbon atoms (e.g., 2-hydroxyethyl), carboxyalkyl groups, preferably carboxyalkyl groups whose alkyl moiety has 1 to 5 carbon atoms (e.g., carboxymethyl), and alkoxycarbonylalkyl groups, preferably alkoxycarbonylalkyl groups whose alkoxy moiety has 1 to 3 carbon atoms and alkyl moiety has 1 to 5 carbon atoms (e.g., methoxycarbonylethyl).

X is an anion, for example, halide ions (iodide, bromide and chloride ions), perchlorate, thiocyanate, benzenesulfonate, p-toluenesulfonate, methylsulfate, and ethylsulfate ions.

Illustrative non-limiting examples of the sensitizing dye of formula (D-IV) are given below.

D-IV-1

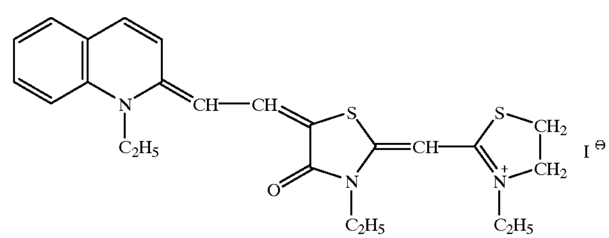

-continued
D-IV-2
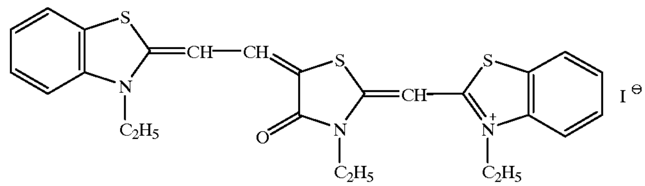
D-IV-3
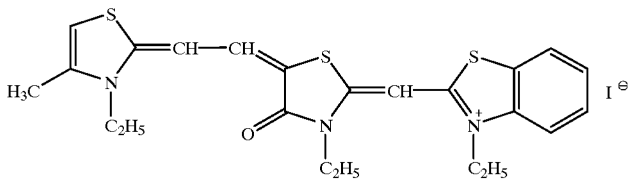
D-IV-4
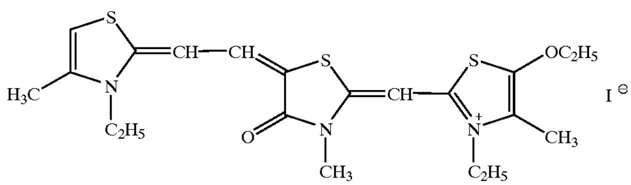
D-IV-5
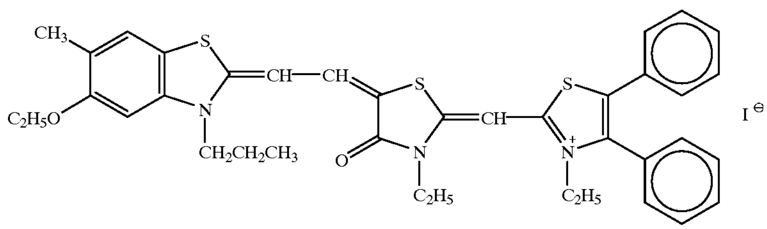
D-IV-6
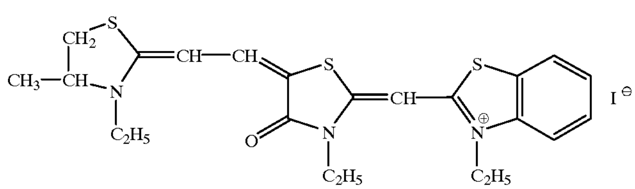
D-IV-7
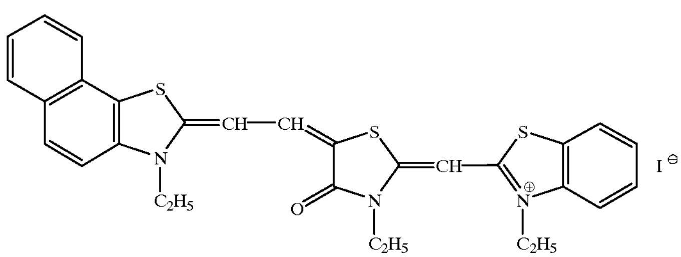
D-IV-8
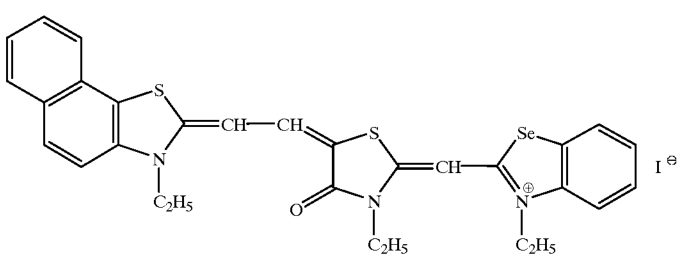

-continued
D-IV-9
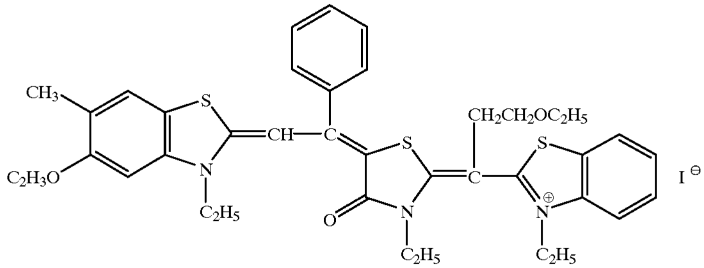
D-IV-10
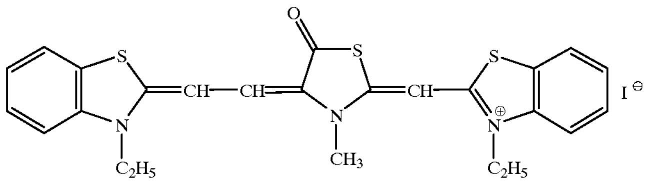
D-IV-11
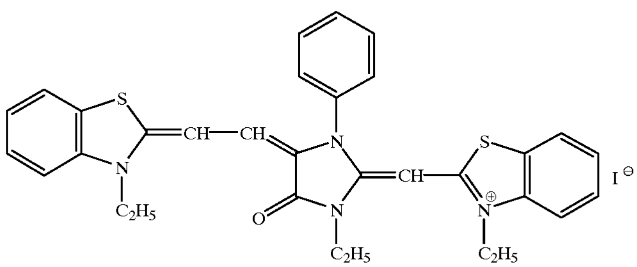
D-IV-12
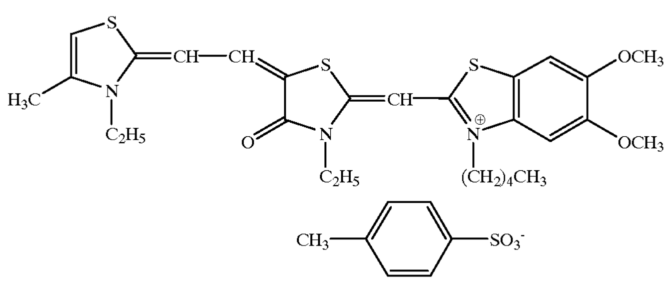
D-IV-13
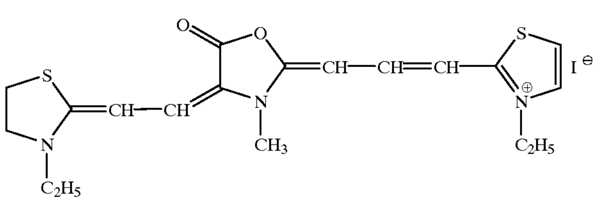
D-IV-14
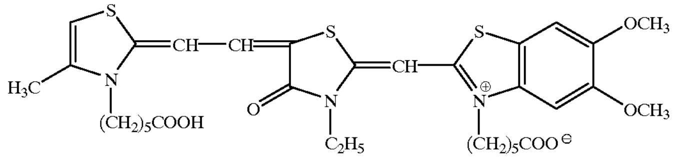

-continued

D-IV-15

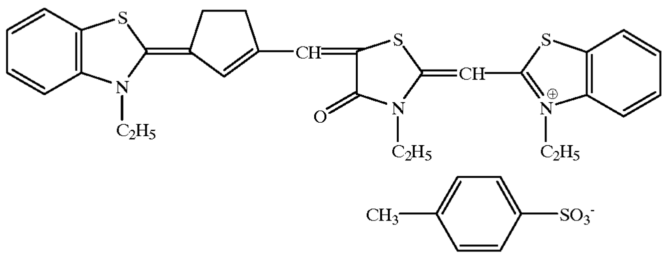

The amount of the sensitizing dye added varies with the shape, size and halogen composition of silver halide grains, the method and extent of chemical sensitization, and the type of antifoggant although the amount is generally $4\times10^{-6}$ to $8\times10^{-3}$ mol per mol of silver halide. Where silver halide grains have a size of 0.2 to 1.3 μm, the amount of the sensitizing dye added is preferably $2\times10^{-7}$ to $3.5\times10^{-6}$ mol, more preferably $6.5\times10^{-7}$ to $2.0\times10^{-6}$ mol per square meter of the surface area of silver halide grains.

general formula (D-V)

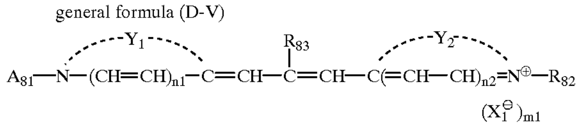

In formula (D-V), each of $R_{81}$ and $R_{82}$, which may be identical or different, is a substituted or unsubstituted alkyl group, preferably having 1 to 8 carbon atoms, for example, methyl, ethyl, propyl, butyl, pentyl, heptyl and octyl. When substituted, the alkyl group preferably has up to 6 carbon atoms, and examples of the substituent include carboxyl, sulfo, cyano, halogen atoms (fluorine, chlorine and bromine atoms), hydroxyl, alkoxycarbonyl (preferably having up to 8 carbon atoms, e.g., methoxycarbonyl, ethoxycarbonyl and benzyloxycarbonyl), alkoxy (preferably having up to 7 carbon atoms, e.g., methoxy, ethoxy, propoxy, butoxy, and benzyloxy), aryloxy (e.g., phenoxy and p-tolyloxy), acyloxy (preferably having up to 3 carbon atoms, e.g., acetyloxy and propionyloxy), acyl (preferably having up to 8 carbon atoms, e.g., acetyl, propionyl, benzoyl and mesyl), carbamoyl (e.g., carbamoyl, N,N-dimethylcarbamoyl, morpholinocarbamoyl, and piperidinocarbamoyl), sulfamoyl (e.g., sulfamoyl, N,N-dimethylsulfamoyl and morpholino-sulfamoyl), and aryl (e.g., phenyl, p-hydroxyphenyl, p-carboxyphenyl, p-sulfophenyl and α-naphthyl). The alkyl group may have two or more different substituents.

$R_{83}$ is a hydrogen atom, a lower alkyl (preferably having 1 to 4 carbon atoms, e.g., methyl, ethyl, propyl and butyl), lower alkoxy (preferably having 1 to 4 carbon atoms, e.g., methoxy, ethoxy, propoxy and butoxy), phenyl, benzyl or phenethyl group. Among these, lower alkyl and benzyl groups are advantageous.

Each of $Y_1$ and $Y_2$ is a group of non-metallic atoms necessary to complete a 5- or 6-membered nitrogenous heterocycle. Exemplary nitrogenous heterocycles are thiazole, selenazole, oxazole, quinoline, 3,3-dialkylindolenine, imidazole, and pyridine nuclei. Examples of the thiazole nucleus include benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-carboxybenzothiazole, 5-ethoxycarbonylbenzothiazole, 5-phenethylbenzothiazole, 5-fluorobenzothiazole, 5-trifluoromethylbenzothiazole, 5,6-dimethylbenzothiazole, 5-hydroxy-6-methylbenzothiazole, tetrahydrobenzothiazole, 4-phenylbenzothiazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, and 5-methoxynaphtho[2,3-d]thiazole nuclei; examples of the selenazole nucleus include benzoselenazole, 5-chlorobenzoselenazole, 5-methoxybenzoselenazole, 5-methylbenzoselenazole, 5-hydroxybenzoselenazole, naphtho[2,1-d]selenazole, and naphtho[1,2-d]selenazole nuclei; examples of the oxazole nucleus include benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluoromethylbenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole, 5-ethoxybenzoxazole, naphtho[2,1-d]oxazole, naphtho[1,2-d]oxazole, and naphtho[2,3-d]oxazole nuclei; examples of the quinoline nucleus include 2-quinoline, 3-methyl-2-quinoline, 5-ethyl-2-quinoline, 6-methyl-2-quinoline, 8-fluoro-2-quinoline, 6-methoxy-2-quinoline, 6-hydroxy-2-quinoline, 8-chloro-2-quinoline, and 8-fluoro-4-quinoline nuclei; examples of the 3,3-dialkylindolenine nucleus include 3,3-dimethylindolenine, 3,3-diethylindolenine, 3,3-dimethyl-5-cyanoindolenine, 3,3-dimethyl-5-methoxyindolenine, 3,3-dimethyl-5-methylindolenine, and 3,3-dimethyl-5-chloroindolenine nuclei; examples of the imidazole nucleus include 1-methylbenzimidazole, 1-ethylbenzimidazole, 1-methyl-5-chlorobenzimidazole, 1-ethyl-5-chlorobenzimidazole, 1-methyl-5,6-dichlorobenzimidazole, 1-ethyl-5,6-dichlorobenzimidazole, 1-ethyl-5-methoxybenzimidazole, 1-methyl-5-cyanobenzimidazole, 1-ethyl-5-cyanobenzimidazole, 1-methyl-5-fluorobenzimidazole, 1-ethyl-5-fluorobenzimidazole, 1-phenyl-5,6-dichlorobenzimidazole, 1-allyl-5,6-dichlorobenzimidazole, 1-allyl-5-chlorobenzimidazole, 1-phenylbenzimidazole, 1-phenyl-5-chlorobenzimidazole, 1-methyl-5-trifluoromethylbenzimidazole, 1-ethyl-5-trifluoromethylbenzimidazole, and 1-ethylnaphtho[1,2-d]imidazole nuclei; and examples of the pyridine nucleus include pyridine, 5-methyl-2-pyridine, and 3-methyl-4-pyridine nuclei. Preferred among these are thiazole and oxazole nuclei. More preferred are benzothiazole, naphthothiazole, naphthoxazole and benzoxazole nuclei.

Letters $m_1$, $n_1$ and $n_2$ are independently equal to 0 or 1. When the dye forms an intramolecular salt, $m_1$ is 0.

$X_1$ is an acid anion.

Illustrative non-limiting examples of the sensitizing dye of formula (D-V) are given below.

-continued
D-V-1
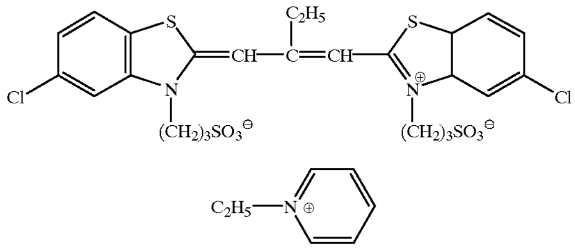
D-V-2
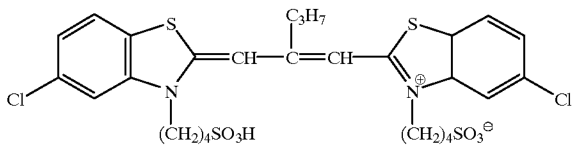
D-V-3
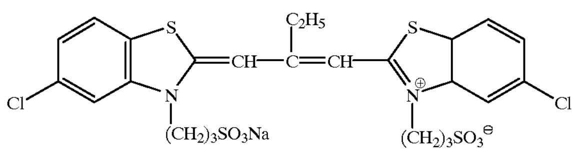
D-V-4
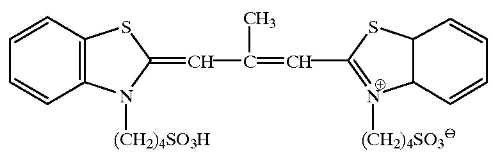
D-V-5
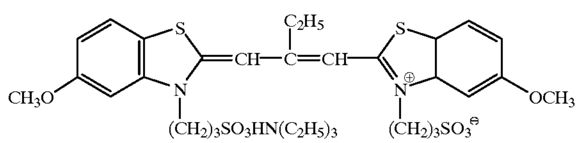
D-V-6
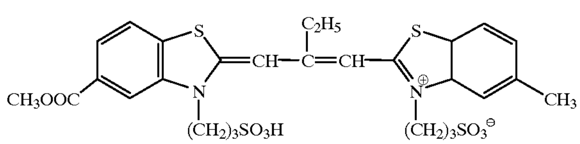
D-V-7
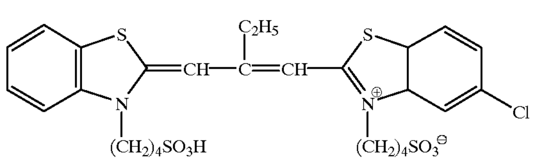
D-V-8
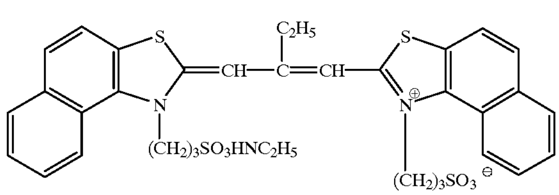
D-V-9
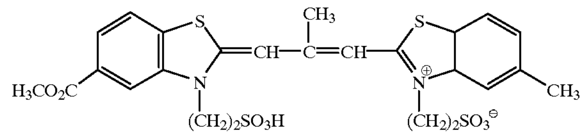
D-V-10
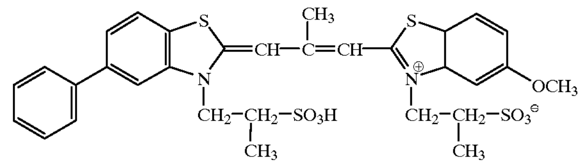
D-V-11
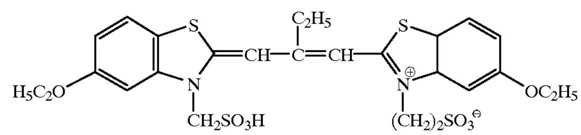
D-V-12
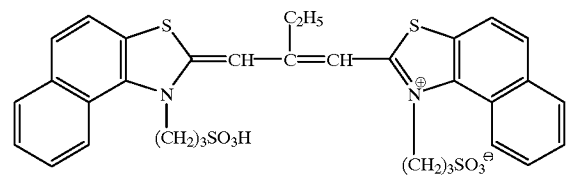
D-V-13
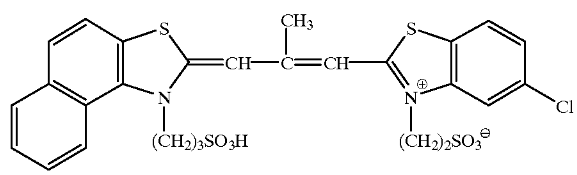
D-V-14
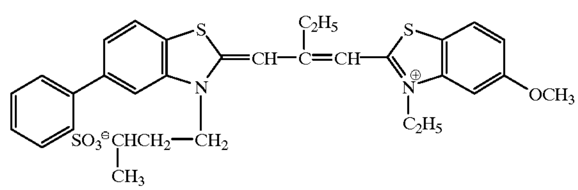
D-V-15
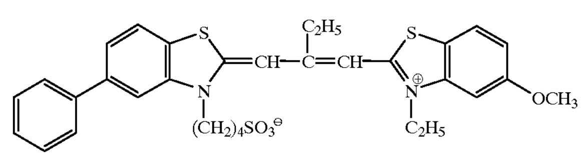
D-V-16
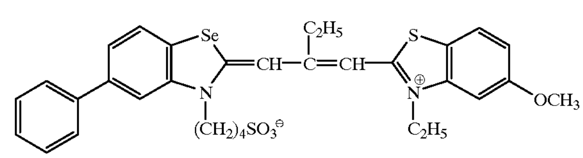

-continued
D-V-17
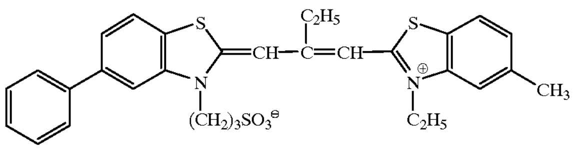
D-V-18
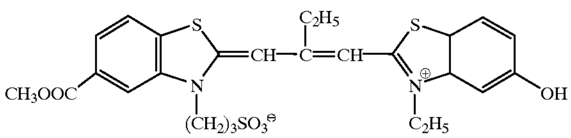
D-V-19
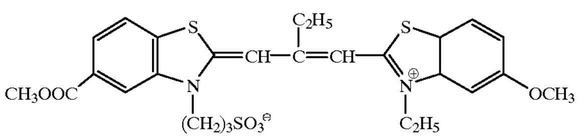
D-V-20
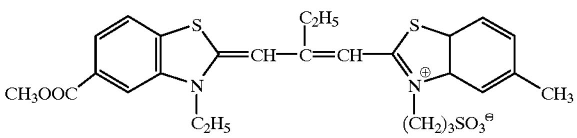
D-V-21
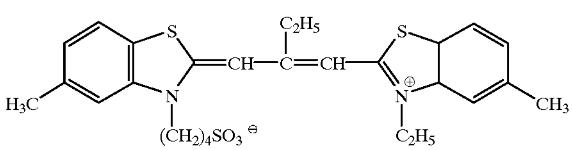
D-V-22
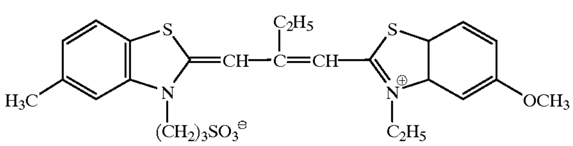
D-V-23
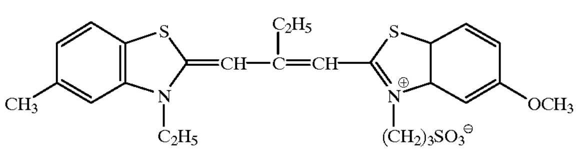
D-V-24
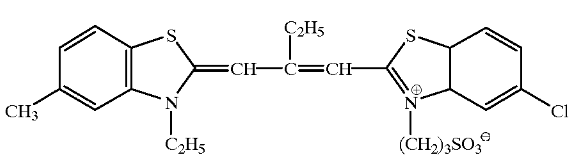
D-V-25
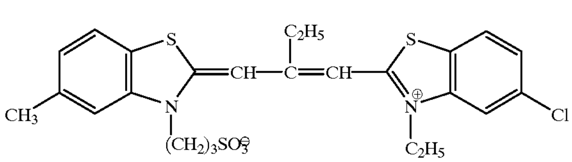
-continued
D-V-26
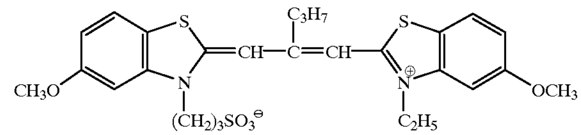
D-V-27
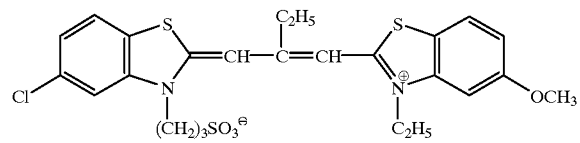
D-V-28
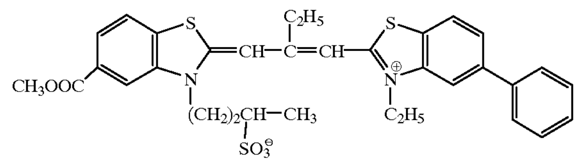
D-V-29
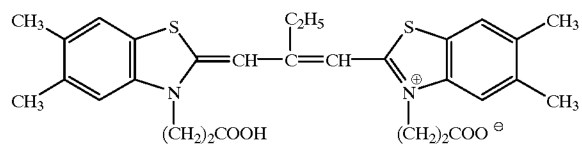
D-V-30
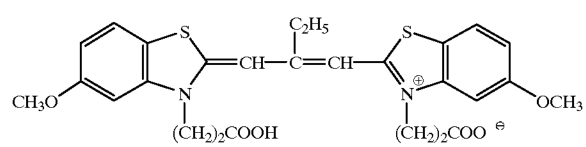
D-V-31
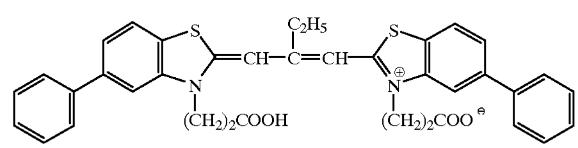
D-V-32
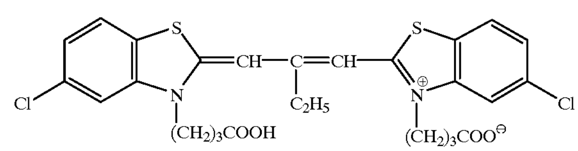
D-V-33
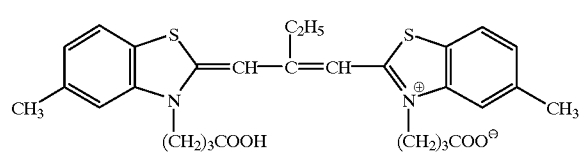
D-V-34
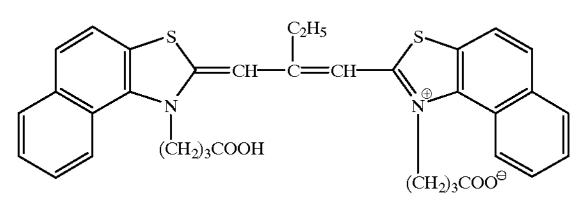

-continued

D-V-35

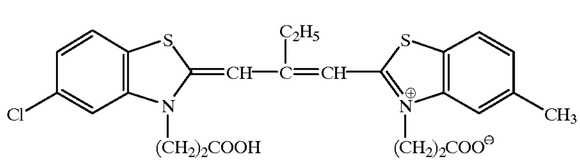

D-V-36

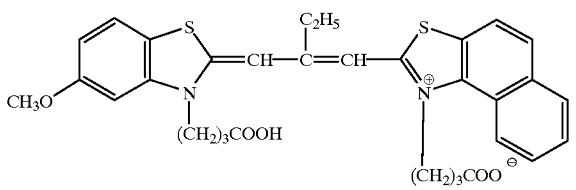

D-V-37

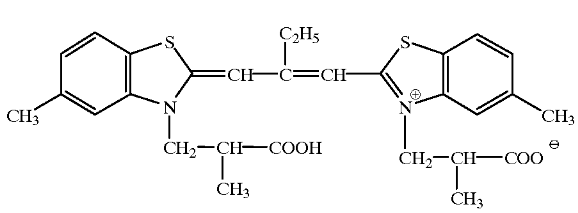

D-V-38

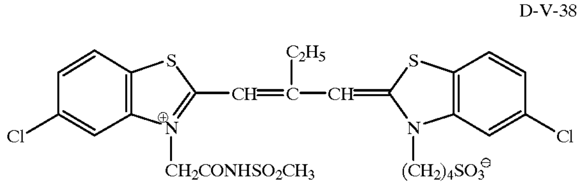

D-V-39

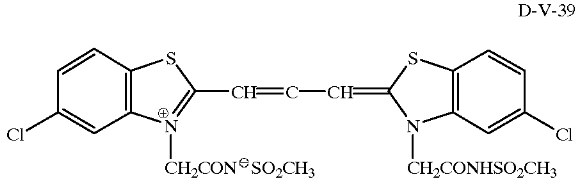

D-V-40

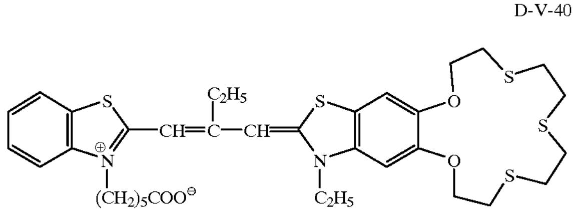

D-V-41

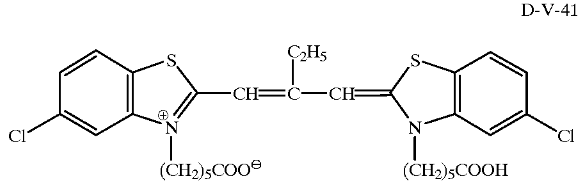

The amount of the sensitizing dye added varies with the shape, size and halogen composition of silver halide grains, the method and extent of chemical sensitization, and the type of antifoggant although the amount is generally $4\times10^{-6}$ to $8\times10^{-3}$ mol per mol of silver halide. Where silver halide grains have a size of 0.2 to 1.3 μm, the amount of the sensitizing dye added is preferably $2\times10^{-7}$ to $3.5\times10^{-6}$ mol, more preferably $6.5\times10^{-7}$ to $2.0\times10^{-6}$ mol per square meter of the surface area of silver halide grains.

general formula (D-VI)

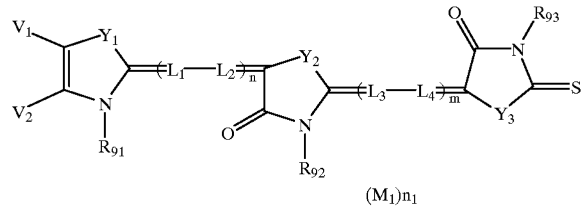

In formula (D-VI), $Y_1$, $Y_2$ and $Y_3$ are independently selected from a group —N—($R_{90}$)—, oxygen atom, sulfur atom and selenium atom.

$R_{90}$, $R_{91}$, $R_{92}$ and $R_{93}$ are aliphatic groups, for example, normal or branched alkyl groups having 1 to 10 carbon atoms, such as methyl, ethyl, n-propyl, n-pentyl and isobutyl, alkenyl groups having 3 to 10 carbon atoms, such as 3-butenyl and 2-propenyl, or aralkyl groups having 3 to 10 carbon atoms, such as benzyl and phenethyl. Also $R_{90}$, $R_{91}$, $R_{92}$ and $R_{93}$ are aryl groups such as phenyl, and heterocyclic groups such as 2- and 4-pyridyl, 2-furyl, 2-thienyl, sulforanyl, tetrahydrofuryl, and piperidinyl groups.

The groups represented by $R_{90}$, $R_{91}$, $R_{92}$ and $R_{93}$ may have substituents, for example, halogen atoms (e.g., fluorine, chlorine and bromine atoms), alkoxy (e.g., methoxy and ethoxy), aryloxy (e.g., phenoxy and p-tolyloxy), cyano, carbamoyl (e.g., carbamoyl, N-methylcarbamoyl, and N,N-tetramethylenecarbamoyl), sulfamoyl (e.g., sulfamoyl and N,N-3-oxapentamethyleneaminosulfonyl), methanesulfonyl, alkoxycarbonyl (e.g., ethoxycarbonyl and butoxycarbonyl), aryl (e.g., phenyl and carboxyphenyl), acyl (e.g., acetyl and benzoyl), sulfo, carboxy, phosphono, sulfate, sulfino, sulfonamide, and sulfamoyl groups.

$V_1$ and $V_2$ are alkyl groups, for example, normal or branched alkyl groups such as methyl, ethyl, isopropyl, tert-butyl, isobutyl, tert-pentyl and hexyl. Also $V_1$ and $V_2$ are alkoxy groups such as methoxy, ethoxy and propoxy.

$V_1$ and $V_2$ also represent aryl groups which may have a substituent at any position, for example, phenyl, p-tolyl, p-hydroxyphenyl and p-methoxyphenyl. Alternatively, $V_1$ and $V_2$, taken together, may form a fused ring with the azole ring, for example, benzoxazole, 4,5,6,7-tetrahydrobenzoxazole, naphtho[1,2-d]oxazole, naphtho[2,3-d]oxazole, benzothiazole, 4,5,6,7-tetrahydrobenzothiazole, naphtho[1,2-d]thiazole, naphtho[2,3-d]thiazole, benzoselenazole, and naphtho[1,2-d] selenazole.

$V_1$ and $V_2$ also represent alkoxy groups, for example, unsubstituted alkoxy groups such as methoxy, ethoxy and butoxy and substituted alkoxy groups such as 2-methoxyethoxy and benzyloxy.

The above-mentioned groups represented by $V_1$ and $V_2$ and the fused ring formed by $V_1$ and $V_2$ may have a substituent at any position. Examples of the substituent include halogen atoms (fluorine, chlorine, bromine and iodine atoms), trifluoromethyl, alkoxy (e.g., unsubstituted alkoxy such as methoxy, ethoxy, and butoxy, and substituted alkoxy such as 2-methoxyethoxy and benzyloxy), alkylthio (e.g., substituted or unsubstituted ones such as methylthio and ethoxyethylthio), hydroxy, cyano, aryloxy (e.g., substituted or unsubstituted ones such as phenoxy and tolyloxy), aryl (e.g., substituted or unsubstituted ones such as phenyl and p-chlorophenyl), styryl, heterocyclic (e.g., furyl and thienyl), carbamoyl (e.g., carbamoyl and N-ethylcarbamoyl), sulfamoyl (e.g., sulfamoyl and N,N- dimethylsulfamoyl), acylamino (e.g., acetylamino, propionylamino and benzoylamino), acyl (e.g., acetyl and benzoyl), alkoxycarbonyl (e.g., ethoxycarbonyl), sulfonamide (e.g., methanesulfonylamide and benzenesulfonamide), sulfonyl (e.g., methanesulfonyl and p-toluenesulfonyl), and carboxy.

$L_1$, $L_2$, $L_3$, and $L_4$ is a group which substitutes on the methine carbon and may have a substituent, for example, lower alkyl groups (e.g., methyl and ethyl), phenyl (e.g., phenyl and carboxyphenyl), and alkoxy (e.g., methoxy and ethoxy).

Letter $n_1$ is 1 or 2, and $m_1$ is 0 or 1. $M_1$ is a cation or acid anion. Exemplary cations are proton, organic ammonium ions (e.g., triethylammonium and triethanolammonium), inorganic cations (e.g., lithium, sodium and calcium cations), and exemplary acid anions include halide ions (e.g., chloride, bromide and iodide ions), p-toluenesulfonate ion, perchlorate ion and tetrafluoroborate ion. Where the dye forms an intramolecular salt so that the electric charge is neutralized, $n_1$ is 0.

Illustrative non-limiting examples of the sensitizing dye of formula (D-VI) are given below.

D-VI-1

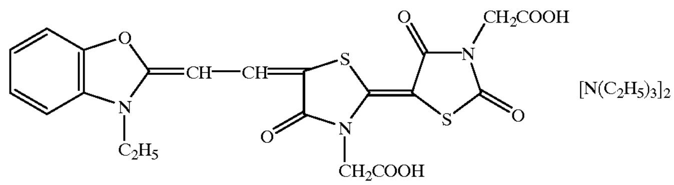

D-VI-2

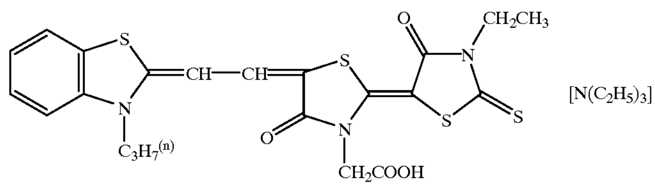

D-VI-3

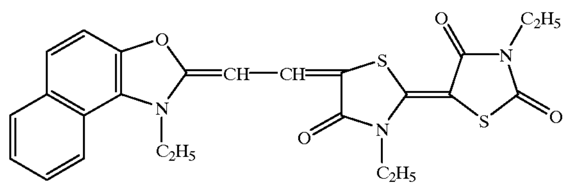

D-VI-4

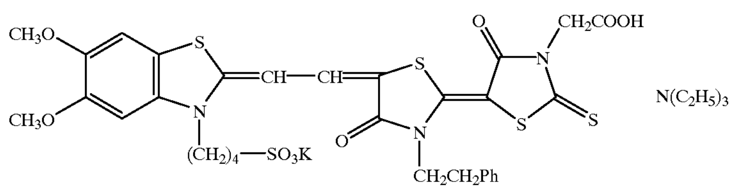

D-VI-5

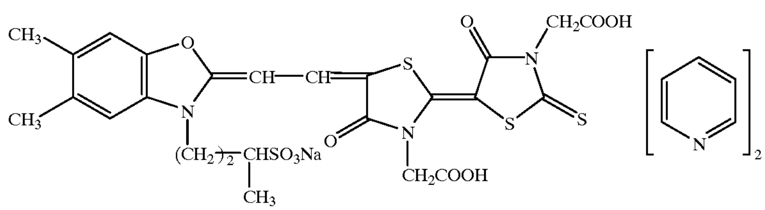

D-VI-6

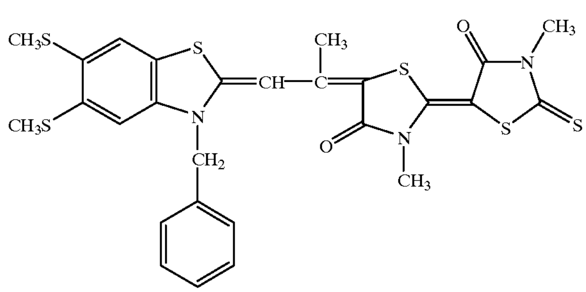

-continued

D-VI-7

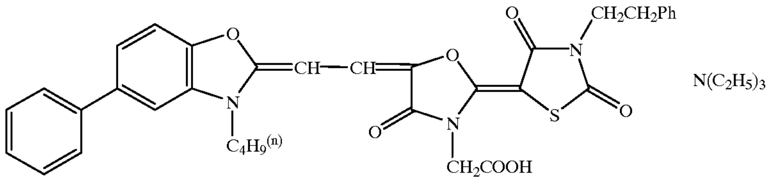

D-IV-8

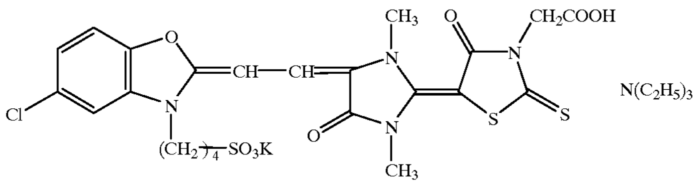

D-IV-9

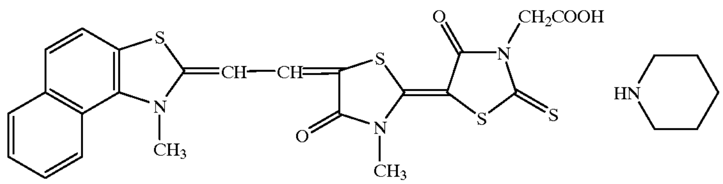

D-IV-10

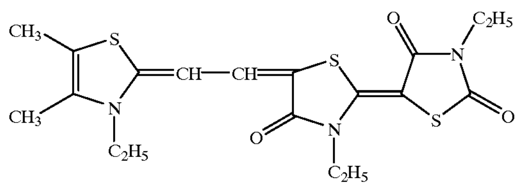

The amount of the sensitizing dye added varies with the shape, size and halogen composition of silver halide grains, the method and extent of chemical sensitization, and the type of antifoggant although the amount is generally $4\times10^{-6}$ to $8\times10^{-3}$ mol per mol of silver halide. Where silver halide grains have a size of 0.2 to 1.3 $\mu$m, the amount of the sensitizing dye added is preferably $2\times10^{-7}$ to $3.5\times10^{-6}$ mol, more preferably $6.5\times10^{-7}$ to $2.0\times10^{-6}$ mol per square meter of the surface area of silver halide grains.

The compounds of the general formulae (D-I) to (D-VI) can be synthesized by the methods described in F. M. Hamer, "Heterocyclic Compounds—Cyanine Dyes and Related Compounds," John Wiley & Sons, New York and London, 1964, D. M. Sturmer, "Heterocyclic Compounds—Special topics in heterocyclic chemistry," Chapter 18, §14, pp. 482–515, John Wiley & Sons, New York and London, 1977, Rodd's Chemistry of Carbon Compounds, 2nd Ed., Vol. IV, part B, 1977, Chapter 15, pp. 369–422, and 2nd Ed., Vol. IV, part B, 1985, Chapter 15, pp. 267–296, Elsevier Science Publishing Company Inc., New York.

The compounds of the general formulae (D-I) to (D-VI) may be used alone or in a combination of two or more. A combination of sensitizing dyes is often used for the purpose of supersensitization. In addition to the sensitizing dye, the emulsion may contain a dye which itself has no spectral sensitization function or a compound which does not substantially absorb visible light, but is capable of supersensitization.

Useful sensitizing dyes, combinations of sensitizing dyes providing supersensitization, and compounds providing supersensitization are described in Research Disclosure, Vol. 176, 17643 (December 1978), item IV-J on page 23, JP-B 25500/1974 and 4933/1968, JP-A 19032/1984 and 192242/1984.

The sensitizing dye is added to a silver halide emulsion by dispersing the dye directly in the emulsion or by dissolving the dye in a suitable solvent or a mixture of solvents and adding the solutin to the emulsion. The solvents used herein include water, methanol, ethanol, propanol, acetone, methyl cellosolve, 2,2,3,3-tetrafluoro-propanol, 2,2,2-trifluoroethanol, 3-methoxy-1-propanol, 3-methoxy-1-butanol, 1-methoxy-2-propanol and N,N-dimethylformamide.

Also useful are a method of dissolving a dye in a volatile organic solvent, dispersing the solution in water or hydrophilic colloid and adding the dispersion to an emulsion as disclosed in U.S. Pat. No. 3,469,987, a method of dissolving a dye in an acid and adding the solution to an emulsion or forming an aqueous solution of a dye with the aid of an acid or base and adding it to an emulsion as disclosed in JP-B 23389/1969, 27555/1969 and 22091/1982, a method of forming an aqueous solution or colloidal dispersion of a dye with the aid of a surfactant and adding it to an emulsion as disclosed in U.S. Pat. Nos. 3,822,135 and 4,006,025, a method of directly dispersing a dye in hydrophilic colloid and adding the dispersion to an emulsion as disclosed in JP-A 102733/1978 and 105141/1983, and a method of dissolving a dye using a compound capable of red shift and adding the solution to an emulsion as disclosed in JP-A 74624/1976. It is also acceptable to apply ultrasonic waves to a solution.

The time when the sensitizing dye is added to the silver halide emulsion according to the invention is at any step of an emulsion preparing process which has been acknowledged effective. The sensitizing dye may be added to the emulsion at any stage or step before the emulsion is coated, for example, at a stage prior to the silver halide grain forming step and/or desalting step, during the desalting step and/or a stage from desalting to the start of chemical ripening as disclosed in U.S. Pat. Nos. 2,735,766, 3,628,960, 4,183,756, and 4,225,666, JP-A 184142/1983 and 196749/1985, and a stage immediately before or during chemical ripening and a stage from chemical ripening to emulsion coating as disclosed in JP-A 113920/1983. Also as disclosed in U.S. Pat. No. 4,225,666 and JP-A 7629/1983, an identical compound may be added alone or in combination with a compound of different structure in divided portions, for example, in divided portions during a grain forming step and during a chemical ripening step or after the completion of chemical ripening, or before or during chemical ripening and after the completion thereof. The type of compound or the combination of compounds to be added in divided portions may be changed.

In the photothermographic material of the invention, sensitizing dyes capable of spectral sensitization at 600 to 850 nm can be used in combination with the hydrazine derivatives of the general formula (Hb) and (Hc). As partially described above, it is advantageous to select a sensitizing dye from tri-nucleus cyanine dyes as described in JP-A 62425/1975, 18726/1979 and 102229/1984 and merocyanines as described in JP-A 103272/1994 for He—Ne laser light sources; and thiacarbocyanines as described in JP-B 42172/1973, 9609/1976, 39818/1980, JP-A 284343/1987 and 105135/1990 for LED light sources and red semiconductor laser light sources.

It is especially preferred to use a cyanine dye having at least one, typically 1 to 4 substituents having a thioether bond as described in Japanese Patent Application No. 344343/1995. The sulfur atom of the thioether bond may be attached directly to the heterocycles at opposite ends of the cyanine dye or present in a substituent attached to the heterocycles. Alternatively, the sulfur atom may be attached directly to the methine chain or present in a substituent attached to the methine chain. In a preferred embodiment, the thioether bond is present as an alkylthio or alkylthioalkyl group.

D-1

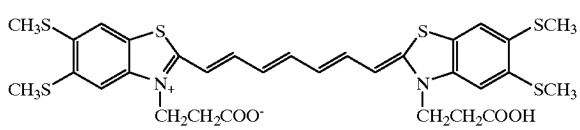

D-2

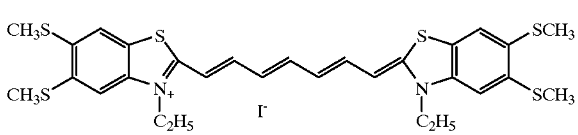

D-3

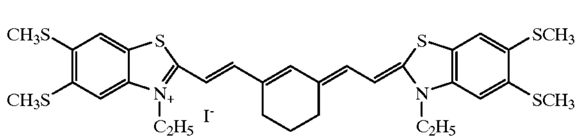

-continued

D-4

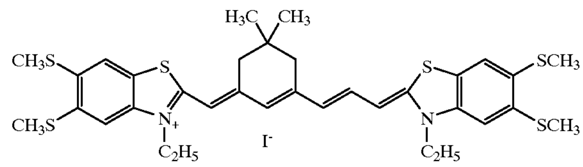

D-5

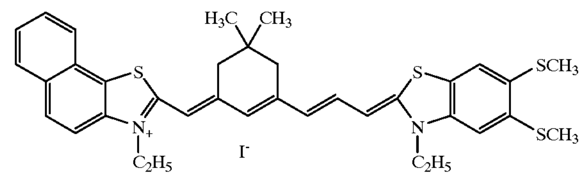

D-6

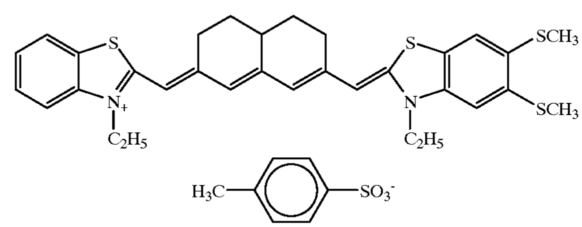

D-7

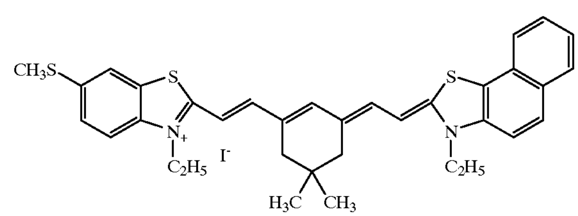

D-8

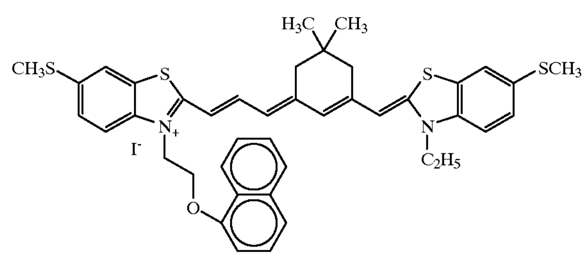

D-9

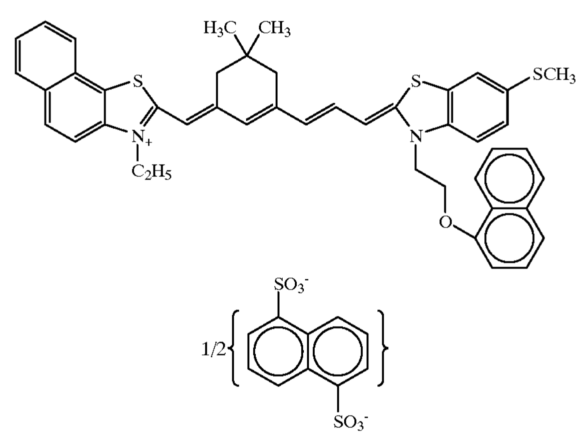

-continued
D-10
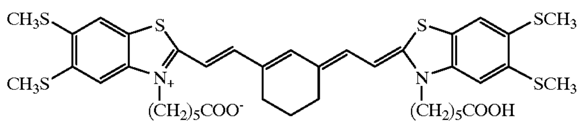
D-11
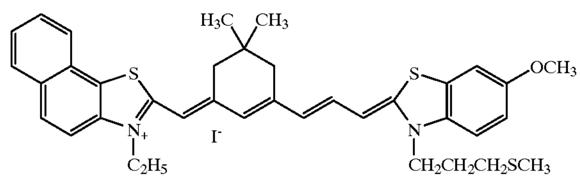
D-12
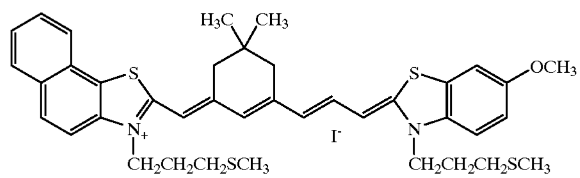
D-13
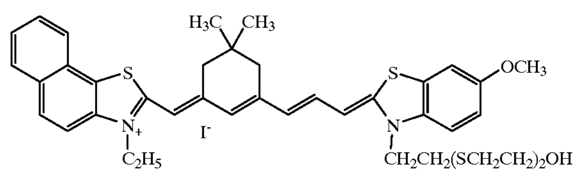
D-14
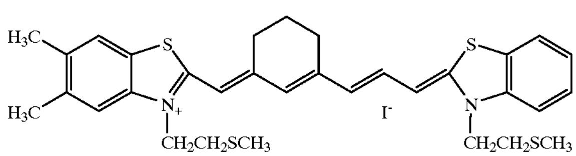
D-15
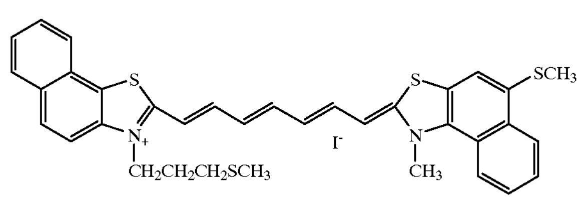
D-16
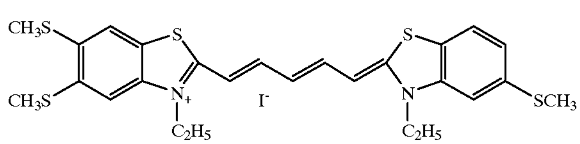
D-17
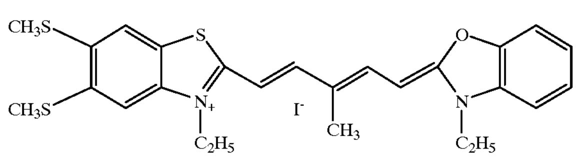
-continued
D-18
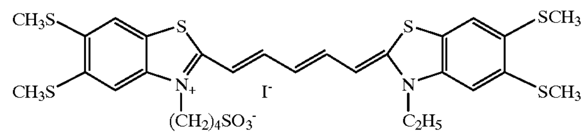
D-19
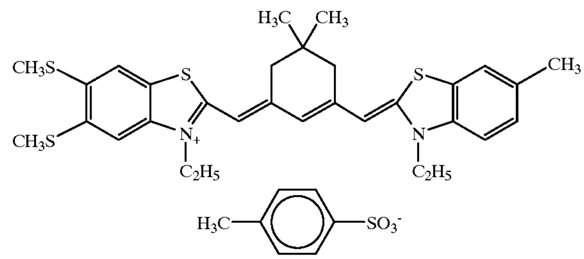
D-20
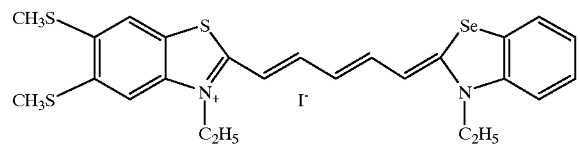
D-21
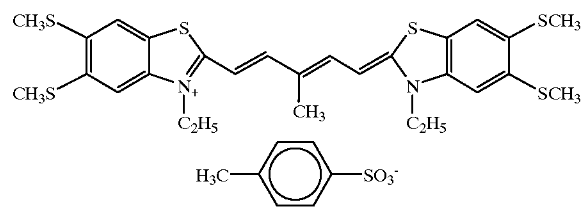
D-22
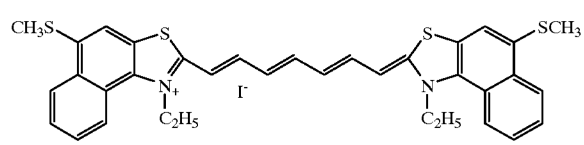
D-23
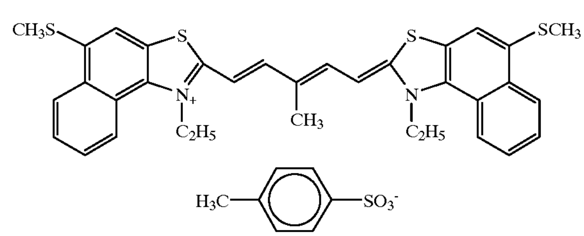
D-24
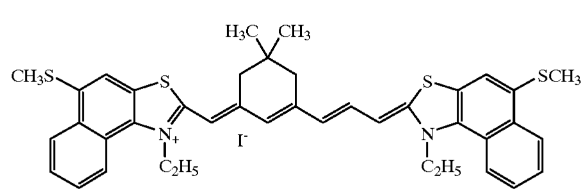

-continued
D-25
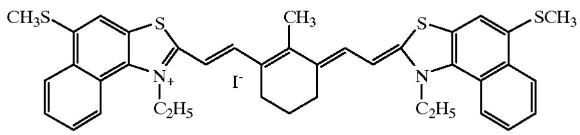
D-26
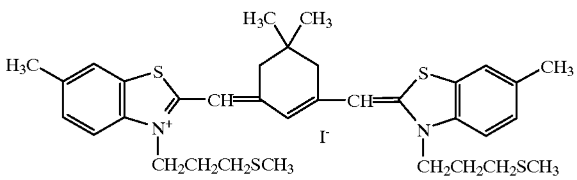
D-27
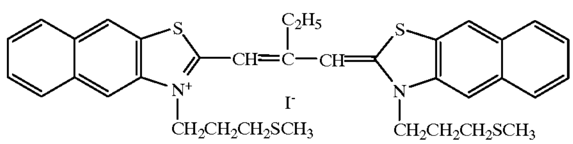
D-28
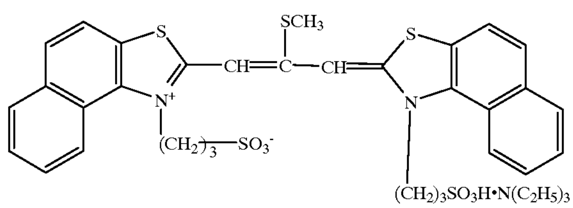
D-29
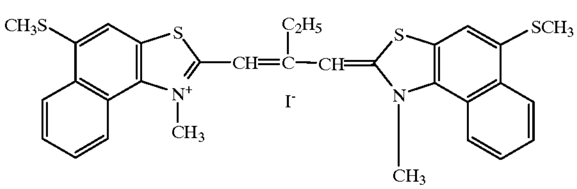
D-30
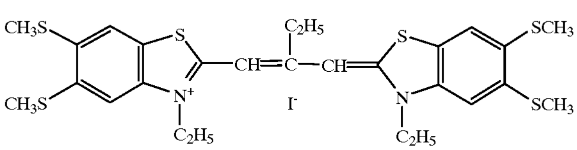
D-31
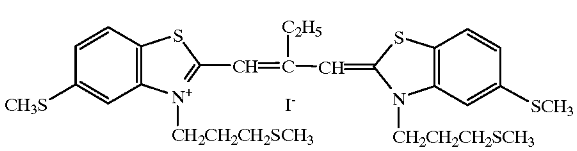
D-32
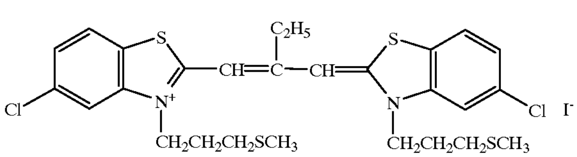
-continued
D-33
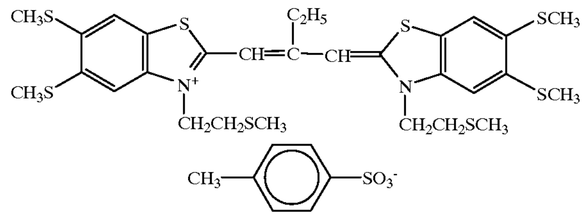
D-34
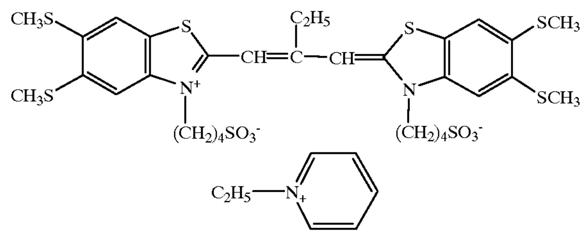
D-35
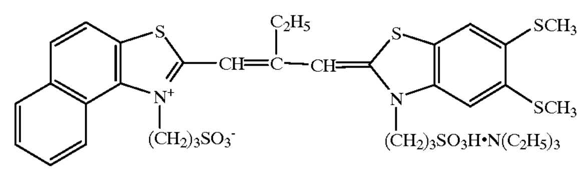
D-36
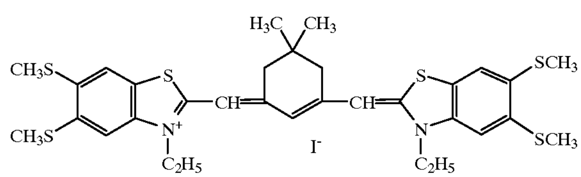
D-37
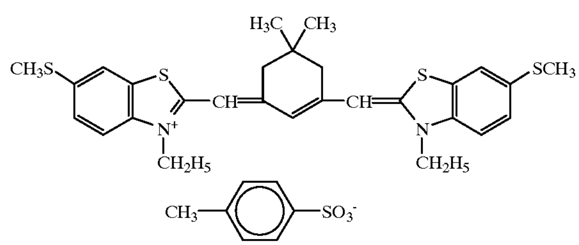
D-38
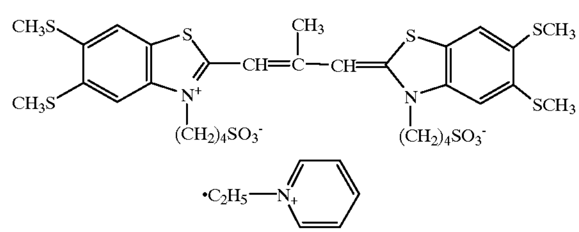
D-39
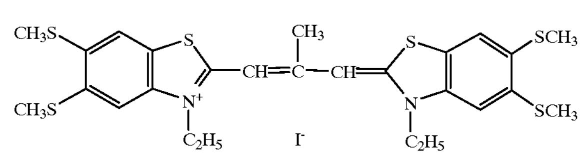

-continued

D-40

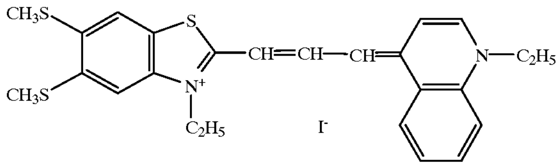

Decolorizable Dye

According to the feature of the invention, a thermally and/or optically decolorizable dye is preferably contained in a suitable layer of the photothermographic material. The decolorizable dye should preferably decolorize within the heat development step. When the decolorizable dye is of the optical decolorization type, a bleaching step by light irradiation is included. This step may be either concurrent with or separate from the heat development step. By the term "decolorization" of a dye it is meant that the transmission absorption of a minimum density portion of photosensitive material at 350 to 700 nm becomes 0.1 or lower.

Described below is the thermal or optical decolorizable dye according to the invention. The dye may decolorize by direct thermal or optical decomposition of a dye molecule or be used as a combination of a dye with a thermal and/or optical bleaching agent.

Where the dye has such nature that its molecule decolorizes by heating, it should preferably decolorize at a temperature of at least 60° C. Examples of the dye which decolorizes by direct thermal decomposition include well-known ones, for example, such compounds as described in U.S. Pat. Nos. 4,594,312 and 5,135,842 and JP-B 23836/1994. Since it is desired that the dyes be stable under ambient conditions as encountered during shelf storage of photosensitive material, the following embodiments are preferred. The invention is not limited to the embodiments described below.

(1) Dye in the Form of a Combination of a Basic Colorless Dye Precursor and an Acidic Material Examples of the basic colorless dye precursor used herein include Crystal Violet lactone, 3-indolino-3-p-dimethylaminophenyl-6-dimethylaminophthalide, 3-diethylamino-7-chlorofluoran, 3-diethylamino-7-cyclohexylaminofluoran, 3-diethylamino-5-methyl-7-t-butylfluoran, 3-diethylamino-6-methyl-7-anilinofluoran, 3-diethylamino-6-methyl-7-p-butylanilinofluoran, 2-(N-phenyl-N-ethyl)aminofluoran, 3-diethylamino-7-dibenzylaminofluoran, 3-cyclohexylamino-6-chlorofluoran, 3-diethylamino-6-methyl-7-xylidinofluoran, 2-anilino-3-methyl-6-(N-ethyl-p-toluidino)fluoran, 3-pyridino-6-methyl-7-anilinofluoran, 3-pyrrolidino-7-cyclohexylaminofluoran, 3-piperidino-6-methyl-7-toluidinofluoran, 3-pyrrolidino-6-methyl-7-(p-toluidino) fluoran, 3-piperidino-6-methyl-7-anilinofluoran, 3-N-methylcyclohexylamino-6-methyl-7-anilinofluoran, and 3-diethylamino-7-(m-trifluoromethylanilino)fluoran.

Also included are the following compounds.

(L-101)

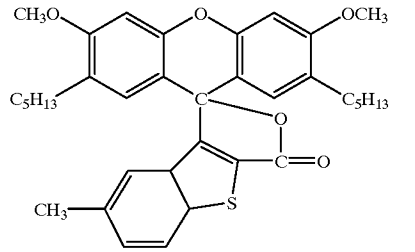

(L-102)

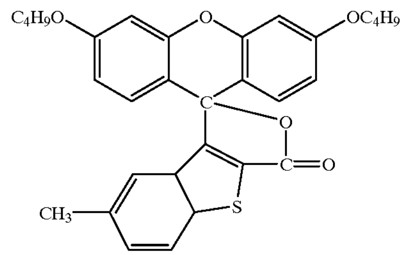

(L-103)

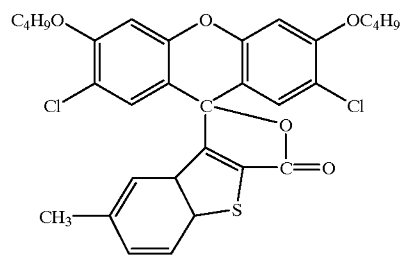

(L-104)

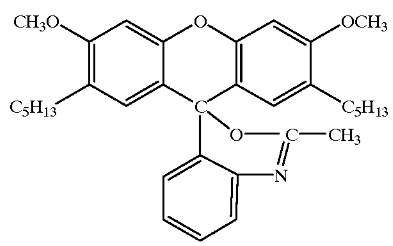

(L-105)

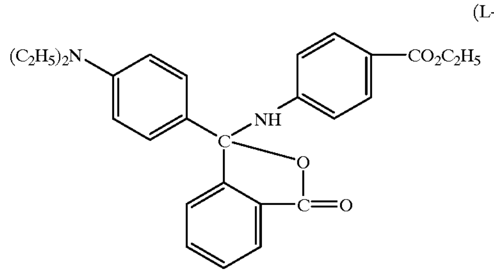

(L-106)

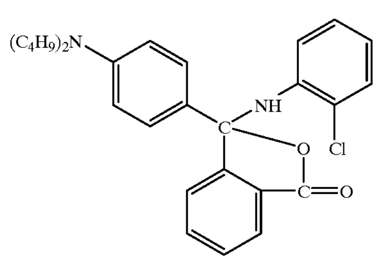

-continued
(L-107)
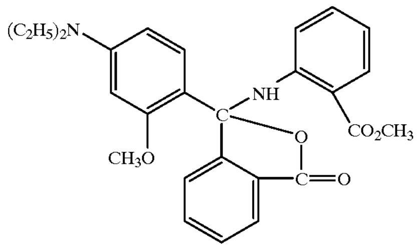
(L-108)
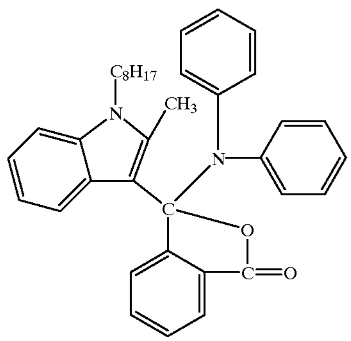
(L-201)
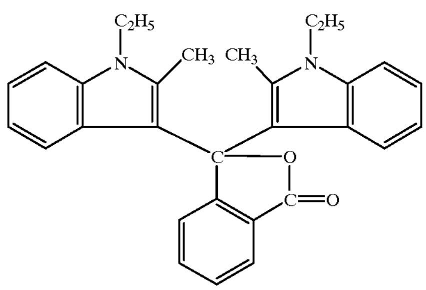
(L-202)
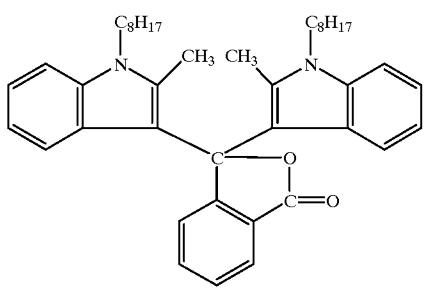
(L-203)
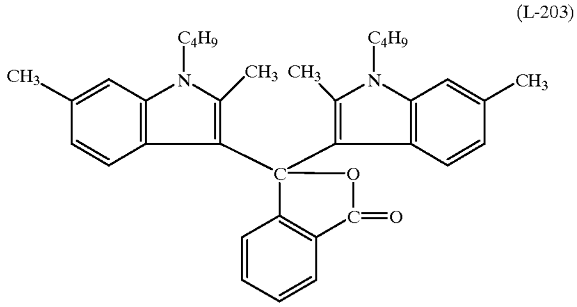
-continued
(L-204)
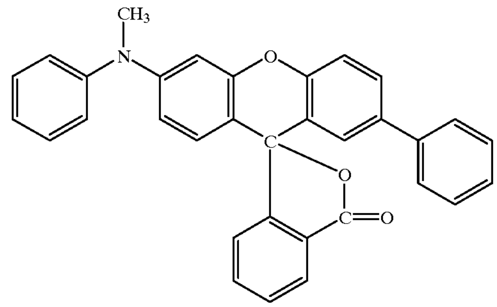
(L-205)
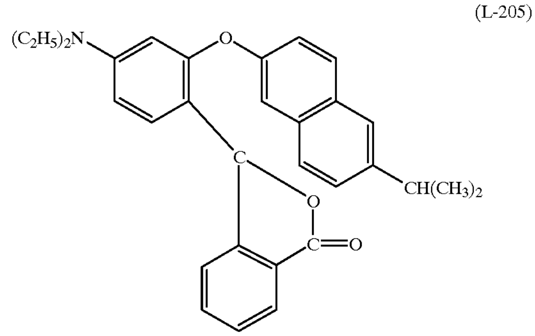
(L-206)
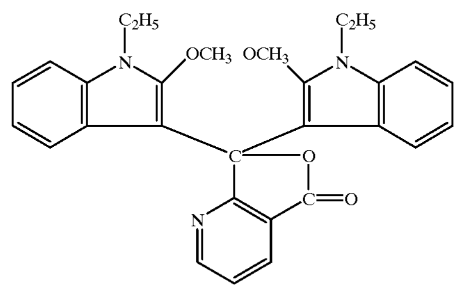
(L-207)
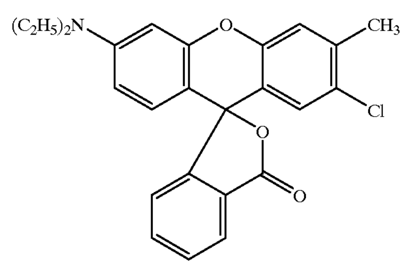
(L-208)
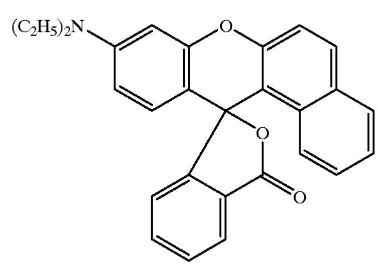

(L-209)
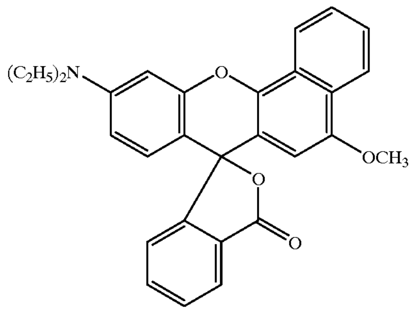
(L-210)
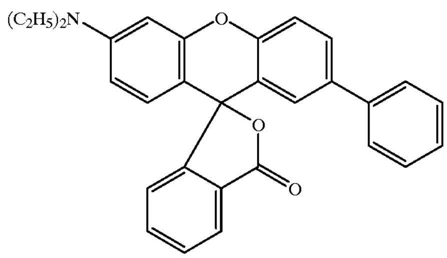
(L-211)
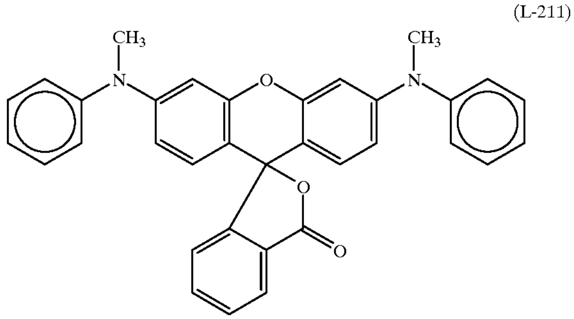
(L-212)
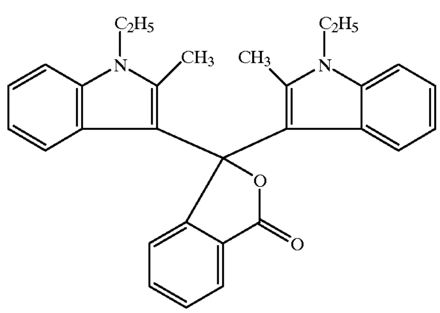
(L-213)
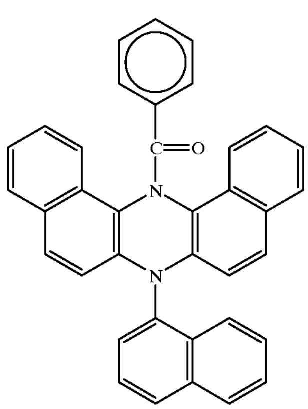
(L-214)
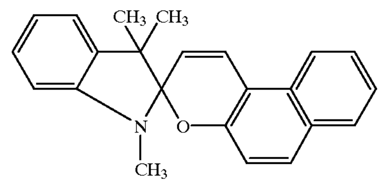
(L-215)
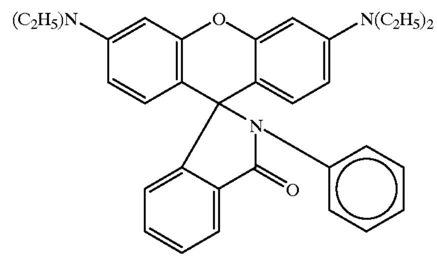
(L-216)
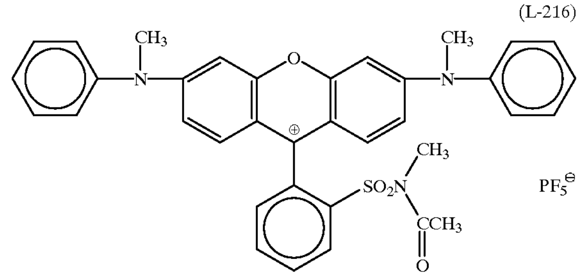
(L-301)
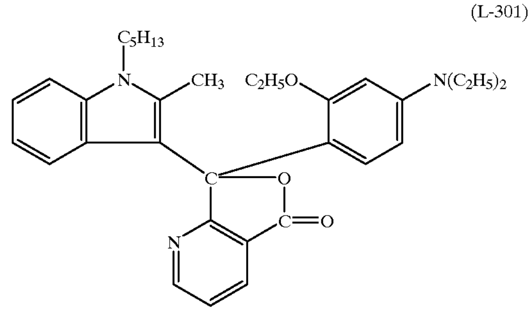
(L-302)
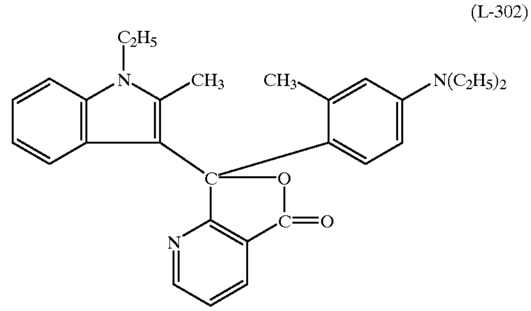

-continued (L-303)

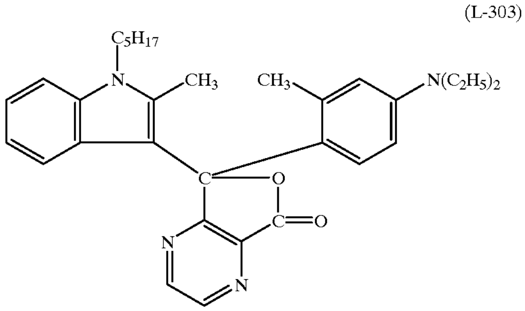

(L-304)

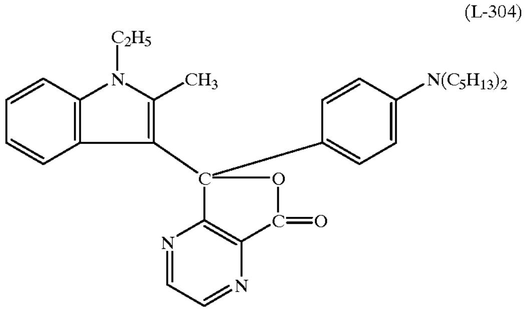

(L-305)

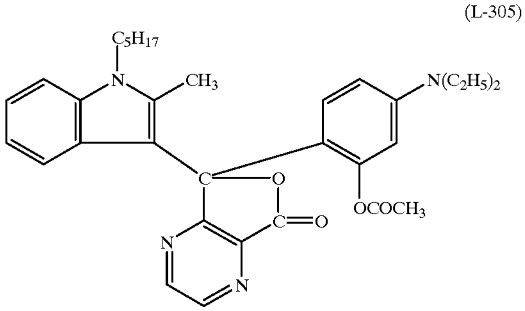

(L-306)

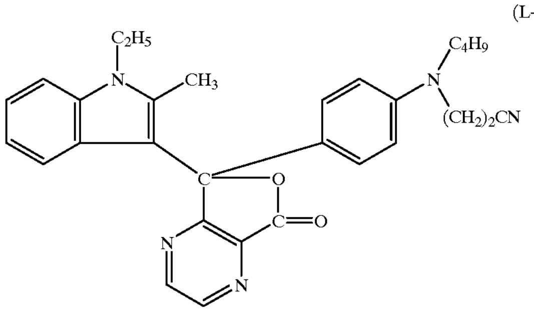

(L-307)

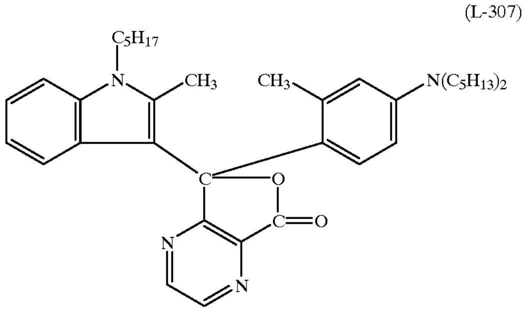

-continued (L-308)

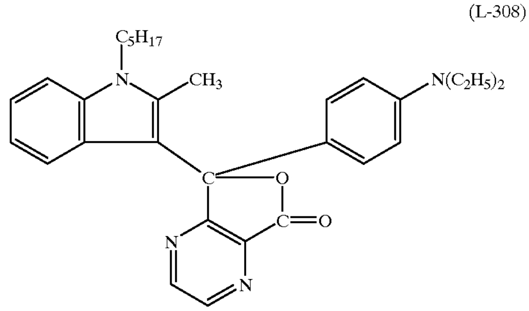

In order to render these compounds chromophoric, phenolic compounds, organic acids or metal salts thereof, and oxybenzoates are used. Preferred examples of the compound used to this end are shown below.

Exemplary phenolic compounds include 4,4'-isopropylidene-diphenol (bisphenol-A), p-tert-butylphenol, 2,4-dinitrophenol, 3,4-dichlorophenol, 4,4,-methylene-bis (2,6-di-tert-butylphenol), p-phenylphenol, 4,4'-cyclohexylidene diphenol, 2,2'-methylenebis(4-tert-butylphenol), 2,2'-methylenebis (α-phenyl-p-cresol)-thiodiphenyl, 4,4,-thiobis(6-tert-butyl-m-cresol), sulfonyldiphenol, 1,1-bis(4-hydroxyphenyl)-n-dodecane, and ethyl 4,4-bis(4-hydroxyphenyl)-1-pentanoate as well as p-tert-butylphenol-formalin condensate and p-phenylphenol-formalin condensate.

Exemplary organic acids and metal salts thereof include 3-tert-butylsalicylic acid, 3,5-tert-butylsalicylic acid, 5-α-methylbenzylsalicylic acid, 3,5-di-α-methylbenzylsalicylic acid, 3-tert-octylsalicylic acid, and 5-α,γ-dimethyl-α-phenyl-γ-phenylpropylsalicylic acid, and zinc, lead, aluminum, magnesium, and nickel salts thereof.

Exemplary oxybenzoates include ethyl p-oxybenzoate, butyl p-oxybenzoate, heptyl p-oxybenzoate, and benzyl p-oxybenzoate.

Also included are the following compounds.

K-1

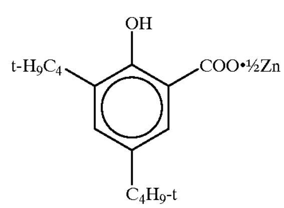

K-2

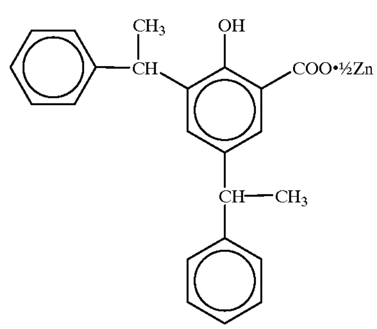

-continued
K-3
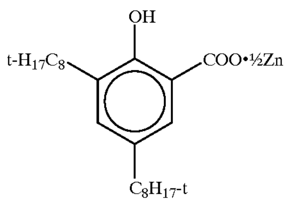
K-4
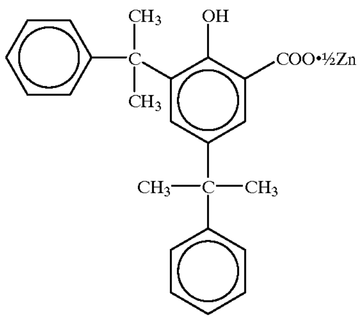
K-5
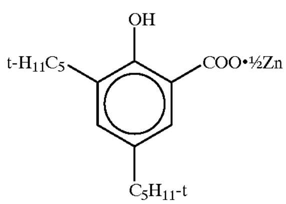
K-6
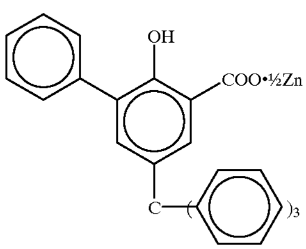
K-7
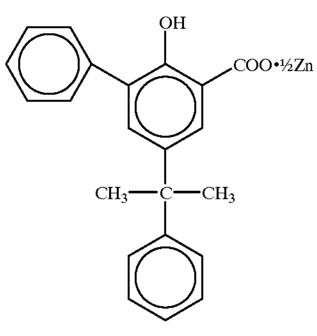
K-8
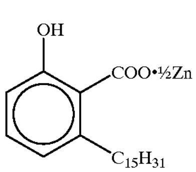
-continued
K-9
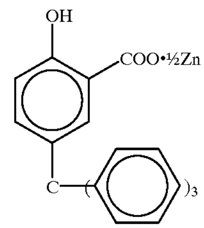
K-10
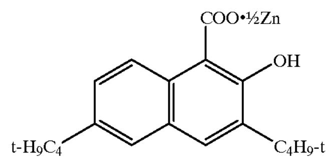
K-11
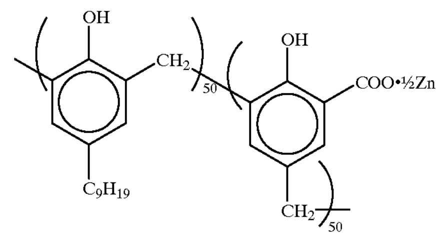
K-12
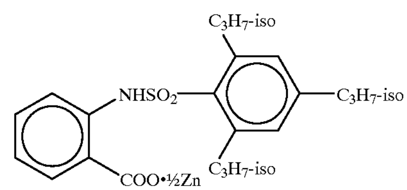
K-13
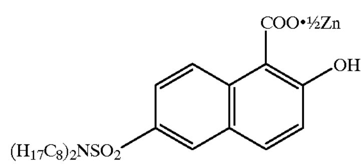
K-14
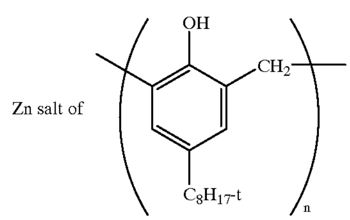
K-15
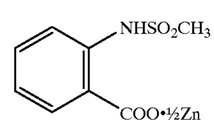
K-16
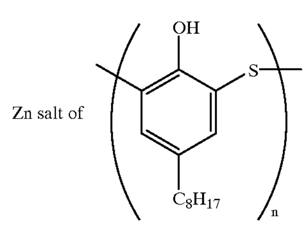

-continued

K-17

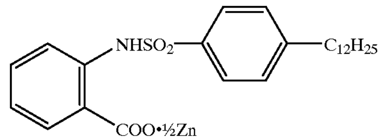

K-18

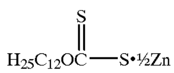

K-19

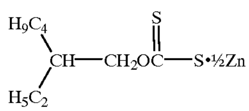

K-20

$Zn(SCN)_2$

K-21

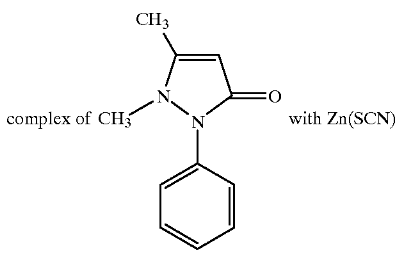

In the photosensitive material, the dye is present in a chromophoric state to a desired wavelength and absorbance, and can be decolorized by contact with a basic material under the action of heat or light. The decolorizable dye and the basic material should be isolated from each other in a stable manner during storage, it is generally preferred that they are not added to a common layer in a dissolved state.

Means for isolating the decolorizable dye from the basic material may be by adding them separately in a solid state or by containing the decolorizable dye and/or the basic material in thermo-responsive microcapsules. As to preparation, reference is made to the heat-sensitive recording material described in Moriga, "Introduction to the Chemistry of Special Paper," 1975 and the method of preparing heat-sensitive recording material disclosed in JP-A 150575/1989.

Instead of the basic material, a base generator capable of releasing a basic material upon heating or a nucleophilic compound may be used.

Although it is known to use specific alcohols, polyethers, polyethylene glycol and guanidine derivatives as a bleaching agent for dyes, the present invention favors to use a base generator which itself is neutral, but when heated, is decarbonated to release a base for decolorizing the dye.

The base generator includes sulfonylacetic acid type compounds as described in JP-A 168441/1984 and propiolic acid salt type compounds as described in JP-A 180537/1984. Especially preferred are compounds of the following general formula (B-I):

$$B^0—X^0—B^0.2R^0SO_2CH_2COOH \qquad \text{(B-I)}$$

wherein $B^0$ is an organic base, $X^0$ is a divalent organic base, and $R^0$ is an aliphatic, aromatic or heterocyclic group.

Especially useful base generators used herein are those compounds of formula (B-I) wherein $B^0$ is an amidino or guanidino group (which may have substituents which may be concatenated to form a nitrogenous heterocyclic group) and $R^0$ is an aryl group.

Illustrative, non-limiting, examples of the base generator are given below.

BP-1

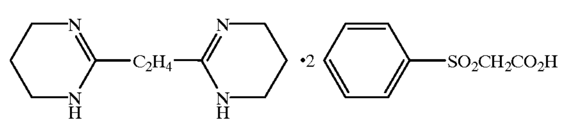

BP-2

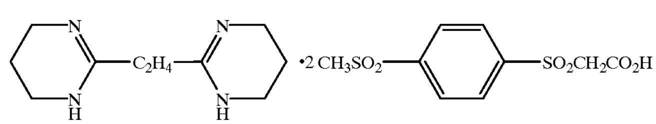

BP-3

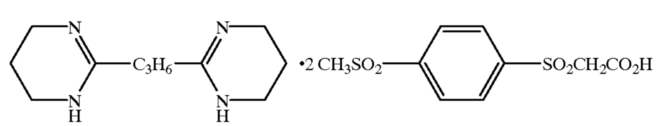

BP-4

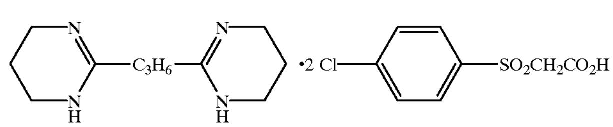

BP-5

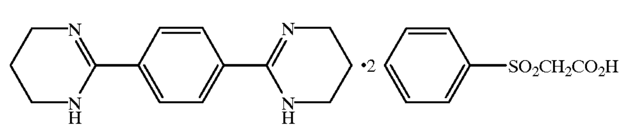

-continued
BP-6
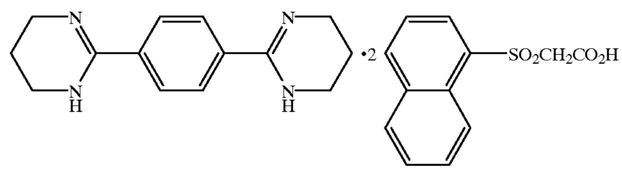
BP-7
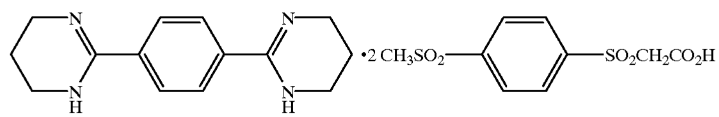
BP-8
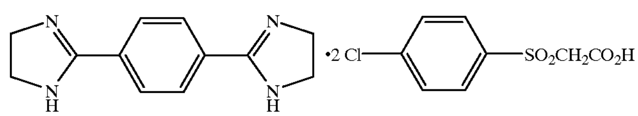
BP-9
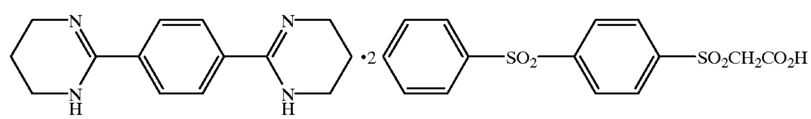
BP-10
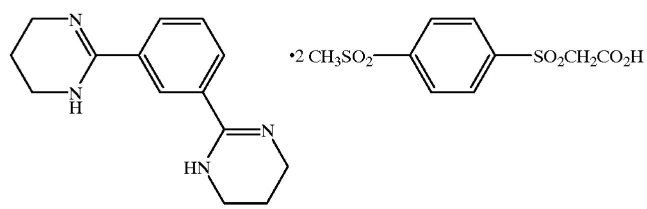
BP-11
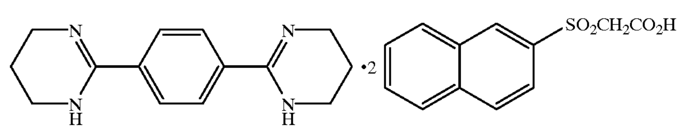
BP-12
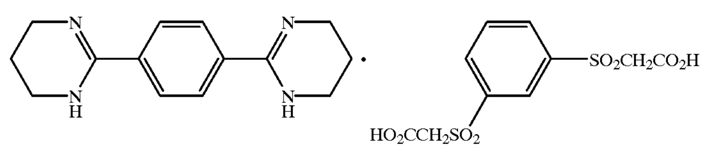
BP-13
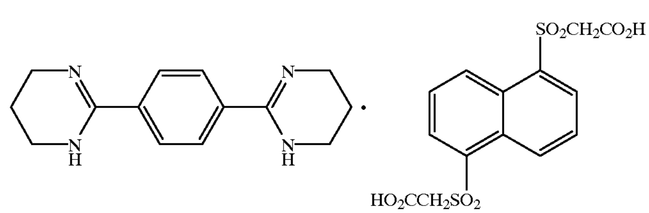
BP-14
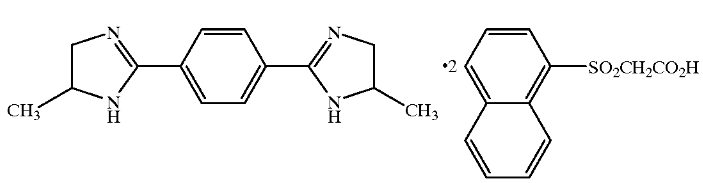

-continued
BP-15
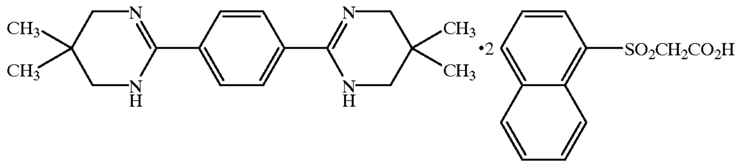
BP-16
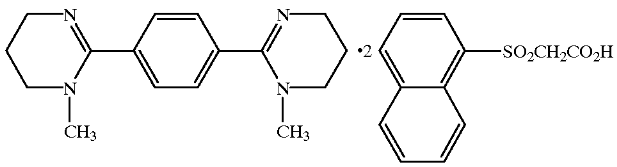
BP-17
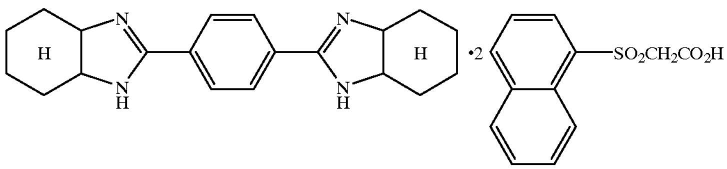
BP-18
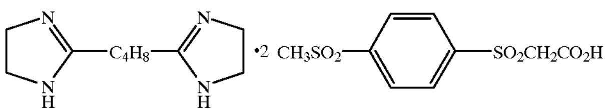
BP-19
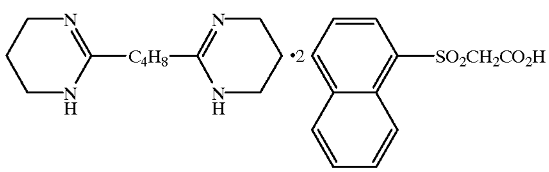
BP-20
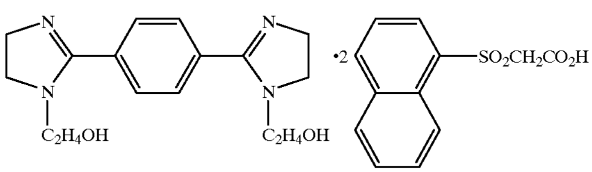
BP-21
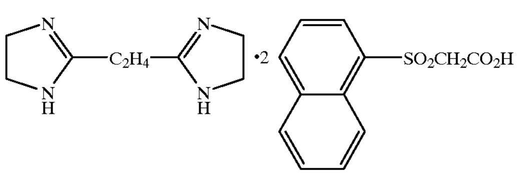
BP-22
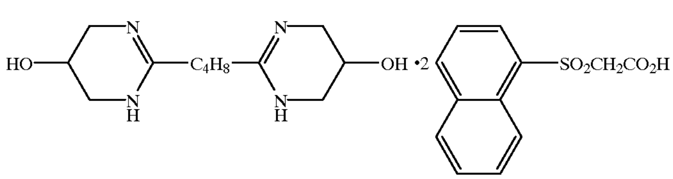
BP-23
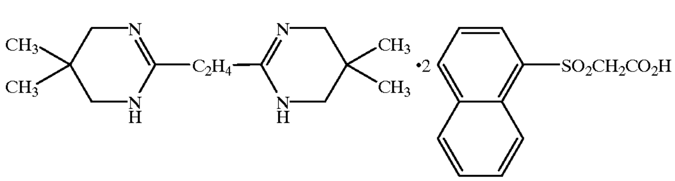

-continued
BP-24
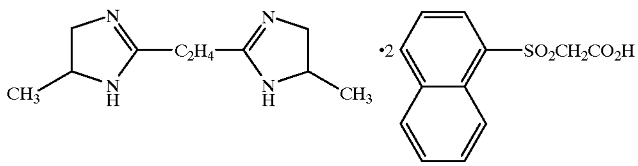
BP-25
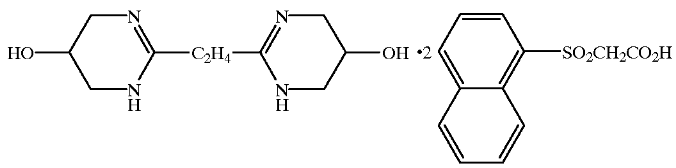
BP-26
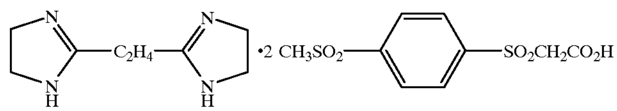
BP-27
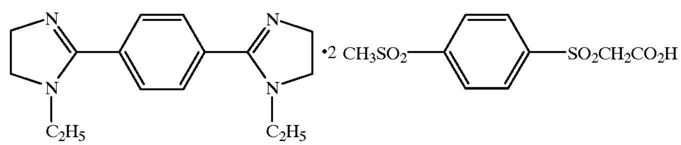
BP-28
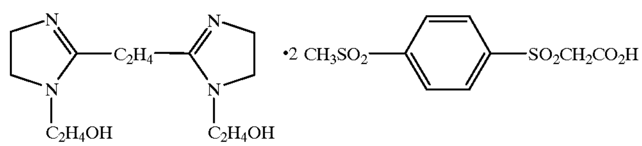
BP-29
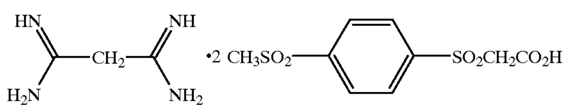
BP-30
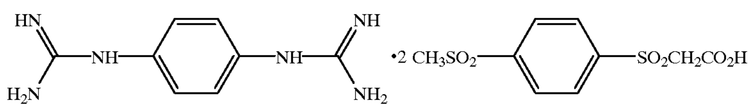
BP-31
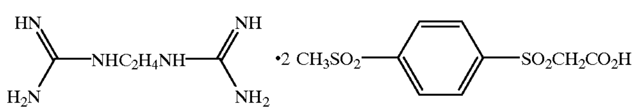
BP-32
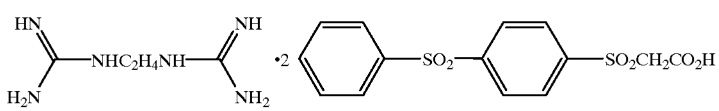
BP-33
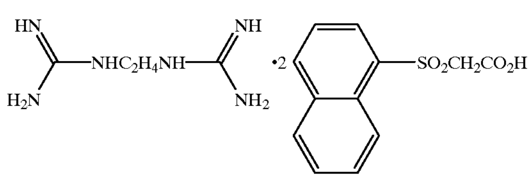
BP-34
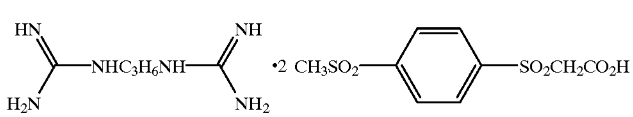

-continued

BP-35

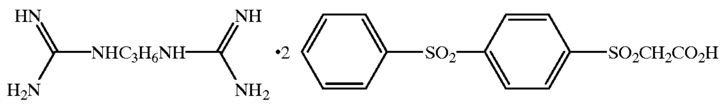

BP-36

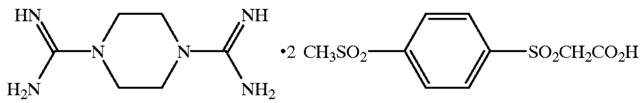

BP-37

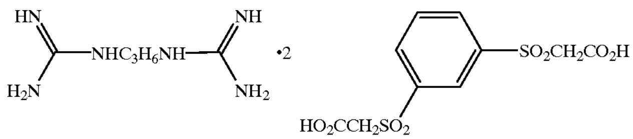

BP-38

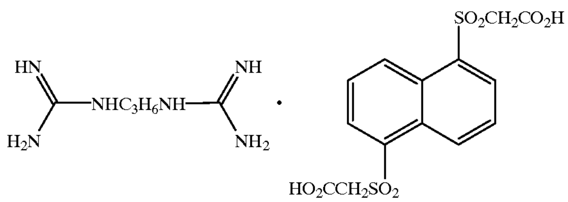

BP-39

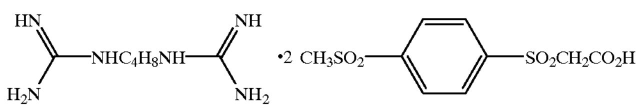

BP-40

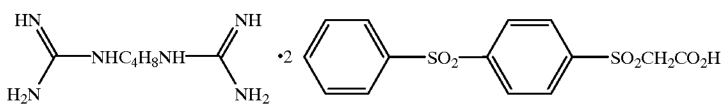

(2) Dye in the Form of a Combination of an Acidic Colorless Dye Precursor and a Basic Material Examples of the acidic colorless dye precursor used herein include phenolphthalein, fluorescein, 2',4',5',7'-tetrabromo-3,4,5,6-tetrachlorofluorescein, Tetrabromophenol Blue, 4,5,6,7-tetrabromophenolphthalein, Eosine, Aurin Cresol Red, and 2-naphtholphenolphthalein.

The basic material which gives rise to chromophoric reaction with the acidic colorless dye precursor used in the photothermographic material of the invention is a difficultly water-soluble or water-insoluble basic material or a material which releases alkali upon heating.

The basic materials which can be used herein are nitrogenous compounds including inorganic and organic ammonium salts, organic amines, amides, ureas and thioureas and derivatives thereof, thiazoles, pyrroles, pyrimidines, piperadines, guanidines, indoles, imidazoles, imidazolines, triazoles, morpholines, piperidines, amidines, formamidines, and pyridines. Illustrative examples include ammonium acetate, tricyclohexylamine, tribenzylamine, octadecylbenzylamine, stearylamine, allylurea, thiourea, methylthiourea, allylthiourea, ethylenethiourea, 2-benzylimidazole, 4-phenylimidazole, 2-phenyl-4-methylimidazole, 2-undecylimidazoline, 2,4,5-trifuryl-2-imidazoline, 1,2-diphenyl-4,4-dimethyl-2-imidazoline, 2-phenyl-2-imidazoline, 1,2,3-triphenylguanidine, 1,2-ditolylguanidine, 1,2-dicyclohexylguanidine, 1,2-dicyclohexyl-3-phenylguanidine, 1,2,3-tricyclohexylguanidine, guanidine trichloroacetate, N,N'-dibenzylpiperadine, 4,4'-dithiomorpholine, morpholinium trichloroacetate, 2-amino-benzothiazole, and 2-benzoyl-hydrazino-benzothiazole. These basic materials may be used in admixture of two or more.

Also included are the following compounds.

S-1

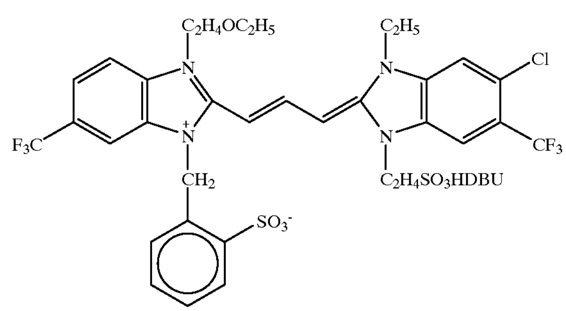

S-2

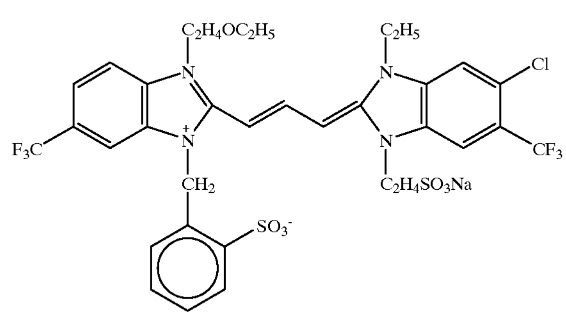

S-3
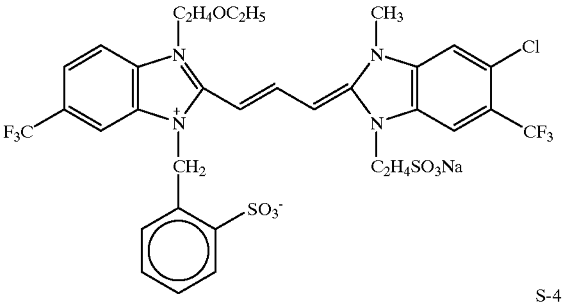
S-4
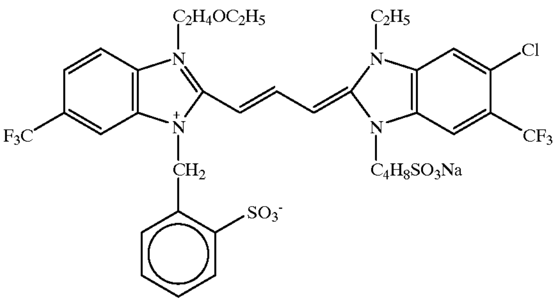
S-5
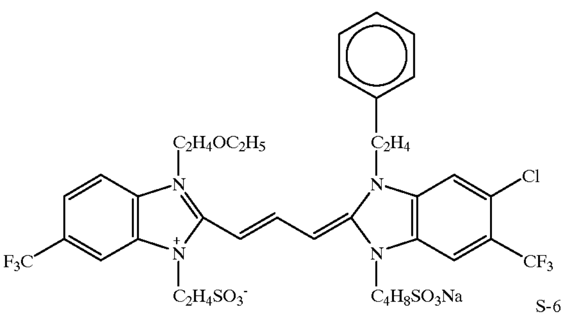
S-6
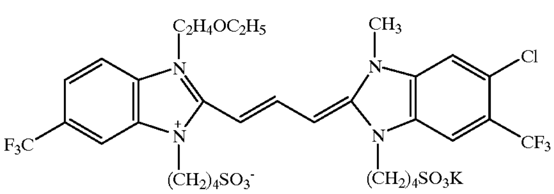
S-7
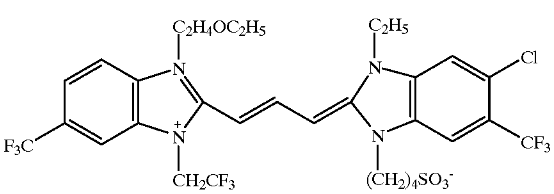
S-8
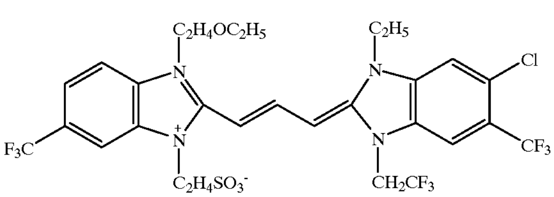
S-9
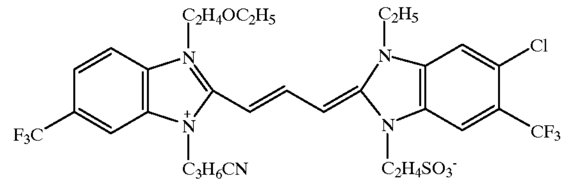
S-10
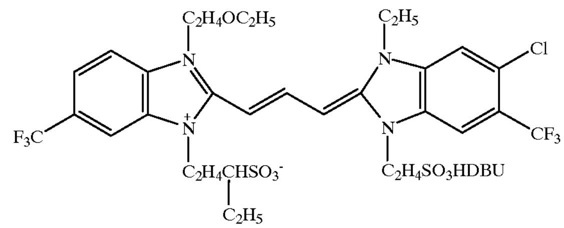
S-11
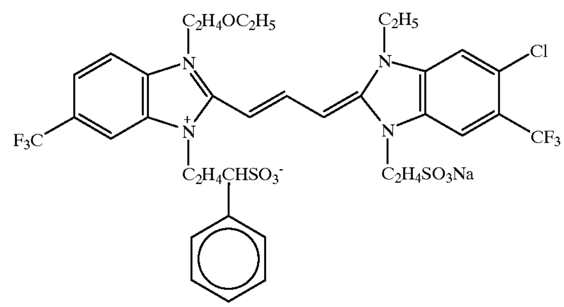
S-12
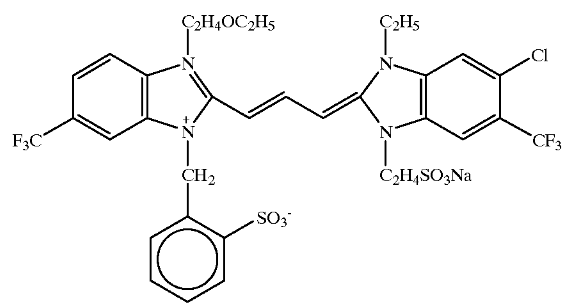
S-13
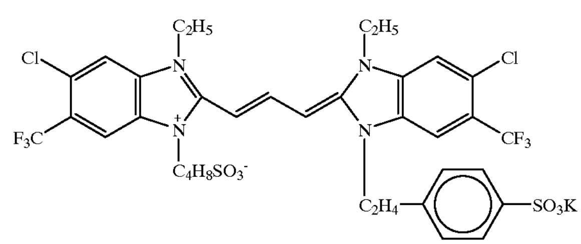

-continued

S-14

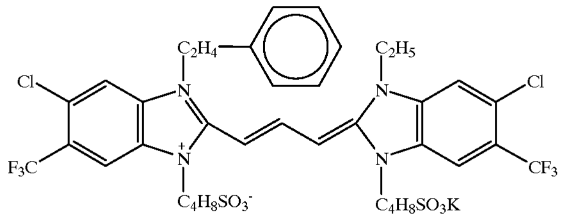

S-15

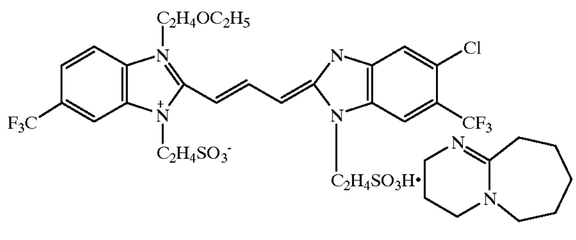

This dye may develop or bleach color in the same manner as dye (1) except that well-known acidic material is used instead of the basic material used for decolorization in the combination of the basic colorless dye precursor and the acidic material.

(3) Dye in the Form of a Compound which Decolorizes Upon Light Illumination

The dose of light illuminated to a dye which decolorizes upon light illumination is up to 100,000 luxmin. The time taken for decolorization is preferably 60 seconds or less, more preferably 1 to 50 seconds. Heating may be done to accelerate decolorization. The heating temperature is preferably 40 to 150° C., more preferably 50 to 120° C. A heating temperature in excess of 150° C. can cause deformation and elongation of supports which are made of commonly used materials such as polyethylene terephthalate, polyethylene naphthalate and triacetate. If supports are made of more heat resistant materials, then heating to a higher temperature is acceptable.

The photo-decolorizable dye according to the invention is described in more detail.

Examples of the photo-decolorizable dye include compounds of the following general formula (1) and combinations of compounds of the following general formulae (2) and (3).

general formula (1)

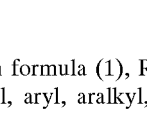

In formula (1), $R^1$, $R^2$, $R^3$ and $R^4$ are independently an alkyl, aryl, aralkyl, alkenyl, alkynyl, silyl or heterocyclic group, and $D^+$ is a cationic dye.

general formula (2)

$X^{\ominus} \cdot D^{\oplus}$

In formula (2), $X^-$ is an anion and $D^+$ is a cationic dye.

general formula (3)

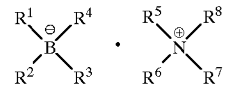

In formula (3), $R^1$, $R^2$, $R^3$ and $R^4$ are independently an alkyl, aryl, aralkyl, alkenyl, alkynyl, silyl or heterocyclic group, and $R^5$, $R^6$, $R^7$ and $R^8$ are independently a hydrogen atom, alkyl, aryl, aralkyl, alkenyl, alkynyl or heterocyclic group.

The general formula (1) is described in detail. The alkyl groups represented by $R^1$ to $R^4$ are those groups having 1 to 12 carbon atoms, more preferably 1 to 8 carbon atoms, for example, methyl, ethyl, propyl, butyl, hexyl and octyl. The aryl group represented by $R^1$ to $R^4$ is preferably phenyl, which may have a substituent such as methyl, methoxy and halogen atoms (e.g., F, Cl and Br). The aralkyl groups represented by $R^1$ to $R^4$ are, for example, benzyl and phenylethyl. The alkenyl groups represented by $R^1$ to $R^4$ are those groups having 2 to 6 carbon atoms, for example, 2-pentyl, vinyl, 2-butenyl, 1-propenyl and 2-propenyl. The alkynyl groups represented by $R^1$ to $R^4$ are, for example, ethynyl and 2-propinyl. The heterocyclic groups represented by $R^1$ to $R^4$ are, for example, pyrrole, pyridine, and pyrrolidine. The silyl groups represented by $R^1$ to $R^4$ are of $SiR^9R^{10}R^{11}$ wherein $R^9$, $R^{10}$ and $R^{11}$ are alkyl or aryl groups (as defined above). Preferred groups represented by $R^1$ to $R^4$ are alkyl, aralkyl and aryl groups.

Examples of the cation dye include the cyanine, Rhodamine, Methylene Blue and Safranine dyes described in JP-A 150242/1987, the cyanine, polymethine, and pyrylium dyes described in JP-A 188635/1993, the cyanine, azomethine, styryl, xanthene, and azine dyes described in JP-A 19734/1982, the cyanine, xanthene and styryl dyes described in JP-A 13144/1989, the cyanine dyes described in JP-A 88444/1989, the triarylmethane dyes described in JP-A 150070/1995, the tetrazine and diimmonium dyes described in JP-A 146905/1992, and the xanthene, thioxanthene, oxazine, thiazine, cyanine, diphenylmethane, triphenylmethane, and pyrylium dyes described in JP-A 59110/1993.

Preferred among others are cyanine dyes of the following general formula (4).

general formula (4)

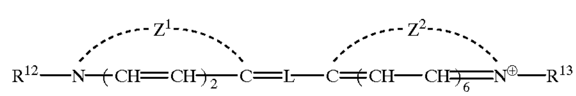

In formula (4), $Z^1$ and $Z^2$ each are a group of non-metallic atoms necessary to form a 5- or 6-membered nitrogenous heterocycle which may have a fused ring; $R^{12}$ and $R^{13}$ each are alkyl, alkenyl or aralkyl; L is a linking group comprising 1, 3, 5, 7 or 9 methine groups concatenated through a conjugated double bond; and letters a and b each are equal to 0 or 1.

More illustratively, examples of the 5- or 6-membered nitrogenous heterocycle represented by $Z^1$ and $Z^2$ include oxazole, isooxazole, benzoxazole, naphthoxazole, thiazole, benzothiazole, naphthothiazole, indolenine, benzoindolenine, imidazole, benzoimidazole, naphthoimidazole, quinoline, pyridine, pyrrolopyridine, furopyrrole, indolidine, and imidazoquinoxaline rings. Preferred are 5-membered nitrogenous heterocycles having a benzene or naphthalene ring fused thereto. These rings may have a substituent. Exemplary substituents include lower alkyl (e.g., methyl and ethyl), alkoxy (e.g., methoxy and ethoxy), phenoxy (e.g., unsubstituted phenoxy), halogen atoms (e.g., Cl, Br and F), alkoxycarbonyl (e.g., ethoxycarbonyl), cyano and nitro.

The alkyl, alkenyl and aralkyl groups represented by $R^{12}$ and $R^{13}$ have the same meaning as the alkyl, alkenyl and aralkyl represented by $R^1$ to $R^4$ in formula (1). L is a linking group comprising 1, 3, 5, 7 or 9 methine groups concatenated through a conjugated double bond wherein three methine groups may be linked to form a cyclopentyl or cyclohexene ring. The linking group may have a substituent such as alkyl (as defined above), halogen atoms (F, Cl and Br), aryl (as defined above), $NR^{14}R^{15}$, $SR^{16}$ and $OR^{17}$ wherein $R^{14}$, $R^{15}$, $R^{16}$ and $R^{17}$ are alkyl (as defined above) or aryl (as defined above) or $R^{14}$ and $R^{15}$, taken together, may form a 5- or 6-membered ring.

Referring to the general formula (2) again, $X^-$ represents an anion, for example, halide ions (e.g., Cl, Br, I), $ClO_4^-$, $PF_6^-$, $SbF_6^-$, $BF_4^-$, p-toluenesulfonate ion, and ethylsulfate ion. The cationic dye represented by $D^+$ are the same as the cationic dye as described for formula (1).

The general formula (3) is described in detail. The alkyl, aryl, aralkyl, alkenyl, alkynyl, silyl and heterocyclic groups represented by $R^1$, $R^2$, $R^3$ and $R^4$ have the same meaning as the alkyl, aryl, aralkyl, alkenyl, alkynyl, silyl and heterocyclic groups represented by $R^1$, $R^2$, $R^3$ and $R^4$ in formula (1). The alkyl, aryl, aralkyl, alkenyl, alkynyl and heterocyclic groups represented by $R^5$, $R^6$, $R^7$ and $R^8$ have the same meaning as the alkyl, aryl, aralkyl, alkenyl, alkynyl and heterocyclic groups represented by $R^1$, $R^2$, $R^3$ and $R^4$ in formula (1).

Illustrative non-limiting examples of the compound of general formula (3) include tetramethylammonium n-butyltriphenylboron,
tetramethylammonium n-butyltrianisilboron,
tetramethylammonium n-octyltriphenylboron,
tetramethylammonium n-octyltrianisilboron,
tetraethylammonium n-butyltriphenylboron,
tetrabutylammonium n-butyltriphenylboron,
tetraoctylammonium n-octyltriphenylboron,
tetrabutylammonium n-dodecyltriphenylboron,
trimethylhydrogenammonium n-butyltriphenylboron,
tetrahydrogenammonium n-butyltriphenylboron,
tetramethylammonium tetrabutylboron,
tetra-n-butylammonium tetra-n-butylboron,
tetramethylammonium tri-n-butyl(triphenylsilyl)boron,
tetramethylammonium tri-n-butyl(dimethylphenylsilyl)boron,
tetraethylammonium n-octyldiphenyl(di-n-butylphenylsilyl)boron,
tetramethylammonium dimethylphenyl(trimethylsilyl)boron,
tetramethylammonium benzyltriphenylboron,
tetrabutylammonium benzyltriphenylboron,
tetramethylammonium methyltriphenylboron, and
tetramethylammonium tri-n-butylphenylboron.

These compounds may be used alone or in admixture of two or more.

Illustrative non-limiting examples of the compound according to the invention are shown below on the basis of the general formula (1). Note that Ph is phenyl.

$\overset{\oplus}{A^1}—CH═A^2$ $\qquad$ $Ph_3—\overset{\ominus}{B}\text{-n-}C_4H_9$

| compound | $A^1$ | $A^2$ | λmax |
|---|---|---|---|
| 1 | 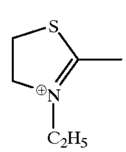 | 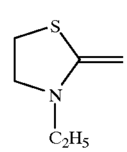 | 338 nm |
| 2 | 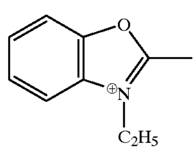 | 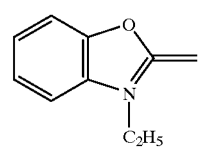 | 380 nm |
| 3 | 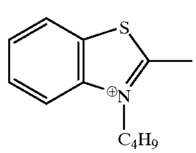 | 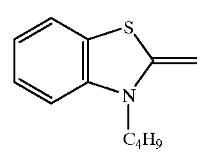 | 422 nm |
| 4 | 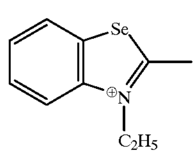 | 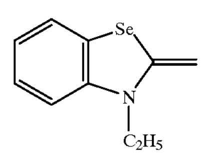 | 427 nm |

-continued
| | | | |
|---|---|---|---|
| 5 | 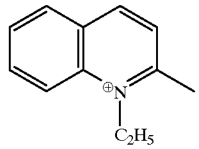 | 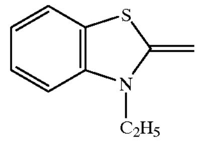 | 490 nm |
| 6 | 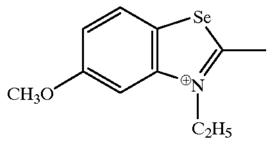 | 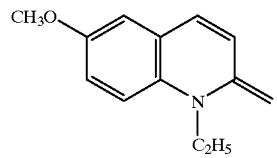 | 508 nm |
$\overset{\oplus}{A}{}^1$—CH=CH—CH=$A^2$ $\quad$ $Ph_3\ \overset{\ominus}{B}\bullet n\text{-}C_4H_9$
| compound | $A^1$ | $A^2$ | λmax |
|---|---|---|---|
| 7 | 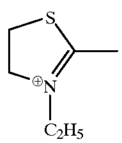 | 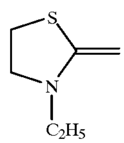 | 443 nm |
| 8 | 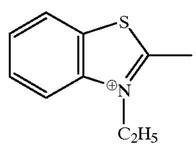 | 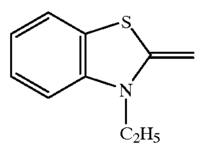 | 530 nm |
| 9 | 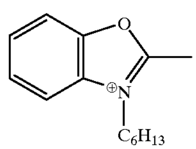 | 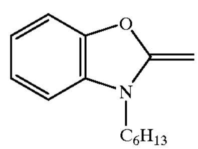 | 492 nm |
| 10 | 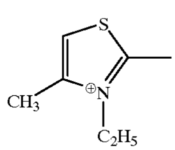 | 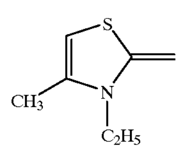 | 554 nm |
| 11 | 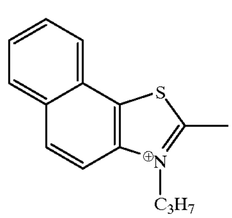 | 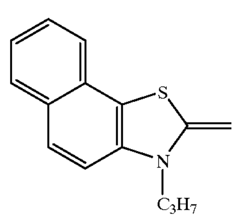 | 590 nm |
| 12 | 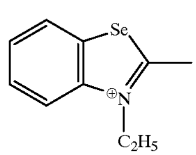 | 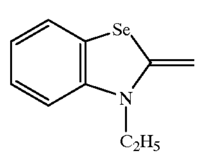 | 568 nm |

-continued
| | | | |
|---|---|---|---|
| 13 | 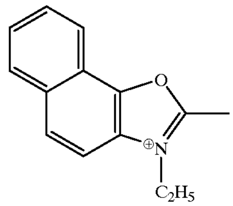 | 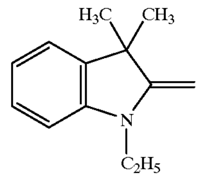 | 530 nm |
| 14 | 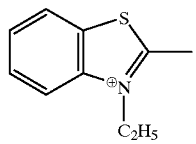 | 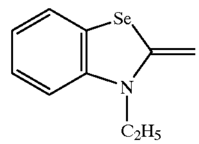 | 550 nm |
| 15 | 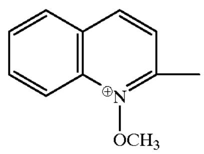 | 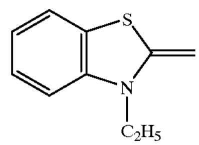 | 587 nm |
| 16 | 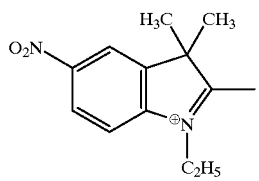 | 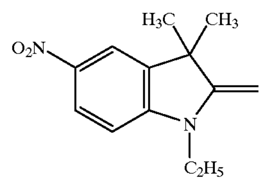 | 575 nm |
| 17 | 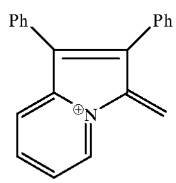 | 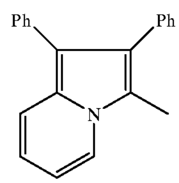 | 730 nm |
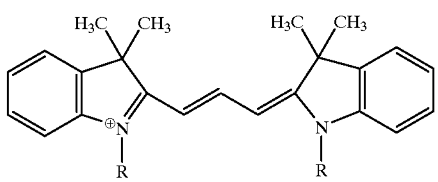
(550 nm)
$Ph_3\ \overset{\ominus}{B}{\bullet}R'$
| compound | R | R' |
|---|---|---|
| 18 | n-$C_4H_9$ | $CH_3$ |
| 19 | n-$C_6H_{13}$ | $CH_2Ph$ |
| 20 | n-$C_4H_9$ | 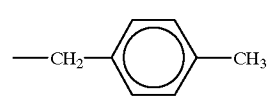 |
| 21 | n-$C_6H_{13}$ | 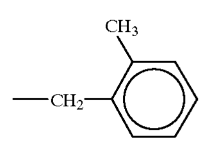 |
| 22 | n-$C_4H_9$ | —$CH_2CH_2CH_2Ph$ |

-continued
| | | |
|---|---|---|
| 23 | n-$C_6H_{13}$ | n-$C_4H_9$ |
| 24 | n-$C_4H_9$ | —CH($CH_3$)—$CH_2CH_3$ |
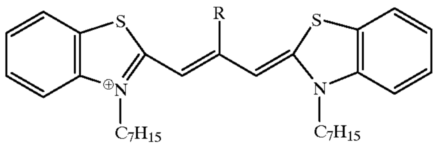
$Ar_3\ \overset{\ominus}{B}\bullet n\text{-}C_4H_9$
| compound | R | Ar | λmax |
|---|---|---|---|
| 25 | $CH_3$ | Ph | (552 nm) |
| 26 | —CH═CH—Ph | Ph | (556 nm) |
| 27 | H | 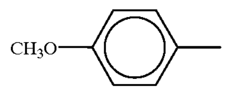 | (590 nm) |
$\overset{\oplus}{A^1}$—CH═CH—C(R)═CH—CH═$A^2$
$Ph_3\ \overset{\ominus}{B}\bullet n\text{-}C_4H_9$
| compound | $A^1$ | $A^2$ | R | λmax |
|---|---|---|---|---|
| 28 | 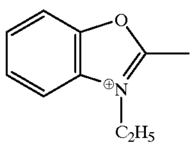 | 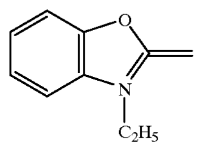 | H | 590 nm |
| 29 | 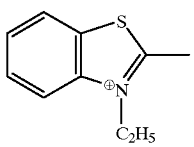 | 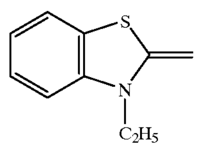 | Cl | 653 nm |
| 30 | 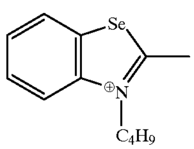 | 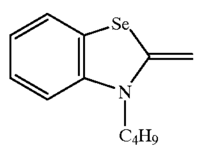 | H | 660 nm |
| 31 | 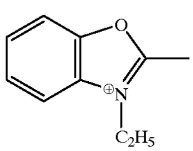 | 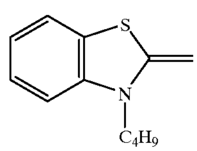 | Cl | 660 nm |
compound 32
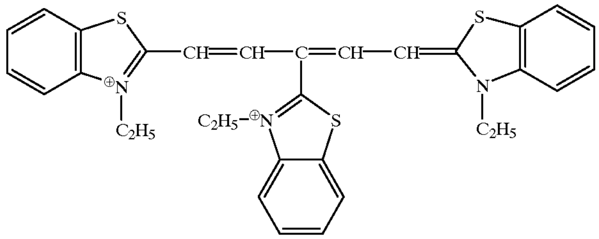
604 nm -continued $2Ph_3\overset{\ominus}{B}\bullet n\text{-}C_4H_9$ compound 33 — 760 nm

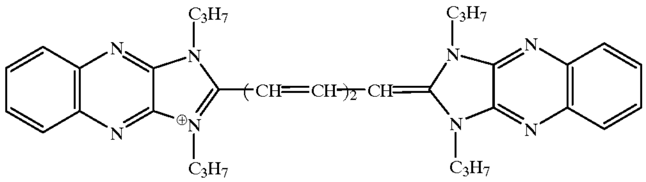

$Ph_3\overset{\ominus}{B}\bullet CH_2Ph$ (640 nm)

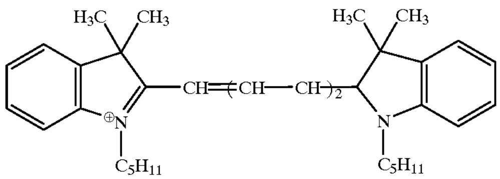

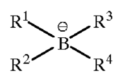

| compound | $R^1$ | $R^2$ | $R^3$ | $R^4$ |
|---|---|---|---|---|
| 34 | Ph | Ph | Ph | n-$C_4H_9$ |
| 35 | 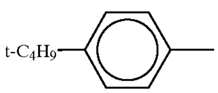 | 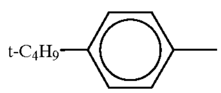 | 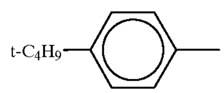 | $CH_2Ph$ |
| 36 | 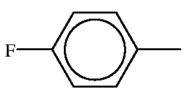 | 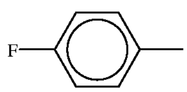 | 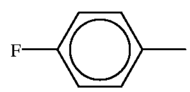 | n-$C_4H_9$ |
| 37 | 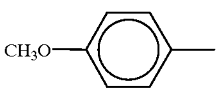 | 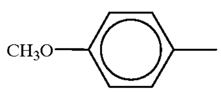 | 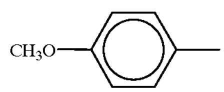 | n-$C_4H_9$ |
| 38 | 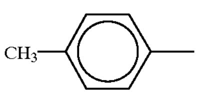 | 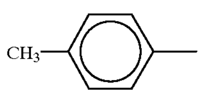 | 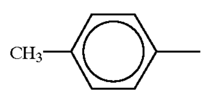 | —$CH_2Ph$ |
| 39 | n-$C_4H_9$ | n-$C_4H_9$ | n-$C_4H_9$ | n-$C_4H_9$ |
| 40 | n-$C_4H_9$ | n-$C_4H_9$ | n-$C_4H_9$ | —$Si(CH_3)_2Ph$ |
| 41 | n-$C_4H_9$ | n-$C_4H_9$ | n-$C_4H_9$ | —$SiPh_3$ |
| 42 | $CH_3$ | $CH_3$ | Ph | —$Si(CH_3)_2$ |
| 43 | Ph | Ph | Ph | —$CH_2$—$CH{=}CH_2$ |
| 44 | Ph | Ph | Ph | —$CH{=}CH_2$ |
| 45 | Ph | Ph | Ph | —$CH_2$—$C{\equiv}CH$ |

$\overset{\oplus}{A^1}$—CH=(CH—CH)$_3$=$A^2$ $Ph_3\overset{\ominus}{B}\bullet CH_2Ph$

| compound | $A^1$ | $A^2$ | λmax |
|---|---|---|---|
| 46 | 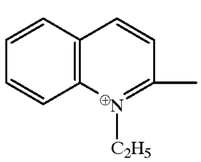 | 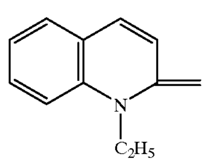 | 820 nm |

-continued
| | | | |
|---|---|---|---|
| 47 | 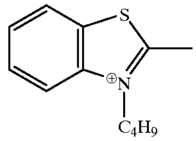 | 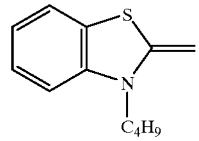 | 770 nm |
| 48 | 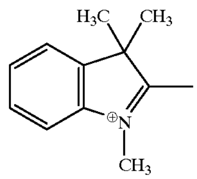 | 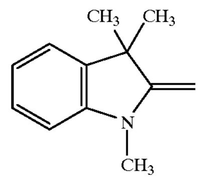 | 750 nm |
| 49 | 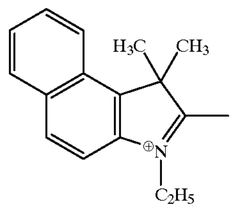 | 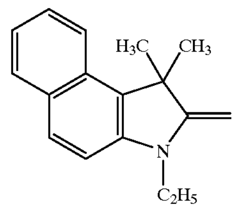 | 785 nm |
| 50 | 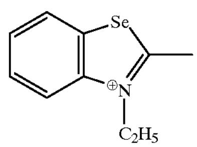 | 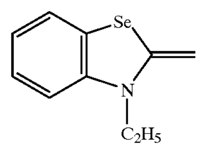 | |
$\overset{\oplus}{A^1}$—CH═CH—Q═CH—CH═$A^2$ $Ph_3\overset{\ominus}{B}\cdot n\text{-}C_4H_9$
| compound | $A^1$ | $A^2$ | Q | λmax |
|---|---|---|---|---|
| 51 | 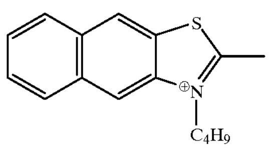 | 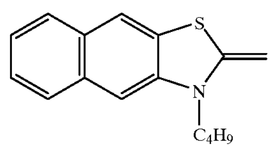 | 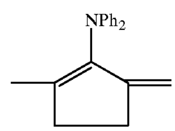 | 830 nm |
| 52 | 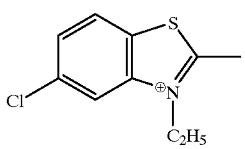 | 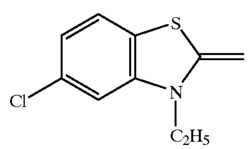 | 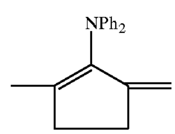 | 820 nm |
| 53 | 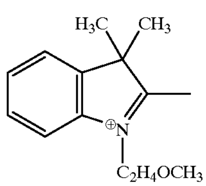 | 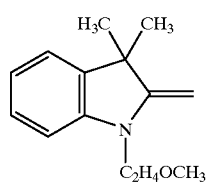 | 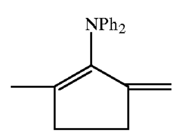 | 790 nm |
| 54 | 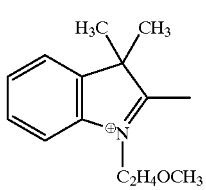 | 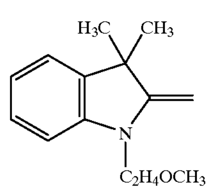 | 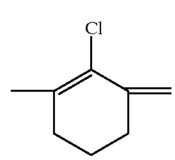 | 790 nm |

-continued
| | | | | |
|---|---|---|---|---|
| 55 | 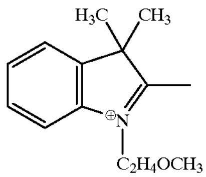 | 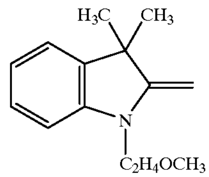 | 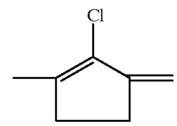 | 820 nm |
| 56 | 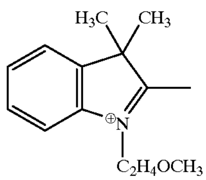 | 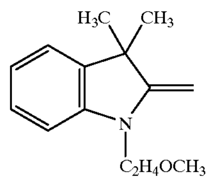 | 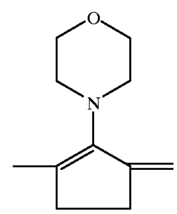 | 760 nm |
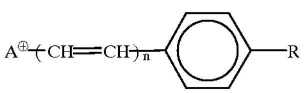
$Ph_3\overset{\ominus}{B}\cdot n\text{-}C_4H_9$
| compound | A | R | n | λmax |
|---|---|---|---|---|
| 57 | 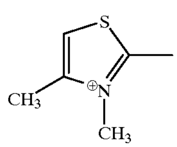 | H | 1 | 354 nm |
| 58 | 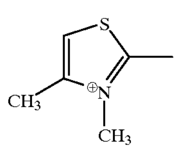 | —$N(CH_3)_2$ | 1 | 475 nm |
| 59 | 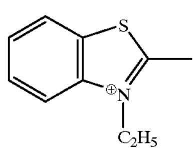 | —$N(CH_3)_2$ | 1 | 523 nm |
| 60 | 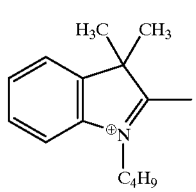 | 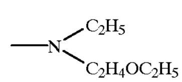 | 1 | 540 nm |
| 61 | 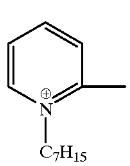 | —$N(CH_3)_2$ | 1 | 461 nm |

-continued
| | | | | |
|---|---|---|---|---|
| 62 | 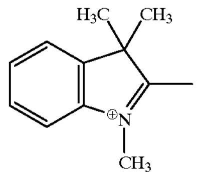 | —$N(CH_3)_2$ | 2 | 630 nm |
$\overset{\oplus}{A^1}$—CH═CH—$A^2$ $Ph_3\overset{\ominus}{B}\cdot CH_2Ph$
| compound | $A^1$ | $A^2$ | λmax |
|---|---|---|---|
| 63 | 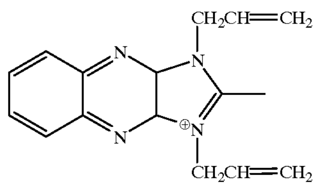 | 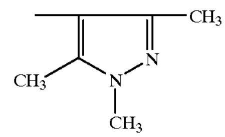 | 440 nm |
| 64 | 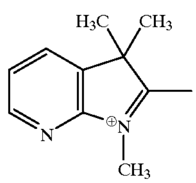 | 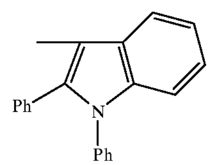 | 506 nm |
| 65 | 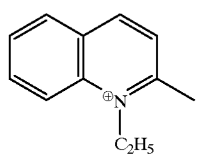 | 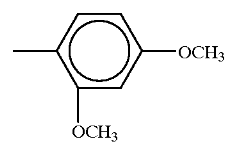 | Yellow |
| 66 | 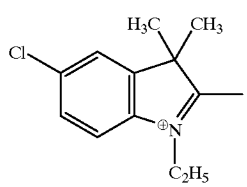 | 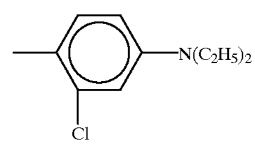 | magenta |
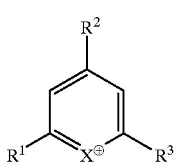
$Ph_3\overset{\ominus}{B}\cdot n\text{-}C_4H_9$
| compound | X | $R^1$ | $R^2$ | $R^3$ | λmax |
|---|---|---|---|---|---|
| 67 | S | Ph | Ph | Ph | ~350 nm |
| 68 | O | Ph | Ph | Ph | 360 nm |
| 69 | S | Ph | 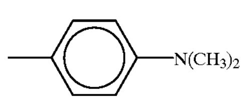 | Ph | 590 nm |
| 70 | S | t-$C_4H_9$ | 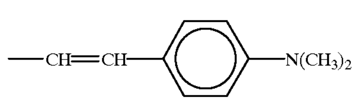 | t-$C_4H_9$ | 608 nm |

-continued
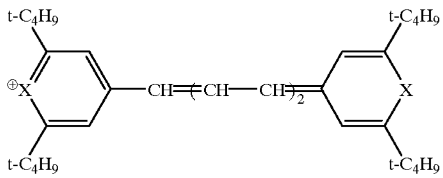
$Ph_3\overset{\ominus}{B}\cdot n\text{-}C_4H_9$
| compound | X | λmax |
|---|---|---|
| 71 | O | 780 nm |
| 72 | S | 830 nm |
compound 73
1080 nm
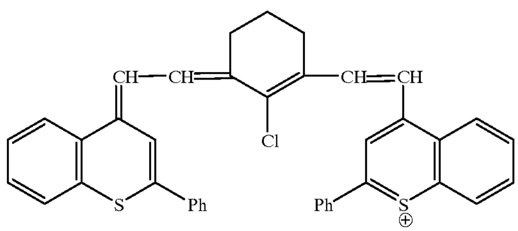
$Ph_3\overset{\ominus}{B}\cdot n\text{-}C_4H_9$
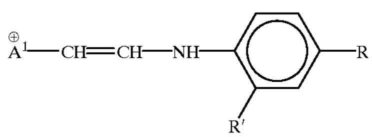
$Ph_3\overset{\ominus}{B}CH_2Ph$
| compound | A | R | R' | λmax |
|---|---|---|---|---|
| 74 | 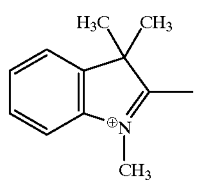 | H | H | 409 nm |
| 75 | 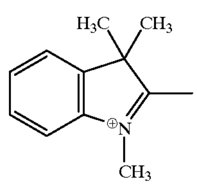 | $OCH_3$ | $OCH_3$ | 420 nm |
| 76 | 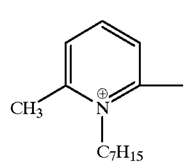 | $N(CH_3)_2$ | H | 444 nm |
compound 77
404 nm
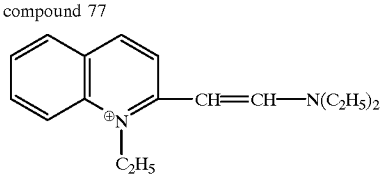
$Ph_3\overset{\ominus}{B}\cdot n\text{-}C_4H_9$ -continued
compound 78
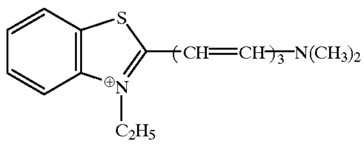
579 nm
$Ph_3\ \overset{\ominus}{B}\bullet n\text{-}C_4H_9$
compound 79
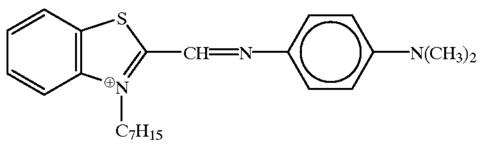
568 nm
$Ph_3\ \overset{\ominus}{B}\bullet n\text{-}C_4H_9$
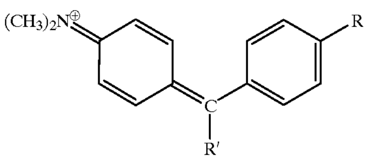
$Ph_3\ \overset{\ominus}{B}\bullet n\text{-}C_4H_9$
| compound | R | R' | λmax |
|---|---|---|---|
| 80 | H | 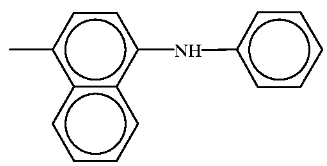 | 600 nm |
| 81 | $N(CH_3)_2$ | 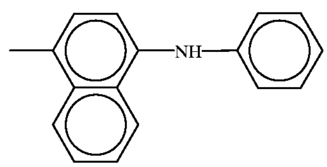 | 623 nm |
| 82 | $N(CH_3)_2$ | 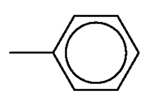 | 630 nm |
| 83 | $N(CH_3)_2$ | 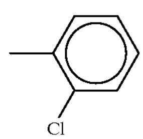 | 642 nm |
compound 84
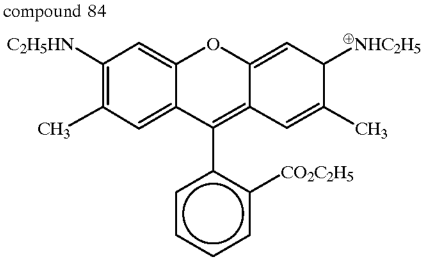
535 nm
Rhodanine 6B -continued
$Ph_3\ \overset{\ominus}{B}{\bullet}n\text{-}C_4H_9$
compound 85
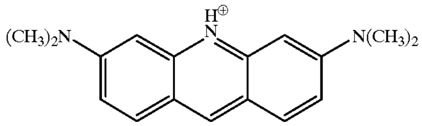
490 nm
$Ph_3\ \overset{\ominus}{B}{\bullet}n\text{-}C_4H_9$
compound 86
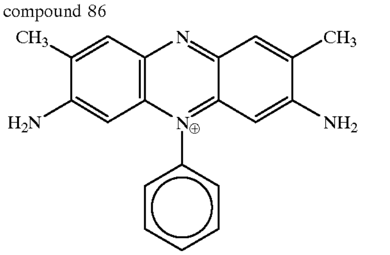
525 nm
Safranine T
$Ph_3\ \overset{\ominus}{B}{\bullet}n\text{-}C_4H_9$
compound 87
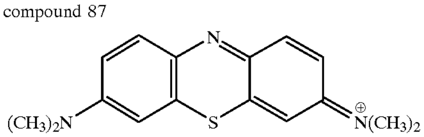
665 nm
$Ph_3\ \overset{\ominus}{B}{\bullet}n\text{-}C_4H_9$
compound 88
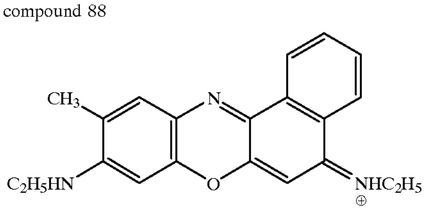
585 nm
$Ph_3\ \overset{\ominus}{B}{\bullet}n\text{-}C_4H_9$
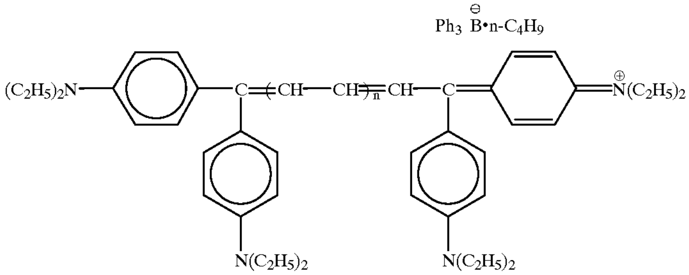
$Ph_3\ \overset{\ominus}{B}{\bullet}n\text{-}C_4H_9$
| compound | n | λmax |
|---|---|---|
| 89 | 1 | 820 nm |
| 90 | 2 | 911 nm |

-continued compound 91

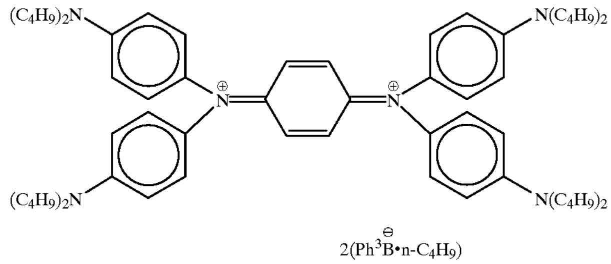

1090 nm compound 92

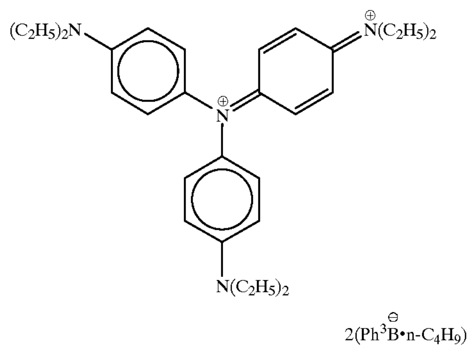

920 nm compound 93

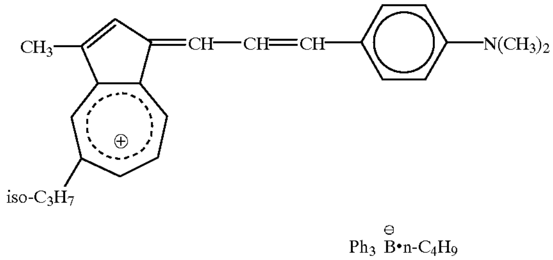

720 nm

The compound of the general formula (1) can be synthesized according to the teaching of JP-A 150069/1995 and 150070/1995. Alternatively, the compound of formula (1) can be obtained by separately adding the compounds of formulae (2) and (3) to photosensitive material. Further, the compound of formula (3) may be added to the compound of formula (1).

Other examples of the photo-decolorizable dye are combinations of a photoacid generator and a dye capable of decolorizing at low pH as described in JP-A 68831/1982.

The thermal and/or optical decolorizable dye may be added in any desired amount. Preferably the dye is used in such amounts that the optical density is in excess of 0.2, more preferably 0.5 to 2 as measured at the intended wavelength. The amount of the dye added is about 0.01 to 1 g/$m^2$ although the amount varies with a molecular extinction coefficient. Where the above-mentioned bleaching agent is used together, it may be added in addition to the amount of the dye. In general, the bleaching agent is used in at least an equimolar amount to the amount of the dye added, for example, in an excess amount of 3 times on a molar basis.

In the practice of the invention, hetero-aromatic mercapto compounds of the following general formula (I), which are included in the aforementioned mercapto compounds and have been described, are ultra-sensitizing agents useful for a photothermographic material comprising a silver halide spectrally sensitized at 600 to 850 nm and become more effective when combined with the hydrazine derivatives of the general formulae (Hb) and (Hc).

$$\text{Ar—SM} \qquad \text{(I)}$$

In formula (I), M is hydrogen or an alkali metal atom and Ar is an aromatic ring or fused aromatic ring having at least one of nitrogen, sulfur, oxygen, selenium and tellurium atoms. Preferred examples of the hetero-aromatic ring include benzimidazole, naphthoimidazole, benzothiazole, naphthothiazole, benzoxazole, naphthoxazole, benzoselenazole, benzotellurazole, imidazole, oxazole, pyrazole, triazole, thiadiazole, tetrazole, triazine, pyrimidine, pyridazine, pyrazine, pyridine, purine, quinoline and quinazolinone. These hetero-aromatic rings may have a substituent selected from halogen, hydroxy, amine, carboxy, alkyl and alkoxy.

Illustrative non-limiting examples of the mercapto compound of formula (I) are given below.

| | |
|---|---|
| I-1 | 2-mercapto-5-methylbenzimidazole |
| I-2 | 2-mercaptobenzoxazole |
| I-3 | 2-mercaptobenzimidazole |
| I-4 | 2-mercaptobenzothiazole |
| I-5 | 3-mercapto-1,2,4-triazole |
| I-6 | 4,5-diphenyl-2-imidazolethiol |
| I-7 | 6-ethoxy-2-mercaptobenzothiazole |
| I-8 | 2,2-dithiobis(benzothiazole) |
| I-9 | 2-mercaptoquinoline |
| I-10 | 8-mercaptopurine |
| I-11 | 2-mercaptoimidazole |
| I-12 | 1-ethyl-2-mercaptobenzimidazole |
| I-13 | 2-mercapto-4(3H)-quinazolinone |
| I-14 | 2,3,5,6-tetrachloro-4-pyridinethiol |
| I-15 | 7-trifluoromethyl-4-quinolinethiol |
| I-16 | 2-amino-5-mercapto-1,3,4-thiadiazole |
| I-17 | 3-amino-5-mercapto-1,2,4-triazole |
| I-18 | 4-amino-6-hydroxy-2-mercaptopyrimidine monohydrate |
| I-19 | 2-mercapto-4-methylpyrimidine hydrochloride |
| I-20 | 3-mercapto-5-phenyl-1,2,4-triazole |
| I-21 | 2-mercapto-4-phenyloxazole |
| I-22 | 2-mercaptopyrimidine |
| I-23 | 4-hydroxy-2-mercaptopyrimidine |
| I-24 | 4,6-diamino-2-mercaptopyrimidine |

These mercapto compounds are used in amounts of 0.001 to 1.0 mol, preferably 0.01 to 0.5 mol per mol of silver in a ultra-sensitized emulsion layer.

It is sometimes advantageous to use an additive known as a "toner" for improving images in addition to the above-mentioned components. The toner is used in an amount of 0.1 to 10% by weight of the entire silver-holding components. The toners are compounds well known in the photographic art as described in U.S. Pat. Nos. 3,080,254, 3,847,612 and 4,123,282.

Exemplary toners include imides such as phthalimide and N-hydroxyphthalimide; cyclic imides such as succinimide, pyrazolin-5-one, quinazolinone, 3-phenyl-2-pyrazoline-5-one, 1-phenylurazol, quinazoline and 2,4-thiazolizinedione; naphthalimides such as N-hydroxy-1,8-naphthalimide; cobalt complexes such as cobalt hexamine trifluoroacetate; mercaptans such as 3-mercapto-1,2,4-triazole, 2,4-dimercaptopyrimidine, 3-mercapto-4,5-diphenyl-1,2,4-triazole and 2,5-dimercapto-1,3,4-thiadiazole; N-(aminomethyl)-aryldicarboxyimides such as N,N-(dimethylaminomethyl)phthalimide and N,N-(dimethylaminomethyl)naphthalene-2,3-dicarboxyimide; a blocked pyrazole, an isothiuronium derivative and a certain photo-fading agent such as N,N'-hexamethylenebis(1-carbamoyl-3,5-dimethylpyrazole), 1,8-(3,6-diazaoctane)bis(isothiuroniumtrifluoroacetate) and 2-tribromomethylsulfonyl-benzothiazole; 3-ethyl-5-[(3-ethyl-2-benzothiazolinylidene)-1-methylethylidene]-2-thio-2,4-oxazolidinedione; phthalazinone, phthalazinone derivatives or metal salts thereof such as 4-(1-naphthyl)phthalazinone, 6-chlorophthalazinone, 5,7-dimethyloxyphthalazinone and 2,3-dihydro-1,4-phthalazinedione; combinations of phthalazinones with phthalic acid derivatives (e.g., phthalic acid, 4-methylphthalic acid, 4-nitrophthalic acid and tetrachlorophthalic anhydride); phthalazine, phthalazine derivatives or metal salts such as 4-(1-naphthyl)phthalazine, 6-chlorophthalazine, 5,7-dimethoxyphthalazine and 2,3-dihydrophthalazine; combinations of phthalazine with phthalic acid derivatives (e.g., phthalic acid, 4-methylphthalic acid, 4-nitrophthalic acid and tetrachlorophthalic anhydride); quinazolinedione, benzoxazine, and naphthoxazine derivatives; rhodium complexes which function not only as a toner, but also a halide ion source for forming silver halide in situ, for example, ammonium hexachlororhodate-(III), rhodium bromide, rhodium nitrate and potassium hexachlororhodate(III); inorganic peroxides and persulfates such as ammonium peroxydisulfide and hydrogen peroxide; benzoxazine-2,4-diones such as 1,3-benzoxazine-2,4-dione, 8-methyl-1,3-benzoxazine-2,4-dione and 6-nitro-1,3-benzoxazine-2,4-dione; pyrimidine and asym-triazines such as 2,4-dihydroxypyrimidine and 2-hydroxy-4-aminopyrimidine; azauracil and tetraazapentalene derivatives such as 3,6-dimercapto-1,4-diphenyl-1H,4H-2,3a,5,6a-tetraazapentalene and 1,4-di(o-chlorophenyl)-3,6-dimercapto-1H, 4H-2,3a, 5,6a-tetraazapentalene.

With antifoggants, stabilizers and stabilizer precursors, the silver halide emulsion and/or organic silver salt according to the invention can be further protected against formation of additional fog and stabilized against lowering of sensitivity during shelf storage. Suitable antifoggants, stabilizers and stabilizer precursors which can be used alone or in combination include thiazonium salts as described in U.S. Pat. Nos. 2,131,038 and 2,694,716, azaindenes as described in U.S. Pat. Nos. 2,886,437 and 2,444,605, mercury salts as described in U.S. Pat. No. 2,728,663, urazoles as described in U.S. Pat. No. 3,287,135, sulfocatechols as described in U.S. Pat. No. 3,235,652, oximes, nitrons and nitroindazoles as described in UKP 623,448, polyvalent metal salts as described in U.S. Pat. No. 2,839,405, thiuronium salts as described in U.S. Pat. No. 3,220,839, palladium, platinum and gold salts as described in U.S. Pat. Nos. 2,566,263 and 2,597,915, halogen-substituted organic compounds as described in U.S. Pat. No. 4,108,665 and 4,442,202, triazines as described in U.S. Pat. Nos. 4,128,557, 4,137,079, 4,138,365 and 4,459,350, and phosphorus compounds as described in U.S. Pat. No. 4,411,985.

Especially preferred antifoggants used herein are compounds as disclosed in U.S. Pat. Nos. 3,874,946 and 4,756,999 and heterocyclic compounds having at least one substituent represented by —C($X^1$) ($X^2$) ($X^3$) wherein $X^1$ and $X^2$ are halogen atoms such as F, Cl, Br, and I, and $X^3$ is hydrogen or halogen. Preferred examples of the heterocyclic compound are shown below.

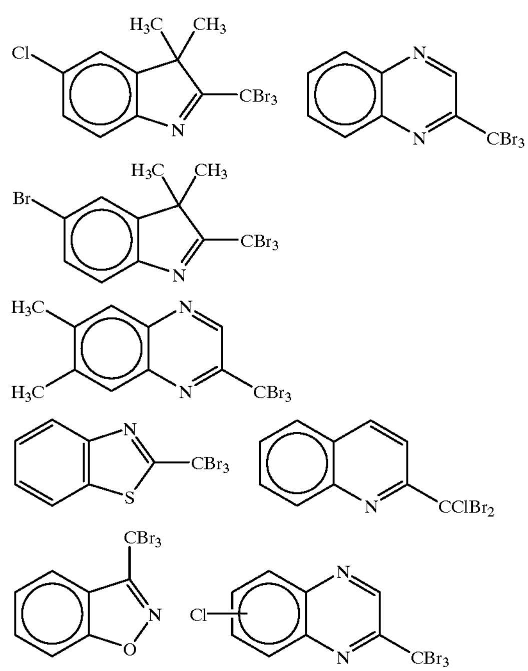

-continued

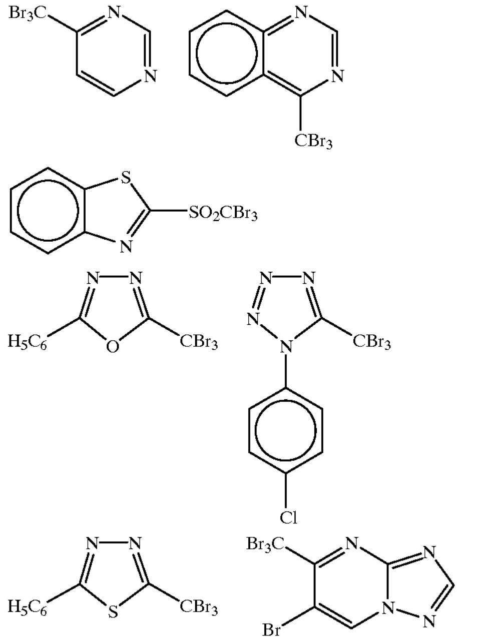

More preferred antifoggants are the heterocyclic compounds disclosed in U.S. Pat. No. 5,028,523, British Patent Application Nos. 92221383.4, 9300147.7 and 9311790.1.

In the photosensitive layer, polyhydric alcohols (e.g., glycerin and diols as described in U.S. Pat. No. 2,960,404), fatty acids and esters thereof as described in U.S. Pat. Nos. 2,588,765 and 3,121,060, and silicone resins as described in UKP 955,061 may be added as a plasticizer and lubricant.

According to the invention, a hardener may be used in various layers including a photosensitive layer, protective layer, and back layer. Examples of the hardener include polyisocyanates as described in U.S. Pat. No. 4,281,060 and JP-A 208193/1994, epoxy compounds as described in U.S. Pat. No. 4,791,042, and vinyl sulfones as described in JP-A 89048/1987.

In the practice of the invention, a surfactant may be used for the purposes of improving coating and electric charging properties. The surfactant used herein may be nonionic, anionic or cationic or a fluorinated one. Examples include fluorinated polymer surfactants as described in JP-A 170950/1987 and U.S. Pat. No. 5,382,504, fluorinated surfactants as described in JP-A 244945/1985 and 188135/1988, polysiloxane surfactants as described in U.S. Pat. No. 3,885,965, and polyalkylene oxide and anionic surfactants as described in JP-A 301140/1994.

A surface protective layer may be provided in the photosensitive material according to the present invention for the purpose of preventing adhesion of an image forming layer. The surface protective layer may be formed of any adhesion-preventing material. Examples of the adhesion-preventing material include wax, silica particles, styrene-containing elastomeric block copolymers (e.g., styrene-butadiene-styrene and styrene-isoprene-styrene), cellulose acetate, cellulose acetate butyrate, cellulose propionate and mixtures thereof.

In the emulsion layer or a protective layer therefor according to the invention, there may be used matte agents, for example, starch, titanium dioxide, zinc oxide, and silica as well as polymer beads including beads of the type described in U.S. Pat. Nos. 2,992,101 and 2,701,245. The emulsion surface may have any degree of matte insofar as no star dust failures occur although a Bekk smoothness of 1,000 to 10,000 seconds, especially 2,000 to 10,000 seconds is preferred.

The emulsion layer is based on a binder. Exemplary binders are naturally occurring polymers and synthetic resins, for example, gelatin, polyvinyl alcohol, polyvinyl acetal, polyvinyl chloride, polyvinyl acetate, cellulose acetate, polyolefins, polyesters, polystyrene, polyacrylonitrile, and polycarbonate. Of course, copolymers and terpolymers are included. Preferred polymers are polyvinyl butyral, butylethyl cellulose, methacrylate copolymers, maleic anhydride ester copolymers, polystyrene and butadiene-styrene copolymers. These polymers may be used alone or in admixture of two or more as desired. The polymer is used in such a range that it may effectively function as a binder to hold various components. The effective range may be properly determined by those skilled in the art without undue experimentation. Taken at least as a measure for holding the organic silver salt in the film, the weight ratio of the binder to the organic silver salt is preferably in the range of from 15:1 to 1:2, more preferably from 8:1 to 1:1.

In the photothermographic material of the invention, a dye may be contained for the purpose of preventing halation, irradiation, and safe light fogging.

For an Ar laser (488 nm), He—Ne laser (633 nm), and red semiconductor laser (670 nm), a dye is preferably added so as to provide an absorbance of more than 0.2, more preferably at least 0.6 at an exposure wavelength in the range of 400 to 750 nm. For an infrared semiconductor laser (780 nm and 830 nm), a dye is preferably added so as to provide an absorbance of more than 0.2, more preferably at least 0.6 at an exposure wavelength in the range of 750 to 1500 nm. The dyes may be used alone or in admixture of two or more. The dye preferably has an absorbance of less than 0.5, more preferably less than 0.2, especially up to 0.1 in the visible region of 300 to 700 nm after heat development.

Where light is used to bleach the decolorizable dye according to the invention, any of well-known light sources such as xenon lamps, halide lamps, fluorescent lamps and incandescent lamps may be employed. The light source should have a wavelength at which the inventive dye can absorb light or contain UV light. Concurrent heating is effective for accelerating the decolorization rate.

In addition to the decolorizable dye according to the invention, any of well-known dyes may be used. Such additional dyes are compounds which have absorption in the desired wavelength range and sufficiently low absorption in the visible region and provide a desired absorbance spectral profile. Exemplary compounds are described in U.S. Pat. No. 5,380,635, JP-A 13295/1995, 68539/1990 (pages 13 to 14), and 24539/1991 (pages 14 to 16).

For anti-halation and anti-irradiation purposes, the dye is preferably added to a photosensitive layer on a support, a light-insensitive layer between the photosensitive layer and the support, or a light-insensitive layer on the support remote from the photosensitive layer. For the purpose of preventing safe light fogging, the dye is preferably added to a protective layer or a light-insensitive layer on the support remote from the photosensitive layer.

The photothermographic material of the present invention is preferably in the form of a one-side photosensitive material having at least one photosensitive layer containing a silver halide emulsion on one surface of a support and a back layer on the other surface thereof.

In the practice of the invention, a matte agent may be added to the one-side photosensitive material for improving feed efficiency. The matte agent used herein is generally a microparticulate water-insoluble organic or inorganic compound. There may be used any desired one of matte agents, for example, well-known matte agents including organic matte agents as described in U.S. Pat. Nos. 1,939,213, 2,701,245, 2,322,037, 3,262,782, 3,539,344, and 3,767,448 and inorganic matte agents as described in U.S. Pat. Nos. 1,260,772, 2,192,241, 3,257,206, 3,370,951, 3,523,022, and 3,769,020. Illustrative examples of the organic compound which can be used as the matte agent are given below; exemplary water-dispersible vinyl polymers include polymethyl acrylate, polymethyl methacrylate, polyacrylonitrile, acrylonitrile-α-methylstyrene copolymers, polystyrene, styrene-divinyl-benzene copolymers, polyvinyl acetate, polyethylene carbonate, and polytetrafluoroethylene; exemplary cellulose derivatives include methyl cellulose, cellulose acetate, and cellulose acetate propionate; exemplary starch derivatives include carboxystarch, carboxynitrophenyl starch, urea-formaldehyde-starch reaction products, gelatin hardened with well-known curing agents, and hardened gelatin which has been coaceruvation hardened into microcapsulated hollow particles. Preferred examples of the inorganic compound which can be used as the matte agent include silicon dioxide, titanium dioxide, magnesium dioxide, aluminum oxide, barium sulfate, calcium carbonate, silver chloride and silver bromide desensitized by a well-known method, glass, and diatomaceous earth. The aforementioned matte agents may be used as a mixture of substances of different types if necessary. The size and shape of the matte agent are not critical. The matte agent of any particle size may be used although matte agents having a particle size of 0.1 μm to 30 μm are preferably used in the practice of the invention. The particle size distribution of the matte agent may be either narrow or wide. Nevertheless, since the haze and surface luster of photosensitive material are largely affected by the matte agent, it is preferred to adjust the particle size, shape and particle size distribution of a matte agent as desired during preparation of the matte agent or by mixing plural matte agents.

In the practice of the invention, the backing layer should preferably have a degree of matte as expressed by a Bekk smoothness of 10 to 250 seconds, more preferably 50 to 180 seconds.

In the photosensitive material of the invention, the matte agent is preferably contained in an outermost surface layer, a layer functioning as an outermost surface layer, a layer close to the outer surface or a layer functioning as a so-called protective layer.

In the practice of the invention, the binder used in the backing layer is preferably transparent or semi-transparent and generally colorless. Exemplary binders are naturally occurring polymers, synthetic resins, polymers and copolymers, and other film-forming media, for example, gelatin, gum arabic, poly(vinyl alcohol), hydroxyethyl cellulose, cellulose acetate, cellulose acetate butyrate, poly (vinyl pyrrolidone), casein, starch, poly(acrylic acid), poly (methyl methacrylate), polyvinyl chloride, poly(methacrylic acid), copoly(styrene-maleic anhydride), copoly(styrene-acrylonitrile), copoly(styrene-butadiene), polyvinyl acetals (e.g., polyvinyl formal and polyvinyl butyral), polyesters, polyurethanes, phenoxy resins, poly(vinylidene chloride), polyepoxides, polycarbonates, poly(vinyl acetate), cellulose esters, and polyamides. The binder may be dispersed in water, organic solvent or emulsion to form a dispersion which is coated to form a layer.

A backside resistive heating layer as described in U.S. Pat. Nos. 4,460,681 and 4,374,921 may be used in a photothermographic image system according to the present invention.

According to the invention, the photothermographic emulsion may be coated on various supports. Typical supports include polyester film, undercoated polyester film, poly(ethylene terephthalate) film, polyethylene naphthalate film, cellulose nitrate film, cellulose ester film, poly(vinyl acetal) film, polycarbonate film and associated or resinous materials, as well as glass, paper and metals. Often used are flexible substrates, typically paper supports, specifically baryta paper and paper supports coated with partially acetylated α-olefin polymers, especially polymers of α-olefins having 2 to 10 carbon atoms such as polyethylene, polypropylene, and ethylene-butene copolymers. Also useful are metal laminated and metallized paper and plastic film. The support may be either transparent or opaque, preferably transparent.

When plastic film is passed through a photothermographic processor, the film experiences dimensional shrinkage or expansion. When the photosensitive material is intended for printing purposes, this dimensional shrinkage or expansion gives rise to a serious problem for precision multi-color printing. Therefore, the invention favors the use of a film experiencing a minimal dimensional change. Exemplary materials are styrene polymers having a syndiotactic structure and heat-treated polyethylene. Also useful are materials having a high glass transition temperature, for example, polyether ethyl ketone, polystyrene, polysulfone, polyether sulfone, and polyarylate.

The photosensitive material of the invention may have an antistatic or electroconductive layer, for example, a layer containing soluble salts (e.g., chlorides and nitrates), a metallized layer, or a layer containing ionic polymers as described in U.S. Pat. Nos. 2,861,056 and 3,206,312 or insoluble inorganic salts as described in U.S. Pat. No. 3,428,451.

A method for producing color images using the photothermographic material of the invention is as described in JP-A 13295/1995, page 10, left column, line 43 to page 11, left column, line 40. Stabilizers for color dye images are exemplified in UKP 1,326,889, U.S. Pat. Nos. 3,432,300, 3,698,909, 3,574,627, 3,573,050, 3,764,337, and 4,042,394.

In the practice of the invention, the photothermographic emulsion can be coated by various coating procedures including dip coating, air knife coating, flow coating, and extrusion coating using a hopper of the type described in U.S. Pat. No. 2,681,294. If desired, two or more layers may be concurrently coated by the methods described in U.S. Pat. No. 2,761,791 and UKP 837,095.

In the photothermographic material of the invention, there may be contained additional layers, for example, a dye accepting layer for accepting a mobile dye image, an opacifying layer when reflection printing is desired, a protective topcoat layer, and a primer layer well known in the photothermographic art. The photosensitive material of the invention is preferably such that only a single sheet of the photosensitive material can form an image. That is, it is preferred that a functional layer necessary to form an image such as an image receiving layer does not constitute a separate photosensitive material.

IR Absorbing Dye

In one preferred embodiment, an infrared (IR) absorbing dye is contained in a photosensitive material for detecting the photosensitive material.

The IR absorbing dye used herein should have an absorption spectrum in which an absorption maximum appears at a wavelength of 850 to 1,400 nm. Specifically, at least one of the following compounds is used as the IR absorbing dye.

(1) Dyes of the Following General Formulae (F1) and (F2)

$A_1{=}L_a{-}A_2$ (F1)

$B_1{=}L_b{-}B_2(X^-)_{k-1}$ (F2)

$A_1$ and $A_2$ each are an acidic nucleus, $B_1$ is a basic nucleus, $B_2$ is an onium form of basic nucleus, $L_a$ and $L_b$ each are a linking group having 5, 7, 9 or 11 methine groups connected through a conjugated double bond, X is an anion, and letter k is equal to 2 or 1. Where the dye forms an intramolecular salt, k is 1.

Preferably the IR absorbing dye is present in a photosensitive material in such a state that the material may have an absorption spectrum shifted at least 50 nm longer than the absorption maximum wavelength of a solution of the dye.

(2) Lake Cyanine Dyes of the Following General Formula (F3)

$D{-}A_m{\cdot}Y_n$ (F3)

D is a skeleton of the cyanine dye represented by the following general formula (F4), A is an anionic dissociatable group attached to D as a substituent, Y is a cation, letter m is an integer of 2 to 5, and n is an integer of 1 to 5 for balancing the electric charge.

(F4)

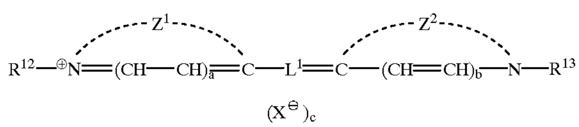

$Z^1$ and $Z^2$ each are a group of non-metallic atoms necessary to form a five- or six-membered nitrogenous heterocycle which may have a ring fused thereto, $R^{12}$ and $R^{13}$ each are an alkyl, alkenyl or aralkyl group, $L^1$ is a linking group having 5, 7 or 9 methine groups connected through a conjugated double bond, and letters a, b and c each are 0 or 1.

The general formulae (F1) and (F2) are described in detail.

The acidic nucleus represented by $A_1$ and $A_2$ is preferably a cyclic ketomethylene compound or a compound having electron attractive groups separated by a methylene group. Preferred are cyclic ketomethylene compounds such as 2-pyrazoline-5-one, isooxazolone, barbituric acid, thiobarbituric acid, pyridone, and dioxopyrazolopyridine, with the dioxopyrazolopyridine being most preferred.

The basic nucleus represented by $B_1$ is a five- or six-membered nitrogenous heterocycle which may have a ring fused thereto, for example, oxazole, isooxazole, benzoxazole, naphthoxazole, thiazole, benzothiazole, naphthothiazole, indolenine, benzindolenine, imidazole, benzimidazole, naphthoimidazole, quinoline, pyridine, benzoselenazole, pyrrolopyridine, furopyrrole, indolidine, quinoxaline, and imidazoquinoxaline rings. Preferred are five-membered nitrogenous heterocycles having a benzene or naphthalene ring fused thereto. Indolenine rings are most preferred.

These rings may have a substituent. Exemplary substituents include lower alkyl (e.g., methyl and ethyl), alkoxy (e.g., methoxy and ethoxy), phenoxy (e.g., unsubstituted phenoxy and p-chlorophenoxy), halogen atoms (e.g., Cl, Br and F), alkoxycarbonyl (e.g., ethoxycarbonyl), cyano, nitro and dissociatable groups. The dissociatable groups include carboxyl, phenolic hydroxyl, sulfonamide and sulfamoyl groups. The dissociatable group may form a lake with a cation. Among the lake forming cations, inorganic ones include alkaline earth metal cations such as $Mg^{2+}$, $Ca^{2+}$, $Ba^{2+}$ and $Sr^{2+}$, transition metal cations such as $Ag^+$ and $Zn^{2+}$, and $A_{3+}$, and organic ones include ammonium, amidinium and guanidium cations having 4 to 10 carbon atoms. Divalent and trivalent cations are preferred.

$B_2$ is an onium form of basic nucleus, for example, onium forms of the basic nuclei exemplified for $B_1$.

The methine group included in each of $L_a$ and $L_b$ may have a substituent while the substituents on $L_a$ and $L_b$ may be connected together to form a five- or six-membered ring (e.g., cyclopentene and cyclohexene). Preferably, $L_a$ is a linking group having 5 methine groups connected through a conjugated double bond, and $L_b$ is a linking group having 7 methine groups connected through a conjugated double bond.

The anions represented by $X^-$ include halide ions (e.g., Cl, Br and I), p-toluenesulfonate ion, ethylsulfate ion, $PF_6^-$, $BF_4^-$, and $ClO_4^-$. The anion represented by $X^-$ may form a lake. Such anions are exemplified by phosphomolybdate, phosphotungstate, and silicomolybdate anions.

Illustrative non-limiting examples of the dye of formulae (F-1) and (F-2) are given below.

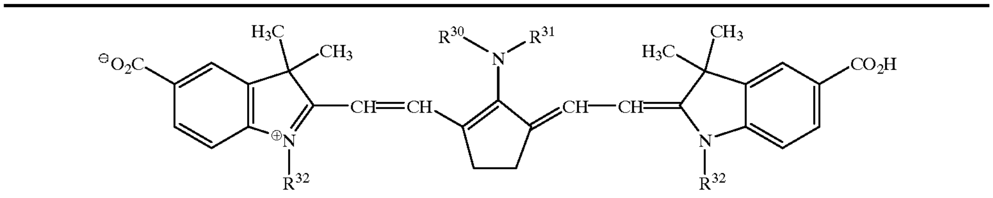

| compound | $R^{30}$ | $R^{31}$ | $R^{32}$ |
|---|---|---|---|
| (1) | phenyl | phenyl | $CH_3$ |
| (2) | 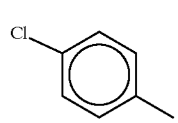 | 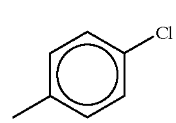 | $CH_3$ |
| (3) | phenyl | $CH_3$ | $CH_3$ |

-continued
| | | | |
|---|---|---|---|
| (4) | 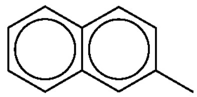 | $C_2H_5$ | $C_2H_5$ |
| (5) | $CH_3$ | phenyl | n-$C_4H_9$ |
| (6) | 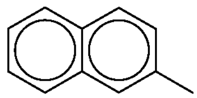 | 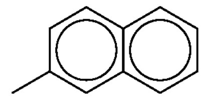 | $CH_3$ |
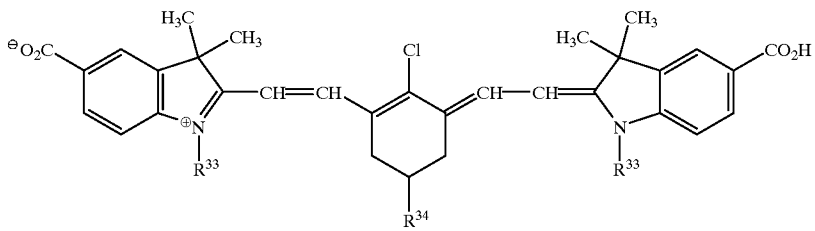
| compound | $R^{33}$ | $R^{34}$ |
|---|---|---|
| (7) | n-$C_4H_9$ | $CH_3$ |
| (8) | n-$C_4H_9$ | t-$C_4H_9$ |
| (9) | n-$C_4H_9$ | phenyl |
| (10) | $C_3H_7$ | phenyl |
| (11) | n-$C_6H_{13}$ | t-$C_4H_9$ |
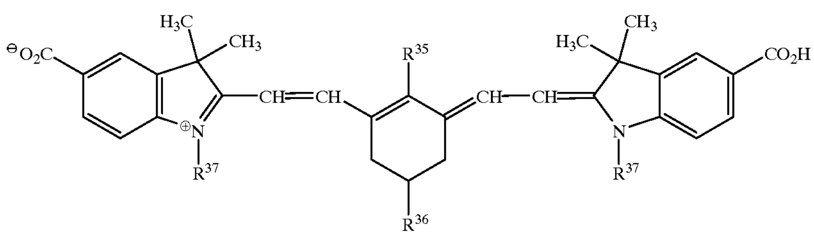
| compound | $R^{35}$ | $R^{36}$ | $R^{37}$ |
|---|---|---|---|
| (12) | 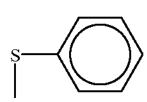 | $CH_3$ | $CH_3$ |
| (13) | 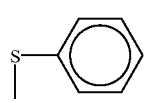 | t-$C_4H_9$ | $CH_3$ |
| (14) | 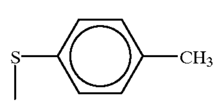 | phenyl | $CH_3$ |
| (15) | 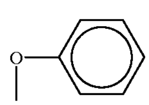 | t-$C_4H_9$ | $CH_3$ |
| (16) | 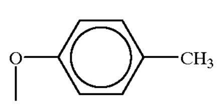 | phenyl | $CH_3$ |

-continued
| | | | |
|---|---|---|---|
| (17) | 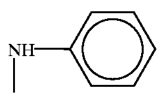 | t-$C_4H_9$ | $CH_3$ |
| (18) | 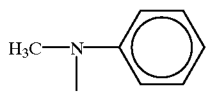 | t-$C_4H_9$ | $CH_3$ |
| (19) | phenyl | H | $C_4H_9$ |
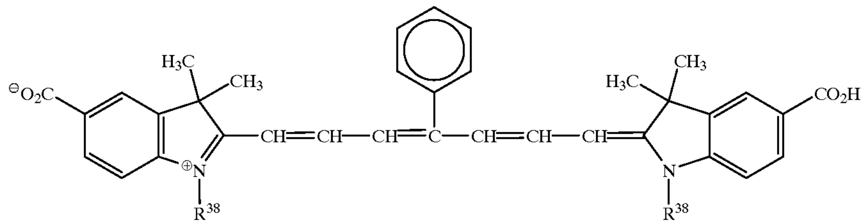
| compound | $R^{38}$ | compound | $R^{38}$ |
|---|---|---|---|
| (20) | $CH_3$ | (21) | $C_2H_5$ |
| (22) | n-$C_3H_7$ | (23) | n-$C_4H_9$ |
| (24) | n-$C_5H_{11}$ | (25) | n-$C_6H_{13}$ |
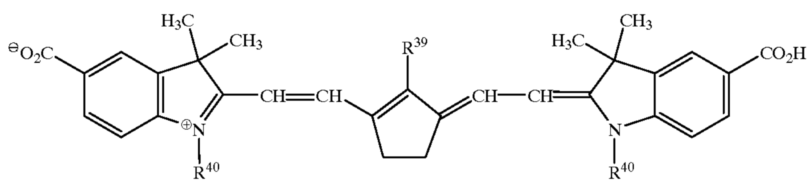
| compound | $R^{39}$ | $R^{40}$ |
|---|---|---|
| (26) | 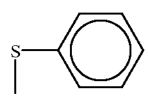 | n-$C_4H_9$ |
| (27) | 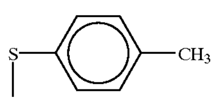 | n-$C_4H_9$ |
| (28) | 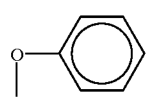 | n-$C_4H_9$ |
| (29) | 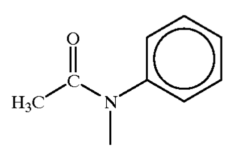 | $CH_3$ |
| (30) | 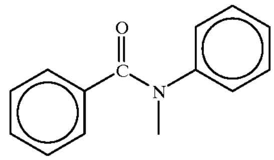 | $CH_3$ |

-continued
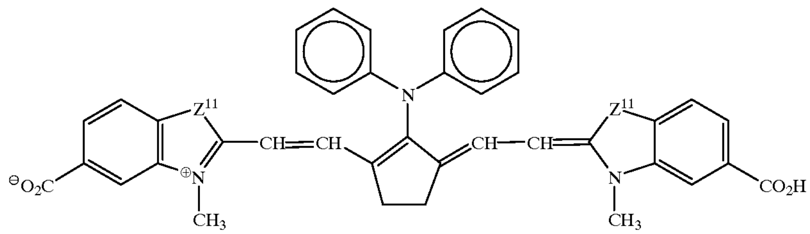
| compound | $Z^{11}$ | compound | $Z^{11}$ | compound | $Z^{11}$ |
|---|---|---|---|---|---|
| (31) | O | (32) | S | (33) | N—$CH_3$ |
| (34) | | | | | |
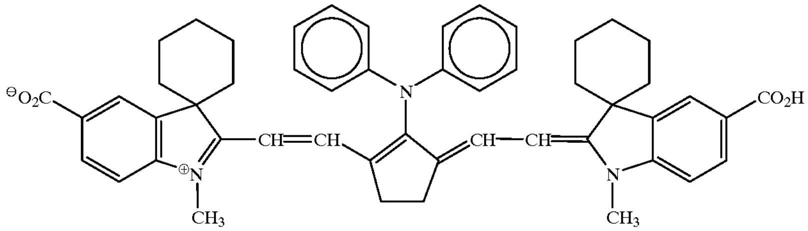
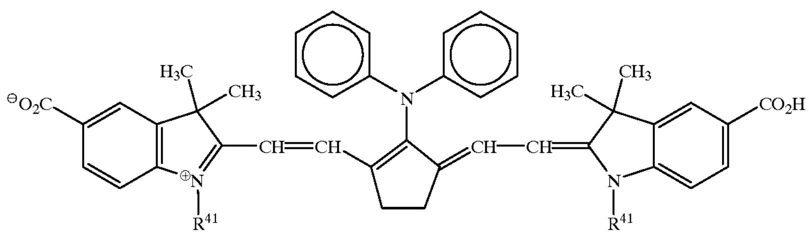
| compound | $R^{41}$ | compound | $R^{41}$ |
|---|---|---|---|
| (35) | $CH_2$—CH=$CH_2$ | (36) | 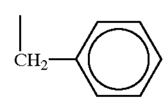 |
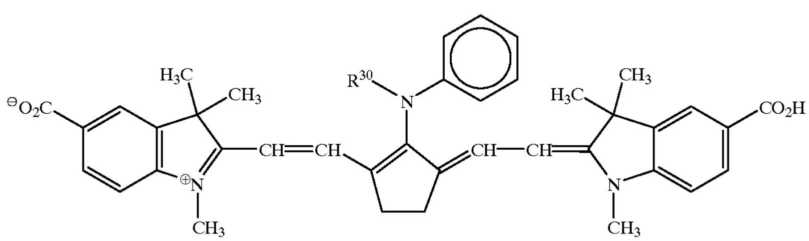
| compound | $R^{42}$ | compound | $R^{42}$ |
|---|---|---|---|
| (37) | $H_3C$—$SO_2$— | (38) | 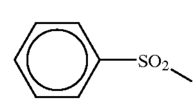 |

-continued
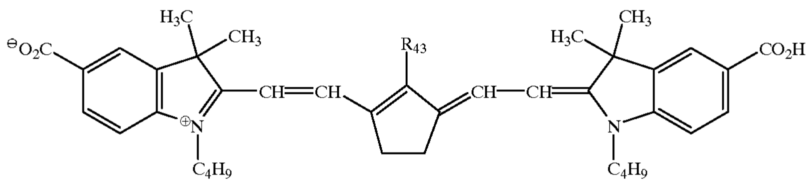
| compound | $R^{43}$ | compound | $R^{43}$ |
|---|---|---|---|
| (39) | 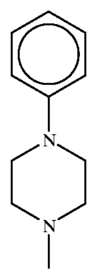 | (40) | 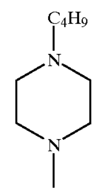 |
| (41) | 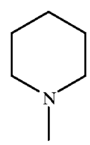 | (42) | Cl |
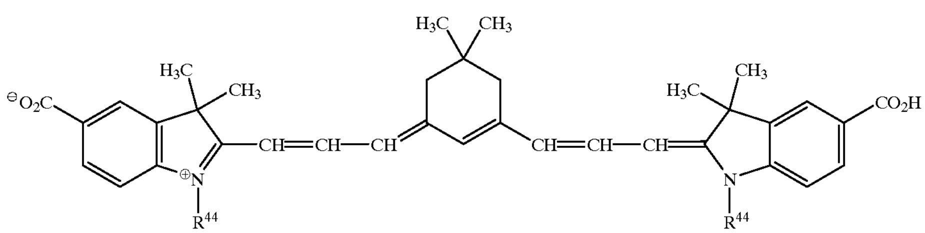
| compound | $R^{44}$ | compound | $R^{44}$ |
|---|---|---|---|
| (43) | $CH_3$ | (44) | $C_2H_5$ |
| (45) | n-$C_3H_7$ | (46) | n-$C_4H_9$ |
| (47) | $CH_2CH_2-CONH_2$ | (48) | 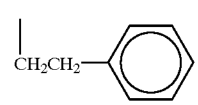 |
| (49) | $CH_2-CH=CH_2$ | (50) | 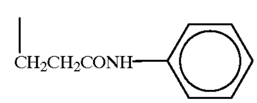 |
| (51) | 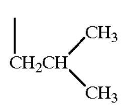 | (52) | 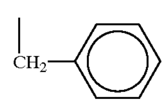 |

-continued
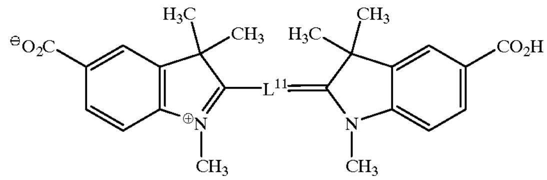
| compound | $L^{11}$ |
|---|---|
| (53) | 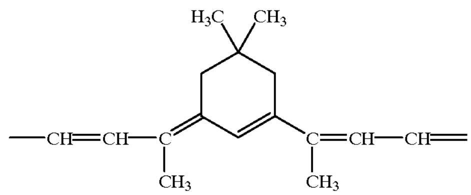 |
| (54) | 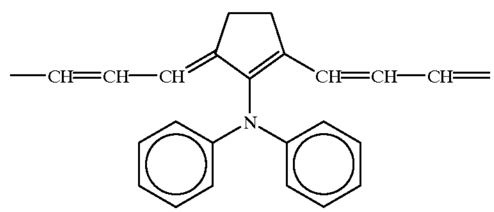 |
| (55) | 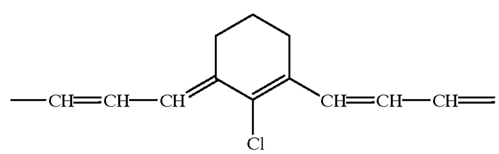 |
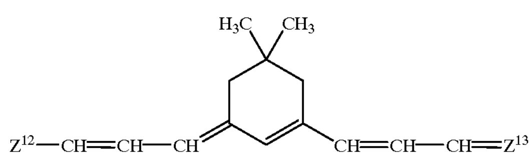
| compound | $Z^{12}$ | $Z^{13}$ |
|---|---|---|
| (56) | 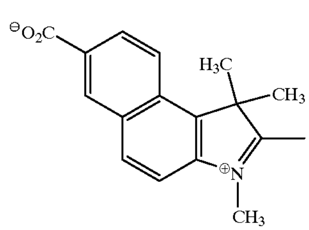 | 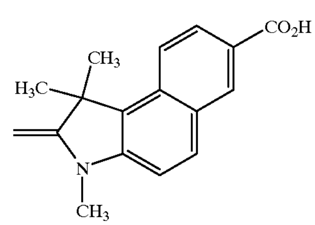 |
| (57) | 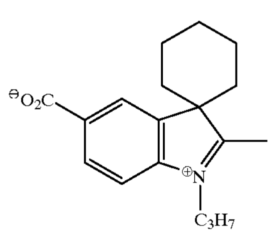 | 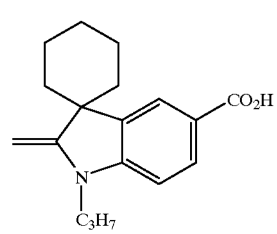 |

-continued
(58)
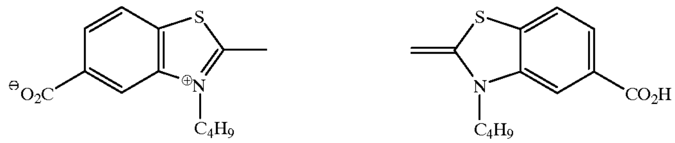
(59)
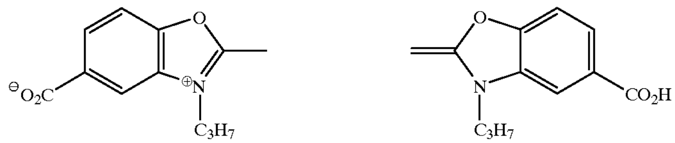
(60)
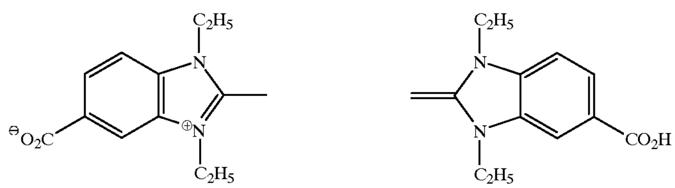
(61)
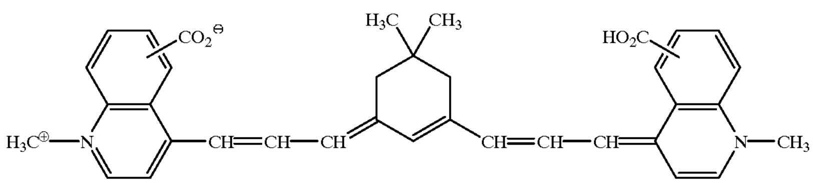
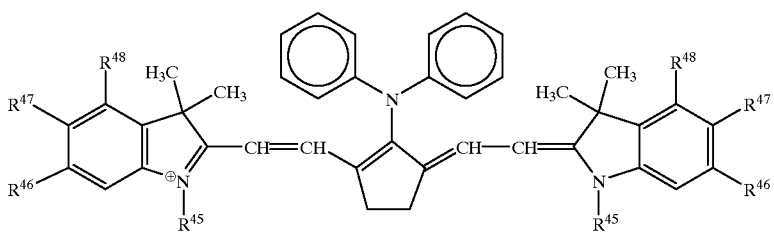
| compound | $R^{45}$ | $R^{46}$ | $R^{47}$ | $R^{48}$ |
|---|---|---|---|---|
| (62) | $CH_3$ | H | H | H |
| (63) | $CH_3$ | H | Cl | H |
| (64) | $CH_3$ | H | $OCH_3$ | H |
| (65) | $CH_3$ | H | CN | H |
| (66) | $CH_3$ | H | $CO_2C_2H_5$ | H |
| (67) | $CH_3$ | H | $NO_2$ | H |
| (68) | $CH_3$ | H | $CH_3$ | H |
| (69) | $CH_3$ | H | Cl | Cl |
| (70) | $CH_3$ | Cl | H | Cl |
| (71) | $C_2H_5$ | H | Cl | H |
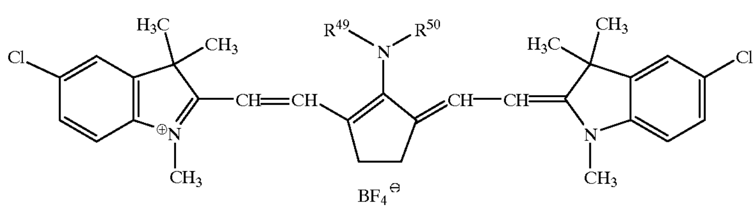
| compound | $R^{49}$ | $R^{50}$ |
|---|---|---|
| (72) | $CH_3$ | phenyl |
| (73) | $C_2H_5$ | phenyl |

-continued
| | | |
|---|---|---|
| (74) | 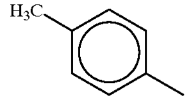 | 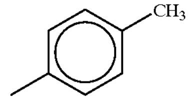 |
| (75) | 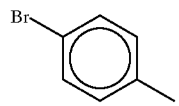 | 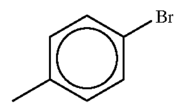 |
| (76) | 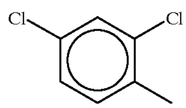 | 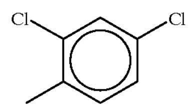 |
| (77) | 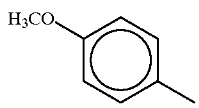 | 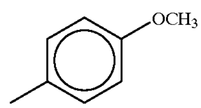 |
| (78) | 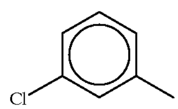 | 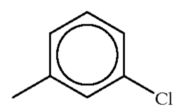 |
| (79) | $CH_3$ | $CH_3$ |
| (80) | $C_2H_5$ | $C_2H_5$ |
| (81) | 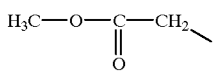 | 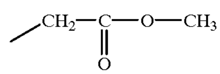 |
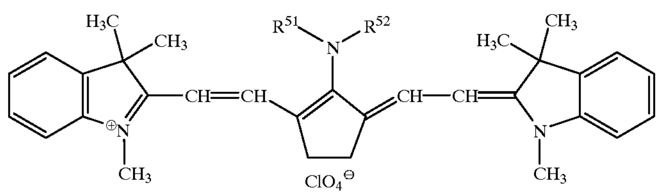
| compound | $R^{51}$ | $R^{52}$ |
|---|---|---|
| (82) | phenyl | 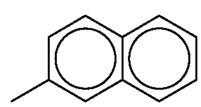 |
| (83) | phenyl | 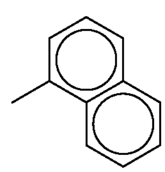 |
| (84) | 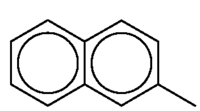 | 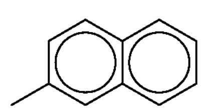 |
| (85) | $CH_3$ | 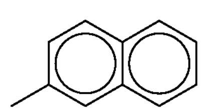 |

-continued
| | | |
|---|---|---|
| (86) | $C_4H_9$ | 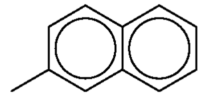 |
| (87) | phenyl | $-SO_2-CH_3$ |
| (88) | phenyl | $-C(=O)-CH_3$ |
| (89) | phenyl | H |
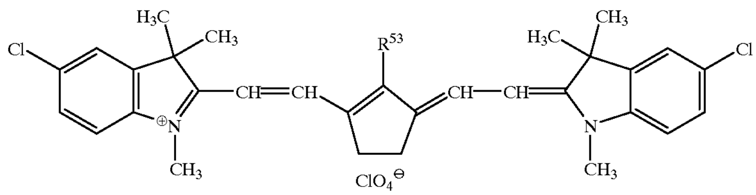
| compound | $R^{53}$ | compound | $R^{53}$ |
|---|---|---|---|
| (90) | Cl | (91) | $OCH_3$ |
| (92) | 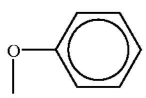 | (93) | 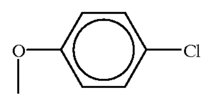 |
| (94) | 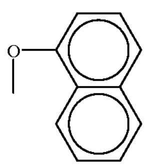 | (95) | 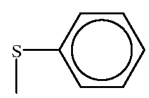 |
| (96) | 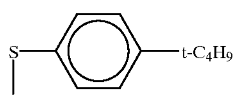 | (97) | 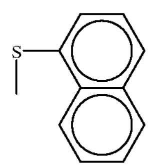 |
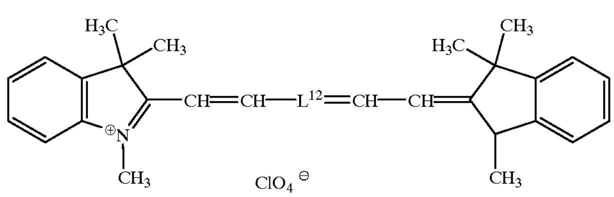
| compound | $L^{12}$ | compound | $L^{12}$ |
|---|---|---|---|
| (98) | 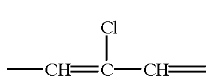 | (99) | 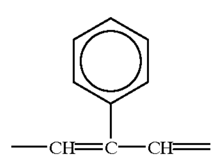 |

-continued
| | | | |
|---|---|---|---|
| (100) | 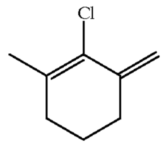 | (101) | 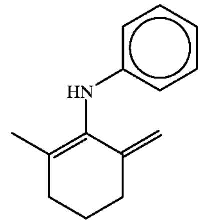 |
| (102) | 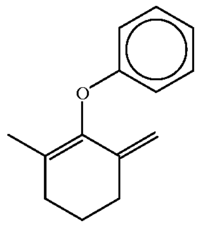 | (103) | 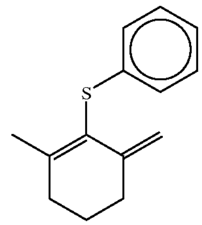 |
| (104) | 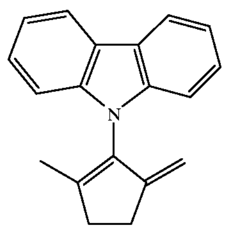 | (105) | 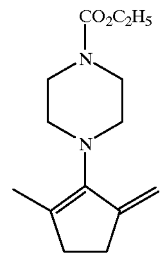 |
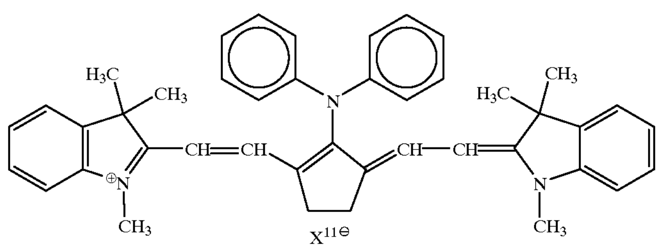
| compound | $X^{11\ominus}$ | compound | $X^{11\ominus}$ |
|---|---|---|---|
| (106) | $ClO_4^{\ominus}$ | (107) | $PF_6^{\ominus}$ |
| (108) | 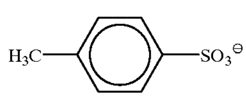 | (109) | $I^{\ominus}$ |
| (110) | $Br^{\ominus}$ | | |
(111)
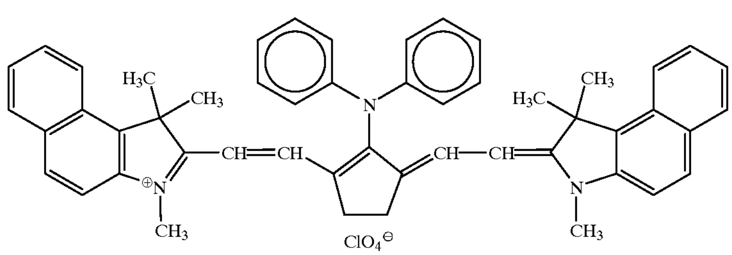

-continued
(112)
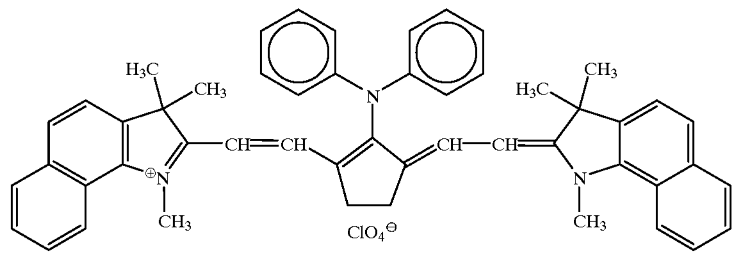
(113)
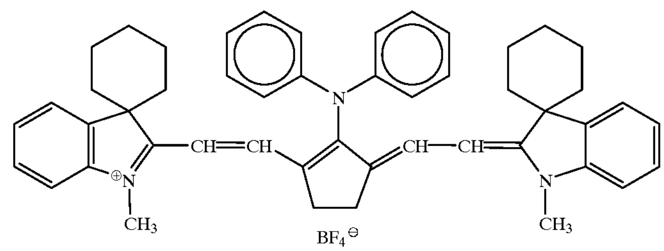
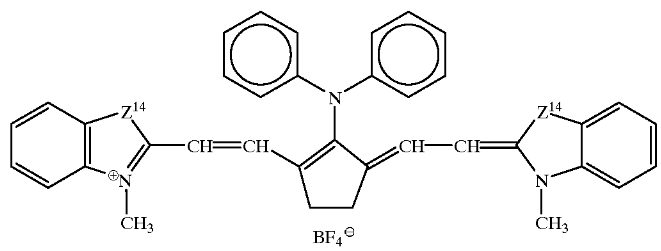
| compound | $Z^{14}$ | compound | $Z^{14}$ | compound | $Z^{14}$ |
|---|---|---|---|---|---|
| (114) | O | (115) | S | (116) | N—$CH_3$ |
(117)
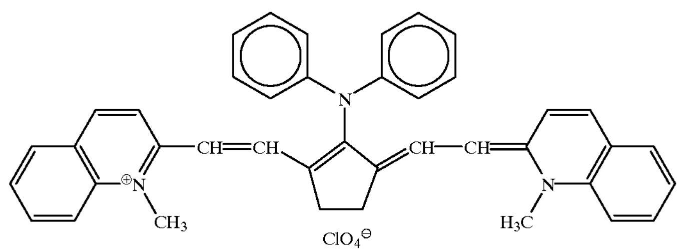
(118)
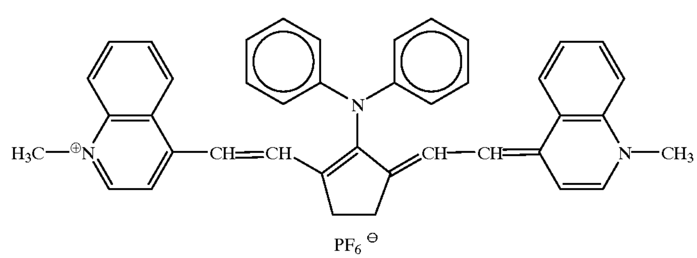

-continued
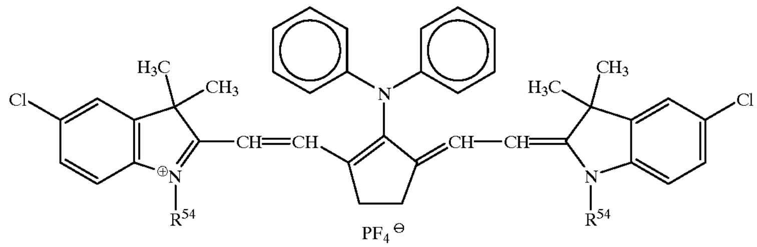
| compound | $R^{54}$ | compound | $R^{54}$ |
|---|---|---|---|
| (119) | 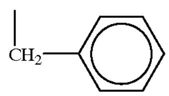 | (120) | 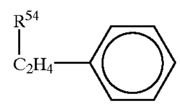 |
| (121) | 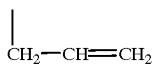 | | |
| (122) | 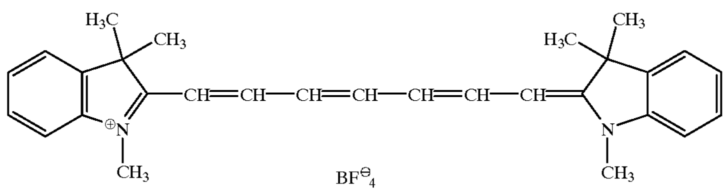 | | |
| (123) | 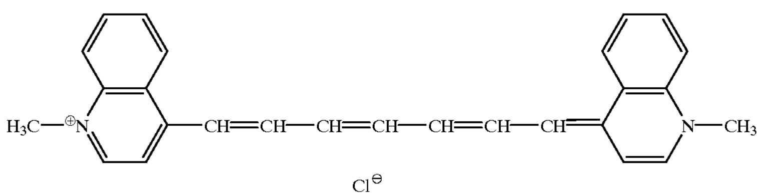 | | |
| (124) | 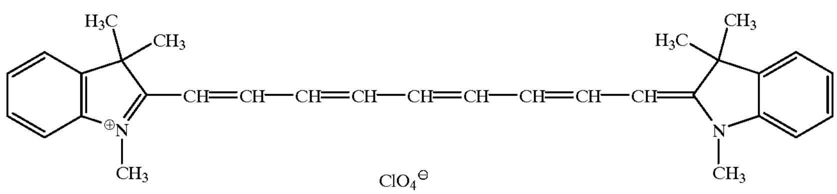 | | |
| (125) | 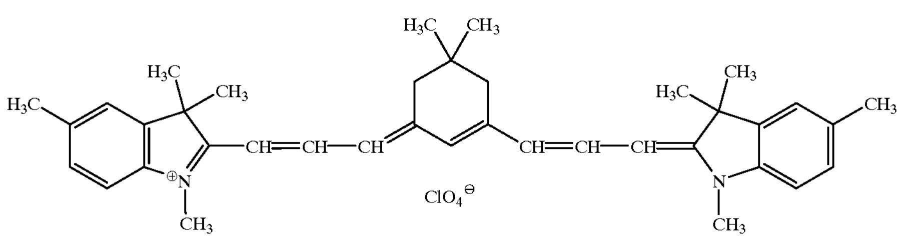 | | |
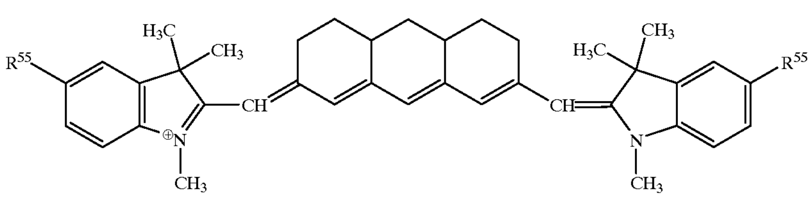

-continued

| compound | $R^{55}$ | compound | $R^{55}$ |
|---|---|---|---|
| (126) | H | (127) | $CO_2H$ |

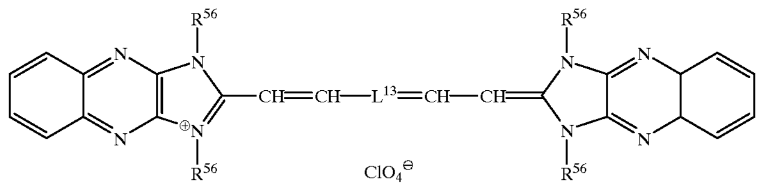

| compound | $R^{56}$ | $L^{13}$ |
|---|---|---|
| (128) | $C_2H_4CO_2H$ | —CH═CH—CH═ |
| (129) | $C_2H_4CO_2H$ | 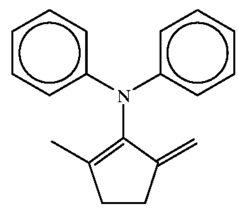 |
| (130) | $C_3H_7$ | 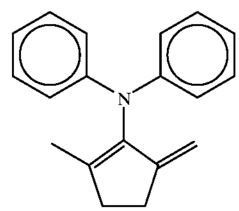 |

The foregoing dyes can be synthesized in accordance with the following Synthesis Examples. Similar synthesis procedures are described in U.S. Pat. Nos. 2,095,854 and 3,671,648, JP-A 123252/1987 and 43583/1994.

Synthesis Example 1

Synthesis of Compound (1)

A mixture of 9.8 grams of 1,2,3,3-tetramethyl-5-carboxyindolenium p-toluenesulfonate, 6 grams of 1-[2,5-bis(anilinomethylene)cyclopentylidene]diphenylanilinium tetrafluoroborate, 100 ml of ethyl alcohol, 5 ml of acetic anhydride, and 10 ml of triethylamine was stirred for one hour at an external temperature of 100° C. The precipitated crystals were collected by filtration and recrystallized from 100 ml of methyl alcohol, obtaining 7.3 grams of compound (1).

mp: ≧270° C.

λmax: 809.1 nm

ϵ: $1.57\times10^5$ (dimethyl sulfoxide)

Synthesis Example 2

Synthesis of Compound (43)

To a mixture of 2 grams of 1,2,3,3-tetramethyl-5-carboxyindolenium p-toluenesulfonate and 10 ml of methyl alcohol were added 1.8 ml of triethylamine and 0.95 gram of N-phenyl[7-phenylamino-3,5-(β,β-dimethyltrimethylene)-heptatrien-2,4,6-ylidene-1]ammonium chloride, and further 2 ml of acetic anhydride. The mixture was stirred for 3 hours at room temperature before 2 ml of water was added. The precipitated crystals were collected by filtration, obtaining 1.1 grams of compound (43).

mp: ≧270° C.

λmax: 855.0 nm

ϵ: $1.69\times10^5$ (methanol)

Synthesis Example 3

Synthesis of Compound (63)

A mixture of 11.4 grams of 1,2,3,3-tetramethyl-5-chloroindolenium p-toluenesulfonate, 7.2 grams of N-(2,5-dianilinomethylenecyclopentylidenediphenylaminium tetrafluoroborate, 100 ml of ethyl alcohol, 6 ml of acetic anhydride, and 12 ml of triethylamine was stirred for one hour at an external temperature of 100° C. The precipitated crystals were collected by filtration and recrystallized from 100 ml of methyl alcohol, obtaining 7.3 grams of compound (63).

mp: ≧250° C.

λmax: 800.8 nm

ϵ: $2.14\times10^5$ (chloroform)

Lake dyes may be formed from the foregoing dyes. Preferred lake dyes are represented by the general formula (F3).

$$D—A_m \cdot Y_n \tag{F3}$$

D is a skeleton of the cyanine dye represented by the following general formula (F4).

(F4)

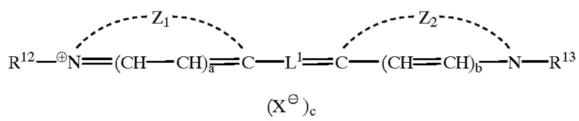

In formula (F4), each of $Z^1$ and $Z^2$ is a group of non-metallic atoms necessary to form a five- or six-membered nitrogenous heterocycle which may have a ring fused thereto. Examples of the nitrogenous heterocycle and fused ring include oxazole, isooxazole, benzoxazole, naphthoxazole, thiazole, benzothiazole, naphthothiazole, indolenine, benzindolenine, imidazole, benzimidazole, naphthoimidazole, quinoline, pyridine, pyrrolopyridine, furopyrrole, indolidine, quinoxaline, and imidazoquinoxaline rings. Among the nitrogenous heterocycles, 5-membered rings are preferable to 6-membered rings. More preferred are 5-membered nitrogenous heterocycles having a benzene or naphthalene ring fused thereto. Indolenine and benzindolenine rings are most preferred.

These rings may have a substituent. Exemplary substituents include alkyl having up to 10 carbon atoms, preferably up to 6 carbon atoms (e.g., methyl, ethyl, propyl, butyl, isobutyl, pentyl and hexyl), alkoxy having up to 10 carbon atoms, preferably up to 6 carbon atoms (e.g., methoxy and ethoxy), aryloxy having up to 20 carbon atoms, preferably up to 12 carbon atoms (e.g., phenoxy and p-chlorophenoxy), halogen atoms (e.g., Cl, Br and F), alkoxycarbonyl having up to 10 carbon atoms, preferably up to 6 carbon atoms (e.g., ethoxycarbonyl), cyano, nitro and carboxyl groups. The carboxyl group may form a salt with the cation or an intramolecular salt with $N^+$. Preferred substituents are chlorine atom (Cl), methoxy, methyl and carboxyl. In the case of a nitrogenous heterocycle having a carboxyl substituent, an outstanding shift of the maximum absorption wavelength toward a longer side occurs when a solid particle dispersion of the dye is formed. An outstanding shift of the maximum absorption wavelength toward a longer side also occurs upon lake formation.

Each of $R^{12}$ and $R^{13}$ in formula (F4) is an alkyl, alkenyl or aralkyl group. Alkyl groups, especially unsubstituted alkyl groups are preferred. More particularly, preferred alkyl groups are those having 1 to 10 carbon atoms, especially 1 to 6 carbon atoms. Exemplary alkyl groups are methyl, ethyl, propyl, butyl, isobutyl, pentyl and hexyl. The alkyl group may have a substituent, examples of which include halogen atoms (e.g., Cl, Br and F), alkoxycarbonyl having up to 10 carbon atoms, especially up to 6 carbon atoms (e.g., methoxycarbonyl and ethoxycarbonyl) and hydroxyl. Preferred alkenyl groups are those having 2 to 10 carbon atoms, especially 2 to 6 carbon atoms. Exemplary alkenyl groups are 2-pentenyl, vinyl, allyl, 2-butenyl and 1-propenyl. The alkenyl group may have a substituent, examples of which include halogen atoms (e.g., Cl, Br and F), alkoxycarbonyl having up to 10 carbon atoms, especially up to 6 carbon atoms (e.g., methoxycarbonyl and ethoxycarbonyl) and hydroxyl. Preferred aralkyl groups are those having 7 to 12 carbon atoms. Exemplary aralkyl groups are benzyl and phenethyl. The aralkyl group may have a substituent, examples of which include halogen atoms (e.g, Cl, Br and F), alkyl having up to 10 carbon atoms, especially up to 6 carbon atoms (e.g., methyl) and alkoxy having up to 10 carbon atoms, especially up to 6 carbon atoms (e.g., methoxy).

In formula (F4), $L^1$ is a linking group having 5, 7 or 9 methine groups connected through a double bond in a conjugated manner. The number of methine groups is preferably 7 (heptamethine compounds) or 9 (nonamethine compounds), with 7 being especially preferred.

The methine group may have a substituent although it is preferred that the substituted methine group be a methine group substituted at the center or meso-position. The substituent on the methine group is described by referring to pentamethines of the following formula L5, heptamethines of the following formula L7, and nonamethines of the following formula L9.

(L5)

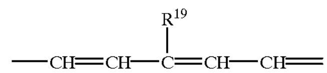

(L7)

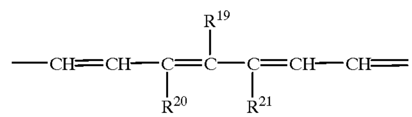

(L9)

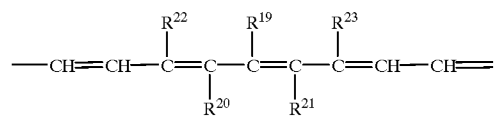

In the formulae, $R^{19}$ is hydrogen, alkyl, halogen, aryl, alkylthio, arylthio, alkoxy or aryloxy or —$NR^{24}R^{25}$ wherein $R^{24}$ is alkyl or aryl and $R^{25}$ is hydrogen, alkyl, aryl, alkylsulfonyl, arylsulfonyl or acyl, or $R^{24}$ and $R^{25}$, taken together, form a five- or six-membered nitrogenous heterocycle. $R^{20}$ and $R^{21}$ each are hydrogen or $R^{20}$ and $R^{21}$, taken together, form a five- or six-membered ring. $R^{22}$ and $R^{23}$ each are hydrogen or alkyl.

Preferably, $R^{19}$ is —$NR^{24}R^{25}$ wherein at least one of $R^{24}$ and $R^{25}$ is desirably phenyl. Also preferably $R^{20}$ and $R^{21}$, taken together, form a five- or six-membered ring, especially when $R^{19}$ is hydrogen. Examples of the ring formed by $R^{20}$ and $R^{21}$ are cyclopentene and cyclohexene rings. The ring formed by $R^{20}$ and $R^{21}$ may have a substituent, examples of which are alkyl and aryl.

The groups represented by $R^{19}$ to $R^{23}$ are described in detail.

The alkyl group preferably has 1 to 10 carbon atoms, especially 1 to 6 carbon atoms. Exemplary alkyl groups include methyl, ethyl, propyl, butyl, isobutyl, pentyl and hexyl. The alkyl group may have a substituent, examples of which are halogen atoms (e.g., Cl, Br and F), alkoxycarbonyl having up to 10 carbon atoms, preferably up to 6 carbon atoms (e.g., methoxycarbonyl and ethoxycarbonyl) and hydroxyl.

The halogen atoms include fluorine, chlorine and bromine.

The aryl group preferably has 6 to 12 carbon atoms. Exemplary aryl groups are phenyl and naphthyl. The aryl group may have a substituent. Exemplary substituents include alkyl having up to 10 carbon atoms, preferably up to 6 carbon atoms (e.g., methyl, ethyl, propyl, butyl, isobutyl, pentyl and hexyl), alkoxy having up to 10 carbon atoms, preferably up to 6 carbon atoms (e.g., methoxy and ethoxy), aryloxy having up to 20 carbon atoms, preferably up to 12 carbon atoms (e.g., phenoxy and p-chlorophenoxy), halogen atoms (e.g., Cl, Br and F), alkoxycarbonyl having up to 10 carbon atoms, preferably up to 6 carbon atoms (e.g., ethoxycarbonyl), cyano, nitro and carboxyl groups.

The alkylsulfonyl group preferably has 1 to 10 carbon atoms. Mesyl and ethanesulfonyl are typical alkylsulfonyl groups.

The arylsulfonyl group preferably has 6 to 10 carbon atoms. Tosyl and benzenesulfonyl are typical arylsulfonyl groups.

The acyl group preferably has 2 to 10 carbon atoms. Exemplary acyl groups are acetyl, propionyl and benzoyl.

The nitrogenous heterocycle formed by $R^{24}$ and $R^{25}$ includes piperidine, morpholine and piperadine rings. The nitrogenous heterocycle may have a substituent, examples of which include alkyl (e.g., methyl), aryl (e.g., phenyl) and alkoxycarbonyl (e.g., ethoxycarbonyl).

In formula (F4), each of letters a, b and c is 0 or 1. It is preferred that both a and b are 0. Letter c is generally 1. When an anionic substituent such as carboxyl forms an intramolecular salt with $N^+$, c is 0.

The anions represented by $X^-$ include halide ions (e.g., $Cl^-$, $Br^-$ and $I^-$), p-toluenesulfonate ion, ethylsulfate ion, $PF_6^-$, $BF_4^-$, and $ClO_4^-$.

In formula (F3), A is an anionic dissociatable group attached to D as a substituent. Examples of the anionic dissociatable group include carboxyl, sulfo, phenolic hydroxyl, sulfonamide, sulfamoyl, and phosphono, with the carboxyl, sulfo and sulfonamide being preferred. Carboxyl is especially preferred.

In formula (F3), Y is a cation for lake formation of the cyanine dye. Among the lake forming cations, inorganic ones include alkaline earth metal cations such as $Mg^{2+}$, $Ca^{2+}$, $Ba^{2+}$ and $Sr^{2+}$, transition metal cations such as $Ag^+$ and $Zn^{2+}$, and $Al^{3+}$, and organic ones include ammonium, amidinium and guanidium cations having 4 or more carbon atoms. Divalent and trivalent cations are preferred.

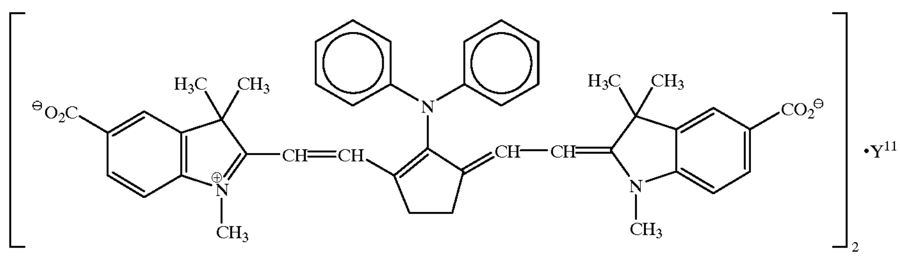

| compound | $Y^{11}$ | compound | $Y^{11}$ | compound | $Y^{11}$ |
|---|---|---|---|---|---|
| (131) | $Ca^{2\oplus}$ | (132) | $Ba^{2\oplus}$ | (133) | $Mg^{2\oplus}$ |
| (134) | $Sr^{2\oplus}$ | (135) | $Zn^{2\oplus}$ | | |

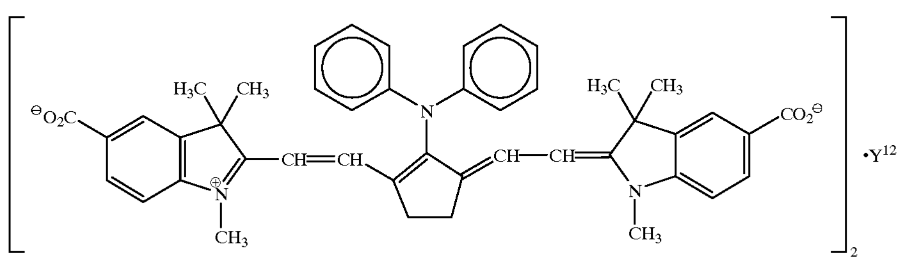

| compound | $Y^{12}$ |
|---|---|
| (136) | 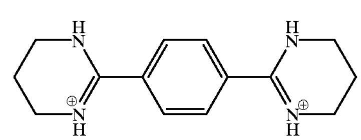 |
| (137) | 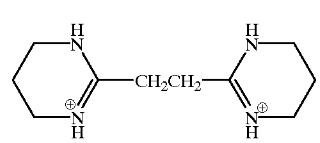 |

-continued
(138)
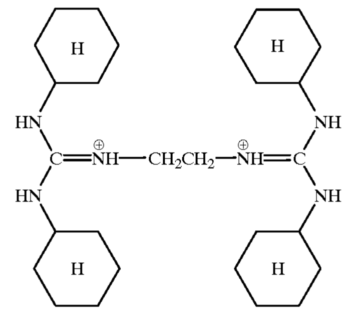
(139)
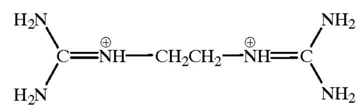
(140)
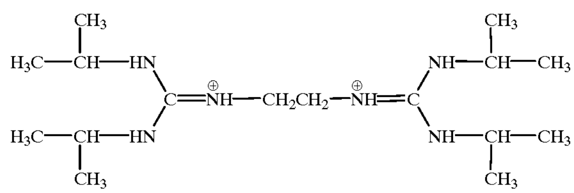
(141)
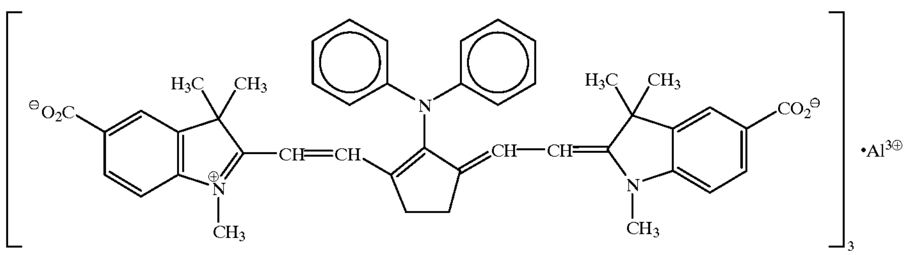
(142)
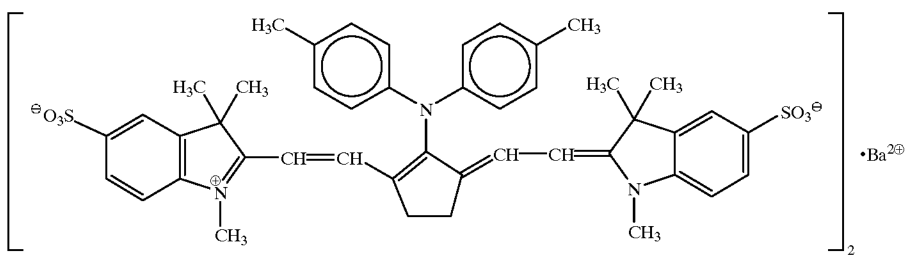
(143)
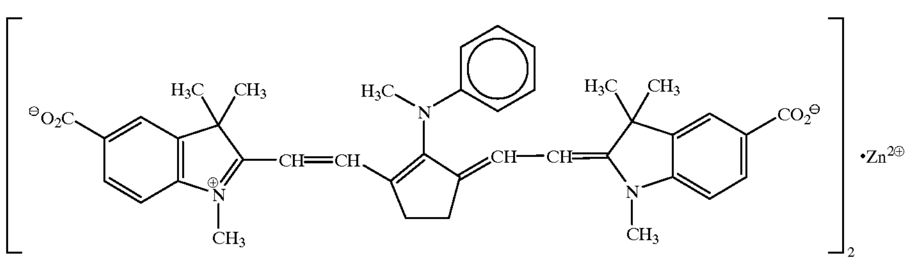

-continued
(144)
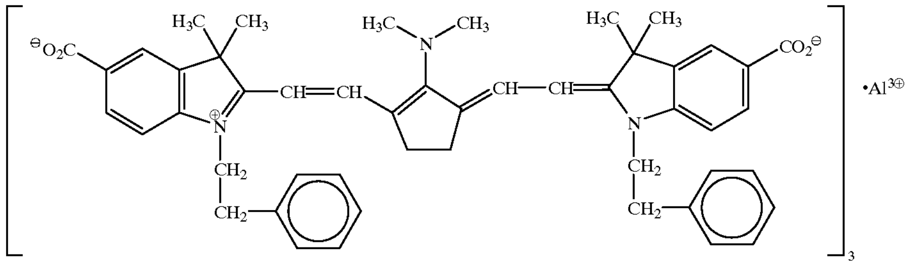
(145)
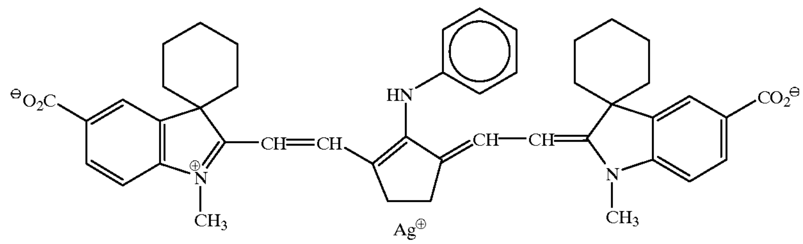
(146)
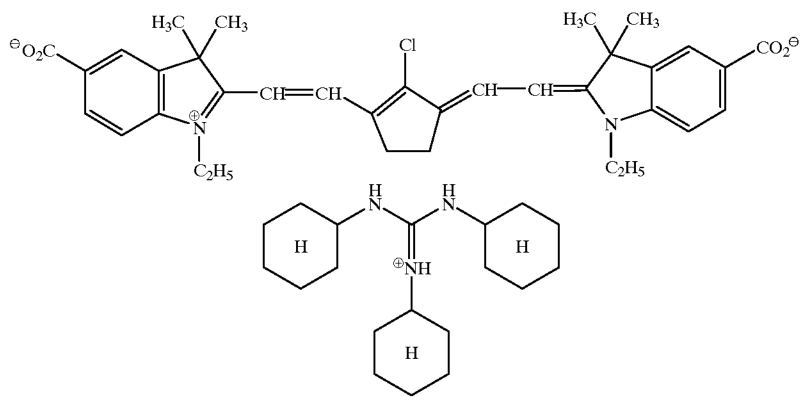
(147)
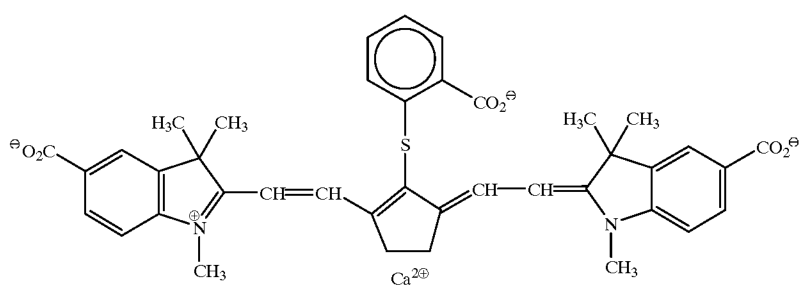
(148)
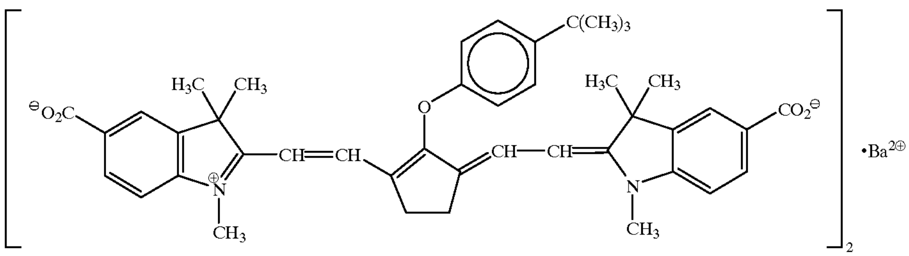

-continued
(149)
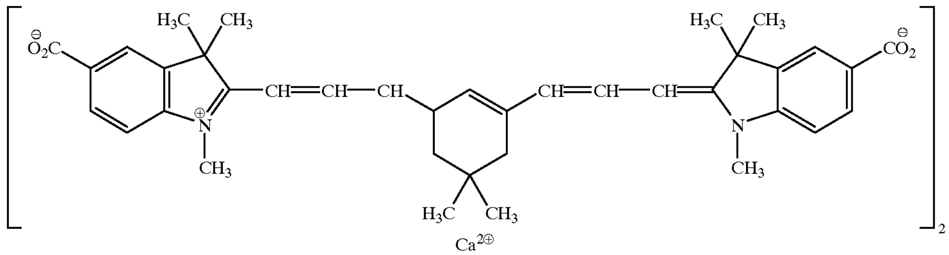
(150)
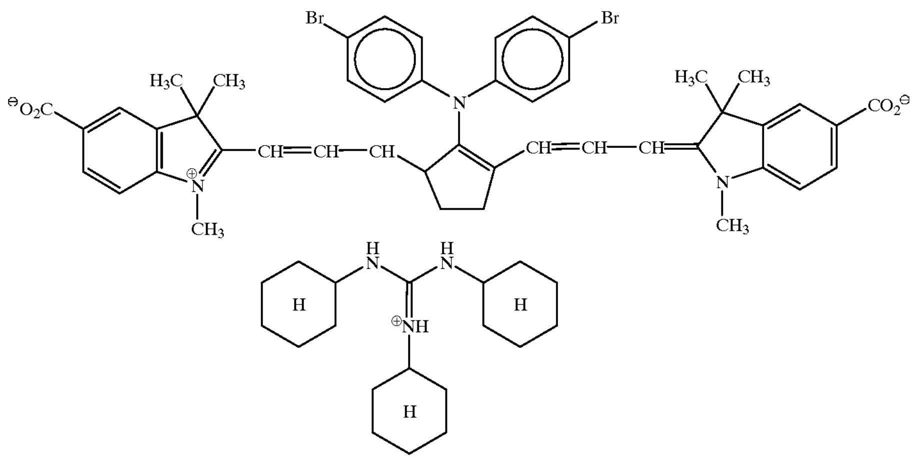
(151)
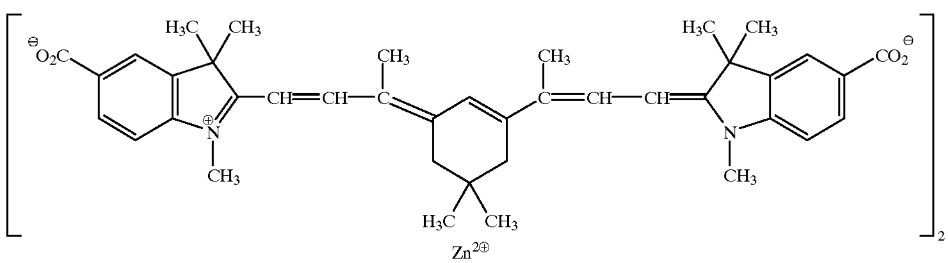
(152)
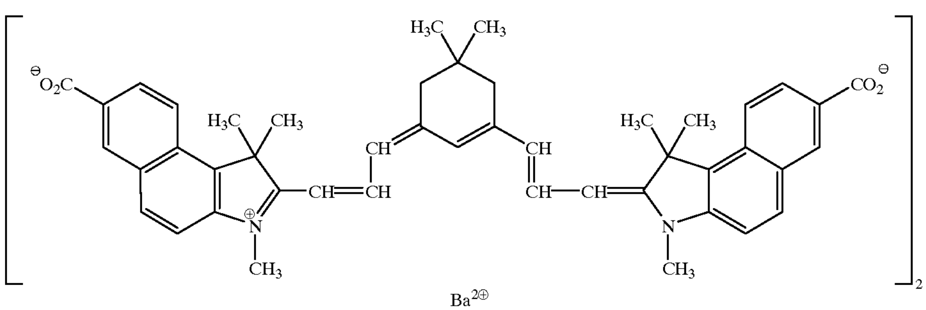

-continued
(153)
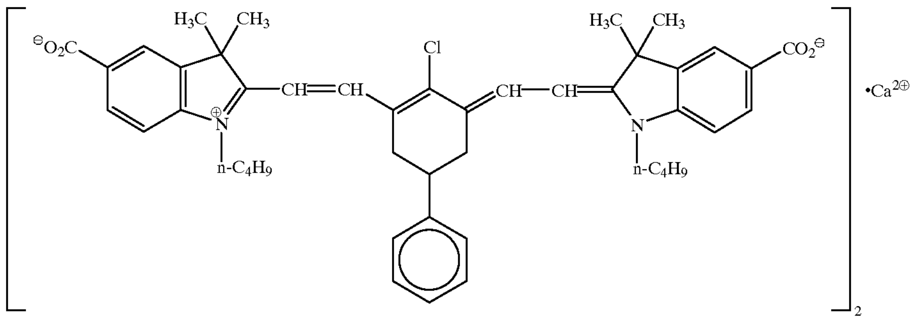
(154)
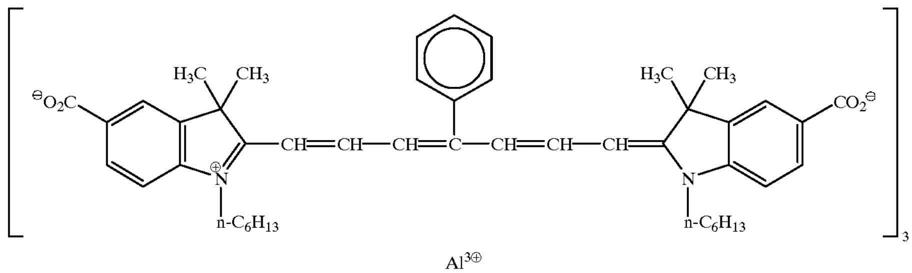
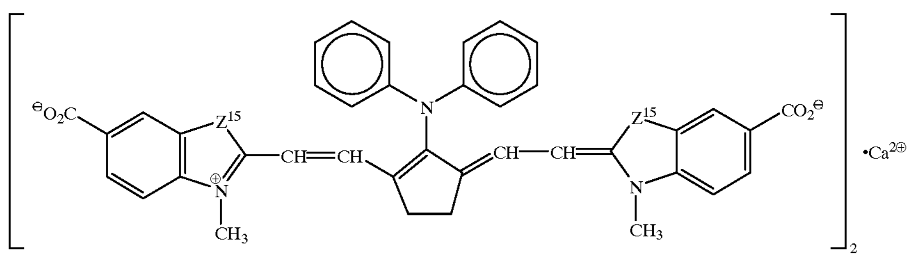
| compound | $Z^{15}$ | compound | $Z^{15}$ | compound | $Z^{15}$ |
|---|---|---|---|---|---|
| (155) | O | (156) | S | (157) | N—$CH_3$ |
(158)
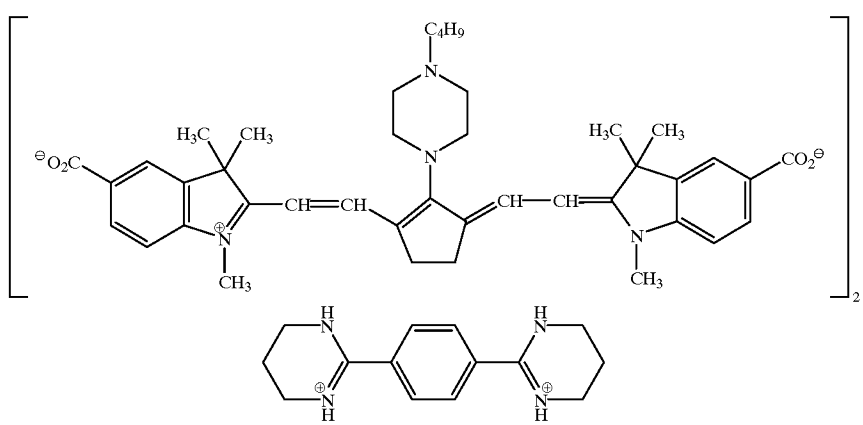

-continued
(159)
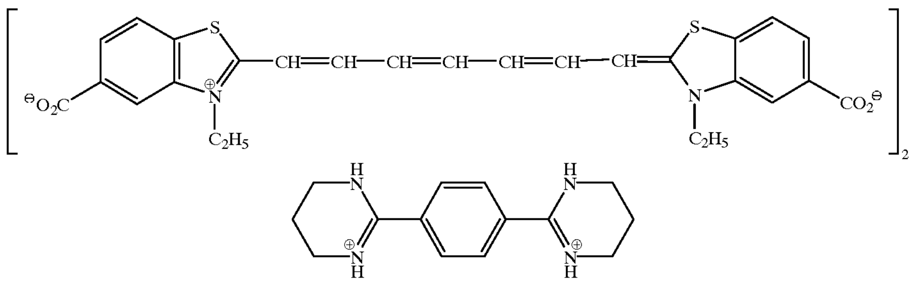
(160)
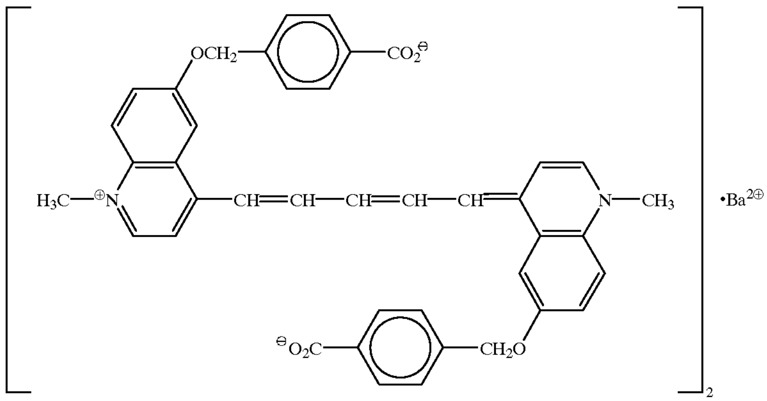
(161)
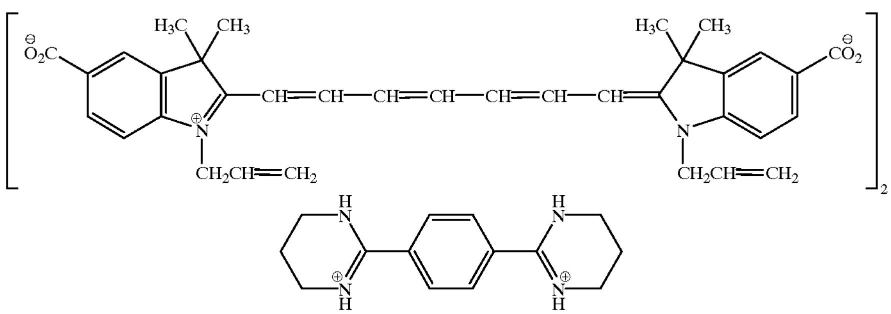
(162)
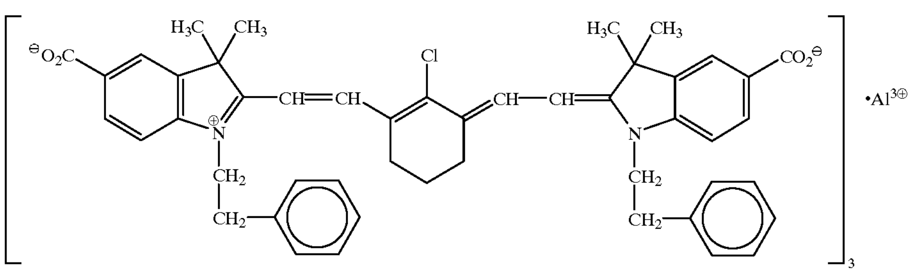

-continued
(163)
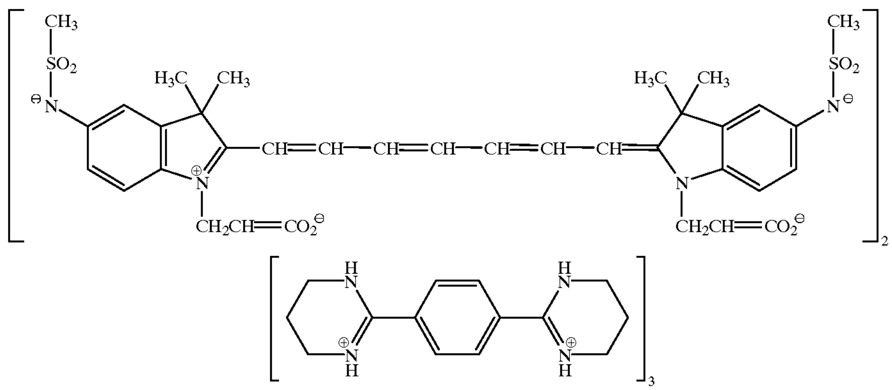
(164)
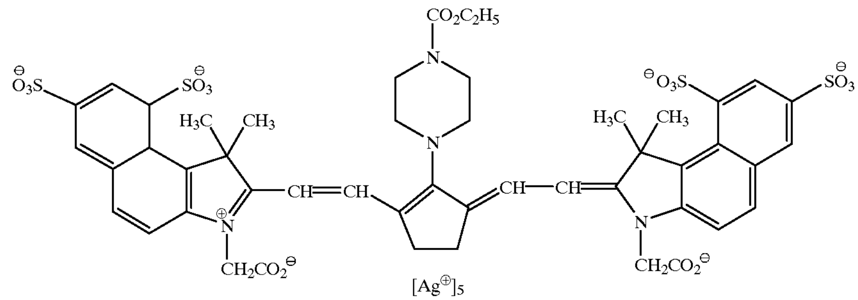
(165)
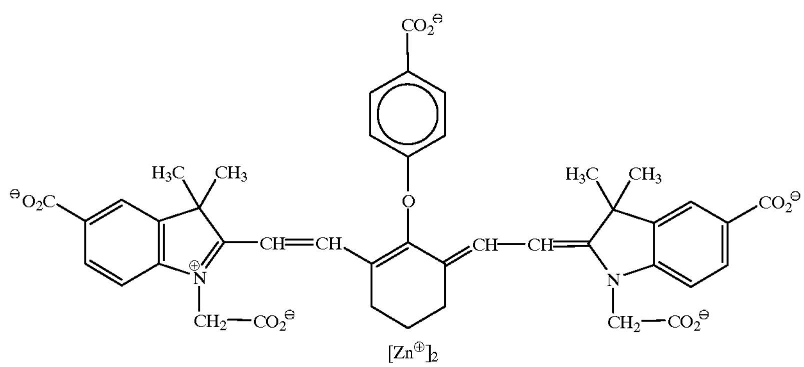

-continued (166)

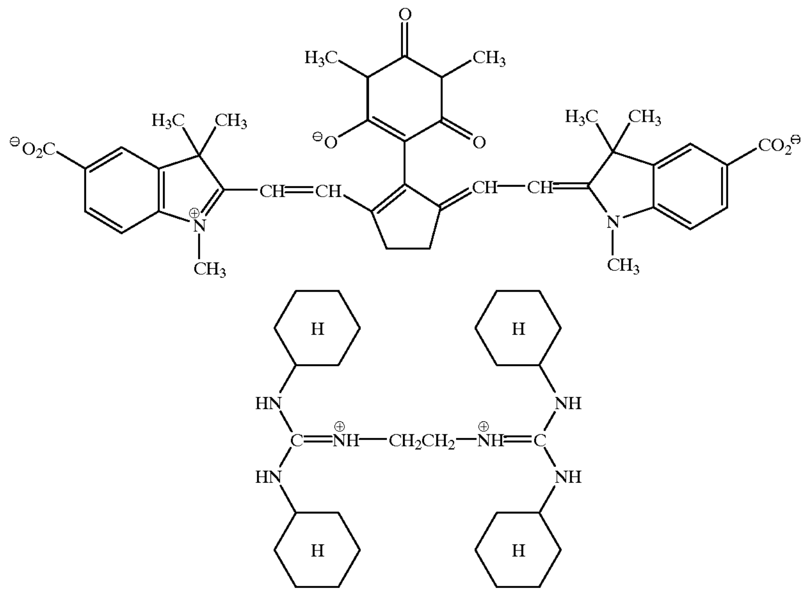

(167)

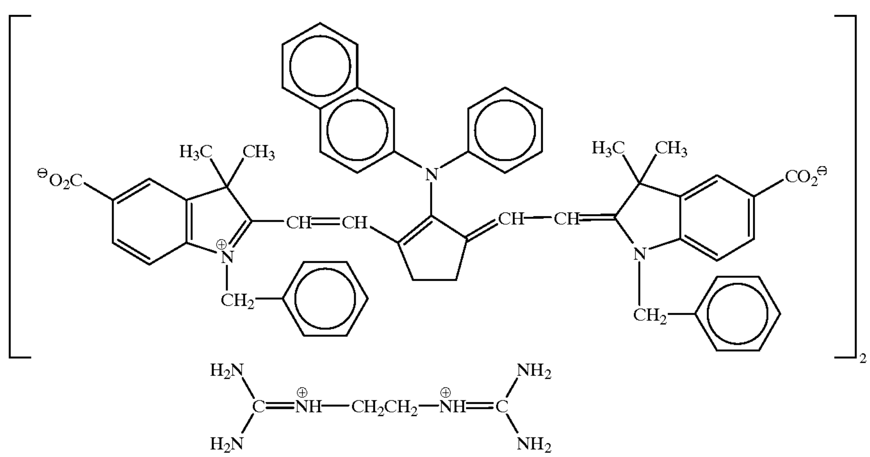

The foregoing lake cyanine dyes can be synthesized in accordance with the following Synthesis Examples.

Synthesis Example 4

Synthesis of Compound (131)

To a solution containing 4 grams of crystalline compound (1) synthesized in Synthesis Example 1, 50 ml of water and 2.6 ml of triethylamine was added 20 ml of an aqueous solution containing 2 grams of calcium chloride. The mixture was stirred for one hour. The precipitate was collected by filtration, obtaining 11.5 grams of a wet cake of compound (131). The dry weight was 3.4 grams.

Synthesis Example 5

Synthesis of Compound (132)

The procedure of Synthesis Example 4 was repeated except that barium chloride was used instead of calcium chloride, obtaining 10.6 grams of a wet cake of compound (132). The dry weight was 3.4 grams.

Synthesis Example 6

Synthesis of Compound (141)

The procedure of Synthesis Example 4 was repeated except that $Al_{13}O_4(OH)_{24}(H_2O)_{12}Cl_7$ (aluminum hydrochloride-P by Hoechst) was used instead of calcium chloride, obtaining 12.0 grams of a wet cake of compound (141). The dry weight was 1.7 grams.

Synthesis Example 7

Synthesis of Compound (138)

To a solution containing 4 grams of crystalline compound (1) synthesized in Synthesis Example 1, 30 ml of methanol and 1.7 ml of triethylamine was added a solution containing 3.3 grams of a guanidine compound shown below in 20 ml of methanol. The mixture was stirred for 3 hours at room temperature. The precipitate was collected by filtration, obtaining 3.9 grams of a wet cake of compound (138). The dry weight was 2.1 grams.

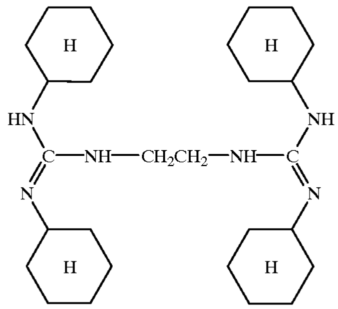

guanidine compound

The IR absorbing dye can be added to the photosensitive material as a solution in a good solvent. However, it is preferred for the shelf stability of the dye that a solid particle dispersion of the dye in a solvent (water or a less aggressive organic solvent) is added to the photosensitive material. The addition of the dye in the form of a solid particle dispersion advantageously eliminates the risk of the dye being dissolved away even when the photosensitive material is contacted with water droplets after image formation.

A solid microparticulate dispersion of the dye may be prepared by well-known dispersing means such as ball mills, vibrating ball mills, planetary ball mills, sand mills, colloidal mills, jet mills, and roller mills. The dispersing machines are described in JP-A 92716/1977 and WO 88/074794. Vertical and lateral media dispersing machines are preferred.

Dispersion may be carried out in the presence of a suitable medium such as water and alcohol. It is preferred to use dispersing surfactants, for example, anionic surfactants as described in JP-A 92716/1977 and WO 88/074794. If desired, an anionic polymer, nonionic surfactant or cationic surfactant may be used.

Another procedure is by dissolving the IR absorbing dye in a suitable solvent and adding a poor solvent thereto, thereby obtaining microparticulate powder. A dispersing surfactant may be used in this procedure. Alternatively, the dye is dissolved by pH adjustment and the pH is changed to precipitate the dye as fine crystals.

When the lake dye is desired, fine crystals of the lake dye can be precipitated by dissolving a dye corresponding to (D)-Am in formula (F3) at appropriate pH and adding a water-soluble salt of a cation corresponding to Y in formula (F3).

The thus prepared dispersion may be stored while continuously stirring for the purpose of preventing fine particles from settling during storage. Alternatively, the dispersion is stored after adding hydrophilic colloid to establish a highly viscous state (for example, in a jelly-like state using gelatin). An antiseptic agent may be added to the dispersion in order to prevent growth of bacteria during storage.

The solid microparticulate dispersion of the dye should preferably have a mean particle size of 0.005 to 10 $\mu$m, more preferably 0.01 to 3 $\mu$m, most preferably 0.05 to 0.5 $\mu$m.

The solid microparticulate dispersion of the dye may be added to any layer of a photosensitive material including a back, emulsion, protective, undercoat and intermediate layer, preferably to a hydrophilic colloid layer other than the emulsion layer. Two or more dyes may be added to a single layer while a single dye may be added to plural layers. The hydrophilic colloid is preferably gelatin or polyvinyl alcohol though not limited thereto.

Although the amount of the dye used as solids varies with a necessary absorbance and an extinction coefficient of a dispersion, the dye is preferably used in an amount of 0.001 to 5 g/m$^2$, more preferably 0.005 to 2 g/m$^2$, most preferably 0.005 to 1 g/m$^2$. Where a photosensitive material has coatings on both surfaces, the dye may be added to only one surface.

The thermographic photographic photosensitive material in this embodiment of the invention is effective when it is passed through a machinery including a feed system equipped with an IR detector. The IR detector uses a light source in the form of a light-emitting diode or semiconductor laser emitting light at a wavelength of 700 nm and a light receiving element having a sensitive region of 700 to 1,200 nm with a sensitivity peak at about 900 nm. Light-emitting diodes are commercially available in the name of GL-514 (Sharp K.K.) and TLN108 (Toshiba K.K.) while light-receiving elements are commercially available in the name of PT501 (Sharp K.K.) and TPS601A (Toshiba K.K.).

EXAMPLE

Examples of the invention are given below by way of illustration and not by way of limitation.

The trade names used in Examples have the following meaning.

Megafax F-176P: fluorinated surfactant by Dai-Nihon Ink Chemical Industry K.K.

CAB 171-15S: cellulose acetate butyrate by Eastman Chemical Products, Inc.

Sildex: spherical silica by Dokai Chemical K.K.

Sumidur N3500: polyisocyanate by Sumitomo-Bayern Urethane K.K.

Denka Butyral: polyvinyl butyral by Denki Kagaku Kogyo K.K.

Example 1

Preparation of Organic Acid Silver Salt Emulsion A

To 12 liters of water were added 840 grams of behenic acid and 95 grams of stearic acid. To the solution kept at 90° C., a solution of 48 grams of sodium hydroxide and 63 grams of sodium carbonate in 1.5 liters of water was added. The solution was stirred for 30 minutes and then cooled to 50° C. whereupon 1.1 liters of a 1% aqueous solution of N-bromosuccinimide was added. With stirring, 2.3 liters of a 17% aqueous solution of silver nitrate was slowly added. While the solution was kept at 35° C., with stirring, 1.5 liters of a 2% aqueous solution of potassium bromide was added over 2 minutes. The solution was stirred for 30 minutes whereupon 2.4 liters of a 1% aqueous solution of N-bromosuccinimide was added. With stirring, 3,300 grams of a solution containing 1.2% by weight of polyvinyl acetate in butyl acetate was added to the aqueous mixture. The mixture was allowed to stand for 10 minutes, separating into two layers. After the aqueous layer was removed, the remaining gel was washed twice with water. There was obtained a gel-like mixture of silver behenate, silver stearate, and silver bromide, which was dispersed in 1,800 grams of a 2.6% 2-butanone solution of polyvinyl butyral (Denka Butyral #3000-K). The dispersion was further dispersed in 600 grams of polyvinyl butyral (Denka Butyral #4000-2) and 300 grams of isopropyl alcohol, obtaining an organic acid silver salt emulsion of needle grains having a mean minor diameter of 0.05 $\mu$m, a mean major diameter of 1.2 $\mu$m, and a coefficient of variation of 25%.

Preparation of Emulsion Layer Coating Solution A

Various chemicals were added to the above-prepared organic acid silver salt emulsion as follows. It is noted that the amounts of chemicals added are expressed per mol of silver. With stirring at 25° C., 10 mg of sodium phenylthiosulfonate, an amount of a dye as shown in Table 7, 2 grams of 2-mercapto-5-methylbenzimidazole, 1 gram of 2-mercapto-5-methylbenzothiazole, 21.5 grams of 4-chlorobenzophenone-2-carboxylic acid, 580 grams of 2-butanone, and 220 grams of dimethylformamide were added to the emulsion, which was allowed to stand for 3 hours. With stirring, there were added 4.5 grams of 4,6-ditrichloromethyl-2-phenyltriazine, 2 grams of disulfide compound A, 160 grams of 1,1-bis(2-hydroxy-3,5-dimethylphenyl)-3,5,5-trimethylhexane, 15 grams of phthalazine, 5 grams of tetrachlorophthalic acid, an amount of a hydrazine derivative as shown in Table 7, 1.1 grams of Megafax F-176P, 590 grams of 2-butanone and 10 grams of methyl isobutyl ketone.

Emulsion Surface Protective Layer Coating Solution A

A coating solution was prepared by dissolving 75 grams of CAB 171-15S, 5.7 grams of 4-methylphthalic acid, 1.5 grams of tetrachlorophthalic anhydride, 10 grams of 2-tribromomethylsulfonylbenzothiazole, 2 grams of phthalazone, 0.3 grams of Megafax F-176P, 2 grams of Sildex H31 (spherical silica having a mean particle size 3 μm), and 5 grams of Sumidur N3500 in 3,070 grams of 2-butanone and 30 grams of ethyl acetate.

Preparation of Back-coated Support

A back layer coating solution was prepared by adding 6 grams of polyvinyl butyral (Denka Butyral #4000-2), 0.2 gram of Sildex H121 (spherical silica having a mean particle size 12 μm), 0.2 gram of Sildex H51 (spherical silica having a mean particle size 5 μm), 0.1 gram of Megafax P-176P to 64 grams of 2-propanol and stirring the mixture for dissolving the components. A solution of 420 mg of dye A in 10 grams of methanol and 20 grams of acetone and a solution of 0.8 gram of 3-isocyanatomethyl-3,5,5-trimethylhexyl isocyanate in 6 grams of ethyl acetate were added to the solution to complete the coating solution.

Onto a polyethylene terephthalate film having a moisture-proof undercoat containing vinylidene chloride on either surface, the back layer coating solution was applied so as to provide an optical density of 0.7 at 633 nm.

Preparation of Coated Sample

Onto the thus prepared support, the emulsion layer coating solution was applied in a coverage of 2 g/m$^2$ of silver. The emulsion surface protecting layer coating solution was then applied onto the emulsion layer to form a protective layer having a dry thickness of 5 μm.

Disulfide compound A and dye A are shown below.

Disulfide compound A

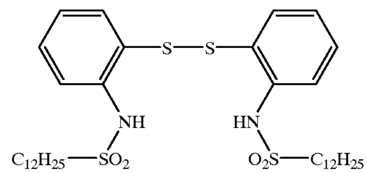

Dye A

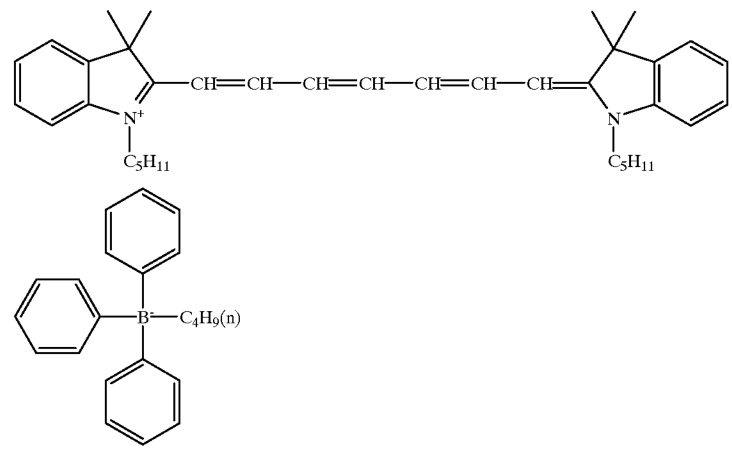

Photographic Property Test

The photographic material samples were exposed by means of a He—Ne light source color scanner SG-608 by Dai-Nihon Screen K.K. and heated for development at 115° C. for 25 seconds on a heat drum. A halide lamp was operated to illuminate light to the developed samples for 15 seconds. The resulting images were determined for Dmax and sensitivity (an inversion of a ratio of an exposure dose providing a density higher by 1.5 than Dmin) by a densitometer. Gradation γ is the gradient of a straight line connecting points of density 0.3 and 3.0 on a characteristic curve. The results are shown in Table 7.

Dot Sharpness Test

Using a He—Ne light source color scanner SG-608 by Dai-Nihon Screen K.K., a 50% screen tint of 100 lines was output to a coated sample, which was developed under the same conditions as above. Through a 200× magnifier, the image was visually observed for sharpness of dots. The results of evaluation were reported in Table 1 using a five-point scale of point 5 for good image quality to point 1 for poor image quality. Point 3 or higher is necessary for practical use. The results are shown in Table 1.

TABLE 1

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-III-2 | $6.0 \times 10^{-5}$ | 2.5 | 0.80 | 4.1 | 1 |
| 2 | H-11a | $8 \times 10^{-3}$ | D-III-2 | $6.0 \times 10^{-5}$ | 5.3 | 1.40 | 14.5 | 4 |
| 3 | H-11a | $8 \times 10^{-3}$ | D-III-12 | $5.0 \times 10^{-5}$ | 5.4 | 1.41 | 15.2 | 5 |
| 4 | H-11a | $8 \times 10^{-3}$ | D-III-35 | $5.5 \times 10^{-5}$ | 5.3 | 1.39 | 14.6 | 4 |
| 5 | H-26e | $5 \times 10^{-3}$ | D-III-2 | $6.0 \times 10^{-5}$ | 5.4 | 1.40 | 14.7 | 5 |
| 6 | H-26e | $5 \times 10^{-3}$ | D-III-12 | $5.0 \times 10^{-5}$ | 5.3 | 1.43 | 14.8 | 4 |
| 7 | H-26e | $5 \times 10^{-3}$ | D-III-35 | $5.5 \times 10^{-5}$ | 5.4 | 1.38 | 14.6 | 5 |
| 8 | H-34a | $6 \times 10^{-3}$ | D-III-2 | $6.0 \times 10^{-5}$ | 5.3 | 1.42 | 15.1 | 4 |
| 9 | H-34a | $6 \times 10^{-3}$ | D-III-12 | $5.0 \times 10^{-5}$ | 5.3 | 1.38 | 14.8 | 5 |
| 10 | H-34a | $6 \times 10^{-3}$ | D-III-35 | $5.5 \times 10^{-5}$ | 5.4 | 1.35 | 14.2 | 5 |
| 11 | H-34m | $9 \times 10^{-3}$ | D-III-2 | $6.0 \times 10^{-5}$ | 5.3 | 1.41 | 14.6 | 5 |
| 12 | H-34m | $9 \times 10^{-3}$ | D-III-12 | $5.0 \times 10^{-5}$ | 5.3 | 1.50 | 13.6 | 4 |
| 13 | H-34m | $9 \times 10^{-3}$ | D-III-35 | $5.5 \times 10^{-5}$ | 5.4 | 1.48 | 13.5 | 4 |
| 14 | H-101 | $6 \times 10^{-3}$ | D-III-2 | $6.0 \times 10^{-5}$ | 5.3 | 1.46 | 13.3 | 5 |
| 15 | H-101 | $6 \times 10^{-3}$ | D-III-12 | $5.0 \times 10^{-5}$ | 5.4 | 1.49 | 13.6 | 5 |
| 16 | H-101 | $6 \times 10^{-3}$ | D-III-35 | $5.5 \times 10^{-5}$ | 5.3 | 1.41 | 14.6 | 5 |
| 17 | H-101 | $6 \times 10^{-3}$ | D-III-27 | $6.0 \times 10^{-5}$ | 5.4 | 1.47 | 14.1 | 5 |
| 18 | H-116 | $6 \times 10^{-3}$ | D-III-2 | $6.0 \times 10^{-5}$ | 5.3 | 1.40 | 14.7 | 5 |
| 19 | H-116 | $6 \times 10^{-3}$ | D-III-12 | $5.0 \times 10^{-5}$ | 5.4 | 1.49 | 13.5 | 5 |
| 20 | H-116 | $6 \times 10^{-3}$ | D-III-35 | $5.5 \times 10^{-5}$ | 5.3 | 1.43 | 14.8 | 5 |
| 21 | H-116 | $6 \times 10^{-3}$ | D-III-27 | $6.0 \times 10^{-5}$ | 5.4 | 1.42 | 14.3 | 5 |
| 22 | H-116 | $6 \times 10^{-3}$ | D-III-30 | $6.0 \times 10^{-5}$ | 5.3 | 1.40 | 14.7 | 5 |
| 23 | H-56 | $8 \times 10^{-3}$ | D-III-2 | $6.0 \times 10^{-5}$ | 5.3 | 1.41 | 14.0 | 4 |
| 24 | H-56 | $8 \times 10^{-3}$ | D-III-12 | $5.0 \times 10^{-5}$ | 5.4 | 1.42 | 14.8 | 5 |
| 25 | H-56 | $8 \times 10^{-3}$ | D-III-35 | $5.5 \times 10^{-5}$ | 5.3 | 1.41 | 14.3 | 4 |

*comparison

It is evident that photothermographic materials using hydrazine compounds and dyes according to the invention satisfy all the requirements of high Dmax, high contrast, and image quality.

Example 2

Preparation of Silver Halide Grains B In 900 ml of water were dissolved 7.5 grams of inert gelatin and 10 mg of potassium bromide. The solution was adjusted to pH 3.0 at a temperature of 35° C. To the solution, 370 ml of an aqueous solution containing 74 grams of silver nitrate and an aqueous solution containing potassium bromide and potassium iodide in a molar ratio of 96:4 and $K_4[Fe(CN)_6]$ were added over 10 minutes by a controlled double jet method while maintaining the solution at pAg 7.7. Note that $[Fe(CN)_6]^{4-}$ was added in an amount of $3\times10^{-5}$ mol/mol of silver. Thereafter, 0.3 gram of 4-hydroxy-6-methyl-1,3,3a,7-tetraazaindene was added to the solution, which was adjusted to pH 5 with NaOH. There were obtained cubic silver iodobromide grains B having a mean grain size of 0.06 μm, a coefficient of variation of projected area diameter of 8%, and a {100} plane ratio of 87%. The emulsion was desalted by adding a gelatin flocculant thereto to cause flocculation and sedimentation and then adjusted to pH 5.9 and pAg 7.5 by adding 0.1 gram of phenoxyethanol.

Preparation of Organic Acid Silver Emulsion B

A mixture of 10.6 grams of behenic acid and 300 ml of water was mixed for 15 minutes at 90° C. With vigorous stirring, 31.1 ml of 1N sodium hydroxide was added over 15 minutes to the solution, which was allowed to stand at the temperature for one hour. The solution was then cooled to 30° C., 7 ml of 1N phosphoric acid was added thereto, and with more vigorous stirring, 0.13 gram of N-bromosuccinimide was added. Thereafter, with stirring, the above-prepared silver halide grains B were added to the solution in such an amount as to give 2.5 mmol of silver halide. Further, 25 ml of 1N silver nitrate aqueous solution was continuously added over 2 minutes, with stirring continued for a further 90 minutes. With stirring, 37 grams of a 1.2 wt % n-butyl acetate solution of polyvinyl acetate was slowly added to the aqueous mixture to form flocs in the dispersion. Water was removed, and water washing and water removal were repeated twice. With stirring, 20 grams of a solution of 2.5% by weight polyvinyl butyral (Denka Butyral #3000-K) in a 1/2 solvent mixture of butyl acetate and isopropyl alcohol was added. To the thus obtained gel-like mixture of organic acid silver and silver halide, 7.8 grams of polyvinyl butyral (Denka Butyral #4000-2) and 57 grams of 2-butanone were added. The mixture was dispersed by a homogenizer, obtaining a silver behenate emulsion of needle grains having a mean minor diameter of 0.04 μm, a mean major diameter of 1 μm and a coefficient of variation of 30%.

Preparation of Emulsion Layer Coating Solution B

Various chemicals were added to the above-prepared organic acid silver salt emulsion B as follows. It is noted that the amounts of chemicals added are expressed per mol of silver. With stirring at 25° C., 10 mg of sodium phenylthiosulfonate, an amount of a dye as shown in Table 2, 2 grams of 2-mercapto-5-methylbenzimidazole, 21.5 grams of 4-chlorobenzophenone-2-carboxylic acid, 580 grams of 2-butanone, and 220 grams of dimethylformamide were added to the emulsion, which was allowed to stand for 3 hours. Then, with stirring, 4 grams of 4,6-ditrichloromethyl-2-phenyltriazine, 2 grams of disulfide compound A, 170 grams of 1,1-bis(2-hydroxy-3,5-dimethylphenyl)-3,5,5-trimethylhexane, 5 grams of tetrachlorophthalic acid, 15 grams of phthalazine, an amount of a hydrazine derivative as shown in Table 2, 1.1 grams of Megafax F-176P, 590 grams of 2-butanone and 10 grams of methyl isobutyl ketone were added.

Emulsion Surface Protective Layer Coating Solution

A coating solution was prepared by dissolving 75 grams of CAB 171-15S, 5.7 grams of 4-methylphthalic acid, 1.5 grams of tetrachlorophthalic anhydride, 8 grams of 5-tribromomethylsulfonyl-2-methylthiadiazole, 6 grams of 2-tribromomethylsulfonylbenzothiazole, 3 grams of phthalazone, 0.3 grams of Megafax F-176P, 2 grams of Sildex H31 (spherical silica having a mean particle size 3 μm), and 6 grams of Sumidur N3500 in 3,070 grams of 2-butanone and 30 grams of ethyl acetate.

Preparation of Back-coated Support

A back layer coating solution was prepared by adding 6 grams of polyvinyl butyral (Denka Butyral #4000-2), 0.2 gram of Sildex H121 (spherical silica having a mean particle size 12 μm), 0.2 gram of Sildex H51 (spherical silica having a mean particle size 5 μm), and 0.1 gram of Megafax F-176P to 64 grams of 2-propanol and stirring the mixture for dissolving the components. A solution of 420 mg of dye A in 10 grams of methanol and 20 grams of acetone and a solution of 0.8 gram of 3-isocyanatomethyl-3,5,5-trimethylhexyl isocyanate in 6 grams of ethyl acetate were added to the solution to complete the coating solution.

Onto a polyethylene terephthalate film having a moisture-proof undercoat containing vinylidene chloride on either surface, the back layer coating solution was applied so as to provide an optical density of 0.7 at 633 nm.

Preparation of Coated Sample

Onto the thus prepared support, the emulsion layer coating solution was applied in a coverage of 2 g/m$^2$ of silver. The emulsion surface protecting layer coating solution was then applied onto the emulsion layer to form a protective layer having a dry thickness of 5 μm.

Note that disulfide compound A and dye A are the same as in Example 1.

The samples were evaluated for photographic properties and image reproducibility as in Example 1. The results are shown in Table 2.

TABLE 2

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-III-2 | 6.0 × 10$^{-5}$ | 2.5 | 0.80 | 3.6 | 1 |
| 2 | H-11a | 8 × 10$^{-3}$ | D-III-2 | 6.0 × 10$^{-5}$ | 5.3 | 1.50 | 15.1 | 5 |
| 3 | H-11a | 8 × 10$^{-3}$ | D-III-12 | 5.0 × 10$^{-5}$ | 5.4 | 1.51 | 15.8 | 4 |
| 4 | H-11a | 8 × 10$^{-3}$ | D-III-35 | 5.5 × 10$^{-5}$ | 5.3 | 1.49 | 15.2 | 4 |
| 5 | H-26e | 5 × 10$^{-3}$ | D-III-2 | 6.0 × 10$^{-5}$ | 5.4 | 1.50 | 13.8 | 5 |
| 6 | H-26e | 5 × 10$^{-3}$ | D-III-12 | 5.0 × 10$^{-5}$ | 5.3 | 1.53 | 13.5 | 4 |
| 7 | H-26e | 5 × 10$^{-3}$ | D-III-35 | 5.5 × 10$^{-5}$ | 5.4 | 1.48 | 13.4 | 4 |
| 8 | H-34a | 6 × 10$^{-3}$ | D-III-2 | 6.0 × 10$^{-5}$ | 5.3 | 1.52 | 15.7 | 5 |
| 9 | H-34a | 6 × 10$^{-3}$ | D-III-12 | 5.0 × 10$^{-5}$ | 5.3 | 1.48 | 15.4 | 5 |
| 10 | H-34a | 6 × 10$^{-3}$ | D-III-35 | 5.5 × 10$^{-5}$ | 5.4 | 1.45 | 14.8 | 5 |
| 11 | H-34m | 9 × 10$^{-3}$ | D-III-2 | 6.0 × 10$^{-5}$ | 5.3 | 1.51 | 13.5 | 5 |
| 12 | H-34m | 9 × 10$^{-3}$ | D-III-12 | 5.0 × 10$^{-5}$ | 5.3 | 1.60 | 13.2 | 4 |
| 13 | H-34m | 9 × 10$^{-3}$ | D-III-35 | 5.5 × 10$^{-5}$ | 5.4 | 1.58 | 12.9 | 4 |
| 14 | H-101 | 6 × 10$^{-3}$ | D-III-2 | 6.0 × 10$^{-5}$ | 5.3 | 1.56 | 13.9 | 5 |
| 15 | H-101 | 6 × 10$^{-3}$ | D-III-12 | 5.0 × 10$^{-5}$ | 5.4 | 1.59 | 14.8 | 5 |
| 16 | H-101 | 6 × 10$^{-3}$ | D-III-35 | 5.5 × 10$^{-5}$ | 5.3 | 1.51 | 14.5 | 5 |
| 17 | H-101 | 6 × 10$^{-3}$ | D-III-27 | 6.0 × 10$^{-5}$ | 5.4 | 1.57 | 14.7 | 5 |
| 18 | H-116 | 6 × 10$^{-3}$ | D-III-2 | 6.0 × 10$^{-5}$ | 5.3 | 1.50 | 15.3 | 5 |
| 19 | H-116 | 6 × 10$^{-3}$ | D-III-12 | 5.0 × 10$^{-5}$ | 5.4 | 1.59 | 14.1 | 5 |
| 20 | H-116 | 6 × 10$^{-3}$ | D-III-35 | 5.5 × 10$^{-5}$ | 5.3 | 1.53 | 15.4 | 5 |
| 21 | H-116 | 6 × 10$^{-3}$ | D-III-27 | 6.0 × 10$^{-5}$ | 5.4 | 1.52 | 14.9 | 5 |
| 22 | H-116 | 6 × 10$^{-3}$ | D-III-30 | 6.0 × 10$^{-5}$ | 5.3 | 1.50 | 15.3 | 5 |
| 23 | H-56 | 8 × 10$^{-3}$ | D-III-2 | 6.0 × 10$^{-5}$ | 5.3 | 1.51 | 14.6 | 4 |
| 24 | H-56 | 8 × 10$^{-3}$ | D-III-12 | 5.0 × 10$^{-5}$ | 5.4 | 1.52 | 15.4 | 5 |
| 25 | H-56 | 8 × 10$^{-3}$ | D-III-35 | 5.5 × 10$^{-5}$ | 5.3 | 1.51 | 14.9 | 4 |

*comparison

It is evident that photothermographic materials using hydrazine compounds according to the invention satisfy all the requirements of high Dmax, high contrast, and image quality.

Example 3

Samples were prepared as in Example 1 except that the sensitizing dyes shown in Table 3 were used.

The samples were evaluated for photographic properties and image reproducibility as in Example 1. The results are shown in Table 3.

TABLE 3

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-IV-3 | $5.0 \times 10^{-5}$ | 2.5 | 0.80 | 4.1 | 1 |
| 2 | H-11a | $8 \times 10^{-3}$ | D-IV-3 | $5.0 \times 10^{-5}$ | 5.3 | 1.40 | 14.5 | 4 |
| 3 | H-11a | $8 \times 10^{-3}$ | D-IV-5 | $6.0 \times 10^{-5}$ | 5.4 | 1.41 | 14.9 | 5 |
| 4 | H-11a | $8 \times 10^{-3}$ | D-IV-13 | $6.0 \times 10^{-5}$ | 5.3 | 1.39 | 14.2 | 4 |
| 5 | H-26e | $5 \times 10^{-3}$ | D-IV-3 | $5.0 \times 10^{-5}$ | 5.4 | 1.40 | 15.0 | 5 |
| 6 | H-26e | $5 \times 10^{-3}$ | D-IV-5 | $6.0 \times 10^{-5}$ | 5.3 | 1.43 | 14.6 | 4 |
| 7 | H-26e | $5 \times 10^{-3}$ | D-IV-13 | $6.0 \times 10^{-5}$ | 5.4 | 1.38 | 14.5 | 5 |
| 8 | H-34a | $6 \times 10^{-3}$ | D-IV-3 | $5.0 \times 10^{-5}$ | 5.3 | 1.42 | 14.9 | 4 |
| 9 | H-34a | $6 \times 10^{-3}$ | D-IV-5 | $6.0 \times 10^{-5}$ | 5.3 | 1.38 | 14.6 | 5 |
| 10 | H-34a | $6 \times 10^{-3}$ | D-IV-13 | $6.0 \times 10^{-5}$ | 5.4 | 1.35 | 14.3 | 5 |
| 11 | H-34m | $9 \times 10^{-3}$ | D-IV-3 | $5.0 \times 10^{-5}$ | 5.3 | 1.41 | 14.6 | 5 |
| 12 | H-34m | $9 \times 10^{-3}$ | D-IV-5 | $6.0 \times 10^{-5}$ | 5.3 | 1.50 | 13.6 | 4 |
| 13 | H-34m | $9 \times 10^{-3}$ | D-IV-13 | $6.0 \times 10^{-5}$ | 5.4 | 1.48 | 13.5 | 4 |
| 14 | H-101 | $6 \times 10^{-3}$ | D-IV-3 | $5.0 \times 10^{-5}$ | 5.3 | 1.46 | 13.5 | 5 |
| 15 | H-101 | $6 \times 10^{-3}$ | D-IV-5 | $6.0 \times 10^{-5}$ | 5.4 | 1.49 | 13.6 | 5 |
| 16 | H-101 | $6 \times 10^{-3}$ | D-IV-13 | $6.0 \times 10^{-5}$ | 5.3 | 1.41 | 14.6 | 5 |
| 17 | H-101 | $6 \times 10^{-3}$ | D-IV-11 | $5.0 \times 10^{-5}$ | 5.4 | 1.47 | 14.3 | 5 |
| 18 | H-116 | $6 \times 10^{-3}$ | D-IV-3 | $5.0 \times 10^{-5}$ | 5.3 | 1.40 | 14.5 | 5 |
| 19 | H-116 | $6 \times 10^{-3}$ | D-IV-5 | $6.0 \times 10^{-5}$ | 5.4 | 1.49 | 13.4 | 5 |
| 20 | H-116 | $6 \times 10^{-3}$ | D-IV-13 | $6.0 \times 10^{-5}$ | 5.3 | 1.43 | 14.8 | 5 |
| 21 | H-116 | $6 \times 10^{-3}$ | D-IV-11 | $5.0 \times 10^{-5}$ | 5.4 | 1.42 | 15.0 | 5 |
| 22 | H-116 | $6 \times 10^{-3}$ | D-IV-15 | $5.0 \times 10^{-5}$ | 5.3 | 1.35 | 13.5 | 5 |
| 23 | H-56 | $8 \times 10^{-3}$ | D-IV-3 | $5.0 \times 10^{-5}$ | 5.3 | 1.41 | 14.0 | 4 |
| 24 | H-56 | $8 \times 10^{-3}$ | D-IV-5 | $6.0 \times 10^{-5}$ | 5.4 | 1.42 | 14.8 | 5 |
| 25 | H-56 | $8 \times 10^{-3}$ | D-IV-13 | $6.0 \times 10^{-5}$ | 5.3 | 1.41 | 14.3 | 4 |

*comparison

It is evident that photothermographic materials using hydrazine compounds according to the invention satisfy all the requirements of high Dmax, high contrast, and image quality.

Example 4

Samples were prepared as in Example 2 except that the sensitizing dyes shown in Table 4 were used.

The samples were evaluated for photographic properties and image reproducibility as in Example 1. The results are shown in Table 4.

TABLE 4

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-IV-3 | $5.0 \times 10^{-5}$ | 2.5 | 0.80 | 3.6 | 1 |
| 2 | H-11a | $8 \times 10^{-3}$ | D-IV-3 | $5.0 \times 10^{-5}$ | 5.3 | 1.50 | 15.3 | 5 |
| 3 | H-11a | $8 \times 10^{-3}$ | D-IV-5 | $6.0 \times 10^{-5}$ | 5.4 | 1.51 | 15.5 | 4 |
| 4 | H-11a | $8 \times 10^{-3}$ | D-IV-13 | $6.0 \times 10^{-5}$ | 5.3 | 1.49 | 15.3 | 4 |
| 5 | H-26e | $5 \times 10^{-3}$ | D-IV-3 | $5.0 \times 10^{-5}$ | 5.4 | 1.50 | 14.1 | 5 |
| 6 | H-26e | $5 \times 10^{-3}$ | D-IV-5 | $6.0 \times 10^{-5}$ | 5.3 | 1.53 | 13.8 | 4 |
| 7 | H-26e | $5 \times 10^{-3}$ | D-IV-13 | $6.0 \times 10^{-5}$ | 5.4 | 1.48 | 13.5 | 4 |
| 8 | H-34a | $6 \times 10^{-3}$ | D-IV-3 | $5.0 \times 10^{-5}$ | 5.3 | 1.51 | 15.5 | 5 |
| 9 | H-34a | $6 \times 10^{-3}$ | D-IV-5 | $6.0 \times 10^{-5}$ | 5.3 | 1.48 | 15.2 | 5 |
| 10 | H-34a | $6 \times 10^{-3}$ | D-IV-13 | $6.0 \times 10^{-5}$ | 5.4 | 1.45 | 14.6 | 5 |
| 11 | H-34m | $9 \times 10^{-3}$ | D-IV-3 | $5.0 \times 10^{-5}$ | 5.3 | 1.51 | 13.9 | 5 |
| 12 | H-34m | $9 \times 10^{-3}$ | D-IV-5 | $6.0 \times 10^{-5}$ | 5.3 | 1.57 | 13.4 | 4 |
| 13 | H-34m | $9 \times 10^{-3}$ | D-IV-13 | $6.0 \times 10^{-5}$ | 5.4 | 1.58 | 13 | 4 |
| 14 | H-101 | $6 \times 10^{-3}$ | D-IV-3 | $5.0 \times 10^{-5}$ | 5.3 | 1.56 | 13.5 | 5 |
| 15 | H-101 | $6 \times 10^{-3}$ | D-IV-5 | $6.0 \times 10^{-5}$ | 5.4 | 1.57 | 14.6 | 5 |
| 16 | H-101 | $6 \times 10^{-3}$ | D-IV-13 | $6.0 \times 10^{-5}$ | 5.3 | 1.51 | 14.3 | 5 |

TABLE 4-continued

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 17 | H-101 | $6 \times 10^{-3}$ | D-IV-11 | $5.0 \times 10^{-5}$ | 5.4 | 1.57 | 14.2 | 5 |
| 18 | H-116 | $6 \times 10^{-3}$ | D-IV-3 | $5.0 \times 10^{-5}$ | 5.3 | 1.50 | 15.1 | 5 |
| 19 | H-116 | $6 \times 10^{-3}$ | D-IV-5 | $6.0 \times 10^{-5}$ | 5.4 | 1.59 | 14.3 | 5 |
| 20 | H-116 | $6 \times 10^{-3}$ | D-IV-13 | $6.0 \times 10^{-5}$ | 5.3 | 1.53 | 15.3 | 5 |
| 21 | H-116 | $6 \times 10^{-3}$ | D-IV-11 | $5.0 \times 10^{-5}$ | 5.4 | 1.52 | 14.8 | 5 |
| 22 | H-116 | $6 \times 10^{-3}$ | D-IV-15 | $5.0 \times 10^{-5}$ | 5.3 | 1.50 | 15.1 | 5 |
| 23 | H-56 | $8 \times 10^{-3}$ | D-IV-3 | $5.0 \times 10^{-5}$ | 5.3 | 1.51 | 14.6 | 4 |
| 24 | H-56 | $8 \times 10^{-3}$ | D-IV-5 | $6.0 \times 10^{-5}$ | 5.4 | 1.52 | 14.9 | 5 |
| 25 | H-56 | $8 \times 10^{-3}$ | D-IV-13 | $6.0 \times 10^{-5}$ | 5.3 | 1.51 | 15.1 | 4 |

*comparison

It is evident that photothermographic materials using hydrazine compounds according to the invention satisfy all the requirements of high Dmax, high contrast, and image quality.

Example 5

Samples were prepared as in Example 1 except that the sensitizing dyes shown in Table 5 were used.

The samples were evaluated for photographic properties and image reproducibility as in Example 1. The results are shown in Table 5.

It is evident that photothermographic materials using hydrazine compounds according to the invention satisfy all the requirements of high Dmax, high contrast, and image quality.

Example 6

Samples were prepared as in Example 2 except that the sensitizing dyes shown in Table 6 were used.

The samples were evaluated for photographic properties and image reproducibility as in Example 1. The results are shown in Table 6.

TABLE 5

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-V-1 | $5.0 \times 10^{-5}$ | 2.5 | 0.80 | 4.1 | 1 |
| 2 | H-11a | $8 \times 10^{-3}$ | D-V-1 | $5.0 \times 10^{-5}$ | 5.3 | 1.37 | 13.4 | 4 |
| 3 | H-11a | $8 \times 10^{-3}$ | D-V-8 | $6.0 \times 10^{-5}$ | 5.4 | 1.38 | 13.8 | 5 |
| 4 | H-11a | $8 \times 10^{-3}$ | D-V-40 | $6.0 \times 10^{-5}$ | 5.3 | 1.36 | 13.1 | 4 |
| 5 | H-26e | $5 \times 10^{-3}$ | D-V-1 | $5.0 \times 10^{-5}$ | 5.4 | 1.37 | 13.8 | 5 |
| 6 | H-26e | $5 \times 10^{-3}$ | D-V-8 | $6.0 \times 10^{-5}$ | 5.3 | 1.40 | 13.5 | 4 |
| 7 | H-26e | $5 \times 10^{-3}$ | D-V-40 | $6.0 \times 10^{-5}$ | 5.4 | 1.35 | 13.4 | 5 |
| 8 | H-34a | $6 \times 10^{-3}$ | D-V-1 | $5.0 \times 10^{-5}$ | 5.3 | 1.39 | 13.8 | 4 |
| 9 | H-34a | $6 \times 10^{-3}$ | D-V-8 | $6.0 \times 10^{-5}$ | 5.3 | 1.35 | 13.5 | 5 |
| 10 | H-34a | $6 \times 10^{-3}$ | D-V-40 | $6.0 \times 10^{-5}$ | 5.4 | 1.32 | 13.2 | 5 |
| 11 | H-34m | $9 \times 10^{-3}$ | D-V-1 | $5.0 \times 10^{-5}$ | 5.3 | 1.38 | 13.5 | 5 |
| 12 | H-34m | $9 \times 10^{-3}$ | D-V-8 | $6.0 \times 10^{-5}$ | 5.3 | 1.47 | 12.6 | 4 |
| 13 | H-34m | $9 \times 10^{-3}$ | D-V-40 | $6.0 \times 10^{-5}$ | 5.4 | 1.45 | 12.5 | 4 |
| 14 | H-101 | $6 \times 10^{-3}$ | D-V-1 | $5.0 \times 10^{-5}$ | 5.3 | 1.43 | 12.5 | 5 |
| 15 | H-101 | $6 \times 10^{-3}$ | D-V-8 | $6.0 \times 10^{-5}$ | 5.4 | 1.46 | 12.6 | 5 |
| 16 | H-101 | $6 \times 10^{-3}$ | D-V-40 | $6.0 \times 10^{-5}$ | 5.3 | 1.38 | 13.5 | 5 |
| 17 | H-101 | $6 \times 10^{-3}$ | D-V-41 | $5.0 \times 10^{-5}$ | 5.4 | 1.44 | 13.2 | 5 |
| 18 | H-116 | $6 \times 10^{-3}$ | D-V-1 | $5.0 \times 10^{-5}$ | 5.3 | 1.37 | 13.4 | 5 |
| 19 | H-116 | $6 \times 10^{-3}$ | D-V-8 | $6.0 \times 10^{-5}$ | 5.4 | 1.46 | 12.4 | 5 |
| 20 | H-116 | $6 \times 10^{-3}$ | D-V-40 | $6.0 \times 10^{-5}$ | 5.3 | 1.40 | 13.7 | 5 |
| 21 | H-116 | $6 \times 10^{-3}$ | D-V-41 | $5.0 \times 10^{-5}$ | 5.4 | 1.39 | 13.8 | 5 |
| 22 | H-116 | $6 \times 10^{-3}$ | D-V-35 | $5.0 \times 10^{-5}$ | 5.3 | 1.32 | 12.5 | 5 |
| 23 | H-56 | $8 \times 10^{-3}$ | D-V-1 | $5.0 \times 10^{-5}$ | 5.3 | 1.38 | 12.9 | 4 |
| 24 | H-56 | $8 \times 10^{-3}$ | D-V-8 | $6.0 \times 10^{-5}$ | 5.4 | 1.39 | 13.7 | 5 |
| 25 | H-56 | $8 \times 10^{-3}$ | D-V-40 | $6.0 \times 10^{-5}$ | 5.3 | 1.38 | 13.2 | 4 |

*comparison

TABLE 6

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-V-1 | $5.0 \times 10^{-5}$ | 2.5 | 0.80 | 3.6 | 1 |
| 2 | H-11a | $8 \times 10^{-3}$ | D-V-1 | $5.0 \times 10^{-5}$ | 5.3 | 1.47 | 15.0 | 5 |
| 3 | H-11a | $8 \times 10^{-3}$ | D-V-8 | $6.0 \times 10^{-5}$ | 5.4 | 1.48 | 15.2 | 4 |
| 4 | H-11a | $8 \times 10^{-3}$ | D-V-40 | $6.0 \times 10^{-5}$ | 5.3 | 1.46 | 15.0 | 4 |
| 5 | H-26e | $5 \times 10^{-3}$ | D-V-1 | $5.0 \times 10^{-5}$ | 5.4 | 1.47 | 13.8 | 5 |
| 6 | H-26e | $5 \times 10^{-3}$ | D-V-8 | $6.0 \times 10^{-5}$ | 5.3 | 1.50 | 13.5 | 4 |
| 7 | H-26e | $5 \times 10^{-3}$ | D-V-40 | $6.0 \times 10^{-5}$ | 5.4 | 1.45 | 13.2 | 4 |
| 8 | H-34a | $6 \times 10^{-3}$ | D-V-1 | $5.0 \times 10^{-5}$ | 5.3 | 1.48 | 15.2 | 5 |
| 9 | H-34a | $6 \times 10^{-3}$ | D-V-8 | $6.0 \times 10^{-5}$ | 5.3 | 1.45 | 14.9 | 5 |
| 10 | H-34a | $6 \times 10^{-3}$ | D-V-40 | $6.0 \times 10^{-5}$ | 5.4 | 1.42 | 14.3 | 5 |
| 11 | H-34m | $9 \times 10^{-3}$ | D-V-1 | $5.0 \times 10^{-5}$ | 5.3 | 1.48 | 13.6 | 5 |
| 12 | H-34m | $9 \times 10^{-3}$ | D-V-8 | $6.0 \times 10^{-5}$ | 5.3 | 1.54 | 13.1 | 4 |
| 13 | H-34m | $9 \times 10^{-3}$ | D-V-40 | $6.0 \times 10^{-5}$ | 5.4 | 1.55 | 12.7 | 4 |
| 14 | H-101 | $6 \times 10^{-3}$ | D-V-1 | $5.0 \times 10^{-5}$ | 5.3 | 1.53 | 13.2 | 5 |
| 15 | H-101 | $6 \times 10^{-3}$ | D-V-8 | $6.0 \times 10^{-5}$ | 5.4 | 1.54 | 14.3 | 5 |
| 16 | H-101 | $6 \times 10^{-3}$ | D-V-40 | $6.0 \times 10^{-5}$ | 5.3 | 1.48 | 14.0 | 5 |
| 17 | H-101 | $6 \times 10^{-3}$ | D-V-41 | $5.0 \times 10^{-5}$ | 5.4 | 1.54 | 13.9 | 5 |
| 18 | H-116 | $6 \times 10^{-3}$ | D-V-1 | $5.0 \times 10^{-5}$ | 5.3 | 1.47 | 14.8 | 5 |
| 19 | H-116 | $6 \times 10^{-3}$ | D-V-8 | $6.0 \times 10^{-5}$ | 5.4 | 1.56 | 14.0 | 5 |
| 20 | H-116 | $6 \times 10^{-3}$ | D-V-40 | $6.0 \times 10^{-5}$ | 5.3 | 1.50 | 15.0 | 5 |
| 21 | H-116 | $6 \times 10^{-3}$ | D-V-41 | $5.0 \times 10^{-5}$ | 5.4 | 1.49 | 14.5 | 5 |
| 22 | H-116 | $6 \times 10^{-3}$ | D-V-35 | $5.0 \times 10^{-5}$ | 5.3 | 1.47 | 14.8 | 5 |
| 23 | H-56 | $8 \times 10^{-3}$ | D-V-1 | $5.0 \times 10^{-5}$ | 5.3 | 1.48 | 14.3 | 4 |
| 24 | H-56 | $8 \times 10^{-3}$ | D-V-8 | $6.0 \times 10^{-5}$ | 5.4 | 1.49 | i4.6 | 5 |
| 25 | H-56 | $8 \times 10^{-3}$ | D-V-40 | $6.0 \times 10^{-5}$ | 5.3 | 1.48 | 14.8 | 4 |

*comparison

It is evident that photothermographic materials using hydrazine compounds according to the invention satisfy all the requirements of high Dmax, high contrast, and image quality.

Example 7

Samples were prepared as in Example 1 except that the sensitizing dyes shown in Table 7 were used.

The samples were evaluated for photographic properties and image reproducibility as in Example 1. The results are shown in Table 7.

TABLE 7

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-VI-2 | $5.0 \times 10^{-5}$ | 2.5 | 0.80 | 4.1 | 1 |
| 2 | H-11a | $8 \times 10^{-3}$ | D-VI-2 | $5.0 \times 10^{-5}$ | 5.3 | 1.39 | 14.3 | 4 |
| 3 | H-11a | $8 \times 10^{-3}$ | D-VI-3 | $6.0 \times 10^{-5}$ | 5.4 | 1.40 | 14.7 | 5 |
| 4 | H-11a | $8 \times 10^{-3}$ | D-VI-4 | $6.0 \times 10^{-5}$ | 5.3 | 1.38 | 14.1 | 4 |
| 5 | H-26e | $5 \times 10^{-3}$ | D-VI-2 | $5.0 \times 10^{-5}$ | 5.4 | 1.39 | 14.8 | 5 |
| 6 | H-26e | $5 \times 10^{-3}$ | D-VI-3 | $6.0 \times 10^{-5}$ | 5.3 | 1.41 | 14.4 | 4 |
| 7 | H-26e | $5 \times 10^{-3}$ | D-VI-4 | $6.0 \times 10^{-5}$ | 5.4 | 1.37 | 14.3 | 5 |
| 8 | H-34a | $6 \times 10^{-3}$ | D-VI-2 | $5.0 \times 10^{-5}$ | 5.3 | 1.41 | 14.7 | 4 |
| 9 | H-34a | $6 \times 10^{-3}$ | D-VI-3 | $6.0 \times 10^{-5}$ | 5.3 | 1.37 | 14.4 | 5 |
| 10 | H-34a | $6 \times 10^{-3}$ | D-VI-4 | $6.0 \times 10^{-5}$ | 5.4 | 1.34 | 14.1 | 5 |
| 11 | H-34m | $9 \times 10^{-3}$ | D-VI-2 | $5.0 \times 10^{-5}$ | 5.3 | 1.40 | 14.4 | 5 |
| 12 | H-34m | $9 \times 10^{-3}$ | D-VI-3 | $6.0 \times 10^{-5}$ | 5.3 | 1.48 | 13.5 | 4 |
| 13 | H-34m | $9 \times 10^{-3}$ | D-VI-4 | $6.0 \times 10^{-5}$ | 5.4 | 1.46 | 13.4 | 4 |
| 14 | H-101 | $6 \times 10^{-3}$ | D-VI-2 | $5.0 \times 10^{-5}$ | 5.3 | 1.44 | 13.4 | 5 |
| 15 | H-101 | $6 \times 10^{-3}$ | D-VI-3 | $6.0 \times 10^{-5}$ | 5.4 | 1.47 | 13.5 | 5 |
| 16 | H-101 | $6 \times 10^{-3}$ | D-VI-4 | $6.0 \times 10^{-5}$ | 5.3 | 1.40 | 14.4 | 5 |
| 17 | H-101 | $6 \times 10^{-3}$ | D-VI-8 | $5.0 \times 10^{-5}$ | 5.4 | 1.45 | 14.1 | 5 |
| 18 | H-116 | $6 \times 10^{-3}$ | D-VI-2 | $5.0 \times 10^{-5}$ | 5.3 | 1.39 | 14.3 | 5 |
| 19 | H-116 | $6 \times 10^{-3}$ | D-VI-3 | $6.0 \times 10^{-5}$ | 5.4 | 1.47 | 13.3 | 5 |
| 20 | H-116 | $6 \times 10^{-3}$ | D-VI-4 | $6.0 \times 10^{-5}$ | 5.3 | 1.41 | 14.6 | 5 |
| 21 | H-116 | $6 \times 10^{-3}$ | D-VI-8 | $5.0 \times 10^{-5}$ | 5.4 | 1.41 | 14.8 | 5 |
| 22 | H-116 | $6 \times 10^{-3}$ | D-VI-10 | $5.0 \times 10^{-5}$ | 5.3 | 1.34 | 13.4 | 5 |
| 23 | H-56 | $8 \times 10^{-3}$ | D-VI-2 | $5.0 \times 10^{-5}$ | 5.3 | 1.40 | 13.9 | 4 |

TABLE 7-continued

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 24 | H-56 | $8 \times 10^{-3}$ | D-VI-3 | $6.0 \times 10^{-5}$ | 5.4 | 1.41 | 14.6 | 5 |
| 25 | H-56 | $8 \times 10^{-3}$ | D-VI-4 | $6.0 \times 10^{-5}$ | 5.3 | 1.40 | 14.1 | 4 |

*comparison

It is evident that photothermographic materials using hydrazine compounds according to the invention satisfy all the requirements of high Dmax, high contrast, and image quality.

Example 8

Samples were prepared as in Example 2 except that the sensitizing dyes shown in Table 8 were used.

The samples were evaluated for photographic properties and image reproducibility as in Example 1. The results are shown in Table 8.

It is evident that photothermographic materials using hydrazine compounds according to the invention satisfy all the requirements of high Dmax, high contrast, and image quality.

Example 9

Samples were prepared as in Example 1 except that the sensitizing dyes shown in Table 9 were used and dye B was used instead of BC dye.

The samples were evaluated for photographic properties and image reproducibility as in Example 1 except that exposure was at 810 nm and halide lamp illumination was eliminated. The results are shown in Table 9.

TABLE 8

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-VI-2 | $5.0 \times 10^{-5}$ | 2.5 | 0.80 | 3.6 | 1 |
| 2 | H-11a | $8 \times 10^{-3}$ | D-VI-2 | $5.0 \times 10^{-5}$ | 5.3 | 1.49 | 15.2 | 5 |
| 3 | H-11a | $8 \times 10^{-3}$ | D-VI-3 | $6.0 \times 10^{-5}$ | 5.4 | 1.50 | 15.4 | 4 |
| 4 | H-11a | $8 \times 10^{-3}$ | D-VI-4 | $6.0 \times 10^{-5}$ | 5.3 | 1.48 | 15.2 | 4 |
| 5 | H-26a | $5 \times 10^{-3}$ | D-VI-2 | $5.0 \times 10^{-5}$ | 5.4 | 1.49 | 14.0 | 5 |
| 6 | H-26e | $5 \times 10^{-3}$ | D-VI-3 | $6.0 \times 10^{-5}$ | 5.3 | 1.52 | 13.7 | 4 |
| 7 | H-26e | $5 \times 10^{-3}$ | D-VI-4 | $6.0 \times 10^{-5}$ | 5.4 | 1.47 | 13.4 | 4 |
| 8 | H-34a | $6 \times 10^{-3}$ | D-VI-2 | $5.0 \times 10^{-5}$ | 5.3 | 1.50 | 15.4 | 5 |
| 9 | H-34a | $6 \times 10^{-3}$ | D-VI-3 | $6.0 \times 10^{-5}$ | 5.3 | 1.47 | 15.1 | 5 |
| 10 | H-34a | $6 \times 10^{-3}$ | D-VI-4 | $6.0 \times 10^{-5}$ | 5.4 | 1.44 | 14.5 | 5 |
| 11 | H-34m | $9 \times 10^{-3}$ | D-VI-2 | $5.0 \times 10^{-5}$ | 5.3 | 1.50 | 13.8 | 5 |
| 12 | H-34m | $9 \times 10^{-3}$ | D-VI-3 | $6.0 \times 10^{-5}$ | 5.3 | 1.56 | 13.3 | 4 |
| 13 | H-34m | $9 \times 10^{-3}$ | D-VI-4 | $6.0 \times 10^{-5}$ | 5.4 | 1.57 | 12.9 | 4 |
| 14 | H-101 | $6 \times 10^{-3}$ | D-VI-2 | $5.0 \times 10^{-5}$ | 5.3 | 1.55 | 13.4 | 5 |
| 15 | H-101 | $6 \times 10^{-3}$ | D-VI-3 | $6.0 \times 10^{-5}$ | 5.4 | 1.56 | 14.5 | 5 |
| 16 | H-101 | $6 \times 10^{-3}$ | D-VI-4 | $6.0 \times 10^{-5}$ | 5.3 | 1.50 | 14.2 | 5 |
| 17 | H-101 | $6 \times 10^{-3}$ | D-VI-8 | $5.0 \times 10^{-5}$ | 5.4 | 1.56 | 14.1 | 5 |
| 18 | H-116 | $6 \times 10^{-3}$ | D-VI-2 | $5.0 \times 10^{-5}$ | 5.3 | 1.49 | 15.0 | 5 |
| 19 | H-116 | $6 \times 10^{-3}$ | D-VI-3 | $6.0 \times 10^{-5}$ | 5.4 | 1.58 | 14.2 | 5 |
| 20 | H-116 | $6 \times 10^{-3}$ | D-VI-4 | $6.0 \times 10^{-5}$ | 5.3 | 1.52 | 15.2 | 5 |
| 21 | H-116 | $6 \times 10^{-3}$ | D-VI-8 | $5.0 \times 10^{-5}$ | 5.4 | 1.51 | 14.7 | 5 |
| 22 | H-116 | $6 \times 10^{-3}$ | D-VI-10 | $5.0 \times 10^{-5}$ | 5.3 | 1.49 | 15.0 | 5 |
| 23 | H-56 | $8 \times 10^{-3}$ | D-VI-2 | $5.0 \times 10^{-5}$ | 5.3 | 1.50 | 14.5 | 4 |
| 24 | H-56 | $8 \times 10^{-3}$ | D-VI-3 | $6.0 \times 10^{-5}$ | 5.4 | 1.51 | 14.8 | 5 |
| 25 | H-56 | $8 \times 10^{-3}$ | D-VI-4 | $6.0 \times 10^{-5}$ | 5.3 | 1.50 | 15.0 | 4 |

*comparison dye B

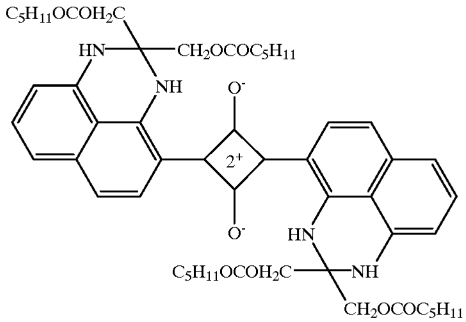

It is evident that photothermographic materials using hydrazine compounds according to the invention satisfy all the requirements of high Dmax, high contrast, and image quality.

Example 10

Samples were prepared as in Example 2 except that the sensitizing dyes shown in Table 10 were used.

TABLE 9

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-I-1 | $1.0 \times 10^{-4}$ | 2.5 | 0.80 | 4.1 | 1 |
| 2 | H-11a | $8 \times 10^{-3}$ | D-I-1 | $1.0 \times 10^{-4}$ | 5.3 | 1.38 | 14.3 | 4 |
| 3 | H-11a | $8 \times 10^{-3}$ | D-I-11 | $1.2 \times 10^{-4}$ | 5.4 | 1.39 | 14.7 | 5 |
| 4 | H-11a | $8 \times 10^{-3}$ | D-II-3 | $1.2 \times 10^{-4}$ | 5.3 | 1.37 | 14.0 | 4 |
| 5 | H-26e | $5 \times 10^{-3}$ | D-I-1 | $1.0 \times 10^{-4}$ | 5.4 | 1.38 | 14.8 | 5 |
| 6 | H-26e | $5 \times 10^{-3}$ | D-I-11 | $1.2 \times 10^{-4}$ | 5.3 | 1.41 | 14.4 | 4 |
| 7 | H-26e | $5 \times 10^{-3}$ | D-II-3 | $1.2 \times 10^{-4}$ | 5.4 | 1.36 | 14.3 | 5 |
| 8 | H-34a | $6 \times 10^{-3}$ | D-I-1 | $1.0 \times 10^{-4}$ | 5.3 | 1.40 | 14.7 | 4 |
| 9 | H-34a | $6 \times 10^{-3}$ | D-I-11 | $1.2 \times 10^{-4}$ | 5.3 | 1.36 | 14.4 | 5 |
| 10 | H-34a | $6 \times 10^{-3}$ | D-II-3 | $1.2 \times 10^{-4}$ | 5.4 | 1.33 | 14.1 | 5 |
| 11 | H-34m | $9 \times 10^{-3}$ | D-I-1 | $1.0 \times 10^{-4}$ | 5.3 | 1.39 | 14.4 | 5 |
| 12 | H-34m | $9 \times 10^{-3}$ | D-I-11 | $1.2 \times 10^{-4}$ | 5.3 | 1.48 | 13.4 | 4 |
| 13 | H-34m | $9 \times 10^{-3}$ | D-II-3 | $1.2 \times 10^{-4}$ | 5.4 | 1.46 | 13.3 | 4 |
| 14 | H-101 | $6 \times 10^{-3}$ | D-I-1 | $1.0 \times 10^{-4}$ | 5.3 | 1.44 | 13.3 | 5 |
| 15 | H-101 | $6 \times 10^{-3}$ | D-I-11 | $1.2 \times 10^{-4}$ | 5.4 | 1.47 | 13.4 | 5 |
| 16 | H-101 | $6 \times 10^{-3}$ | D-II-3 | $1.2 \times 10^{-4}$ | 5.3 | 1.39 | 14.4 | 5 |
| 17 | H-101 | $6 \times 10^{-3}$ | D-II-12 | $1.2 \times 10^{-4}$ | 5.4 | 1.45 | 14.1 | 5 |
| 18 | H-116 | $6 \times 10^{-3}$ | D-I-1 | $1.0 \times 10^{-4}$ | 5.3 | 1.38 | 14.3 | 5 |
| 19 | H-116 | $6 \times 10^{-3}$ | D-I-11 | $1.2 \times 10^{-4}$ | 5.4 | 1.47 | 13.2 | 5 |
| 20 | H-116 | $6 \times 10^{-3}$ | D-II-3 | $1.2 \times 10^{-4}$ | 5.3 | 1.41 | 14.6 | 5 |
| 21 | H-116 | $6 \times 10^{-3}$ | D-II-14 | $1.2 \times 10^{-4}$ | 5.4 | 1.40 | 14.8 | 5 |
| 22 | H-116 | $6 \times 10^{-3}$ | D-II-18 | $1.2 \times 10^{-4}$ | 5.3 | 1.38 | 14.5 | 5 |
| 23 | H-56 | $8 \times 10^{-3}$ | D-I-1 | $1.0 \times 10^{-4}$ | 5.3 | 1.39 | 13.8 | 4 |
| 24 | H-56 | $8 \times 10^{-3}$ | D-I-11 | $1.2 \times 10^{-4}$ | 5.4 | 1.40 | 14.6 | 5 |
| 25 | H-56 | $8 \times 10^{-3}$ | D-II-3 | $1.2 \times 10^{-4}$ | 5.3 | 1.39 | 14.1 | 4 |

*comparison

The samples were evaluated for photographic properties and image reproducibility as in Example 1 except for exposure at 810 nm. The results are shown in Table 10.

TABLE 10

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 1* | | | D-I-1 | $1.0 \times 10^{-4}$ | 2.5 | 0.80 | 4.1 | 1 |
| 2 | H-11a | $8 \times 10^{-3}$ | D-I-1 | $1.0 \times 10^{-4}$ | 5.3 | 1.35 | 14.0 | 4 |
| 3 | H-11a | $8 \times 10^{-3}$ | D-I-11 | $1.2 \times 10^{-4}$ | 5.4 | 1.36 | 14.4 | 5 |
| 4 | H-11a | $8 \times 10^{-3}$ | D-II-3 | $1.2 \times 10^{-4}$ | 5.3 | 1.34 | 13.7 | 4 |
| 5 | H-26e | $5 \times 10^{-3}$ | D-I-1 | $1.0 \times 10^{-4}$ | 5.4 | 1.35 | 14.5 | 5 |
| 6 | H-26e | $5 \times 10^{-3}$ | D-I-11 | $1.2 \times 10^{-4}$ | 5.3 | 1.38 | 14.1 | 4 |
| 7 | H-26e | $5 \times 10^{-3}$ | D-II-3 | $1.2 \times 10^{-4}$ | 5.4 | 1.33 | 14.0 | 5 |
| 8 | H-34a | $6 \times 10^{-3}$ | D-I-1 | $1.0 \times 10^{-4}$ | 5.3 | 1.37 | 14.4 | 4 |
| 9 | H-34a | $6 \times 10^{-3}$ | D-I-11 | $1.2 \times 10^{-4}$ | 5.3 | 1.33 | 14.1 | 5 |
| 10 | H-34a | $6 \times 10^{-3}$ | D-II-3 | $1.2 \times 10^{-4}$ | 5.4 | 1.30 | 13.8 | 5 |
| 11 | H-34m | $9 \times 10^{-3}$ | D-I-1 | $1.0 \times 10^{-4}$ | 5.3 | 1.36 | 14.1 | 5 |
| 12 | H-34m | $9 \times 10^{-3}$ | D-I-11 | $1.2 \times 10^{-4}$ | 5.3 | 1.45 | 13.1 | 4 |
| 13 | H-34m | $9 \times 10^{-3}$ | D-II-3 | $1.2 \times 10^{-4}$ | 5.4 | 1.43 | 13.0 | 4 |

TABLE 10-continued

| Sample No. | Hydrazine Type | Amount (mol/mol of Ag) | Sensitizing dye Type | Amount (mol/mol of Ag) | Dmax | Sensitivity | γ | Sharpness |
|---|---|---|---|---|---|---|---|---|
| 14 | H-101 | $6 \times 10^{-3}$ | D-I-1 | $1.0 \times 10^{-4}$ | 5.3 | 1.41 | 13.0 | 5 |
| 15 | H-101 | $6 \times 10^{-3}$ | D-I-11 | $1.2 \times 10^{-4}$ | 5.A | 1.44 | 13.1 | 5 |
| 16 | H-101 | $6 \times 10^{-3}$ | D-II-3 | $1.2 \times 10^{-4}$ | 5.3 | 1.36 | 14.1 | 5 |
| 17 | H-101 | $6 \times 10^{-3}$ | D-II-12 | $1.2 \times 10^{-4}$ | 5.4 | 1.42 | 13.8 | 5 |
| 18 | H-116 | $6 \times 10^{-3}$ | D-I-1 | $1.0 \times 10^{-4}$ | 5.3 | 1.35 | 14.0 | 5 |
| 19 | H-116 | $6 \times 10^{-3}$ | D-I-11 | $1.2 \times 10^{-4}$ | 5.4 | 1.44 | 12.9 | 5 |
| 20 | H-116 | $6 \times 10^{-3}$ | D-II-3 | $1.2 \times 10^{-4}$ | 5.3 | 1.38 | 14.3 | 5 |
| 21 | H-116 | $6 \times 10^{-3}$ | D-II-14 | $1.2 \times 10^{-4}$ | 5.4 | 1.37 | 14.5 | 5 |
| 22 | H-116 | $6 \times 10^{-3}$ | D-II-18 | $1.2 \times 10^{-4}$ | 5.3 | 1.35 | 14.2 | 5 |
| 23 | H-56 | $8 \times 10^{-3}$ | D-I-1 | $1.0 \times 10^{-4}$ | 5.3 | 1.36 | 13.5 | 4 |
| 24 | H-56 | $8 \times 10^{-3}$ | D-I-11 | $1.2 \times 10^{-4}$ | 5.4 | 1.37 | 14.3 | 5 |
| 25 | H-56 | $8 \times 10^{-3}$ | D-II-3 | $1.2 \times 10^{-4}$ | 5.3 | 1.36 | 13.8 | 4 |

*comparison

It is evident that photothermographic materials using hydrazine compounds according to the invention satisfy all the requirements of high Dmax, high contrast, and image quality.

Example 11

Samples were prepared as in Example 1 except that hydrazine derivatives H-43, H-49, H-50, H-40p, H-34n, and H-42p were used instead of the hydrazine derivative used in Example 1. The results were equivalent to Example 1.

The following procedures were carried out in preparation for Examples 12 to 17.

Preparation of Coating Solutions A1 to A4

Coating solutions A1 to A4 were prepared by separately dispersing base generators (BP-7), (BP-6), (BP-35) identified above and a solid base in the form of tricyclohexylguanidine according to the following formulation by means of a sand mill (1/16 G Sand Grinder Mill by Imex K.K.).

| | |
|---|---|
| Base generator | 12.0 g |
| Polyvinyl alcohol | 1.56 g |
| $H_2O$ | 26.4 g |

Preparation of Coating Solutions B1 to B5

A chromophoric system of a basic colorless dye precursor and an acidic material was prepared as follows. An organic solvent phase was prepared by mixing and dissolving the following components.

| | |
|---|---|
| Basic colorless dye precursor | Table 11 |
| Acidic material | Table 11 |
| 3:1 addition product of xylylene diisocyanate and trimethylol propane | 18 g |
| Dibutyl phthalate | 24 g |
| Ethyl acetate | 5 g |

An aqueous solution phase was prepared by mixing and dissolving the following components.

| | |
|---|---|
| Polyvinyl alcohol | 5.2 g |
| $H_2O$ | 58 g |

The organic solvent phase was mixed with the aqueous solution phase. The mixture was emulsified and dispersed at room temperature, obtaining an emulsion having a mean particle size of 2.5 μm. The emulsion was combined with 100 grams of water, heated to 60° C., and stirred at the temperature for 2 hours, obtaining a solution of microcapsules containing the basic colorless dye precursor and acidic material in their core.

Preparation of Coating Solution B6

The above procedure was repeated except that dye L-216 shown in Table 11 was used instead of the basic colorless dye precursor and acidic material whose type and amount are shown in Table 11. There was obtained a solution of microcapsules containing the dye L-216 in their core.

TABLE 11

| Chemical additive | B1 | B2 | B3 | B4 | B5 | B6 |
|---|---|---|---|---|---|---|
| L-301 | 2 | — | — | — | — | — |
| L-302 | — | 2 | — | — | — | — |
| L-305 | — | — | 2 | — | — | — |
| L-307 | — | — | — | 2 | — | — |
| L-308 | — | — | — | — | 2 | — |
| L-216 | — | — | — | — | — | 2 |
| K-2 | 2.3 | 2.3 | 2 | 2 | 2.3 | — |

Note: The amount of a chemical additive is expressed in gram.

Preparation of Coating Solutions C1 to C6

Coating solutions were prepared by replacing the chromophoric system of a basic colorless dye precursor and an acidic material used in the preparation of coating solutions B1 to B6 by the following formulation. An organic solvent phase was prepared by mixing and dissolving the following components.

| | |
|---|---|
| Basic colorless dye precursor | Table 12 |
| Acidic material | Table 12 |
| Sodium dodecylbenzenesulfonate | 0.9 g |
| High-boiling solvent-I | 3 g |
| Ethyl acetate | 45 ml |

An aqueous solution phase was prepared by mixing and dissolving the following components.

| | | |
|---|---|---|
| Gelatin | 12 | g |
| 3.5% methanol solution of Compound-I | 1.2 | ml |
| $H_2O$ | 87 | ml |

The organic solvent phase was mixed with the aqueous solution phase. The mixture was emulsified and dispersed at 50° C., obtaining an emulsion having a mean particle size of 0.4 μm. The emulsion was combined with 160 ml of water, stirred at 50° C., and then cooled for solidification, obtaining an emulsion containing the basic colorless dye precursor and acidic material.

Note that high-boiling solvent-I and compound-I are shown below.

high-boiling solvent-I

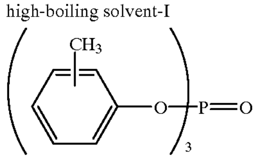

compound-I

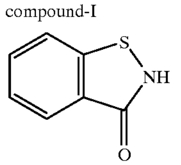

TABLE 12

| Chemical additive | C1 | C2 | C3 | C4 | C5 | C6 |
|---|---|---|---|---|---|---|
| L-301 | 3 | — | — | — | — | — |
| L-302 | — | 3 | — | — | — | — |
| L-305 | — | — | 3 | — | — | — |
| L-307 | — | — | — | 3 | — | — |
| L-308 | — | — | — | — | 3 | — |
| L-216 | — | — | — | — | — | 3 |
| K-2 | 4 | 4 | 3 | 3 | 4 | 3 |

Note: The amount of a chemical additive is expressed in gram.

Example 12

Preparation of Organic Acid Silver Emulsion A

To 12 liters of water were added 840 grams of behenic acid and 95 grams of stearic acid. To the solution kept at 90° C., a solution of 48 grams of sodium hydroxide and 63 grams of sodium carbonate in 1.5 liters of water was added. The solution was stirred for 30 minutes and then cooled to 50° C. whereupon 1.1 liters of a 1% aqueous solution of N-bromosuccinimide was added. With stirring, 2.3 liters of a 17% aqueous solution of silver nitrate was slowly added. While the solution was kept at 35° C., with stirring, 1.5 liters of a 2% aqueous solution of potassium bromide was added over 2 minutes. The solution was stirred for 30 minutes whereupon 2.4 liters of a 1% aqueous solution of N-bromosuccinimide was added. With stirring, 3,300 grams of a solution containing 1.2% by weight of polyvinyl acetate in butyl acetate was added to the aqueous mixture. The mixture was allowed to stand for 10 minutes, separating into two layers. After the aqueous layer was removed, the remaining gel was washed twice with water. There was obtained a gel-like mixture of silver behenate, silver stearate, and silver bromide, which was dispersed in 1,800 grams of a 2.6% 2-butanone solution of polyvinyl butyral (Denka Butyral #3000-K). The dispersion was further dispersed in 600 grams of polyvinyl butyral (Denka Butyral #4000-2) and 300 grams of 2-butanone, obtaining an organic acid silver salt emulsions of needle grains having a mean minor diameter of 0.05 μm, a mean major diameter of 1.2 μm, and a coefficient of variation of 25%.

Preparation of Emulsion Layer Coating Solution A

With stirring at 25° C., the following chemicals were added to the above-prepared organic acid silver salt emulsion A in amounts per mol of silver.

| | | |
|---|---|---|
| Sodium phenylthiosulfonate | 10 | mg |
| Sensitizing dye-1 | 5.5 | mg |
| 2-mercapto-5-methylbenzimidazole | 2 | g |
| 2-mercapto-5-methylbenzothiazole | 1 | g |
| 4-chlorobenzophenone-2-carboxylic acid | 21.5 | g |
| 2-butanone | 580 | g |
| Dimethylformamide | 220 | g |

The emulsion was allowed to stand for 3 hours. With stirring, the following chemicals were further added.

| | | |
|---|---|---|
| 4,5-ditrichloromethyl-2-phenyltriazine | 4.5 | g |
| Disulfide compound A | 2 | g |
| 1,1-bis(2-hydroxy-3,5-dimethylphenyl)-3,5,5-trimethylhexane | 160 | g |
| Phthalazine | 15 | g |
| Tetrachlorophthalic acid | 5 | g |
| Hydrazine derivative H-116 | 1.1 | g |
| Megafax F-176P | 1.1 | g |
| 2-butanone | 590 | g |
| Methyl isobutyl ketone | 10 | g |

Note that sensitizing dye-1, hydrazine derivative H-116, and disulfide compound A are shown below.

sensitizing dye-1

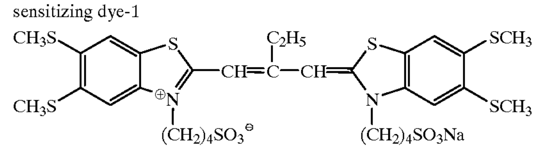

hydrazine derivative H-116

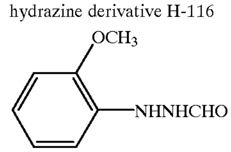

disulfide compound A

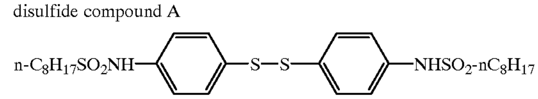

Preparation of Emulsion Layer Surface Protective Layer Coating Solution A

A coating solution A for an emulsion layer surface protective layer was prepared by mixing and dissolving the following chemicals at room temperature.

| | | |
|---|---|---|
| CAB 171-15S | 75 | g |
| 4-methylphthalic acid | 5.7 | g |
| Tetrachlorophthalic anhydride | 1.5 | g |
| 2-tribromomethylsulfonylbenzothiazole | 10 | g |

-continued

| | |
|---|---|
| Phthalazone | 2 g |
| Megafax F-176P | 0.3 g |
| Sildex H31 (spherical silica, 3 μm) | 2 g |
| Sumidur N3500 | 5 g |
| 2-butanone | 3070 g |
| Ethyl acetate | 30 g |

Preparation of Back-coated Support G1 to G12

| | |
|---|---|
| Back layer | |
| Gelatin | 2.1 g/m$^2$ |
| Coating solution | Table 13 |
| Sodium dodecylbenzenesulfonate | 80 mg/m$^2$ |
| 1,3-divinylsulfone-2-propanol | 60 mg/m$^2$ |
| Back protective layer | |
| Gelatin | 0.5 g/m$^2$ |
| Polymethyl methacrylate (particle size 4.7 μm) | 30 mg/m$^2$ |
| Sodium dodecylbenzenesulfonate | 20 mg/m$^2$ |
| Silicone oil | 90 mg/m$^2$ |

A polyethylene terephthalate film having a moisture-proof undercoat of vinylidene chloride on one surface and a hydrophilic undercoat of gelatin on the other surface was coated on the gelatin undercoat with the back surface coating solution so as to give an optical density of at least 0.3 at 633 nm.

TABLE 13

| Support | Chemical additive |
|---|---|
| G1 | none |
| G2 | coating solution A3 2 g/m$^2$ + coating solution B1 2 g/m$^2$ |
| G3 | coating solution A3 2 g/m$^2$ + coating solution B2 2 g/m$^2$ |
| G4 | coating solution A3 2 g/m$^2$ + coating solution B3 2 g/m$^2$ |
| G5 | coating solution A4 2 g/m$^2$ + coating solution B4 2 g/m$^2$ |
| G6 | coating solution A4 2 g/m$^2$ + coating solution B5 2 g/m$^2$ |
| G7 | coating solution A1 2 g/m$^2$ + coating solution C1 2 g/m$^2$ |
| G8 | coating solution A1 2 g/m$^2$ + coating solution C2 2 g/m$^2$ |
| G9 | coating solution A3 2 g/m$^2$ + coating solution C3 2 g/m$^2$ |
| G10 | coating solution A3 2 g/m$^2$ + coating solution C4 2 g/m$^2$ |
| G11 | coating solution A2 2 g/m$^2$ + coating solution C5 2 g/m$^2$ |
| G12 | dye C 70 mg/m$^2$ |

Note that dye C in Table 13 is shown below.

dye C

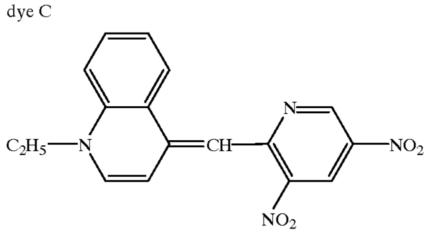

On the thus prepared support, the emulsion layer coating solution was coated so as to give a coverage of 2 g/m$^2$ of silver and the emulsion layer protective layer coating solution was then coated on the emulsion layer so as to give a dry thickness of 5 μm, obtaining sample Nos. 101 to 112.

Photographic Property Test

The photographic material samples were exposed by means of a He—Ne light source color scanner SG-608 by Dai-Nihon Screen K.K. and heated for development at 115° C. for 25 seconds on a heat drum. The resulting images were determined for Dmax and sensitivity (an inversion of a ratio of an exposure dose providing a density higher by 1.5 than Dmin) by a densitometer. Gradation γ is the gradient of a straight line connecting points of density 0.3 and 3.0 on a characteristic curve. The results are shown in Table 14.

Dot Sharpness Test

Using a He—Ne light source color scanner SG-608 by Dai-Nihon Screen K.K., a 50% screen tint of 100 lines was output to a coated sample, which was developed under the same conditions as above. Through a 100× magnifier, the image was visually observed for sharpness of dots. The results of evaluation were reported in Table 14 using a three-point scale of point 3 for good image quality to point 1 for poor image quality. Point 2 or higher is necessary for practical use.

Evaluation of Residual Color in Minimum Density Area

A minimum density area of an imaged sample was measured for transmission absorbance by a spectrophotometer U-3210 by Hitachi K.K. Only samples showing a transmission absorbance of up to 0.1 at 700 to 350 nm were regarded passed while the remaining samples were rejected. The results are shown in Table 14.

TABLE 14

| Sample No. | Sensitivity | Residual color | Image quality | Remarks |
|---|---|---|---|---|
| 101 | 100 | passed | 1 | comparison |
| 102 | 70 | passed | 2 | invention |
| 103 | 68 | passed | 2 | invention |
| 104 | 71 | passed | 2 | invention |
| 105 | 65 | passed | 2 | invention |
| 106 | 70 | passed | 2 | invention |
| 107 | 66 | passed | 2 | invention |
| 108 | 69 | passed | 2 | invention |
| 109 | 68 | passed | 2 | invention |
| 110 | 66 | passed | 2 | invention |
| 111 | 71 | passed | 2 | invention |
| 112 | 65 | rejected | 2 | comparison |

It is evident that photothermographic materials using decolorizable dyes according to the invention satisfy all the requirements of high contrast, image quality and residual color.

Example 13

Preparation of Silver Halide Grains B

In 900 ml of water were dissolved 7.5 grams of inert gelatin and 10 mg of potassium bromide. The solution was adjusted to pH 3.0 at a temperature of 35° C. To the solution, 370 ml of an aqueous solution containing 74 grams of silver nitrate and an aqueous solution containing potassium bromide and potassium iodide in a molar ratio of 96:4 and $K_4[Fe(CN)_6]$ were added over 10 minutes by a controlled double jet method while maintaining the solution at pAg 7.7. Note that $[Fe(CN)_6]^{4-}$ was added in an amount of $3\times10^{-5}$ mol/mol of silver. Thereafter, 0.3 gram of 4-hydroxy-6-methyl-1,3,3a,7-tetraazaindene was added to the solution, which was adjusted to pH 5 with NaOH. There were obtained cubic silver iodobromide grains B having a mean grain size of 0.06 μm, a coefficient of variation of projected area diameter of 8%, and a {100} plane ratio of 87%. The emulsion was desalted by adding a gelatin flocculant thereto to cause flocculation and sedimentation and then adjusted to pH 5.9 and pAg 7.5 by adding 0.1 gram of phenoxyethanol.

Preparation of Organic Acid Silver Emulsion B

A mixture of 10.6 grams of behenic acid and 300 ml of water was mixed for 15 minutes at 90° C. With vigorous stirring, 31.1 ml of 1N sodium hydroxide was added over 15 minutes to the solution, which was allowed to stand at the temperature for one hour. The solution was then cooled to 30° C., 7 ml of 1N phosphoric acid was added thereto, and with more vigorous stirring, 0.13 gram of N-bromosuccinimide was added. Thereafter, with stirring, the above-prepared silver halide grains B were added to the solution in such an amount as to give 2.5 mmol of silver halide. Further, 25 ml of 1N silver nitrate aqueous solution was continuously added over 2 minutes, with stirring continued for a further 90 minutes. With stirring, 37 grams of a 1.2 wt % n-butyl acetate solution of polyvinyl acetate was slowly added to the aqueous mixture to form flocs in the dispersion. Water was removed, and water washing and water removal were repeated twice. With stirring, 20 grams of a solution of 2.5% by weight polyvinyl butyral (Denka Butyral #3000-K) in a 1/2 solvent mixture of butyl acetate and 2-butanone was added. To the thus obtained gel-like mixture of organic acid silver and silver halide, 7.8 grams of polyvinyl butyral (Denka Butyral #4000-2) and 57 grams of 2-butanone were added. The mixture was dispersed by a homogenizer, obtaining a silver behenate emulsion of needle grains having a mean minor diameter of 0.04 μm, a mean major diameter of 1 μm and a coefficient of variation of 30%.

Preparation of Emulsion Layer Coating Solution B

With stirring at 25° C., the following chemicals were added to the above-prepared organic acid silver salt emulsion B in amounts per mol of silver.

| | |
|---|---|
| Sodium phenylthiosulfonate | 10 mg |
| Sensitizing dye-1 | 5.5 mg |
| 2-mercapto-5-methylbenzimidazole | 2 g |
| 2-mercapto-5-methylbenzothiazole | 1 g |
| 4-chlorobenzophenone-2-carboxylic acid | 21.5 g |
| 2-butanone | 580 g |
| Dimethylformamide | 220 g |

The emulsion was allowed to stand for 3 hours. With stirring, the following chemicals were further added.

| | |
|---|---|
| 4,6-ditrichloromethyl-2-phenyltriazine | 4.5 g |
| Disulfide compound A | 2 g |
| 1,1-bis(2-hydroxy-3,5-dimethylphenyl)-3,5,5-trimethylhexane | 160 g |
| Phthalazine | 15 g |
| Tetrachlorophthalic acid | 5 g |
| Hydrazine derivative H-116 | 1.1 g |
| Megafax F-176P | 1.1 g |
| 2-butanone | 590 g |
| Methyl isobutyl ketone | 10 g |

Coated samples were prepared as in Example 12 except that emulsion layer coating solution B was used instead of emulsion layer coating solution A. There were obtained sample Nos. 201 to 212 in which the emulsion layer coating solution was coated on the support in a coverage of 2 $g/m^2$ of silver and the emulsion surface protective layer coating solution was coated to a dry thickness of 5 μm. It is noted that sensitizing dye-1, hydrazine derivative H-116, and disulfide compound A were the same as used in Example 1.

The samples were evaluated for photographic properties, image reproducibility, and residual color in minimum density area as in Example 12. The results are shown in Table 15.

TABLE 15

| Sample No. | Sensitivity | Residual color | Image quality | Remarks |
|---|---|---|---|---|
| 201 | 100 | passed | 1 | comparison |
| 202 | 66 | passed | 2 | invention |
| 203 | 65 | passed | 2 | invention |
| 204 | 69 | passed | 2 | invention |
| 205 | 64 | passed | 2 | invention |
| 206 | 60 | passed | 2 | invention |
| 207 | 66 | passed | 2 | invention |
| 208 | 64 | passed | 2 | invention |
| 209 | 65 | passed | 2 | invention |
| 210 | 66 | passed | 2 | invention |
| 211 | 65 | passed | 2 | invention |
| 212 | 55 | rejected | 3 | comparison |

It is evident that photothermographic materials using decolorizable dyes according to the invention satisfy all the requirements of high contrast, image quality and residual color.

Example 14

Samples were prepared as in Examples 12 and 13 except that the back-coated support of each sample prepared in Examples 12 and 13 was replaced by support G1 in Examples 12 and 13 and a layer of the back layer composition was formed between the support and the emulsion layer.

The samples were evaluated for photographic properties, image reproducibility, and residual color in minimum density area as in Examples 12 and 13, finding that photothermographic materials using decolorizable dyes according to the invention satisfy all the requirements of high contrast, image quality and residual color.

Example 15

Samples were prepared as in Examples 12 and 13 except that sensitizing dye-2 was used instead of sensitizing dye-1 sensitizing dye-2

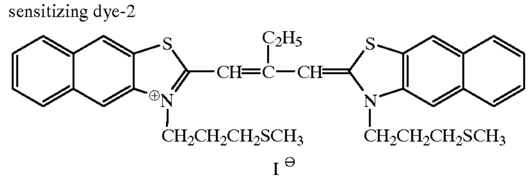

Evaluation of Photographic Properties

Each sample was processed as in Examples 12 and 13 except that the sample was exposed to xenon flash light for a light emission time of $10^{-3}$ second through an interference filter having a peak at 670 nm.

The samples were evaluated for image reproducibility and residual color in minimum density area as in Examples 12 and 13.

It was found that photothermographic materials using decolorizable dyes according to the invention produce images satisfying all the requirements of high contrast, image quality and residual color.

Example 16

Samples were prepared as in Example 13 except that the following dye was added to the emulsion layer.

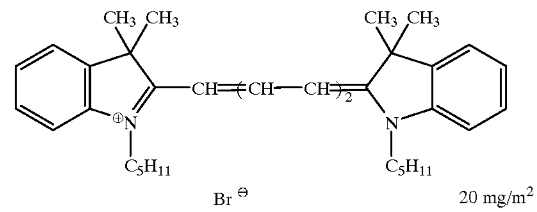

20 mg/m²

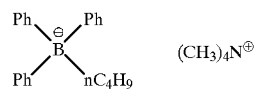

30 mg/m²

Photographic Property Test

The photographic material samples were exposed by means of a He—Ne light source color scanner SG-608 by Dai-Nihon Screen K.K. and heated for development at 115° C. for 25 seconds on a heat drum. A halide lamp was operated to illuminate light to the developed samples for 15 seconds. The resulting images were determined by a densitometer and evaluated as in Example 13. The results are shown in Table 16.

TABLE 16

| Sample No. | Sensitivity | Residual color | Image quality | Remarks |
|---|---|---|---|---|
| 301 | 100 | passed | 1 | comparison |
| 302 | 50 | passed | 3 | invention |
| 303 | 58 | passed | 3 | invention |
| 304 | 61 | passed | 3 | invention |
| 305 | 55 | passed | 3 | invention |
| 306 | 60 | passed | 3 | invention |
| 307 | 56 | passed | 3 | invention |
| 308 | 54 | passed | 3 | invention |
| 309 | 55 | passed | 3 | invention |
| 310 | 60 | passed | 3 | invention |
| 311 | 52 | passed | 3 | invention |
| 312 | 45 | rejected | 3 | comparison |

It is evident that photothermographic materials using decolorizable dyes according to the invention produce images satisfying all the requirements of high contrast, image quality and residual color.

Example 17

Samples were prepared as in Example 12 except that hydrazine derivatives H-43, H-49, H-50, H-40p, H-34n, and H-42p were used instead of H-116. The results were equivalent to Example 12.

Example 18

Preparation of Silver Halide Grains A

In 900 ml of water were dissolved 7.5 grams of inert gelatin and 10 mg of potassium bromide. The solution was adjusted to pH 3.0 at a temperature of 35° C. To the solution, 370 ml of an aqueous solution containing 74 grams of silver nitrate and an aqueous solution containing potassium bromide and potassium iodide in a molar ratio of 96:4 were added over 10 minutes by a controlled double jet method while maintaining the solution at pAg 7.7. At the same time as the start of silver nitrate addition, a salt of hexacyanoferrate(III) and a complex salt of hexachloroiridate(III) were added over 5 minutes in an amount of $1\times10^{-5}$ mol/mol of Ag. Thereafter, 0.3 gram of 4-hydroxy-6-methyl-1,3,3a,7-tetraazaindene was added to the solution, which was adjusted to pH 5 with NaOH. There were obtained cubic silver iodobromide grains A having a mean grain size of 0.06 μm, a coefficient of variation of projected area diameter of 8%, and a {100} plane ratio of 87%. The emulsion was desalted by adding a gelatin flocculant thereto to cause flocculation and sedimentation and then adjusted to pH 5.9 and pAg 7.5 by adding 0.1 gram of phenoxyethanol.

Preparation of Organic Fatty Acid Silver Emulsion A

Behenic acid, 10.6 grams, was dissolved in 300 ml of water by heating at 90° C. With thorough stirring, 31.1 ml of 1N sodium hydroxide was added to the solution, which was allowed to stand at the temperature for one hour. The solution was then cooled to 30° C., 7.0 ml of 1N phosphoric acid was added thereto, and with thorough stirring, 0.13 gram of N-bromosuccinimide was added. Thereafter, with stirring, the above-prepared silver halide grains A were added to the solution heated at 40° C. in such an amount as to give 10 mol % of silver based on the behenic acid. Further, 25 ml of 1N silver nitrate aqueous solution was continuously added over 2 minutes. With stirring continued, the dispersion was allowed to stand for one hour.

With stirring, 37 grams of a 1.2 wt % n-butyl acetate solution of polyvinyl acetate was slowly added to the aqueous mixture to form flocs in the dispersion. Water was removed, and water washing and water removal were repeated twice. With stirring, 20 grams of a solution of 2.5% by weight polyvinyl butyral (Denka Butyral #3000-K) in a 1/2 solvent mixture of butyl acetate and isopropyl alcohol was added. To the thus obtained gel-like mixture of silver behenate and silver halide, 12.5 grams of polyvinyl butyral (Denka Butyral #4000-2) and 57 grams of isopropyl alcohol were added. The mixture was dispersed.

Preparation of Coated Sample

Samples were prepared by successively coating the following layers on a heat treated polyethylene terephthalate support. Each coating was dried at 75° C. for 5 minutes.

Back layer

A coating solution of the following composition was coated to a wet thickness of 100 μm on a back surface of the support opposite to a photosensitive layer-bearing surface.

| | |
|---|---|
| 10% isopropyl alcohol solution of polyvinyl butyral (Denka Butyral #4000-2) | 60 g |
| Isopropyl alcohol | 10 g |
| 8% ethyl acetate solution of 3-isocyanato-methyl-3,5,5-trimethylcyclohexyl isocyanate (Wako Junyaku K.K.) | 8 g |

Dye S-1 was added to the solution. That is, a solution containing 0.2 gram of dye S-1 in 10 grams of methanol and 20 grams of acetone was added to the solution so as to provide an absorbance of 0.8 at the exposure wavelength of 670 nm.

Dye S-1

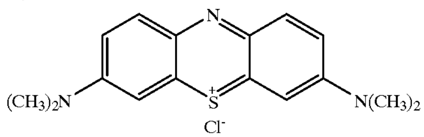

Photosensitive layer

A coating solution of the following composition was coated so as to give a coverage of 1.5 g/m$^2$ of silver. Note that the photosensitive layer contained $2\times10^{-4}$ mol/m$^2$ of an aromatic mercapto compound as shown in Table 17.

| | |
|---|---|
| Photosensitive emulsion A | 73 g |
| Sensitizing dye (0.05% in methanol, Table 17) | 4 ml |
| Phthalazine (5% in methanol) | 2.5 ml |
| Antifoggant-1 (1.7% in DMF) | 2.5 ml |
| Developing agent-1 (10% in acetone) | 13 ml |
| Aromatic mercapto compound (Table 17) | $2 \times 10^{-4}$ mol/m$^2$ |
| $CaBr_2$ (0.3% in methanol) | 6.5 ml |
| Hydrazine derivative (1% in methanol, Table 17) | 2.0 ml |

Antifoggant-1

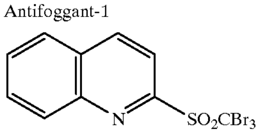

Developing agent-1

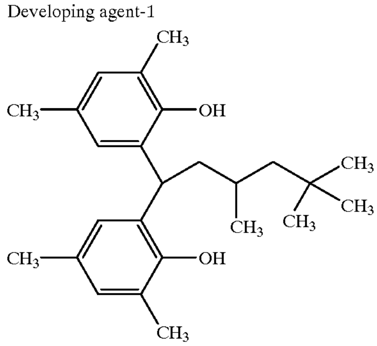

Surface protective layer

A coating solution of the following composition was coated on the photosensitive layer to a wet thickness of 100 μm.

| | |
|---|---|
| Acetone | 175 ml |
| Methanol | 15 ml |
| Cellulose acetate | 8.0 g |
| 4-methylphthalic acid | 0.72 g |

-continued

| | |
|---|---|
| Tetrachlorophthalic acid | 0.22 g |
| Tetrachlorophthalic anhydride | 0.5 g |

Sensitometry

Each photothermographic material sample was exposed to xenon flash light for a light emission time of $10^{-3}$ second through an interference filter having a peak at 670 nm and then heated for development at 115° C. for 15 seconds on a heat drum.

The developed samples were examined for sensitivity and gradation (γ) by sensitometry. The sensitivity is evaluated in terms of an inversion of an exposure dose providing a density of 3.0 and expressed by a relative value. γ is the gradient of a straight line connecting points of density 0.1 and 1.5 on a characteristic curve, indicating the contrast of toe gradation. The dye in the back layer was bleached by operating a halide lamp for 15 seconds after the heat development. The results are shown in Table 17.

TABLE 17

| Photo-thermo-graphic material | Mercapto compound | Hydrazine derivative | Dye | Sensitivity | Dmax | Dmin | γ |
|---|---|---|---|---|---|---|---|
| 1* | — | — | D-21 | 10 | 1.5 | 0.02 | 3 |
| 2* | M-1 | — | D-21 | 7 | 1.4 | 0.02 | 3 |
| 3* | M-2 | — | D-21 | 8 | 1.5 | 0.02 | 3 |
| 4* | MMBI | — | D-21 | 17 | 1.4 | 0.02 | 4 |
| 5 | MMBI | HR-1 | D-21 | 30 | 3.5 | 0.02 | 14 |
| 6 | MMBI | HR-1 | D-21 | 32 | 3.8 | 0.02 | 14 |
| 7 | MMBI | HR-3 | D-21 | 31 | 3.8 | 0.02 | 14 |
| 8 | MMBI | H-118 | D-21 | 52 | 4.1 | 0.02 | 18 |
| 9 | MMBI | H-121 | D-21 | 51 | 4.0 | 0.02 | 19 |
| 10 | MMBI | H-144 | D-21 | 50 | 4.2 | 0.02 | 19 |
| 11 | MMBI | H-151 | D-21 | 55 | 4.1 | 0.02 | 18 |
| 12 | MMBI | H-156 | D-21 | 52 | 4.0 | 0.02 | 19 |
| 13 | MMBI | H-151 | B-1 | 45 | 3.9 | 0.02 | 18 |
| 14 | MMBI | H-151 | B-2 | 40 | 3.8 | 0.02 | 18 |
| 15 | 2-MBI | H-123 | D-21 | 53 | 4.1 | 0.02 | 19 |
| 16 | 2-MBO | H-125 | D-21 | 55 | 4.1 | 0.02 | 19 |
| 17 | 2-MBT | H-131 | D-21 | 57 | 4.2 | 0.02 | 19 |
| 18 | 2-MI | H-136 | D-21 | 54 | 4.0 | 0.02 | 19 |
| 19 | M-1 | H-151 | D-21 | 12 | 3.7 | 0.02 | 10 |
| 20 | M-2 | H-151 | D-21 | 11 | 3.7 | 0.02 | 11 |

*comparison

The compounds shown by symbols in Table 17 are identified below.

MMBI: 2-mercapto-5-methylbenzimidazole

2-MBI: 2-mercaptobenzimidazole

2-MBO: 2-mercaptobenzoxazole

2-MBT: 2-mercaptobenzothiazole

2-MI: 2-mercaptoimidazole

Compound M-1 (supersensitizing agent)

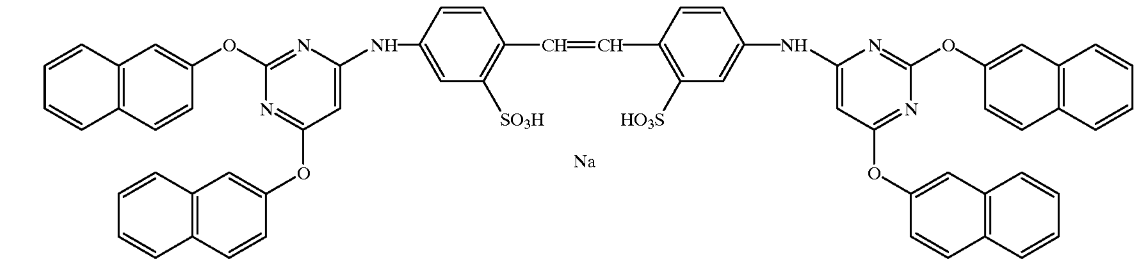

Compound M-2 (supersensitizing agent)

benzotriazole

Compound HR-1

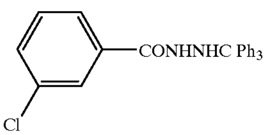

Compound HR-2

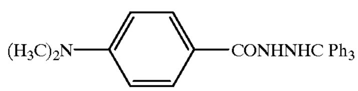

Compound HR-3

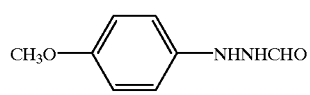

Sensitizing dye B-1

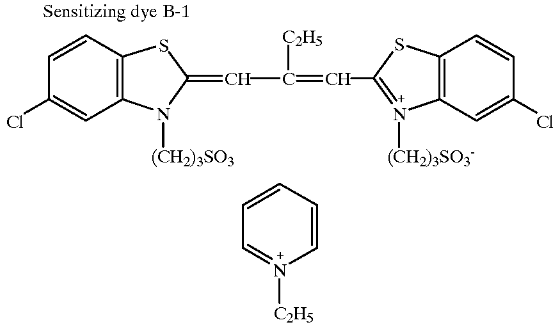

Sensitizing dye B-2

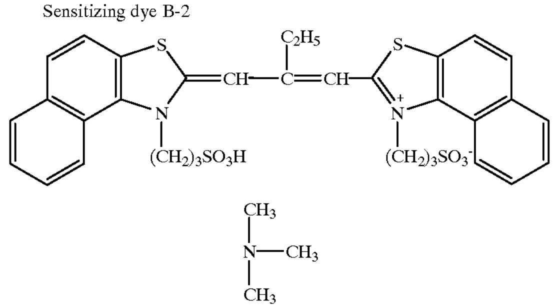

It is evident from Table 17 that photothermographic materials within the preferred scope of the invention show high γ, sensitivity and Dmax and no increase of fog. Higher sensitivity is obtained when a hydrazine derivative of the general formula (Hb) or (Hc) is combined with a supersensitizing agent within the preferred scope of the invention. The panchromatic supersensitizing agent which has been used in the prior art is less effective. The sensitivity is further increased by using a sensitizing dye within the preferred scope of the invention.

Similar benefits were obtained when sensitizing dyes D-5 and D-11 were used.

The following procedures were carried out in preparation for Examples 19 to 24.

Preparation of Dye Dispersion

A dye was handled as a wet cake without drying and weighed so as to give 6.3 grams as dry solids. A dispersant was handled as a 10 wt % aqueous solution, which was added in such an amount as to give a dry solid content of 30% by weight based on of the solid weight of the dye. Water was added to the dye/dispersant mixture to a total amount of 63.3 grams. The mixture was thoroughly mixed into a slurry. The slurry was admitted into a vessel together with 100 cc of zirconia beads having a mean diameter of 0.5 mm. The slurry was dispersed for 6 hours by means of a dispersing machine (1/16 G Sand Grinder Mill by Imex K.K.). Water was added to a dye concentration of 8% by weight, completing a dye dispersion. The identity of the dye and dispersant used is shown in Table 18.

The dispersion was mixed with photographic gelatin in such amounts that the dye solid content was 5% by weight and the gelatin content was equal to the dye solid content. An aqueous solution of a preservative compound shown below was added to the dispersion in such an amount as to give 2000 ppm of the compound relative to the gelatin. The dispersion was refrigerated and stored in a jelly-like state.

TABLE 18

| Dispersion No. | Dye | Dispersant | Solution absorption γ max | Solvent |
|---|---|---|---|---|
| 1 | (1) | Dispersant-1 | 793 | Methanol |
| 2 | (62) | Dispersant-1 | 785 | Methanol |
| 3 | (63) | Dispersant-1 | 801 | Methanol |
| 4 | (72) | Dispersant-1 | 785 | Methanol |
| 5 | (131) | Dispersant-1 | 809 | DMSO |
| 6 | (1) | Dispersant-2 | 793 | Methanol |
| 7 | (1) | Dispersant-3 | 793 | Methanol |
| 8 | (1) | Dispersant-4 | 793 | Methanol |

Dispersant-1: Demol EP by Kao K.K.
Dispersant-2: Celogen 6A by Daiichi Kogyo Seiyaku K.K.
Dispersant-3: Demol SNB by Kao K.K.

Preparation of Coated Sample A

A coated sample A was prepared by coating an undercoated polyethylene terephthalate film with the following chemicals in the following coverage.

| | |
|---|---|
| Gelatin | 4.0 mg/m$^2$ |
| Dye dispersion (as dye solids) | 70 mg/m$^2$ |
| Compound-A | 24 mg/m$^2$ |
| Sodium polystyrenesulfonate | 24 mg/m$^2$ |

As a hardener, 1,2-bis(sulfonylacetamide)ethane was coated in a coverage of 130 mg/m$^2$ on either surface.

Compound-A

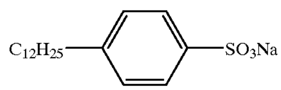

Spectral Absorption Measurement

The thus obtained samples were measured for transmission density by a spectrophotometer U-3410 by Hitachi K.K. The results are shown in Table 19. It is seen that the dyes within the preferred scope of the invention have low absorption in the visible region and sufficient absorption in the IR region.

TABLE 19

| Sample No. | Coated sample γ max | Maximum density at 350–700 nm | Absorbance at maximum density | Dispersion No. |
|---|---|---|---|---|
| 1 | 922 | 0.05 | 1.45 | 1 |
| 2 | 915 | 0.08 | 1.00 | 2 |
| 3 | 910 | 0.06 | 1.10 | 3 |
| 4 | 910 | 0.07 | 1.12 | 4 |
| 5 | 892 | 0.08 | 1.00 | 5 |
| 6 | 900 | 0.09 | 0.95 | 6 |
| 7 | 890 | 0.08 | 1.03 | 7 |
| 8 | 905 | 0.08 | 1.06 | 8 |

Example 19

Preparation of Back-coated Supports G1 to G12

| | |
|---|---|
| Back layer | |
| Gelatin | 2.1 g/m$^2$ |
| Dye dispersion | Table 20 |
| Sodium dodecylbenzenesulfonate | 80 mg/m$^2$ |
| 1,3-divinylsulfone-2-propanol | 60 mg/m$^2$ |
| Back protective layer | |
| Gelatin | 0.5 g/m$^2$ |
| Polymethyl methacrylate (particle size 4.7 μm) | 30 mg/m$^2$ |
| Sodium dodecylbenzenesulfonate | 20 mg/m$^2$ |
| Silicone oil | 90 mg/m$^2$ |

A polyethylene terephthalate film having a moisture-proof undercoat of vinylidene chloride on one surface and a hydrophilic undercoat of gelatin on the other surface was coated on the gelatin undercoat with the back surface coating solution so as to give an optical density of at least 0.3 at 850 to 1,400 nm.

TABLE 20

| Sample No. | Dispersion No. | Coverage (mg/m$^2$) calculated as dye solids |
|---|---|---|
| G1 | 1 | 40 |
| G2 | 2 | 40 |
| G3 | 3 | 40 |
| G4 | 4 | 40 |
| G5 | 5 | 40 |
| G6 | 6 | 40 |
| G7 | 7 | 40 |
| G8 | none | 0 |

Preparation of Organic Acid Silver Emulsion A

To 12 liters of water were added 840 grams of behenic acid and 95 grams of stearic acid. To the solution kept at 90° C., a solution of 48 grams of sodium hydroxide and 63 grams of sodium carbonate in 1.5 liters of water was added. The solution was stirred for 30 minutes and then cooled to 50° C. whereupon 1.1 liters of a 1% aqueous solution of N-bromosuccinimide was added. With stirring, 2.3 liters of a 17% aqueous solution of silver nitrate was slowly added. While the solution was kept at 35° C., with stirring, 1.5 liters of a 2% aqueous solution of potassium bromide was added over 2 minutes. The solution was stirred for 30 minutes whereupon 2.4 liters of a 1% aqueous solution of N-bromosuccinimide was added. With stirring, 3,300 grams of a solution containing 1.2% by weight of polyvinyl acetate in butyl acetate was added to the aqueous mixture. The mixture was allowed to stand for 10 minutes, separating into two layers. After the aqueous layer was removed, the remaining gel was washed twice with water. There was obtained a gel-like mixture of silver behenate, silver stearate, and silver bromide, which was dispersed in 1,800 grams of a 2.6% 2-butanone solution of polyvinyl butyral (Denka Butyral #3000-K). The dispersion was further dispersed in 600 grams of polyvinyl butyral (Denka Butyral #4000-2) and 300 grams of 2-butanone, obtaining an organic acid silver salt emulsion of needle grains having a mean minor diameter of 0.05 μm, a mean major diameter of 1.2 μm, and a coefficient of variation of 25%.

Preparation of Emulsion Layer Coating Solution A

With stirring at 25° C., the following chemicals were added to the above-prepared organic acid silver salt emulsion A in amounts per mol of silver.

| | |
|---|---|
| Sodium phenylthiosulfonate | 10 mg |
| Sensitizing dye-1 | 5.5 mg |
| 2-mercapto-5-methylbenzimidazole | 2 g |
| 2-mercapto-5-methylbenzothiazole | 1 g |
| 4-chlorobenzophenone-2-carboxylic acid | 21.5 g |
| 2-butanone | 580 g |
| Dimethylformamide | 220 g |

The emulsion was allowed to stand for 3 hours. With stirring, the following chemicals were further added.

| | |
|---|---|
| 4,6-ditrichloromethyl-2-phenyltriazine | 4.5 g |
| Disulfide compound A | 2 g |
| 1,1-bis(2-hydroxy-3,5-dimethylphenyl)-3,5,5-trimethylhexane | 160 g |
| Phthalazine | 15 g |
| Tetrachlorophthalic acid | 5 g |
| Hydrazine derivative (Table 21) | 1.1 g |

-continued

| | |
|---|---|
| Megafax F-176P | 1.1 g |
| 2-butanone | 590 g |
| Methyl isobutyl ketone | 10 g |

Note that sensitizing dye-1 is shown below.

sensitizing dye-1

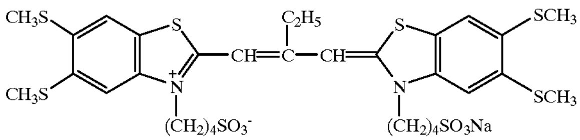

disulfide compound A

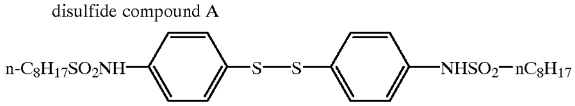

TABLE 21

| Sample No. | Support | Antihalation layer | Hydrazine derivative |
|---|---|---|---|
| 401 | G1 | AH-1 | H-77 |
| 402 | G2 | AH-1 | H-77 |
| 403 | G3 | AH-1 | H-77 |
| 404 | G4 | AH-1 | H-77 |
| 405 | G5 | AH-1 | H-77 |
| 406 | G6 | AH-1 | H-77 |
| 407 | G7 | AH-1 | H-77 |
| 408 | G8 | AH-1 | H-77 |
| 409 | G8 | AH-2 | H-77 |
| 410 | G1 | AH-1 | H-96 |
| 411 | G1 | AH-1 | H-98 |
| 412 | G1 | AH-1 | H-99 |
| 413 | G1 | AH-1 | H-101 |
| 414 | G2 | AH-2 | H-101 |

TABLE 21-continued

| Sample No. | Support | Antihalation layer | Hydrazine derivative |
|---|---|---|---|
| 415 | G1 | AH-1 | None |
| 416 | G1 | AH-2 | None |

Preparation of Emulsion Layer Surface Protective Layer Coating Solution A

A coating solution A for an emulsion layer surface protective layer was prepared by mixing and dissolving the following chemicals at room temperature.

| | |
|---|---|
| CAB 171-15S | 75 g |
| 4-methylphthalic acid | 5.7 g |
| Tetrachlorophthalic anhydride | 1.5 g |
| 2-tribromomethylsulfonylbenzothiazole | 10 g |
| Phthalazone | 2 g |
| Megafax F-176P | 0.3 g |
| Sildex H31 (spherical silica, 3 $\mu$m) | 2 g |
| Sumidur N3500 | 5 g |
| 2-butanone | 3070 g |
| Ethyl acetate | 30 g |

Antihalation Layer Coating Solution AH-1

| | |
|---|---|
| 10% isopropyl alcohol solution of polyvinyl butyral (Denka Butyral #4000-2) | 60 g |
| Isopropyl alcohol | 10 g |
| 8% ethyl acetate solution of 3-isocyanato-methyl-3,5,5-trimethylcyclohexyl isocyanate (Wako Junyaku K.K.) | 8 g |

To the solution was added 0.2 gram of dye D-1.

Antihalation Layer Coating Solution AH-2

An antihalation layer coating solution AH-2 was prepared in the same way as AH-1 except that dye D-2 was used instead of dye D-1.

dye D-1

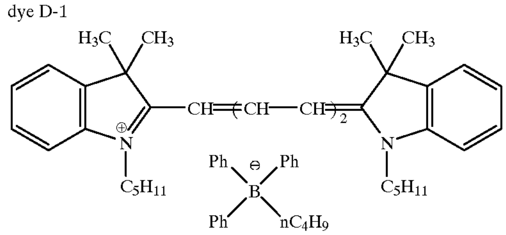

dye D-2

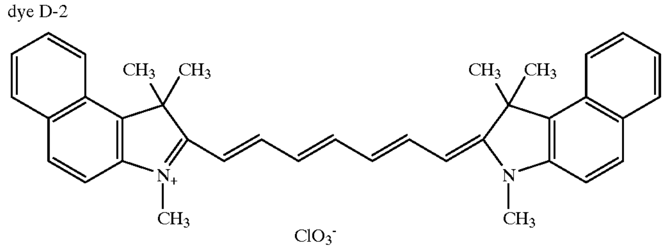

The above-prepared support was successively coated with an antihalation layer coating solution to a dry thickness of 6 μm, an emulsion layer coating solution in a coverage of 2 $g/m^2$ of silver, and an emulsion surface protective layer coating solution to a dry thickness of 5 μm, obtaining sample Nos. 401 to 416. Note that these samples had a spectral sensitivity maximum at 630 nm.

Photographic Property Test

The photographic material samples were exposed by means of a He—Ne light source color scanner SG-608 by Dai-Nihon Screen K.K. and heated for development at 115° C. for 25 seconds on a heat drum. The resulting images were determined by a densitometer. It was found that photosensitive materials within the preferred scope of the invention produced clear images with high sensitivity.

Dot Sharpness Test

Using a He—Ne light source color scanner SG-608 by Dai-Nihon Screen K.K., a 50% screen tint of 100 lines was output to a coated sample, which was developed under the same conditions as above. Through a 100× magnifier, the image was visually observed for sharpness of dots. The results of evaluation were reported in Table 22 using a three-point scale of point 3 for good image quality to point 1 for poor image quality. Point 2 or higher is necessary for practical use.

Film Detection Test

Ten sheets of each sample were fed into a film detection tester (a modified version of automatic processor FPM-9000 by Fuji Photo-Film Co., Ltd.) through its film inlet. The number of detected sheets was counted. The tester at the film inlet had a pair of an IR emitting element (GL-514 by Sharp K.K.) and a light-receiving element (PT501B by Sharp K.K.). Whenever a film sheet is inserted into the inlet, the detector detects blockage of IR by the sheet and delivers a signal to start a roller conveyor for automatically feeding the film sheet through the processor.

For each sample, the number of sheets passed was counted. The results are shown in Table 22.

TABLE 22

| Sample No. | Image quality | Number of undetected sheets |
|---|---|---|
| 401 | 3 | 0 |
| 402 | 3 | 0 |
| 403 | 3 | 0 |
| 404 | 3 | 0 |
| 405 | 3 | 0 |
| 406 | 3 | 0 |
| 407 | 3 | 0 |
| 408 | 3 | 10 |
| 409 | 2 | 10 |
| 410 | 3 | 0 |
| 411 | 3 | 0 |
| 412 | 3 | 0 |
| 413 | 3 | 0 |
| 414 | 2 | 0 |
| 415 | 2 | 0 |
| 416 | 2 | 0 |

It is evident that photothermographic materials using IR absorbing dyes within the preferred scope of the invention satisfy all the requirements of high contrast, image quality and film detection.

Example 20

Preparation of Silver Halide Grains B

In 900 ml of water were dissolved 7.5 grams of inert gelatin and 10 mg of potassium bromide. The solution was adjusted to pH 3.0 at a temperature of 35° C. To the solution, 370 ml of an aqueous solution containing 74 grams of silver nitrate and an aqueous solution containing potassium bromide and potassium iodide in a molar ratio of 96:4 and $K_4[Fe(CN)_6]$ were added over 10 minutes by a controlled double jet method while maintaining the solution at pAg 7.7. Note that $[Fe(CN)_6]^{4-}$ was added in an amount of $3\times10^{-5}$ mol/mol of silver. Thereafter, 0.3 gram of 4-hydroxy-6-methyl-1,3,3a,7-tetraazaindene was added to the solution, which was adjusted to pH 5 with NaOH. There were obtained cubic silver iodobromide grains B having a mean grain size of 0.06 μm, a coefficient of variation of projected area diameter of 8%, and a {100} plane ratio of 87%. The emulsion was desalted by adding a gelatin flocculant thereto to cause flocculation and sedimentation and then adjusted to pH 5.9 and pAg 7.5 by adding 0.1 gram of phenoxyethanol.

Preparation of Organic Acid Silver Emulsion B

A mixture of 10.6 grams of behenic acid and 300 ml of distilled water was mixed for 15 minutes at 90° C. With vigorous stirring, 31.1 ml of 1N sodium hydroxide was added over 15 minutes to the solution, which was allowed to stand at the temperature for one hour. The solution was then cooled to 30° C., 7 ml of 1N phosphoric acid was added thereto, and with more vigorous stirring, 0.13 gram of N-bromosuccinimide was added. Thereafter, with stirring, the above-prepared silver halide grains B were added to the solution in such an amount as to give 2.5 mmol of silver halide. Further, 25 ml of 1N silver nitrate aqueous solution was continuously added over 2 minutes, with stirring continued for a further 90 minutes. With stirring, 37 grams of a 1.2 wt % n-butyl acetate solution of polyvinyl acetate was slowly added to the aqueous mixture to form flocs in the dispersion. Water was removed, and water washing and water removal were repeated twice. With stirring, 20 grams of a solution of 2.5% by weight polyvinyl butyral (Denka Butyral #3000-K) in a 1/2 solvent mixture of butyl acetate and 2-butanone was added. To the thus obtained gel-like mixture of organic acid silver and silver halide, 7.8 grams of polyvinyl butyral (Denka Butyral #4000-2) and 57 grams of 2-butanone were added. The mixture was dispersed by a homogenizer, obtaining a silver behenate emulsion of needle grains having a mean minor diameter of 0.04 μm, a mean major diameter of 1 μm and a coefficient of variation of 30%.

Preparation of Emulsion Layer Coating Solution B

With stirring at 25° C., the following chemicals were added to the above-prepared organic acid silver salt emulsion B in amounts per mol of silver.

| | |
|---|---|
| Sodium phenylthiosulfonate | 10 mg |
| Sensitizing dye-1 | 5.5 mg |
| 2-mercapto-5-methylbenzimidazole | 2 g |
| 2-mercapto-5-methylbenzothiazole | 1 g |
| 4-chlorobenzophenone-2-carboxylic acid | 21.5 g |
| 2-butanone | 580 g |
| Dimethylformamide | 220 g |

The emulsion was allowed to stand for 3 hours. With stirring, the following chemicals were further added.

| | |
|---|---|
| 4,6-ditrichloromethyl-2-phenyltriazine | 4.5 g |
| Disulfide compound A | 2 g |
| 1,1-bis(2-hydroxy-3,5-dimethylphenyl)-3,5,5-trimethylhexane | 160 g |
| Phthalazine | 15 g |
| Tetrachlorophthalic acid | 5 g |

-continued

| | |
|---|---|
| Hydrazine derivative (Table 23) | 1.1 g |
| Megafax F-176P | 1.1 g |
| 2-butanone | 590 g |
| Methyl isobutyl ketone | 10 g |

sensitizing dye-1

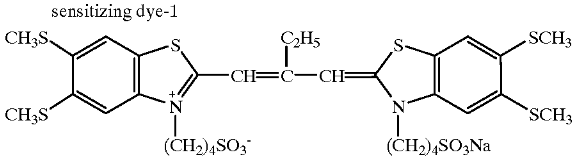

disulfide compound A

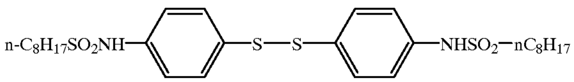

TABLE 23

| Sample No. | Support | Antihalation layer | Hydrazine derivative |
|---|---|---|---|
| 501 | G1 | AH-1 | H-80 |
| 502 | G2 | AH-1 | H-80 |
| 503 | G3 | AH-1 | H-80 |
| 504 | G4 | AH-1 | H-80 |
| 505 | G5 | AH-1 | H-80 |
| 506 | G6 | AH-1 | H-80 |
| 507 | G7 | AH-1 | H-80 |
| 508 | G8 | AH-1 | H-80 |
| 509 | G8 | AH-2 | H-80 |
| 510 | G1 | AH-1 | H-109 |
| 511 | G1 | AH-1 | H-111 |
| 512 | G1 | AH-1 | H-114 |
| 513 | G1 | AH-1 | H-102 |
| 514 | G2 | AH-2 | H-102 |
| 515 | G1 | AH-1 | None |
| 516 | G1 | AH-2 | None |

The procedure of Example 19 was followed except that emulsion layer coating solution B was used instead of emulsion layer coating solution A. Namely, the support was successively coated with an antihalation layer coating solution to a dry thickness of 6 μm, an emulsion layer coating solution in a coverage of 2 $g/m^2$ of silver, and an emulsion surface protective layer coating solution to a dry thickness of 5 μm, obtaining sample Nos. 501 to 516. Note that these samples had a spectral sensitivity maximum at 675 nm.

The samples were evaluated for photographic properties, image reproducibility and film detection as in Example 19. The results are shown in Table 24.

TABLE 24

| Sample No. | Image quality | Number of undetected sheets |
|---|---|---|
| 501 | 3 | 0 |
| 502 | 3 | 0 |
| 503 | 3 | 0 |
| 504 | 3 | 0 |
| 505 | 3 | 0 |
| 506 | 3 | 0 |
| 507 | 3 | 0 |
| 508 | 3 | 10 |
| 509 | 2 | 10 |
| 510 | 3 | 0 |

TABLE 24-continued

| Sample No. | Image quality | Number of undetected sheets |
|---|---|---|
| 511 | 3 | 0 |
| 512 | 3 | 0 |
| 513 | 3 | 0 |
| 514 | 2 | 0 |
| 515 | 2 | 0 |
| 516 | 2 | 0 |

It is evident that photothermographic materials using IR absorbing dyes within the preferred scope of the invention satisfy all the requirements of high contrast, image quality and film detection.

Example 21

Samples were prepared as in Examples 19 and 20 except that sensitizing dye-2 was used instead of sensitizing dye-1.

sensitizing dye-2

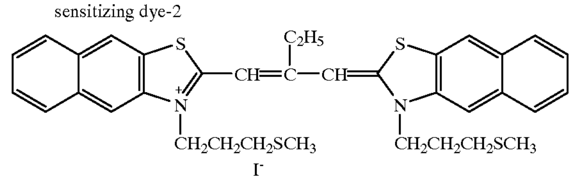

Each sample was processed as in Examples 19 and 20 except that the sample was exposed to xenon flash light for a light emission time of $10^{-3}$ second through an interference filter having a peak at 670 nm. The samples were evaluated for photographic properties, image reproducibility and film detection as in Examples 19 and 20.

It was found that photothermographic materials using IR absorbing dyes within the preferred scope of the invention satisfy all the requirements of high contrast, image quality and film detection.

Example 22

Samples were prepared as in Examples 19 and 20 except that diketo type hydrazine derivatives H-149, H-152, H-154, H-156, and H-158 were used instead of the hydrazine derivatives used in sample No. 401 of Example 19 and sample No. 501 of Example 20. The results were equivalent to Examples 19 and 20.

Example 23

Samples were prepared as in Examples 19 and 20 except that substituted alkyl type hydrazine derivatives H-117; H-123, H-124, H-136, and H-141 were used instead of the hydrazine derivatives used in sample No. 401 of Example 19 and sample No. 501 of Example 20. The results were equivalent to Examples 19 and 20.

Example 24

Samples were prepared as in Examples 19 and 20 except that hydrazine derivatives H-160, H-161, and H-164 were used instead of the hydrazine derivatives used in sample No. 401 of Example 19 and sample No. 501 of Example 20. The results were equivalent to Examples 19 and 20.

According to the invention, there is obtained a photothermographic material capable of forming a high Dmax, ultrahigh contrast image. In one preferred embodiment, there is obtained a photothermographic material featuring sensitivity at 600 to 850 nm, high Dmax, high contrast of toe gradation, and ultrahigh contrast. There is obtained a printing photosensitive material having improved image quality, especially a full dry process printing photosensitive material without a need for wet processing. In another preferred embodiment, there is obtained a photothermographic material featuring high Dmax, ultrahigh contrast, good resolution, being free of residual color after processing and detectable with infrared radiation. In a further preferred embodiment, there is obtained a photothermographic material featuring high Dmax, ultrahigh contrast and good resolution and being free of residual color after processing.

Example 25

Samples were prepared as in Example 9 except that the sensitizing dyes shown in Table 25 were used.

The samples were evaluated for photographic properties and image reproducibility as in Example 9.

The shelf stability of samples was examined as a measure for estimating a variation of photographic properties over a long term of storage. The samples were aged for 3 days at 50° C. and RH 40%. Sensitivity was measured before and after aging. A sensitivity change "ΔS" is the sensitivity of the aged sample minus the sensitivity of the fresh sample. A ΔS value more approximate to 0 indicates better stability.

The results are shown in Table 25.

It is evident that photothermographic materials using compounds within the preferred scope of the invention satisfy all the requirements of high Dmax, high contrast, and image quality and maintain such properties over a long term of storage.

Example 26

Samples were prepared as in Example 10 except that the sensitizing dyes shown in Table 26 were used.

The samples were evaluated for photographic properties and image reproducibility as in Example 9. The shelf stability of samples was examined as in Example 25.

The results are shown in Table 26.

TABLE 25

| | Hydrazine Type | Amount (mol/mol of Ag) | Dye | Amount (mol/mol of Ag) | Dmax | Sensitivity | γ | Sharpness | Δ S |
|---|---|---|---|---|---|---|---|---|---|
| 1* | — | — | D-I-1 | $1.0 \times 10^{-4}$ | 2.5 | 0.80 | 4.1 | 1 | 0.01 |
| 2* | — | — | D-II-3 | $1.2 \times 10^{-4}$ | 2.4 | 0.78 | 4.0 | 1 | 0.03 |
| 3 | H-34a | $6 \times 10^{-3}$ | D-I-1 | $1.0 \times 10^{-4}$ | 5.3 | 1.40 | 14.7 | 4 | 0.04 |
| 4 | H-34a | $6 \times 10^{-3}$ | D-I-11 | $1.2 \times 10^{-4}$ | 5.3 | 1.36 | 14.4 | 5 | 0.04 |
| 5 | H-34a | $6 \times 10^{-3}$ | D-II-3 | $1.2 \times 10^{-4}$ | 5.4 | 1.33 | 14.1 | 5 | 0.06 |
| 6 | H-34m | $9 \times 10^{-3}$ | D-I-1 | $1.0 \times 10^{-4}$ | 5.3 | 1.39 | 14.4 | 5 | 0.01 |
| 7 | H-34m | $9 \times 10^{-3}$ | D-I-11 | $1.2 \times 10^{-4}$ | 5.3 | 1.48 | 13.4 | 4 | 0.01 |
| 8 | H-34m | $9 \times 10^{-3}$ | D-II-3 | $1.2 \times 10^{-4}$ | 5.4 | 1.46 | 13.3 | 4 | 0.03 |
| 9 | H-34m | $9 \times 10^{-3}$ | D-II-12 | $1.0 \times 10^{-4}$ | 5.3 | 1.45 | 14.1 | 4 | 0.04 |
| 10 | H-34m | $9 \times 10^{-3}$ | D-I-14 | $1.0 \times 10^{-4}$ | 5.5 | 1.48 | 14.6 | 5 | 0.00 |
| 11 | H-34m | $9 \times 10^{-3}$ | D-I-16 | $1.0 \times 10^{-4}$ | 5.6 | 1.49 | 14.8 | 5 | 0.01 |
| 12 | H-68 | $6 \times 10^{-3}$ | D-I-1 | $1.0 \times 10^{-4}$ | 5.4 | 1.4 | 14.7 | 5 | 0.01 |
| 13 | H-68 | $6 \times 10^{-3}$ | D-I-11 | $1.2 \times 10^{-4}$ | 5.4 | 1.5 | 13.7 | 5 | 0.00 |
| 14 | H-68 | $6 \times 10^{-3}$ | D-II-3 | $1.2 \times 10^{-4}$ | 5.5 | 1.5 | 13.6 | 4 | 0.03 |
| 15 | H-68 | $6 \times 10^{-3}$ | D-II-12 | $1.0 \times 10^{-4}$ | 5.4 | 1.5 | 14.4 | 4 | 0.04 |
| 16 | H-68 | $6 \times 10^{-3}$ | D-I-14 | $1.0 \times 10^{-4}$ | 5.6 | 1.5 | 14.9 | 5 | 0.01 |
| 17 | H-68 | $6 \times 10^{-3}$ | D-I-16 | $1.0 \times 10^{-4}$ | 5.7 | 1.5 | 15.1 | 5 | 0.01 |
| 18 | H-72 | $6 \times 10^{-3}$ | D-I-1 | $1.0 \times 10^{-4}$ | 5.4 | 1.4 | 14.7 | 5 | 0.00 |
| 19 | H-72 | $6 \times 10^{-3}$ | D-I-11 | $1.2 \times 10^{-4}$ | 5.4 | 1.5 | 13.7 | 5 | 0.01 |
| 20 | H-72 | $6 \times 10^{-3}$ | D-II-3 | $1.2 \times 10^{-4}$ | 5.5 | 1.5 | 13.6 | 4 | 0.03 |
| 21 | H-72 | $6 \times 10^{-3}$ | D-II-12 | $1.0 \times 10^{-4}$ | 5.4 | 1.5 | 14.4 | 4 | 0.03 |
| 22 | H-72 | $6 \times 10^{-3}$ | D-I-14 | $1.0 \times 10^{-4}$ | 5.6 | 1.5 | 15.0 | 5 | 0.01 |
| 23 | H-72 | $6 \times 10^{-3}$ | D-I-16 | $1.0 \times 10^{-4}$ | 5.7 | 1.5 | 15.2 | 5 | 0.01 |
| 24 | H-76 | $6 \times 10^{-3}$ | D-I-1 | $1.0 \times 10^{-4}$ | 5.5 | 1.4 | 14.9 | 5 | 0.01 |
| 25 | H-76 | $6 \times 10^{-3}$ | D-I-11 | $1.2 \times 10^{-4}$ | 5.5 | 1.6 | 13.8 | 5 | 0.00 |
| 26 | H-76 | $6 \times 10^{-3}$ | D-II-3 | $1.2 \times 10^{-4}$ | 5.6 | 1.5 | 13.7 | 4 | 0.04 |
| 27 | H-76 | $6 \times 10^{-3}$ | D-II-12 | $1.0 \times 10^{-4}$ | 5.5 | 1.5 | 14.6 | 4 | 0.03 |
| 28 | H-76 | $6 \times 10^{-3}$ | D-I-14 | $1.0 \times 10^{-4}$ | 5.7 | 1.5 | 15.1 | 5 | 0.00 |
| 29 | H-76 | $6 \times 10^{-3}$ | D-I-16 | $1.0 \times 10^{-4}$ | 5.8 | 1.5 | 15.3 | 5 | 0.01 |

*comparison

TABLE 26

| | Hydrazine Type | Amount (mol/mol of Ag) | Dye | Amount (mol/mol of Ag) | Dmax | Sensitivity | γ | Sharpness | Δ S |
|---|---|---|---|---|---|---|---|---|---|
| 1* | — | — | D-I-1 | $1.0 \times 10^{-4}$ | 2.5 | 0.80 | 4.1 | 1 | 0.01 |
| 2* | — | — | D-II-3 | $1.2 \times 10^{-4}$ | 2.4 | 0.78 | 4.0 | 1 | 0.03 |
| 3 | H-34a | $6 \times 10^{-3}$ | D-I-1 | $1.0 \times 10^{-4}$ | 5.3 | 1.37 | 14.4 | 4 | 0.04 |
| 4 | H-34a | $6 \times 10^{-3}$ | D-I-11 | $1.2 \times 10^{-4}$ | 5.3 | 1.33 | 14.1 | 5 | 0.04 |
| 5 | H-34a | $6 \times 10^{-3}$ | D-II-3 | $1.2 \times 10^{-4}$ | 5.4 | 1.30 | 13.8 | 5 | 0.06 |
| 6 | H-34m | $9 \times 10^{-3}$ | D-I-1 | $1.0 \times 10^{-4}$ | 5.3 | 1.36 | 14.1 | 5 | 0.01 |
| 7 | H-34m | $9 \times 10^{-3}$ | D-I-11 | $1.2 \times 10^{-4}$ | 5.3 | 1.45 | 13.1 | 4 | 0.01 |
| 8 | H-34m | $9 \times 10^{-3}$ | D-II-3 | $1.2 \times 10^{-4}$ | 5.4 | 1.43 | 13.0 | 4 | 0.03 |
| 9 | H-34m | $9 \times 10^{-3}$ | D-II-12 | $1.0 \times 10^{-4}$ | 5.2 | 1.44 | 14.0 | 4 | 0.04 |
| 10 | H-34m | $9 \times 10^{-3}$ | D-I-14 | $1.0 \times 10^{-4}$ | 5.3 | 1.48 | 14.6 | 5 | 0.00 |
| 11 | H-34m | $9 \times 10^{-3}$ | D-I-16 | $1.0 \times 10^{-4}$ | 5.4 | 1.47 | 14.7 | 5 | 0.01 |
| 12 | H-68 | $6 \times 10^{-3}$ | D-I-1 | $1.0 \times 10^{-4}$ | 5.4 | 1.4 | 14.3 | 5 | 0.01 |
| 13 | H-68 | $6 \times 10^{-3}$ | D-I-11 | $1.2 \times 10^{-4}$ | 5.4 | 1.5 | 13.3 | 5 | 0.00 |
| 14 | H-68 | $6 \times 10^{-3}$ | D-II-3 | $1.2 \times 10^{-4}$ | 5.5 | 1.5 | 13.2 | 4 | 0.03 |
| 15 | H-68 | $6 \times 10^{-3}$ | D-II-12 | $1.0 \times 10^{-4}$ | 5.3 | 1.5 | 14.2 | 4 | 0.04 |
| 16 | H-68 | $6 \times 10^{-3}$ | D-I-14 | $1.0 \times 10^{-4}$ | 5.4 | 1.5 | 14.8 | 5 | 0.01 |
| 17 | H-68 | $6 \times 10^{-3}$ | D-I-16 | $1.0 \times 10^{-4}$ | 5.5 | 1.5 | 14.9 | 5 | 0.01 |
| 18 | H-72 | $6 \times 10^{-3}$ | D-I-1 | $1.0 \times 10^{-4}$ | 5.4 | 1.4 | 14.4 | 5 | 0.00 |
| 19 | H-72 | $6 \times 10^{-3}$ | D-I-11 | $1.2 \times 10^{-4}$ | 5.4 | 1.5 | 13.4 | 5 | 0.01 |
| 20 | H-72 | $6 \times 10^{-3}$ | D-II-3 | $1.2 \times 10^{-4}$ | 5.5 | 1.5 | 13.3 | 4 | 0.03 |
| 21 | H-72 | $6 \times 10^{-3}$ | D-II-12 | $1.0 \times 10^{-4}$ | 5.3 | 1.5 | 14.3 | 4 | 0.03 |
| 22 | H-72 | $6 \times 10^{-3}$ | D-I-14 | $1.0 \times 10^{-4}$ | 5.4 | 1.5 | 14.9 | 5 | 0.01 |
| 23 | H-72 | $6 \times 10^{-3}$ | D-I-16 | $1.0 \times 10^{-4}$ | 5.5 | 1.5 | 15.0 | 5 | 0.01 |
| 24 | H-76 | $6 \times 10^{-3}$ | D-I-1 | $1.0 \times 10^{-4}$ | 5.4 | 1.4 | 14.5 | 5 | 0.01 |
| 25 | H-76 | $6 \times 10^{-3}$ | D-I-11 | $1.2 \times 10^{-4}$ | 5.4 | 1.5 | 13.4 | 5 | 0.00 |
| 26 | H-76 | $6 \times 10^{-3}$ | D-II-3 | $1.2 \times 10^{-4}$ | 5.5 | 1.5 | 13.3 | 4 | 0.04 |
| 27 | H-76 | $6 \times 10^{-3}$ | D-II-12 | $1.0 \times 10^{-4}$ | 5.3 | 1.5 | 14.4 | 4 | 0.03 |
| 28 | H-76 | $6 \times 10^{-3}$ | D-I-14 | $1.0 \times 10^{-4}$ | 5.4 | 1.5 | 15.0 | 5 | 0.00 |
| 29 | H-76 | $6 \times 10^{-3}$ | D-I-16 | $1.0 \times 10^{-4}$ | 5.5 | 1.5 | 15.1 | 5 | 0.01 |

*comparison

It is evident that photothermographic materials using compounds within the preferred scope of the invention satisfy all the requirements of high Dmax, high contrast, and image quality and maintain such properties over a long term of storage.

Example 27

The samples prepared in Example 1 were evaluated for shelf stability as in Example 25. Sample Nos. 5–7 and 11–13 using hydrazine derivatives H-26e and H-34m show ΔS of 0.01 whereas samples using hydrazine derivatives other than H-26e and H-34m show ΔS of at least 0.03.

What is claimed is:

1. A photothermographic material comprising at least one photosensitive layer, which comprises an organic silver salt, a silver halide, a reducing agent, a hydrazine derivative of the following formula (H):

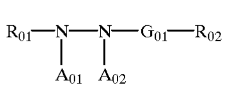

(H)

wherein $R_{01}$ is an aromatic or heterocyclic group;

$R_{02}$ is an alkyl, aryl heterocyclic, alkoxy, aryloxy, amino or hydrazino group, when $G_{01}$ is —CO—, and $R_{02}$ is a hydrogen atom, alkyl, aryl, heterocyclic, alkoxy, aryloxy, amino or hydrazino group when $G_{01}$ is —$SO_2$—, —SO—, —P(=O)(—$R_{03}$)—, —CO—CO—, thiocarbonyl or iminomethylene group;

$A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following formula (D-I):

formula (D-I):

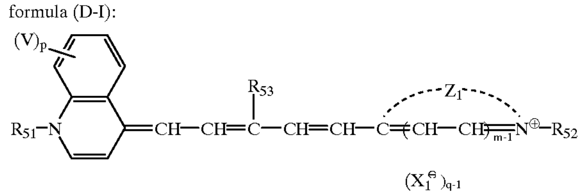

wherein each of $R_{51}$ and $R_{52}$, which may be identical or different, is a substituted alkyl group; $R_{53}$ is a hydrogen atom, lower alkyl, lower alkoxy, phenyl, benzyl or phenethyl group; V is a hydrogen atom, lower alkyl, alkoxy, halogen atom or substituted alkyl group; $Z_1$ is a group of nonmetallic atoms necessary to complete a five- or six-membered nitrogenous heterocycle; $X_1$ is an acid anion; letters m, p and q are independently equal to 1 or 2, with the proviso that q is 1 when the dye forms an intramolecular salt.

2. The photothermographic material of claim 1, wherein said hydrazine derivative has the following formula (Hb) or (Hc);

formula (Hb):

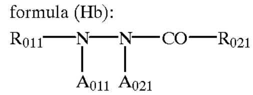

wherein $R_{011}$ is an aromatic group; $R_{021}$ is an alkyl group having at least one electron attractive substituent, an aryl group having at least one electron attractive substituent, or a heterocyclic, amino, alkylamino, arylamino, heterocyclic amino, hydrazino, alkoxy or aryloxy group; both $A_{011}$ and $A_{021}$ are hydrogen atoms or one of $A_{011}$ and $A_{021}$ is a hydrogen atom and the other is a substituted or unsubstituted alkylsulfonyl or acyl group;

formula (Hc):

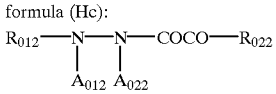

wherein $R_{012}$ is an aromatic group; $R_{022}$ is an amino, alkylamino, arylamino, heterocyclic amino, hydrazino, alkoxy, aryloxy, alkyl or aryl group; and $A_{012}$ and $A_{022}$ are as defined for $A_{011}$ and $A_{021}$.

3. The photosensitive material of claim 2, further comprising a supersensitizing amount of an aromatic mercapto compound of the following formula (I), the silver halide being spectrally sensitized at 600 to 850 nm with a spectral sensitizing dye;

$$Ar—SM \qquad (I)$$

wherein M is hydrogen or an alkali metal atom and Ar is a heteroaromatic ring.

4. The photosensitive material of claim 3, wherein said spectral sensitizing dye is a cyanine dye having at least one substituent with a thioether bond.

5. A photothermographic material comprising at least one photosensitive layer, which comprises an organic silver salt, a silver halide, a reducing agent, a hydrazine derivative of the following formula (H):

(H)

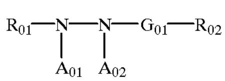

wherein $R_{01}$ is an aromatic or heterocyclic group;

$R_{02}$ is an alkyl, aryl, heterocyclic, alkoxy, aryloxy, amino or hydrazino group when $G_{01}$ is —CO—, and $R_{02}$ is a hydrogen atom, alkyl, aryl, heterocyclic, alkoxy, aryloxy, amino or hydrazino when $G_{01}$ is —$SO_2$—, —SO—, —P(=O)(—$R_{03}$)—, —CO—CO—, thiocarbonyl or iminomethylene group;

$A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following formula (D-II) or (D-III):

formula (D-II)

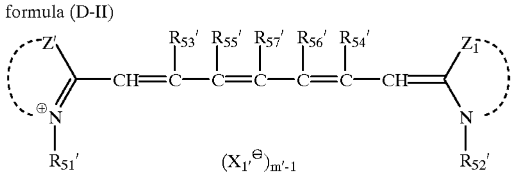

wherein each of $R_{51}'$ and $R_{52}'$, which may be identical or different, is an alkyl group; $R_{53}'$ and $R_{54}'$, each are a hydrogen atom, lower alkyl, lower alkoxy, phenyl, benzyl, or phenethyl group; $R_{55}'$ and $R_{56}'$, each are a hydrogen atom or $R_{55}'$ and $R_{56}'$, taken together, form a divalent alkylene group; $R_{57}'$ is a hydrogen atom, lower alkyl, lower alkoxy, phenyl, benzyl or —N($W_1'$)($W_2'$) group wherein $W_1'$ and $W_2'$ are independently selected from alkyl and aryl groups, or $W_1'$ and $W_2'$, taken together, may form a five- or six-membered nitrogenous heterocycle; or $R_{53}'$ and $R_{57}'$ or $R_{54}'$ and $R_{57}'$, taken together, may form a divalent alkylene group; each of Z' and $Z_1'$ is a group of non-metallic atoms necessary to complete a 5- or 6-membered nitrogenous heterocycle; $X_1'$ is an acid anion; and letter m' is equal to 1 or 2 with the proviso that m' is 1 when the dye forms an intramolecular salt, formula (D-III):

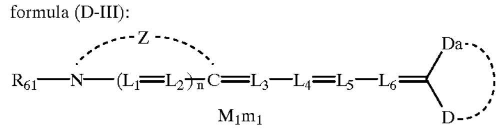

wherein $R_{61}$ is an alkyl group; Z is a group of atoms necessary to complete a five- or six-membered nitrogenous heterocycle; each of D and Da is a group of atoms necessary to form a cyclic or acyclic acidic nucleus; each of $L_1$, $L_2$, $L_3$, $L_4$, $L_5$ and $L_6$ is a methine group; $M_1$ is an electric charge balancing counter ion; $m_1$ is a number necessary to neutralize the electric charge in a molecule; and n is 0 or 1.

6. The photothermographic material of claim 5, wherein in formula (H), $G_{01}$ is —CO—, $R_{02}$ is alkyl, and $A_{01}$ and $A_{02}$ are hydrogen.

7. A photothermographic material comprising at least one photosensitive layer, which comprises an organic silver salt, a silver halide, a reducing agent, a hydrazine derivative of the following formula (H):

(H)

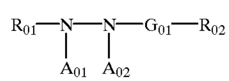

wherein $R_{01}$ is an aromatic or heterocyclic group;

$R_{02}$ is an alkyl, aryl heterocyclic, alkoxy, aryloxy, amino or hydrazino group, when $G_{01}$ is —CO—, and $R_{02}$ is a hydrogen atom, alkyl, aryl, heterocyclic, alkoxy, aryloxy, amino or hydrazino group when $G_{01}$ is —$SO_2$—, —SO—, —P(=O)(—$R_{03}$)—, —CO—CO—, thiocarbonyl or iminomethylene group;

$A_{01}$ and $A_{02}$ are both hydrogen atoms, or one of $A_{01}$ and $A_{02}$ is a hydrogen atom and the other is a substituted or unsubstituted alkylsulfonyl, arylsulfonyl or acyl group; and $R_{03}$ is a group selected from the same range as defined for $R_{02}$ and may be identical with or different from $R_{02}$, and a sensitizing dye of the following formula (D-IV) or (D-V) or (D-VI):

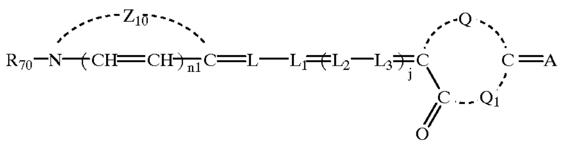

A represents

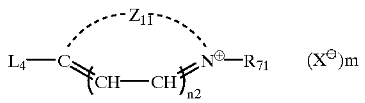

wherein each of $Z_{10}$ and $Z_{11}$ is a group of non-metallic atoms necessary to complete a five- or six-membered nitrogenous heterocyclic nucleus; each of $R_{70}$ and $R_{71}$ is an alkyl, substituted alkyl or aryl group; Q and $Q_1$, taken together, are a group of non-metallic atoms necessary to complete a 4-thiazolidinone, 5-thiazolidinone or 4-imidazolidinone nucleus; each of L, $L_1$, $L_2$, $L_3$, and $L_4$ is a substituted or unsubstituted methine group, or L and $L_2$, or $L_1$ and $L_3$ may form a five- or six-membered ring; $n_1$ and $n_2$ each are 0 or 1; X is an anion; m is 0 or 1, with the proviso that m is 0 when the dye forms an intramolecular salt;

formula (D-V):

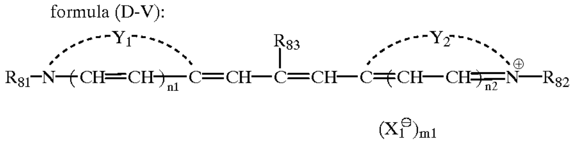

wherein each of $Y_1$ and $Y_2$ is a group of non-metallic atoms necessary to complete a five- or six-membered nitrogenous heterocyclic nucleus which may have a substituent; each of $R_{81}$ and $R_{82}$, which may be identical or different, is a substituted or unsubstituted lower alkyl group; $R_{83}$ is a hydrogen atom, lower alkyl, lower alkoxy, phenyl, benzyl or phenethyl group; $X_1$ is an acid anion; $n_1$ and $n_2$ each are 0 or 1; and $m_1$ is 0 or 1, with the proviso that $m_1$ is 0 when the dye forms an intramolecular salt;

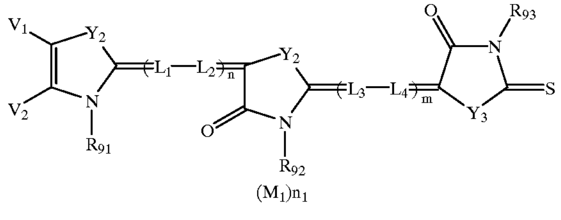

wherein $Y_1$, $Y_2$ and $Y_3$ are independently a group —N—($R_{90}$)—, oxygen, sulfur or selenium atom; each of $R_{90}$, $R_{91}$, $R_{92}$ and $R_{93}$ is an aliphatic, aryl or heterocyclic group; each of $V_1$ and $V_2$ is a hydrogen atom, alkyl, alkoxy or aryl group, or $V_1$ and $V_2$, taken together, may form a fused ring with the azole ring; each of $L_1$, $L_2$, $L_3$, and $L_4$ is a substituted or unsubstituted methine group; n is 1 or 2; m is 0 or 1; $M_1$ is an electric charge balancing counter ion; and $n_1$ is a number necessary to neutralize the electric charge in a molecule.

8. The photothermographic material of any one of claims 1, 5 or 7, comprising the organic silver salt, the silver halide, and the reducing agent on a transparent support, wherein at least one of thermally or optically decolorizable dyes is contained in at least one of the following layers: (1) a photosensitive layer on one surface of the support, (2) a layer disposed between the support and the photosensitive layer, (3) a layer coated on the opposite surface of the support to the photosensitive layer, and (4) a layer disposed on the same surface of the support as the photosensitive layer and more remote from the support than the photosensitive layer.

9. The photothermographic material of claim 8, wherein said decolorizable dye comprises a dye combined with a thermal bleaching agent, an optical bleaching agent or a combination of thermal agent and an optical bleaching agent.

10. The photothermographic material of claim 8, wherein said decolorizable dye comprises a basic colorless dye precursor and an acidic material.

11. The photothermographic material of claim 8, wherein said decolorizable dye comprises an acidic colorless dye precursor and a basic material.

12. The photothermographic material of claim 8, wherein said decolorizable dye comprises at least one decarbonating compound.

13. The photothermographic material of claim 8, wherein said decolorizable dye decolorizes upon exposure to light of up to 100,000 lux-min.

14. The photothermographic material of claim 8, wherein said decolorizable dye comprises (a) a photosensitive halogenated compound which generates an acid upon photolysis and (b) a dye which undergoes a change of color hue upon acidolysis.

15. The photothermographic material of claim 8, which has a transmission density in excess of 0.2 in the photosensitive wavelength range before heat development and a transmission density of up to 0.1 in the wavelength range of 350 to 700 nm in a minimum density portion after decolorization.

16. The photothermographic material of any one of claims 1, 5 or 7, which has a spectral sensitivity maximum at a wavelength of from 600 nm to less than 850 nm, said material further comprising an infrared-absorbing dye having an absorption maximum wavelength of 850 to 1,400 nm.

17. The photothermographic material of claim 16, wherein said infrared-absorbing dye comprises at least one dye of the following formula (F1) and (F2):

$$A_1 = L_a - A_2 \quad \text{(F1)}$$

$$B_1 = L_b - B_2(X^-)_{k-1} \quad \text{(F2)}$$

wherein $A_1$ and $A_2$ each are an acidic nucleus, $B_1$ is a basic nucleus, $B_2$ is an onium form of basic nucleus, $L_a$ and $L_b$ each are a linking group having 5, 7, 9 or 11 methine groups connected through a conjugated double bond, X is an anion, and letter k is equal to 2 or 1, with the proviso that k is 1 where the dye forms an intramolecular salt.

18. The photothermographic material of claim 16, wherein said infrared-absorbing dye comprises at least one lake cyanine dye of the following formula (F3):

$D—A_m.Y_n$ (F3)

wherein D is a skeleton of the cyanine dye represented by the following formula (F4), A is an anionic dissociatable group attached to D as a substituent, Y is a cation, letter m is an integer of 2 to 5, and n is an integer of 1 to 5 for balancing the electric charge, (F4)

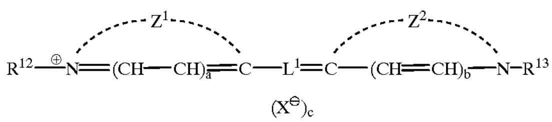

wherein $Z^1$ and $Z^2$ each are a group of non-metallic atoms necessary to form a five- or six-membered nitrogenous heterocycle which may have a ring fused thereto, $R^{12}$ and $R^{13}$ each are an alkyl, alkenyl or aralkyl group, $L^1$ is a linking group having 5, 7 or 9 methine groups connected through a conjugated double bond, and letters a, b and c each are 0 or 1.

19. The photothermographic material of claim 16, wherein the infrared-absorbing dye is present in the material in such a state that the material may have an absorption spectrum shifted at least 50 nm longer than the absorption maximum wavelength of a solution of the dye.

20. The photothermographic material of claim 16, wherein prior to heat development, said material has a transmission density of more than 0.3 at a wavelength of 850 to 1,400 nm and after heat development, a minimum density area of said material has a transmission density of up to 0.1 at a wavelength of 350 to 700 nm.

* * * * *